US012565877B2

(12) United States Patent
Theisen et al.

(10) Patent No.: US 12,565,877 B2
(45) Date of Patent: Mar. 3, 2026

(54) ELECTRICALLY OPERATED LINEAR PUMP AND PUMP DRIVE

(71) Applicant: Graco Minnesota Inc., Minneapolis, MN (US)

(72) Inventors: Matthew R. Theisen, Woodbury, MN (US); Arthur T. Graf, Roseville, MN (US); Bryan K. Colby, New Brighton, MN (US); Andrew J. Ericson, Andover, MN (US); Thomas F. Janecek, Flagstaff, AZ (US); Christopher A. Lins, Waverly, MN (US); Alexander J. Daeger, Roseville, MN (US); David M. Larsen, Albertville, MN (US); Jeremy P. Jurmu, Buffalo, MN (US); William M. Blenkush, Becker, MN (US); Mark D. Shultz, Ham Lake, MN (US); Steven D. Becker, Inver Grove Heights, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 647 days.

(21) Appl. No.: 17/914,661

(22) PCT Filed: Mar. 31, 2021

(86) PCT No.: PCT/US2021/025129

§ 371 (c)(1),
(2) Date: Sep. 26, 2022

(87) PCT Pub. No.: WO2021/202695

PCT Pub. Date: Oct. 7, 2021

(65) Prior Publication Data

US 2023/0136204 A1 May 4, 2023

Related U.S. Application Data

(60) Provisional application No. 63/002,693, filed on Mar. 31, 2020, provisional application No. 63/002,811, filed on Mar. 31, 2020.

(51) Int. Cl.
*F04B 9/02* (2006.01)
*B05B 9/04* (2006.01)
(Continued)

(52) U.S. Cl.
CPC .............. *F04B 9/02* (2013.01); *B05B 9/0413* (2013.01); *F04B 17/03* (2013.01); *F04B 53/12* (2013.01)

(58) Field of Classification Search
CPC .. F04B 9/02; F04B 17/03; F04B 53/12; F04B 35/01; F04B 35/04; B05B 9/0413
See application file for complete search history.

(56) References Cited

U.S. PATENT DOCUMENTS 1,650,377 A 11/1927 Leroy
1,865,350 A 6/1932 William
(Continued)

FOREIGN PATENT DOCUMENTS

CN 87202952 U 3/1988
CN 2262110 Y 9/1997
(Continued)

OTHER PUBLICATIONS

First Chinese Office Action for CN Application No. 202180026302.4, Dated Dec. 24, 2024, pp. 21.
(Continued)

*Primary Examiner* — Bryan M Lettman
(74) *Attorney, Agent, or Firm* — Kinney & Lange, P.A.

(57) ABSTRACT

A pumping assembly comprises: a motor (24) including a stator and a rotor, the rotor configured to rotate relative the
(Continued)

stator on a pump axis (PA); a drive mechanism (24) connected to the rotor, the drive mechanism (24) configured to receive a rotational output from the rotor and convert the rotational output into a linear input along the pump axis to cause pumping of the fluid; and a piston (34) connected to the drive mechanism (26) to receive the linear input and disposed coaxially with the drive mechanism (26) and the rotor, wherein the piston (34) is configured to reciprocate axially along the pump axis to pump fluid.

19 Claims, 36 Drawing Sheets

(51) Int. Cl.

| | |
|---|---|
| ***F04B 17/03*** | (2006.01) |
| ***F04B 53/12*** | (2006.01) |

(56) References Cited

U.S. PATENT DOCUMENTS

| | | | |
|---|---|---|---|
| 1,926,403 | A | 9/1933 | Phillips |
| 2,069,471 | A | 2/1937 | Baker |
| 2,286,263 | A | 6/1942 | Comins |
| 2,368,131 | A | 1/1945 | French |
| 2,407,792 | A | 9/1946 | Mcmillan |
| 2,446,393 | A | 8/1948 | Russell |
| 2,464,936 | A | 3/1949 | Mcconaghy |
| 2,491,230 | A | 12/1949 | Theis |
| 2,508,253 | A | 5/1950 | Haggardt |
| 2,737,817 | A | 3/1956 | Harris et al. |
| 2,752,854 | A | 7/1956 | Prior et al. |
| 2,821,404 | A | 1/1958 | Sloan |
| 2,844,103 | A | 7/1958 | Allen |
| 3,075,468 | A | 1/1963 | Eifel |
| 3,164,101 | A | 1/1965 | Nederynen |
| 3,207,080 | A | 9/1965 | Schlosser |
| 3,250,225 | A | 5/1966 | Taplin |
| 3,276,389 | A | 10/1966 | Bower |
| 3,354,830 | A | 11/1967 | Mortara |
| 3,414,302 | A | 12/1968 | Priest |
| 3,416,461 | A | 12/1968 | Rolland |
| 3,501,180 | A | 3/1970 | Waara |
| 3,542,491 | A | 11/1970 | Newman |
| 3,652,187 | A | 3/1972 | Loeffler et al. |
| 3,670,630 | A | 6/1972 | Tyson et al. |
| 3,680,981 | A | 8/1972 | Wagner |
| 3,741,689 | A | 6/1973 | Rupp |
| 3,769,879 | A | 11/1973 | Lofquist |
| 3,775,030 | A | 11/1973 | Wanner |
| 3,814,086 | A | 6/1974 | Lemb |
| 3,849,033 | A | 11/1974 | Schall |
| 3,857,642 | A | 12/1974 | Miller |
| 3,916,449 | A | 11/1975 | Davis |
| 3,967,542 | A | 7/1976 | Hall et al. |
| 3,999,896 | A | 12/1976 | Sebastiani |
| 4,008,984 | A | 2/1977 | Scholle |
| 4,060,351 | A | 11/1977 | Cloup |
| 4,068,982 | A | 1/1978 | Quarve |
| 4,123,204 | A | 10/1978 | Scholle |
| 4,145,165 | A | 3/1979 | Perkins et al. |
| 4,276,003 | A | 6/1981 | Perkins et al. |
| 4,277,706 | A | 7/1981 | Isaacson |
| 4,348,159 | A | 9/1982 | Acheson |
| 4,365,745 | A | 12/1982 | Beck |
| 4,366,723 | A | 1/1983 | Wilke et al. |
| 4,403,924 | A | 9/1983 | Gebauer et al. |
| 4,459,089 | A | 7/1984 | Vincent et al. |
| 4,511,276 | A | 4/1985 | Doutt |
| 4,526,053 | A | 7/1985 | Carson |
| 4,549,467 | A | 10/1985 | Wilden et al. |
| 4,615,259 | A | 10/1986 | Anbe |
| 4,635,621 | A | 1/1987 | Atkinson |
| 4,637,193 | A | 1/1987 | Lange |
| 4,681,516 | A | 7/1987 | Ohara et al. |
| 4,696,211 | A | 9/1987 | Bitzel |
| 4,749,300 | A | 6/1988 | Berger et al. |
| 4,778,356 | A | 10/1988 | Hicks |
| 4,815,360 | A | 3/1989 | Winterle |
| 4,883,412 | A | 11/1989 | Malizard et al. |
| 4,902,206 | A | 2/1990 | Nakazawa et al. |
| 5,053,660 | A | 10/1991 | Sneddon |
| 5,061,077 | A | 10/1991 | Whiteman |
| 5,066,199 | A | 11/1991 | Reese et al. |
| 5,076,761 | A | 12/1991 | Krohn et al. |
| 5,106,274 | A | 4/1992 | Holtzapple |
| 5,122,032 | A | 6/1992 | Shields et al. |
| 5,128,688 | A | 7/1992 | West |
| 5,135,329 | A | 8/1992 | Yuda |
| 5,145,339 | A | 9/1992 | Lehrke et al. |
| 5,165,869 | A | 11/1992 | Reynolds |
| 5,174,731 | A | 12/1992 | Korver |
| 5,213,485 | A | 5/1993 | Wilden |
| 5,219,274 | A | 6/1993 | Pawlowski et al. |
| 5,249,932 | A | 10/1993 | Van |
| 5,253,981 | A | 10/1993 | Yang et al. |
| 5,257,914 | A | 11/1993 | Reynolds |
| 5,279,504 | A | 1/1994 | Williams |
| 5,312,233 | A | 5/1994 | Tanny et al. |
| 5,362,212 | A | 11/1994 | Bowen et al. |
| 5,378,122 | A | 1/1995 | Duncan |
| 5,407,292 | A | 4/1995 | Collins |
| 5,413,031 | A | 5/1995 | Kohlmeyer |
| 5,440,282 | A | 8/1995 | Devendorf et al. |
| 5,484,270 | A | 1/1996 | Adahan |
| 5,509,766 | A | 4/1996 | Leuschner |
| 5,525,515 | A | 6/1996 | Blattner |
| 5,527,160 | A | 6/1996 | Kozumplik et al. |
| 5,557,154 | A | 9/1996 | Erhart |
| 5,567,118 | A | 10/1996 | Grgurich et al. |
| 5,616,005 | A | 4/1997 | Whitehead |
| 5,649,809 | A | 7/1997 | Stapelfeldt |
| 5,711,709 | A | 1/1998 | McCoy |
| D390,923 | S | 2/1998 | Stevens |
| 5,751,125 | A | 5/1998 | Weiss |
| 5,816,778 | A | 10/1998 | Elsey et al. |
| 5,927,954 | A | 7/1999 | Kennedy et al. |
| 5,939,813 | A | 8/1999 | Schoeb |
| 6,032,349 | A | 3/2000 | Wagner et al. |
| 6,036,445 | A | 3/2000 | Reynolds |
| 6,092,992 | A | 7/2000 | Imblum et al. |
| 6,092,995 | A | 7/2000 | Morikawa |
| 6,106,246 | A | 8/2000 | Steck et al. |
| 6,109,878 | A | 8/2000 | Barton et al. |
| 6,135,722 | A | 10/2000 | Kawaguchi et al. |
| 6,139,288 | A | 10/2000 | Karasawa |
| 6,142,749 | A | 11/2000 | Jack et al. |
| 6,158,982 | A | 12/2000 | Kennedy et al. |
| 6,174,136 | B1 | 1/2001 | Kilayko et al. |
| 6,183,225 | B1 | 2/2001 | Thompson |
| 6,212,998 | B1 | 4/2001 | Thompson et al. |
| 6,280,149 | B1 | 8/2001 | Able et al. |
| 6,299,415 | B1 | 10/2001 | Bahrton |
| 6,402,486 | B1 | 6/2002 | Steck et al. |
| 6,428,287 | B1 | 8/2002 | Denkins et al. |
| 6,468,057 | B1 | 10/2002 | Beck |
| 6,474,961 | B1 | 11/2002 | Timmer et al. |
| 6,533,488 | B2 | 3/2003 | Blenkush et al. |
| 6,609,646 | B2 | 8/2003 | Miller et al. |
| 6,764,284 | B2 | 7/2004 | Oehman |
| 6,811,380 | B2 | 11/2004 | Kim |
| 6,935,846 | B2 | 8/2005 | Jesse |
| 6,994,500 | B2 | 2/2006 | Ward et al. |
| 7,036,752 | B1 | 5/2006 | Hsiang |
| 7,112,025 | B2 | 9/2006 | Ward et al. |
| 7,128,541 | B2 | 10/2006 | Kaech |
| 7,242,118 | B2 | 7/2007 | Sakamoto |
| 7,399,168 | B1 | 7/2008 | Eberwein |
| 7,448,857 | B1 | 11/2008 | Fugere |
| 7,492,074 | B1 | 2/2009 | Rittenhouse |
| 7,517,199 | B2 | 4/2009 | Reed et al. |
| 7,568,874 | B2 | 8/2009 | Riedel et al. |
| 7,600,985 | B2 | 10/2009 | Meloche et al. |

(56) References Cited

U.S. PATENT DOCUMENTS

| | | | |
|---|---|---|---|
| 7,626,308 | B2 | 12/2009 | Kang et al. |
| 7,654,801 | B2 | 2/2010 | Spude |
| 7,658,598 | B2 | 2/2010 | Reed et al. |
| 7,758,321 | B2 | 7/2010 | Fukano et al. |
| 7,918,654 | B2 | 4/2011 | Adahan |
| 8,053,944 | B2 | 11/2011 | Calley et al. |
| 8,083,470 | B2 | 12/2011 | Yu et al. |
| 8,123,500 | B2 | 2/2012 | Jueterbock et al. |
| 8,167,583 | B2 | 5/2012 | Harnetiaux et al. |
| 8,167,586 | B2 | 5/2012 | Towne |
| 8,177,524 | B1 | 5/2012 | Kieffer et al. |
| 8,182,247 | B2 | 5/2012 | Gallwey et al. |
| 8,292,600 | B2 | 10/2012 | Reed et al. |
| 8,313,313 | B2 | 11/2012 | Juterbock et al. |
| 8,337,166 | B2 | 12/2012 | Meza et al. |
| 8,382,445 | B2 | 2/2013 | Roseberry |
| 8,393,881 | B2 | 3/2013 | Usui et al. |
| 8,405,275 | B2 | 3/2013 | Calley et al. |
| 8,485,792 | B2 | 7/2013 | Mccourt et al. |
| 8,529,223 | B2 | 9/2013 | Cohoon et al. |
| 8,581,866 | B2 | 11/2013 | Park et al. |
| 8,585,372 | B2 | 11/2013 | Bacher et al. |
| 8,602,751 | B2 | 12/2013 | Courier |
| 8,845,298 | B2 | 9/2014 | Larsen et al. |
| 8,847,529 | B2 | 9/2014 | Dixon et al. |
| 9,068,567 | B2 | 6/2015 | Hitter et al. |
| 9,212,657 | B2 | 12/2015 | Reukers |
| 9,316,218 | B2 | 4/2016 | Mccourt et al. |
| 9,385,572 | B2 | 7/2016 | Lu et al. |
| 9,638,185 | B2 | 5/2017 | Hines et al. |
| 10,046,351 | B2 | 8/2018 | Brudevold et al. |
| 10,161,393 | B2 | 12/2018 | Hines et al. |
| 10,594,192 | B1 | 3/2020 | Kaul |
| 10,900,583 | B2 | 1/2021 | Gagliano et al. |
| 10,941,764 | B2 * | 3/2021 | Ohm ........................ F16H 25/20 |
| 11,912,252 | B2 * | 2/2024 | Weh ........................ F16D 65/28 |
| 12,103,507 | B2 * | 10/2024 | Weh ...................... B60T 13/745 |
| 12,162,449 | B2 * | 12/2024 | Tuerk ...................... F16C 19/34 |
| 2001/0029838 | A1 | 10/2001 | Blenkush et al. |
| 2001/0048882 | A1 | 12/2001 | Layman |
| 2002/0079016 | A1 | 6/2002 | Webb |
| 2002/0153794 | A1 | 10/2002 | Kawasaki et al. |
| 2003/0000765 | A1 | 1/2003 | Spadafora |
| 2003/0099550 | A1 | 5/2003 | Kim |
| 2003/0161746 | A1 | 8/2003 | Asayama et al. |
| 2004/0057853 | A1 | 3/2004 | Ross et al. |
| 2004/0086398 | A1 | 5/2004 | Eugene et al. |
| 2005/0089427 | A1 | 4/2005 | Riley et al. |
| 2005/0104469 | A1 | 5/2005 | Zepp et al. |
| 2005/0156556 | A1 | 7/2005 | Hermann et al. |
| 2006/0056979 | A1 | 3/2006 | Yoo et al. |
| 2006/0127252 | A1 | 6/2006 | Caddell |
| 2006/0162549 | A1 | 7/2006 | Wang |
| 2006/0257271 | A1 | 11/2006 | Juterbock et al. |
| 2006/0292016 | A1 | 12/2006 | Hitter et al. |
| 2007/0092385 | A1 | 4/2007 | Petrie |
| 2007/0236089 | A1 | 10/2007 | Okubo |
| 2007/0272075 | A1 | 11/2007 | Nathan |
| 2008/0179982 | A1 | 7/2008 | Kramer |
| 2008/0286120 | A1 | 11/2008 | Noord |
| 2009/0097987 | A1 | 4/2009 | Sung et al. |
| 2009/0108712 | A1 | 4/2009 | Holtzapple et al. |
| 2009/0196771 | A1 | 8/2009 | Juterbock et al. |
| 2010/0045096 | A1 | 2/2010 | Schonlau et al. |
| 2010/0178184 | A1 | 7/2010 | Simmons et al. |
| 2010/0196176 | A1 | 8/2010 | Kaufmann et al. |
| 2011/0133485 | A1 | 6/2011 | Gieras et al. |
| 2011/0138949 | A1 | 6/2011 | Himmelmann |
| 2011/0163704 | A1 | 7/2011 | Wang et al. |
| 2011/0236236 | A1 | 9/2011 | Larsen et al. |
| 2012/0000561 | A1 | 1/2012 | Schuttermair et al. |
| 2012/0063925 | A1 | 3/2012 | Parker |
| 2012/0065457 | A1 | 3/2012 | Peters et al. |
| 2012/0119599 | A1 | 5/2012 | Calley et al. |
| 2012/0227389 | A1 | 9/2012 | Hinderks |
| 2012/0291920 | A1 | 11/2012 | Grisley |
| 2013/0008538 | A1 | 1/2013 | Schutze |
| 2013/0015733 | A1 | 1/2013 | Rasch et al. |
| 2013/0039789 | A1 | 2/2013 | Donado-Munoz |
| 2013/0078123 | A1 | 3/2013 | Fukasaku et al. |
| 2013/0078125 | A1 | 3/2013 | Headley et al. |
| 2013/0101445 | A1 | 4/2013 | Schuetze |
| 2013/0183173 | A1 | 7/2013 | Kohli et al. |
| 2013/0233421 | A1 | 9/2013 | Furet et al. |
| 2013/0243630 | A1 | 9/2013 | Simmons et al. |
| 2013/0256426 | A1 | 10/2013 | Becker et al. |
| 2014/0034754 | A1 | 2/2014 | Thompson et al. |
| 2014/0219819 | A1 | 8/2014 | Roman et al. |
| 2014/0260746 | A1 | 9/2014 | Sakaguchi et al. |
| 2015/0048712 | A1 | 2/2015 | Janecek et al. |
| 2015/0226192 | A1 | 8/2015 | Hines et al. |
| 2015/0226205 | A1 | 8/2015 | Hines et al. |
| 2015/0226206 | A1 | 8/2015 | Hines et al. |
| 2015/0226207 | A1 | 8/2015 | Hines et al. |
| 2015/0266192 | A1 | 9/2015 | Coresh |
| 2015/0322931 | A1 * | 11/2015 | Weh ......................... H02K 7/14 417/415 |
| 2015/0375727 | A1 * | 12/2015 | Weh ........................ F16H 57/00 29/428 |
| 2015/0377261 | A1 * | 12/2015 | Weh .......................... F04B 9/02 92/33 |
| 2016/0001624 | A1 | 1/2016 | Meissner et al. |
| 2016/0377065 | A1 | 12/2016 | Parker |
| 2017/0030445 | A1 * | 2/2017 | Weh ........................ F04B 9/047 |
| 2017/0067455 | A1 | 3/2017 | Reukers et al. |
| 2017/0130792 | A1 * | 5/2017 | Tandler ................. B60T 13/741 |
| 2017/0149304 | A1 | 5/2017 | Li et al. |
| 2017/0198690 | A1 | 7/2017 | Johnston et al. |
| 2017/0217418 | A1 * | 8/2017 | Ganzel .................. B60T 8/4086 |
| 2018/0106244 | A1 | 4/2018 | Wang et al. |
| 2018/0223817 | A1 | 8/2018 | Turner et al. |
| 2018/0345934 | A1 * | 12/2018 | Weh ...................... B60T 8/4018 |
| 2019/0100188 | A1 * | 4/2019 | Lee ....................... B60T 11/102 |
| 2020/0248682 | A1 | 8/2020 | Reukers et al. |
| 2020/0291936 | A1 | 9/2020 | Brocker et al. |
| 2021/0301819 | A1 | 9/2021 | Reynolds et al. |
| 2022/0112888 | A1 * | 4/2022 | Weh ...................... B60T 13/745 |

FOREIGN PATENT DOCUMENTS

| | | | |
|---|---|---|---|
| CN | 2473348 | Y | 1/2002 |
| CN | 1714236 | A | 12/2005 |
| CN | 1298990 | C | 2/2007 |
| CN | 201041118 | Y | 3/2008 |
| CN | 201189501 | Y | 2/2009 |
| CN | 101617162 | A | 12/2009 |
| CN | 101970875 | A | 2/2011 |
| CN | 201827066 | U | 5/2011 |
| CN | 102202802 | A | 9/2011 |
| CN | 102947593 | A | 2/2013 |
| CN | 103298564 | A | 9/2013 |
| CN | 103814213 | A | 5/2014 |
| CN | 105121867 | A | 12/2015 |
| CN | 105673378 | A | 6/2016 |
| DE | 4300512 | A1 | 7/1994 |
| DE | 102004063032 | A1 | 7/2006 |
| DE | 102010018145 | A1 | 10/2011 |
| EP | 0781922 | A1 | 7/1997 |
| EP | 0799672 | A1 | 10/1997 |
| EP | 3299622 | A1 | 3/2018 |
| EP | 3502470 | A1 | 6/2019 |
| EP | 3530940 | A1 | 8/2019 |
| FR | 2681646 | A1 | 3/1993 |
| GB | 1408095 | A | 10/1975 |
| JP | 2000145577 | A | 5/2000 |
| JP | 2004210544 | A | 7/2004 |
| JP | 2005098135 | A | 4/2005 |
| JP | 2006029302 | A | 2/2006 |
| JP | 2006291957 | A | 10/2006 |
| JP | 2007500821 | A | 1/2007 |
| JP | 2011220223 | A | 11/2011 |
| JP | 2014152767 | A | 8/2014 |
| KR | 200296106 | Y1 | 11/2002 |
| TW | 200606337 | A | 2/2006 |

(56) References Cited

FOREIGN PATENT DOCUMENTS

| | | | |
|---|---|---|---|
| WO | 9012962 | A1 | 11/1990 |
| WO | 03002257 | A2 | 1/2003 |
| WO | 2006037671 | A1 | 4/2006 |
| WO | 2009076429 | A2 | 6/2009 |
| WO | WO2010066754 | A1 | 6/2010 |
| WO | 2011162822 | A2 | 12/2011 |
| WO | 2012034238 | A1 | 3/2012 |
| WO | 2012125790 | A2 | 9/2012 |
| WO | WO2015127497 | A1 | 9/2015 |
| WO | 2016100197 | A1 | 6/2016 |
| WO | 2016100707 | A1 | 6/2016 |

OTHER PUBLICATIONS

International Preliminary Report on Patentability for PCT Application No. PCT/US20211/025129, Dated Oct. 13, 2022, pp. 10.

International Preliminary Report on Patentability for PCT Application No. PCT/US2021/025086, Dated Oct. 13, 2022, pp. 19.

International Preliminary Report on Patentability for PCT Application No. PCT/US2021/025121, Dated Oct. 13, 2022, pp. 11.

International Preliminary Report on Patentability for PCT Application No. PCT/US2021/025132, Dated Oct. 13, 2022, pp. 14.

International Preliminary Report on Patentability for PCT Application No. PCT/US2021/025133, Dated Oct. 13, 2022, pp. 7.

International Search Report and Written Opinion for PCT Application No. PCT/US2021/025086, Dated Aug. 31, 2021, pp. 25.

International Search Report and Written Opinion for PCT Application No. PCT/US2021/025121, Dated Jul. 5, 2021, pp. 20.

International Search Report and Written Opinion for PCT Application No. PCT/US2021/025132, Dated Aug. 12, 2021, pp. 22.

Invitation to Pay Additional Fees for PCT Application No. PCT/US2021/025121, Dated May 14, 2021, pp. 15.

Invitation to Pay Additional Fees for PCT Application No. PCT/US2021/025132, Dated Jun. 21, 2021, pp. 15.

motorcontroltips.com: Halbach array What is it and how is it used in electric motors pdf from motioncontroltips.com/what-is-halbach-array-and-how-is-it-used-in-electric-motors/ (Year:2021).

International Search Report and Written Opinion for PCT Application No. PCT/US2021/025133, Dated Jun. 4, 2021, pp. 12.

Invitation to Pay Additional Fees for PCT Application No. PCT/US2021/025086, Dated Jul. 7, 2021, pp. 18.

International Search Report and Written Opinion for PCT Application No. PCT/US2021/025129, Dated Jul. 8, 2021, pp. 18.

Invitation to Pay Additional Fees for PCT Application No. PCT/US2021/025129, Dated May 17, 2021, pp. 24.

* cited by examiner

ELECTRICALLY OPERATED LINEAR PUMP AND PUMP DRIVE

CROSS-REFERENCE TO RELATED APPLICATION(S)

This application is a national phase application of PCT Application No. PCT/US2021/025129, which claims the benefit of U.S. Provisional Application No. 63/002,811, filed Mar. 31, 2020, and entitled "ELECTRIC FEED PUMP FOR A PLURAL COMPONENT SPRAY SYSTEM," and claims the benefit of U.S. Provisional Application No. 63/002,693, filed Mar. 31, 2020, and entitled "ELECTRICALLY OPERATED LINEAR PUMP DRIVE," the disclosures of which are hereby incorporated by reference in their entireties.

BACKGROUND

This disclosure generally relates to fluid displacement systems. More specifically, this disclosure relates to drives for positive displacement pumps for use in fluid displacement systems, such as spray systems and plural component dispensing systems.

A spray fluid, such as paint, is put under pressure by a pump for application to a substrate. Typically, the fluid is placed under pressure by a positive displacement pump. The pump places the fluid under pressure and outputs the fluid under pressure through a flexible hose. A spray gun is used to dispense the fluid, the gun being attached to the end of the hose opposite the pump. The positive displacement pump is typically mounted to a drive housing and driven by a motor. A pump rod is attached to a reciprocating drive that drives reciprocation of the pump rod, thereby pulling fluid from a container into the pump and then driving the fluid downstream from the pump. In some cases, electric motors can power the pump. The motor is attached to the pump via a gear reduction system that increases the torque and reduces the speed generated by the motor.

Multiple component (e.g., liquid) applicators often include dispensing systems that receive separate inert material components, mix the components in a predetermined ratio, and then dispense the components as an activated compound. For example, multiple component applicators are often used to dispense epoxies and polyurethanes that solidify after mixing of a resin component and an activating material, which are individually inert. After mixing, an immediate chemical reaction begins that results in the cross-linking, curing, and solidification of the mixture. Therefore, the two components are routed separately in the system so that they can remain segregated as long as possible. A dispensing device, such as a sprayer or other device, receives each component and mixes the components for delivery as an activated compound. A typical multiple component applicator system includes positive displacement pumps that individually draw in component materials from separate hoppers and pump the pressurized component materials (e.g., fluids) to the dispensing device for mixing and application.

SUMMARY

According to one aspect of the present disclosure, a pumping assembly for pumping a spray fluid from an upstream fluid source to a downstream spray applicator for spraying of the fluid includes a motor including a stator and a rotor, the rotor configured to rotate relative the stator on a pump axis; a pump frame supporting the motor by a first static connection and a first dynamic connection; and a drive mechanism connected to the rotor, the drive mechanism configured to receive a rotational output from the rotor and convert the rotational output into a linear input along the pump axis to cause pumping of the fluid.

According to an additional or alternative aspect of the present disclosure, a pumping assembly for pumping a spray fluid from an upstream fluid source to a downstream spray applicator for spraying of the fluid includes a motor including a stator and a rotor, the rotor configured to rotate relative the stator on a pump axis; a pump frame supporting the motor by a first static connection and a first dynamic connection; a drive mechanism connected to the rotor, the drive mechanism configured to receive a rotational output from the rotor and convert the rotational output into a linear input along the pump axis to cause pumping of the fluid; and a displacement pump fixed to the pump frame by a second static connection and connected to the drive mechanism by a second dynamic connection.

According to yet another additional or alternative aspect of the present disclosure, a fluid sprayer includes a frame elongate along an axis to have a first end and a second end; a motor mounted on the first end of the frame and configured to output rotational motion, the motor electrically powered and including a rotor rotating about an axis and a stator the motor; a pump mounted on the second end of the frame, the pump comprising a piston and a cylinder, the piston reciprocating along the axis within the cylinder; a drive mechanism supported by the frame and located directly between the motor and the pump, the drive mechanism comprising a screw that is elongate along the axis, the screw only one of linearly translating along or rotating about the axis, the drive mechanism outputting linear reciprocating motion. The piston receives the linear reciprocating motion output by the drive mechanism to reciprocate the piston along the axis while the cylinder is braced by the frame such that the piston reciprocates within the cylinder.

According to yet another additional or alternative aspect of the present disclosure, a pumping assembly for pumping a spray fluid from an upstream fluid source to a downstream spray applicator for spraying of the fluid includes a motor including a stator and a rotor, the rotor configured to rotate on a pump axis about the stator to cause reciprocation of a fluid displacement member of a pump on the pump axis; a drive mechanism connected to the rotor, the drive mechanism configured to convert a rotational output from the rotor into a linear input along the pump axis to cause pumping of the fluid by the fluid displacement member; and a bearing supporting the rotor and configured to react axial loads in both a first axial direction along the pump axis and a second axial direction along the pump axis.

According to yet another additional or alternative aspect of the present disclosure, a pumping assembly for pumping a spray fluid to an applicator to generate a fluid spray includes a motor having a stator and a rotor disposed coaxially about the stator on a pump axis, the rotor including a rotor shaft extending in a first axial direction from a rotor body of the rotor; a pump frame extending in the first axial direction from a first end of the motor such that the rotor shaft extends into the pump frame, wherein the pump frame is connected to the stator to support the motor; a drive mechanism connected to the rotor shaft, the drive mechanism configured to convert a rotational output from the rotor to a linear input along the pump axis; and a bearing supporting the motor relative the pump frame and configured to transmit axial forces to the pump frame.

According to yet another additional or alternative aspect of the present disclosure, a method of pumping fluid to a spray gun to generate an atomized fluid spray includes driving rotation of a rotor of an electric motor about a pump axis and about a stator of the motor; displacing a screw of a drive mechanism axially along the pump axis by the rotation of the rotor; reciprocating a fluid displacement member connected to the screw along the pump axis by displacing the screw along the pump axis, wherein reciprocating the fluid displacement member causes the fluid displacement member to pump fluid; receiving axial loads generated during pumping at the drive mechanism; and transmitting the axial loads to a pump frame by a bearing disposed radially between the pump frame and a rotor shaft connecting the drive mechanism to the rotor.

According to yet another additional or alternative aspect of the present disclosure, a portable fluid sprayer includes a frame having a first end and a second end, a motor, a pump, a drive mechanism supported by the frame and located axially between the motor and the pump, and a bearing assembly located between the drive mechanism and the motor. The motor is mounted on the first end of the frame, electrically powered, and has a rotor and a stator. The motor is configured to output rotational motion about an axis. The pump is mounted on the second end of the frame, includes a piston and a cylinder, and is configured to reciprocate along the axis within the cylinder. The drive mechanism includes a screw that is elongate along the axis and configured to only one of linearly translate along or rotate about the axis. The drive mechanism is configured to output linear reciprocating motion. The piston is configured to receive the linear reciprocating motion output by the drive mechanism and to reciprocate within the cylinder through an upstroke and a downstroke. The piston receives a downward reaction force when moving through the upstroke and an upward reaction force when moving through the downstroke. The drive mechanism and the bearing assembly are arranged such that both of the upward reaction force and the downward reaction force transfer through the drive mechanism and to the bearing assembly. The bearing assembly permits rotational motion to pass within the bearing assembly from the motor to the drive mechanism while the bearing assembly prevents some or all of both of the downward reaction force and the upward reaction force from transferring to the rotor.

According to yet another additional or alternative aspect of the present disclosure, a pumping assembly for pumping a spray fluid from an upstream fluid source to a downstream spray applicator for spraying of the fluid. The pumping assembly includes a motor including a stator and a rotor configured to rotate about the stator on a pump axis; and a drive mechanism configured to receive a rotational output from the rotor and generate a linear input along the pump axis to cause pumping of the fluid. The rotor includes a rotor body including a plurality of permanent magnets; and a rotor shaft disposed coaxially on the pump axis and extending in a first axial direction from the rotor body. The drive mechanism is connected to an end of the rotor shaft opposite the rotor body. The rotor shaft defines a cavity, and wherein at least a portion of the drive mechanism is disposed within the cavity.

According to yet another additional or alternative aspect of the present disclosure, a pumping assembly for pumping a spray fluid to an applicator to generate a fluid spray includes a motor having a stator and a rotor, a pump frame supporting the motor, and a drive mechanism. The rotor is disposed coaxially about the stator on a pump axis and includes a rotor shaft extending in a first axial direction from a rotor body of the rotor. The rotor shaft at least partially defines a cavity. The rotor shaft extends into the pump frame. The drive mechanism is configured to convert a rotational output from the rotor shaft to a linear input along the pump axis. At least a portion of a linear drive element of the drive mechanism axially extends into the cavity of the rotor shaft.

According to yet another additional or alternative aspect of the present disclosure, a method of pumping fluid to a spray gun to generate an atomized fluid spray includes driving rotation of a rotor of an electric motor about a pump axis and about a stator of the motor, the rotor including a rotor shaft coaxial with the pump axis and extending in a first axial direction from a rotor body of the rotor; displacing a screw of a drive mechanism axially along the pump axis by the rotation of the rotor; and reciprocating a fluid displacement member connected to the screw along the pump axis by displacing the screw along the pump axis to pump a fluid. At least a portion of the screw axially overlaps with the rotor shaft for at least a portion of a reciprocation cycle of the screw.

According to yet another additional or alternative aspect of the present disclosure, a fluid pump apparatus includes a frame having a first end and a second end; a motor mounted on the first end of the frame, the motor electrically powered, the motor comprising a rotor and a stator, the rotor rotating about an axis, the motor configured to output rotational motion; a pump mounted on the second end of the frame, the pump comprising a piston and a cylinder; a drive mechanism supported by the frame and located directly between the motor and the pump, the drive mechanism comprising a screw having a first end, the drive mechanism outputting linear reciprocating motion; and a rotor shaft located between the motor and the drive mechanism, the rotor shaft conveying the rotational motion from the motor to the drive mechanism, the rotor shaft comprising a cavity within which the first end of the screw linearly translates.

According to yet another additional or alternative aspect of the present disclosure, a pumping assembly for pumping a spray fluid from an upstream fluid source to a downstream spray applicator for spraying of the fluid includes a motor including a stator and a rotor, the rotor configured to rotate about the stator on a pump axis; a drive mechanism connected the rotor and configured to convert a rotational output from the rotor into a linear input along the pump axis to cause pumping of the fluid, wherein the drive mechanism includes a linear drive element configured to displace axially along the pump axis; and a clocking member interfacing with the linear drive element to prevent rotation of the linear drive element about the pump axis.

According to yet another additional or alternative aspect of the present disclosure, a pumping assembly for pumping a spray fluid to an applicator to generate a fluid spray includes a motor having a stator and a rotor, the rotor disposed coaxially about the stator on a pump axis, wherein the motor includes a first motor end and a second motor end; a pump frame fixed to the second motor end and including a main body extending in a first axial direction relative the motor, wherein the rotor shaft extends into the main body; a drive mechanism connected to the rotor, the drive mechanism configured to convert a rotational output from the rotor to a linear input along the pump axis; and a clocking member connected to a linear drive element of the drive mechanism and interfacing with the main body to prevent the linear drive element from rotating about the pump axis.

According to yet another additional or alternative aspect of the present disclosure, a method of pumping fluid to a spray gun to generate an atomized fluid spray includes driving rotation of a rotor of an electric motor about a pump axis and about a stator of the motor; displacing a screw of a drive mechanism axially along the pump axis by rotation of the rotor; reciprocating a fluid displacement member connected to the screw along the pump axis by displacing the screw along the pump axis, the fluid displacement member pumping a fluid downstream to the spray gun; and preventing rotation of the screw relative a pump frame mechanically fixed to both the stator and a cylinder of a pump by a clocking member interfacing with each of the screw and the pump frame.

According to yet another additional or alternative aspect of the present disclosure, a fluid pump apparatus includes a frame having a first end and a second end; a motor mounted on the first end of the frame, the motor electrically powered, the motor comprising a rotor and a stator, the motor configured to output rotational motion; a pump mounted on the second end of the frame, the pump comprising a piston and a cylinder; a drive mechanism supported by the frame and located directly between the motor and the pump, the drive mechanism comprising a screw, the drive mechanism outputting linear reciprocating motion, the piston receiving the linear reciprocating motion output by the drive mechanism to reciprocate the piston within the cylinder; and a clocking assembly located between the motor and the pump, the clocking assembly configured to resist rotation of the screw due to the rotational motion output by the motor, the clocking assembly comprising a collar fixed about the screw, the clocking assembly further comprising a sleeve fixed with respect to the frame. Both the screw and the collar linearly translate within the sleeve while the sleeve prevents rotation of the collar.

According to yet another additional or alternative aspect of the present disclosure, a pumping assembly for pumping a spray fluid from an upstream fluid source to a downstream spray applicator for spraying of the fluid includes a motor including a stator and a rotor, the rotor configured to rotate about the stator on a pump axis; a drive mechanism connected the rotor and configured to convert a rotational output from the rotor into a linear input along the pump axis to cause pumping of the fluid, wherein the drive mechanism includes a linear drive element configured to displace axially along the pump axis; and a clocking member interfacing with the linear drive element to prevent rotation of the linear drive element about the pump axis.

According to yet another additional or alternative aspect of the present disclosure, a pumping assembly for pumping a spray fluid to an applicator to generate a fluid spray includes a motor having a stator and a rotor, the rotor disposed coaxially about the stator on a pump axis and including a rotor shaft extending in a first axial direction from a first axial end of the motor; a pump frame extending in the first axial direction such that the rotor shaft extends into the pump frame, wherein the pump frame is fixed to the motor at a second axial end of the motor opposite the first axial end; a drive mechanism connected to the rotor shaft, the drive mechanism configured to convert a rotational output from the rotor shaft to a linear input along the pump axis; and a clocking member fixed relative the pump frame and interfacing with a linear drive element of the drive mechanism to prevent the linear drive element from rotating about to the pump axis.

According to yet another additional or alternative aspect of the present disclosure, a method of pumping fluid to a spray gun to generate an atomized fluid spray includes driving rotation of a rotor of an electric motor about a pump axis and about a stator of the motor; displacing a screw of a drive mechanism axially along the pump axis by rotation of the rotor; reciprocating a fluid displacement member of a displacement pump, the fluid displacement member connected to the screw such that reciprocation of the screw causes reciprocation of the fluid displacement member, wherein reciprocating the fluid displacement member along the pump axis pumps a fluid downstream for spraying; and preventing rotation of the screw relative a pump frame mechanically fixed to the electric motor and the displacement pump by a clocking member telescopically interfacing with the screw.

According to yet another additional or alternative aspect of the present disclosure, a fluid pump apparatus includes a frame having a first end and a second end; a motor mounted on the first end of the frame, the motor electrically powered, the motor comprising a rotor and a stator, the motor configured to output rotational motion; a pump mounted on the second end of the frame, the pump comprising a piston and a cylinder; a drive mechanism supported by the frame and located directly between the motor and the pump, the drive mechanism comprising a screw, the drive mechanism outputting linear reciprocating motion, the piston receiving the linear reciprocating motion output by the drive mechanism to reciprocate the piston within the cylinder; and a clocking assembly, the clocking assembly comprising a telescope member that has a sliding overlapping interface with the screw, the telescope member preventing rotation of the screw by resisting the rotational motion output by the motor as the screw linearly translates relative to the telescope member.

According to yet another additional or alternative aspect of the present disclosure, a pumping assembly for pumping a spray fluid from an upstream fluid source to a downstream spray applicator for spraying of the fluid includes a motor including a stator and a rotor, the rotor configured to rotate about the stator on a pump axis; and a drive mechanism connected to the rotor disposed coaxially with the rotor, the drive mechanism configured to convert a rotational output from the rotor into a linear input along the pump axis in each of a first axial direction and a second axial direction to cause pumping of the fluid. A screw of the drive mechanism extends into the motor with the screw disposed at a first position associated with an end of a stroke in the second axial direction.

According to yet another additional or alternative aspect of the present disclosure, a pumping assembly for pumping a spray fluid to an applicator to generate a fluid spray includes a motor having a stator and a rotor, the rotor disposed coaxially about the stator on a pump axis, wherein the motor includes a first motor end and a second motor end; a rotor shaft extending in a first axial direction from a rotor body of the rotor; a pump frame fixed to the second motor end and including a main body extending in a first axial direction relative the motor, wherein the rotor shaft extends into the main body; and a drive mechanism connected to the rotor shaft, the drive mechanism configured to convert a rotational output from the rotor shaft to a linear input along the pump axis. The drive mechanism includes a linear drive element configured to provide the linear input, and wherein at least a portion of the linear drive element is disposed within a motor cavity within the motor with the linear drive element disposed at a first position associated with an end of a stroke in a second axial direction opposite the first axial direction.

According to yet another additional or alternative aspect of the present disclosure, a method of pumping fluid to a spray gun to generate an atomized fluid spray includes driving rotation of a rotor of an electric motor about a pump axis and about a stator of the electric motor; displacing a screw of a drive mechanism axially along the pump axis through a first stroke in a first axial direction and a second stroke in a second axial direction by rotation of the rotor; reciprocating a fluid displacement member connected to a first end of the screw along the pump axis by displacement of the screw along the pump axis to pump fluid; and translating a second end of the screw disposed opposite the first end into a motor cavity within the motor during the second stroke.

According to yet another additional or alternative aspect of the present disclosure, a fluid sprayer includes a frame having a first end and a second end; a motor mounted on the first end of the frame, the motor electrically powered, the motor comprising a rotor and a stator, the rotor rotating about an axis, the motor configured to output rotational motion, the motor comprising a motor cavity that is coaxial with the axis; a pump mounted on the second end of the frame, the pump comprising a piston and a cylinder; a drive mechanism supported by the frame and located directly between the motor and the pump, the drive mechanism comprising a screw that is elongate along the axis, the screw having a first end, the first end of the screw linearly translating within the motor cavity along the axis, the drive mechanism outputting linear reciprocating motion. The piston receives the linear reciprocating motion output by the drive mechanism to reciprocate the piston within the cylinder.

According to yet another additional or alternative aspect of the present disclosure, a pumping assembly includes a motor including a stator and a rotor, the rotor configured to rotate on a pump axis; a fluid displacement member operatively connected to the rotor to be reciprocated through an upstroke and a downstroke along the pump axis; and a controller configured to control operation of the motor such that the fluid displacement member displaces according to a first speed profile during the upstroke and according to a second speed profile during the downstroke, the first speed profile different than the second speed profile.

According to yet another additional or alternative aspect of the present disclosure, a pumping system includes a first upstream pump having a first electric motor connected to a first fluid displacement member; a first downstream pump having an inlet fluidically connected to an outlet of the first upstream pump; a first sensor disposed downstream from an outlet of the first downstream pump; and a controller in communication with the first electric motor and the first sensor. The controller is configured to receive first parameter data from the first sensor and control operation of the first electric motor based on the first parameter data.

According to yet another additional or alternative aspect of the present disclosure, a method of operating a pumping system includes driving rotation of a first rotor of a first electric motor to drive reciprocation of a first fluid displacement member of a first feed pump to pump the first component material to an inlet of a first proportioner pump; increasing a pressure of the first component material via the first proportioner pump; generating first parameter data regarding the first component material downstream of the first proportioner pump by a first sensor; and controlling operation of the first electric motor by a controller based on the first parameter data According to yet another additional or alternative aspect of the present disclosure, a method of operating a pumping system configured to pump different first and second component materials to an applicator for mixing and forming a plural component material includes pumping a first component material, with a first upstream pump including a first electric motor, from a first fluid tank to a first downstream pump; pumping a second component material, with a second upstream pump including a second electric motor, from a first fluid tank to a second downstream pump; controlling, by a controller, pumping by the first upstream pump, the second upstream pump, the first downstream pump, and the second downstream pump in each of a spray mode and a flush mode. The spray mode includes increasing a pressure of the first component material with the first downstream pump and pumping the first component material to an applicator with the first downstream pump; and increasing a pressure of the second component material with the second downstream pump and pumping the second component material to the applicator with the second downstream pump. The flush mode includes pumping the first component material to a first dump tank from the first proportioner pump; and pumping the second component material to a second dump tank from the second proportioner pump.

According to yet another additional or alternative aspect of the present disclosure, a pump for a plural component spray system is configured to pump one of first and second component materials to form a plural component spray material and the pump includes an electric motor comprising a stator and a rotor, the rotor configured to rotate about a pump axis; a drive mechanism connected to the rotor and configured to translate a rotating input from the rotor to a linear output, wherein the drive mechanism is coaxial with the rotor; and a pumping assembly including a piston, wherein the piston is connected to the drive mechanism to receive the linear output and is disposed coaxially with the drive mechanism and the rotor, wherein the piston is configured to reciprocate axially along the pump axis to pump fluid.

According to yet another additional or alternative aspect of the present disclosure, a feed pump for a plural component spray system configured to receive first and second component materials and output a plural component material includes an electric motor comprising a stator and a rotor disposed within the stator, the rotor configured to rotate about a pump axis; a pumping assembly including a piston, wherein the piston is disposed coaxially with the rotor and is configured to reciprocate axially along the pump axis to pump fluid; a drive mechanism connected to the rotor and the piston, the drive mechanism configured to convert a rotational output from the rotor into a linear input to the piston, wherein the drive mechanism is coaxial with the piston and the rotor; a fluid outlet manifold positioned axially between the piston and the rotor, the fluid outlet manifold in fluid communication with the pumping assembly; a first check valve axially between a piston head of the piston and a fluid inlet of the feed pump; and a second check valve disposed in the piston to travel axially with the piston.

According to yet another additional or alternative aspect of the present disclosure, a drive mechanism for a feed pump that converts a rotational output from an electric motor into a linear input includes a screw having a first end; a second end axially opposite the first end relative the pump axis; and a spiral groove extending on an outer surface of the screw between the first end and the second end. The second end of the screw extends within each of a rotor shaft, a stator, and a housing of the electric motor, and the screw translates axially within the rotor shaft. The drive mechanism further includes a drive nut connected to the rotor and configured to rotate with the rotor.

According to yet another additional or alternative aspect of the present disclosure, a feed pump apparatus for pumping fluid from a reservoir includes a frame for mounting on the reservoir; an electric motor mounted on the frame, the electric motor comprising a stator and a rotor, the rotor rotating about an axis to output rotational motion; a drive mechanism supported by the frame, the drive mechanism comprising a screw and a nut, the drive mechanism configured to receive the rotational motion output by the motor and convert the rotational motion into linear reciprocating motion, each of the screw and the nut one of rotating about the axis or linearly translating along the axis; and a pump comprising a cylinder and a piston within the cylinder, the piston configured to be linearly reciprocated along the axis by the drive mechanism.

According to yet another additional or alternative aspect of the present disclosure, a feed pump apparatus for pumping fluid from a reservoir includes a frame for mounting on the reservoir; an electric motor mounted on the frame, the electric motor comprising a stator and a rotor, the rotor rotating about an axis to output rotational motion; a drive mechanism supported by the frame, the drive mechanism comprising a screw and a nut, the drive mechanism configured to receive the rotational motion output by the motor and convert the rotational motion into linear reciprocating motion, each of the screw and the nut one of rotating about the axis or linearly translating along the axis; and a pump comprising a cylinder and a piston within the cylinder, the piston configured to be linearly reciprocated along the axis by the drive mechanism. The piston is configured to reciprocate within a working zone to build pressure within the cylinder, and wherein the piston can travel into a pressure relief zone to vent pressurized fluid from the cylinder to the reservoir.

According to yet another additional or alternative aspect of the present disclosure, a pump for a plural component spray system is configured to pump one of first and second component materials to form a plural component spray material, the pump includes an electric motor comprising a stator and a rotor, the rotor configured to rotate about a pump axis; a drive mechanism connected to the rotor and configured to translate a rotating input from the rotor to a linear output, wherein the drive mechanism is coaxial with the rotor; and a pumping assembly including a piston and a cylinder, wherein the piston is connected to the drive mechanism to receive the linear output and is disposed coaxially with the drive mechanism and the rotor. The piston is configured to reciprocate axially within a working zone to build pressure within the cylinder, and wherein the piston can travel into a pressure relief zone to vent pressurized fluid from the cylinder to the reservoir.

According to yet another additional or alternative aspect of the present disclosure, a feed pump for a plural component spray system configured to receive first and second component materials and output a plural component material, the feed pump includes an electric motor comprising a stator and a rotor, the rotor configured to rotate about an axis; a drive shaft connected to a piston, wherein the drive shaft is configured to reciprocate axially along the pump axis of the feed pump, and wherein the drive shaft is coaxial with the rotor; a drive mechanism connected to the rotor and to the drive shaft, the drive mechanism configured to convert a rotational output from the rotor into a linear input to the drive shaft; a pump including a piston connected to the drive shaft to be reciprocated by the drive shaft and a cylinder surrounding the piston; a fluid outlet manifold positioned axially between the piston and the drive mechanism and including a fluid outlet, the fluid outlet manifold in fluid communication with the pump; and an over-pressurization valve connected to the fluid outlet manifold and fluidically connected to the fluid outlet by an interior passage of the fluid outlet manifold.

According to yet another additional or alternative aspect of the present disclosure, a pressure relief assembly for a double ball piston pump, the pressure relief assembly includes a piston housing disposed around a piston, wherein the piston housing extends along an axis and comprises a first end opposite a second end, wherein a piston rod extends through an opening in the first end; a seal housing inside the piston housing, wherein the seal housing is connected to the first end of the piston housing and extends circumferentially around the piston rod and is disposed axially between a piston head and the first end of the piston housing; a seal disposed inside the seal housing and connected to the piston rod, wherein the seal extends radially from the piston rod relative the pump axis and contacts the seal housing; a vent path disposed within the seal housing and in fluid communication with the opening; and at least one port extending through the seal housing. The at least one port fluidically connects the opening in the first end of the piston housing with an interior of the piston housing when the seal is in a pressure relief zone defined by the at least one port. The seal fluidly isolates the at least one port and the vent path when the seal is in a working zone defined between the first end and the at least one port.

According to yet another additional or alternative aspect of the present disclosure, a feed pump apparatus for pumping fluid from a reservoir includes a frame for mounting on the reservoir; an electric motor mounted on the frame, the electric motor comprising a stator and a rotor, the rotor rotating about an axis to output rotational motion; a drive mechanism supported by the frame, the drive mechanism comprising a screw and a nut, the drive mechanism configured to receive the rotational motion output by the motor and convert the rotational motion into linear reciprocating motion, each of the screw and the nut one of rotating about the axis or linearly translating along the axis; a clocking assembly disposed axially between the electric motor and the piston wherein the clocking assembly is configured to interface with a linear displacing element of the drive mechanism to prevent rotation of the linear displacement element about the pump axis; and a pump comprising a cylinder and a piston within the cylinder, the piston configured to be linearly reciprocated along the axis by the drive mechanism.

According to yet another additional or alternative aspect of the present disclosure, a feed pump for a plural component spray system configured to output a plural component spray material formed from first and second component materials includes an electric motor comprising a stator and a rotor; a pump having a piston configured to reciprocate axially along the pump axis of the feed pump, and wherein the piston is coaxial with the rotor; a drive mechanism connected to the rotor and to the piston, the drive mechanism configured to convert a rotational output from the rotor into a linear input to the piston, and a clocking assembly. The drive mechanism includes a drive nut connected to the rotor and configured to rotate with the rotor; and a screw extending through the drive nut and coaxial with the drive nut. The clocking assembly is axially between the electric motor and the piston and around a portion of the screw, wherein the clocking assembly is configured to prevent rotation of the screw relative the pump axis.

According to yet another additional or alternative aspect of the present disclosure, a feed pump for a plural component spray system configured to receive first and second component materials and output a plural component material includes an electric motor comprising a stator and a rotor, the rotor configured to rotate about an axis; a pump having a piston disposed coaxially with the rotor and configured to reciprocate axially along the axis; a drive mechanism connected to the rotor and to the piston, the drive mechanism configured to convert a rotational output from the rotor into a linear input to the piston, wherein the drive mechanism comprises a screw and a nut, wherein each of the screw and the nut one of rotates about the axis or linearly translates along the axis; a bearing assembly axially between the electric motor and the piston and rotationally connecting the rotor of the electric motor to the drive nut. The piston receives a downward reaction force when moving through the upstroke and an upward reaction force when moving through the downstroke, and both of the upward reaction force and the downward reaction force transfer through the drive mechanism and to the bearing assembly. The bearing assembly permits the rotational motion to pass within the drive mechanism from the motor to the drive mechanism while the bearing assembly prevents some or all of both of the downward reaction force and the upward reaction force from transferring to the rotor.

According to yet another additional or alternative aspect of the present disclosure, a feed pump for a plural component spray system configured output a plural component spray material includes an electric motor comprising a stator and a rotor, the rotor configured to rotate on an axis; a pump having a piston, wherein the piston is configured to reciprocate axially along the axis of the feed pump, and wherein the piston is coaxial with the rotor; a drive mechanism connected to the rotor and to the piston, the drive mechanism configured to convert a rotational output from the rotor into a linear input to the piston; and a bearing assembly rotationally connecting the rotor of the electric motor to the drive mechanism and configured to react axial loads in both a first axial direction along the axis and a second axial direction along the pump axis.

DETAILED DESCRIPTION

The present disclosure relates to spray systems that include positive displacement pumps. The pumps include electric motors that are connected to a fluid displacement member to drive reciprocation of the fluid displacement member to cause pumping. The motor is disposed coaxially with the fluid displacement member such that a rotational axis of the rotor and a reciprocation axis of the fluid displacement member are coaxial. A drive can be disposed axially between the rotor and the fluid displacement member to receive the rotational output from the motor and convert that rotational motion into a linear reciprocating input to the fluid displacement member.

Figure 1B:
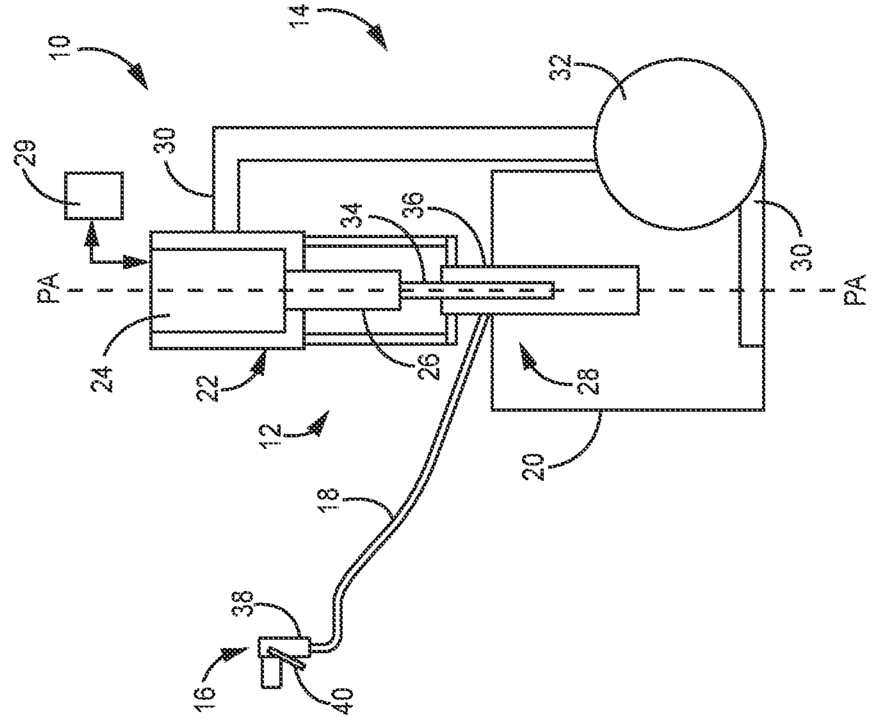
FIG. 1B is a side elevational schematic block diagram of the spray system of FIG.
Figure 1A:
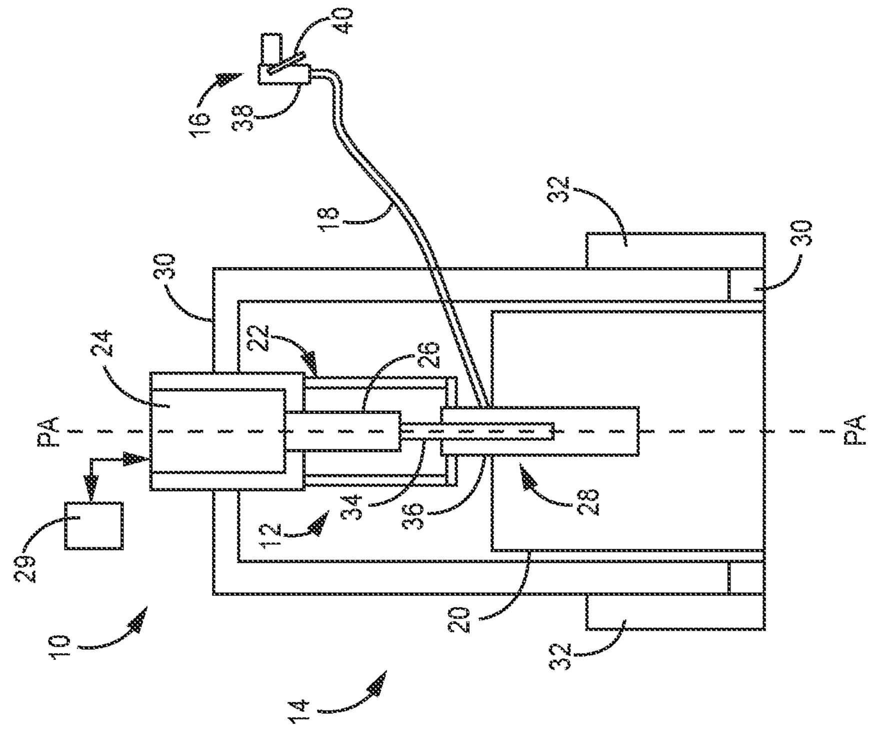
FIG. 1A is a front elevational schematic block diagram of a spray system.

FIG. 1A is a front elevational schematic block diagram of a spray system 10. FIG. 1B is a side elevational schematic block diagram of spray system 10. FIGS. 1A and 1B will be discussed together. Pump assembly 12, support 14, spray gun 16, supply line 18, and reservoir 20 are shown. Pump assembly 12 includes pump frame 22, electric motor 24, drive mechanism 26, displacement pump 28, and controller 29. Support 14 includes support frame 30 and wheels 32. Fluid displacement member 34 and cylinder 36 of displacement pump 28 are shown. Spray gun 16 includes handle 38 and trigger 40.

Spray system 10 is a system for applying sprays of various fluids, examples of which include paint, water, oil, stains, finishes, aggregate, coatings, and solvents, amongst other options, onto a substrate. Pump assembly 12 can generate high fluid pumping pressures, such as about 3.4-69 megapascal (MPa) (about 500-10,000 pounds per square inch (psi)) or even higher. In some examples, the pumping pressures are in the range of about 20.7-34.5 MPa (about 3,000-5,000 psi). High fluid pumping pressure is useful for atomizing the fluid into a spray for applying the fluid to a surface.

Pump assembly 12 is configured to draw spray fluid from reservoir 20 and pump the fluid downstream to spray gun 16 for application on the substrate. Support 14 is connected to pump assembly 12 and supports pump assembly 12 relative reservoir 20. Support frame 30 is connected to pump frame 22. Wheels 32 are connected to support frame 30 to facilitate movement between job sites and within a job site.

Pump frame 22 supports other components of pump assembly 12. Motor 24 and displacement pump 28 are connected to pump frame 22. Motor 24 is an electric motor having a stator and a rotor. The rotor is configured to rotate about pump axis PA in response to current (such as a direct current (DC) signals and/or alternating current (AC) signals) through the stator. Controller 29 is operably connected to motor 24, electrically or communicatively, to control operation of motor 24 thereby controlling pumping by displacement pump 28. Controller 29 can be of any desired configuration for controlling pumping by displacement pump 28 and can include control circuitry and memory. Controller 29 is configured to store software, implement functionality, and/or process instructions. Controller 29 is configured to perform any of the functions discussed herein, including receiving an output from any sensor referenced herein, detecting any condition or event referenced herein, and controlling operation of any components referenced herein. Controller 29 can be of any suitable configuration for controlling operation of pump assembly 12, gathering data, processing data, etc. Controller 29 can include hardware, firmware, and/or stored software, and controller 29 can be entirely or partially mounted on one or more boards. Controller 29 can be of any type suitable for operating in accordance with the techniques described herein. While controller 29 is illustrated as a single unit, it is understood that controller 29 can be disposed across one or more boards. In some examples, controller 29 can be implemented as a plurality of discrete circuitry subassemblies.

Drive mechanism 26 is connected to motor 24 to be driven by motor 24. Drive mechanism 26 receives a rotational output from motor 24 and converts that rotational output into a linear input along pump axis PA. Drive mechanism 26 is connected to fluid displacement member 34 to drive reciprocation of fluid displacement member 34 along pump axis PA. Motor 24, drive mechanism 26, and fluid displacement member 34 are disposed coaxially on pump axis PA. Fluid displacement member 34 reciprocates within cylinder 36 to pump spray fluid from reservoir 20 to spray gun 16 through supply line 18. The fluid displacement member 34 can be cylindrical, elongate along, and coaxial with pump axis PA. The fluid displacement member 34 can be a piston, which can be elongate along and coaxial with pump axis PA. Displacement pump 28 can be configured such that both a static seal and a dynamic seal are disposed between fluid displacement member 34 and cylinder 36. The static seal is static relative to cylinder 36 and along pump axis PA and the dynamic seal moves relative to cylinder 36 and along pump axis PA during operation. The dynamic seal can be mounted to the piston forming fluid displacement member 34. The piston forming fluid displacement member 34 can extend out of cylinder 36 through the static seal.

During operation, the user can maneuver pump assembly 12 to a desired position relative the target substrate by moving support 14. For example, the user can maneuver pump assembly 12 by tilting support frame 30 on wheels 32 and rolling pump assembly 12 to a desired location. Displacement pump 28 can extend into reservoir 20. Motor 24 provides the rotational input to drive mechanism 26 and drive mechanism 26 provides the linear input to fluid displacement member 34 to cause reciprocation of fluid displacement member 34. Fluid displacement member 34 draws the spray fluid from reservoir 20 and drives the spray fluid downstream through supply line 18 to spray gun 16. The user can manipulate spray gun 16 by grasping handle 38, such as with a single hand of the user. The user causes spraying by actuating trigger 40. In some examples, the pressure generated by pump assembly 12 atomizes the spray fluid exiting spray gun 16 to generate the fluid spray. In some examples, spray gun 16 is an airless sprayer.

Figure 2A:
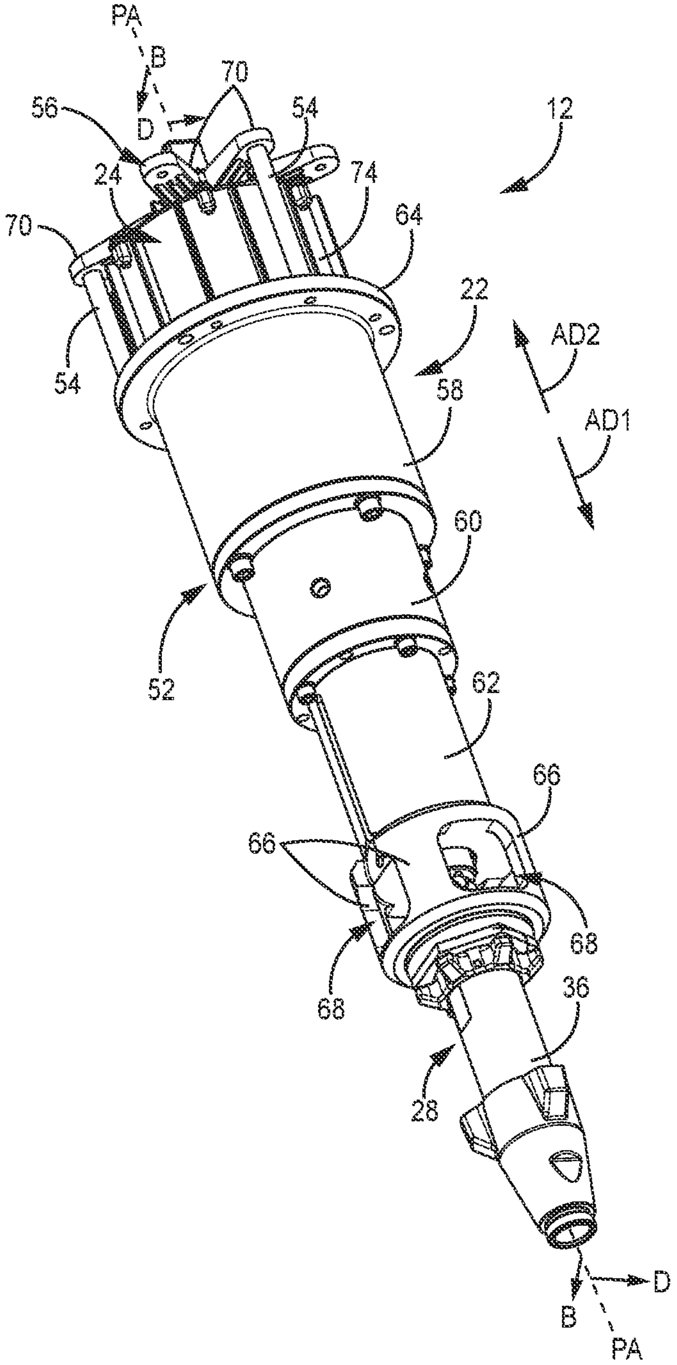
FIG. 2A is an isometric view of a pumping assembly for use in the spray system of FIGS. 1A and 1B.
Figure 2B:
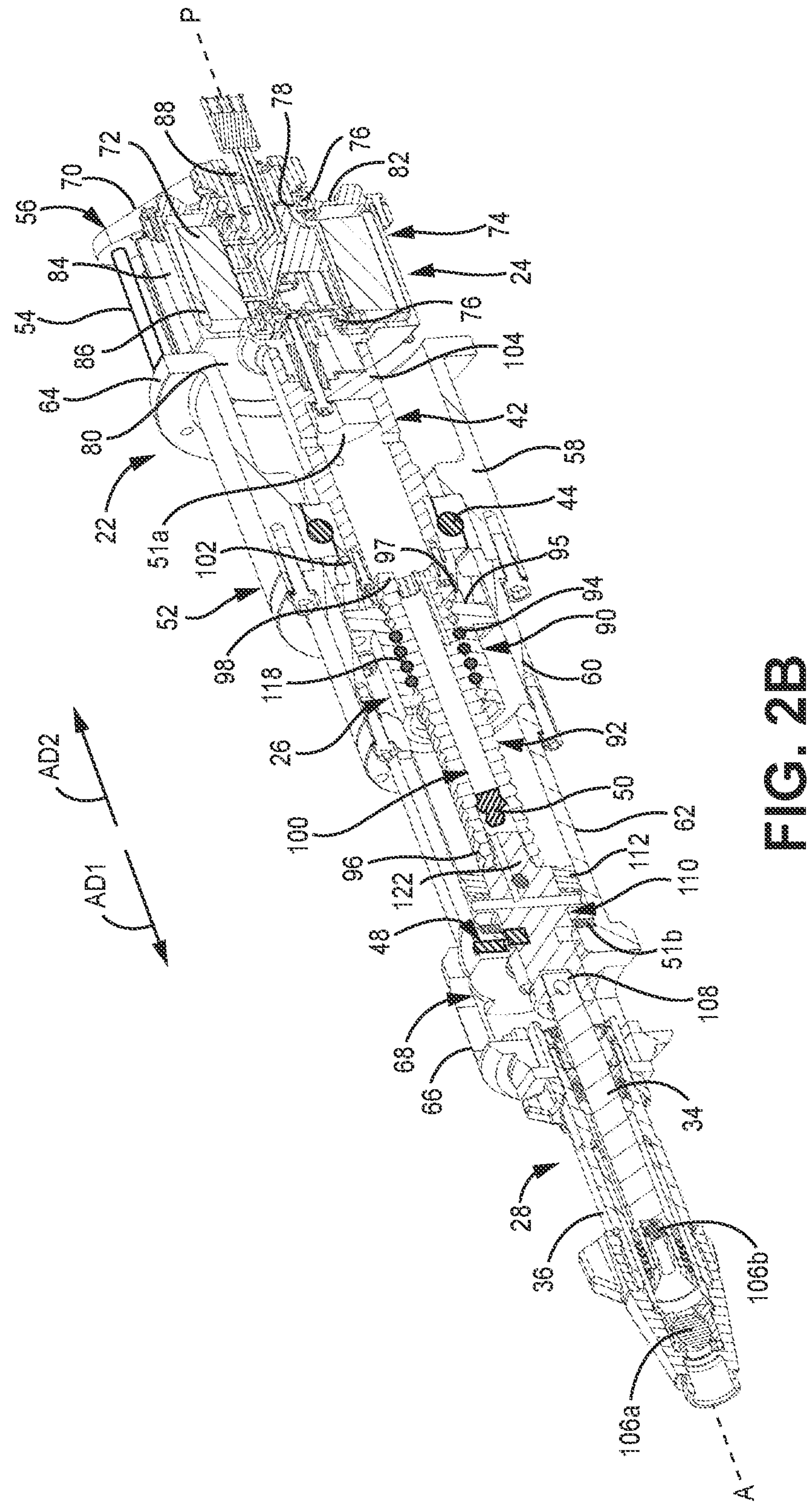
FIG. 2B is an isometric cross-sectional view taken along line B-B in FIG. 2A.
Figure 2C:
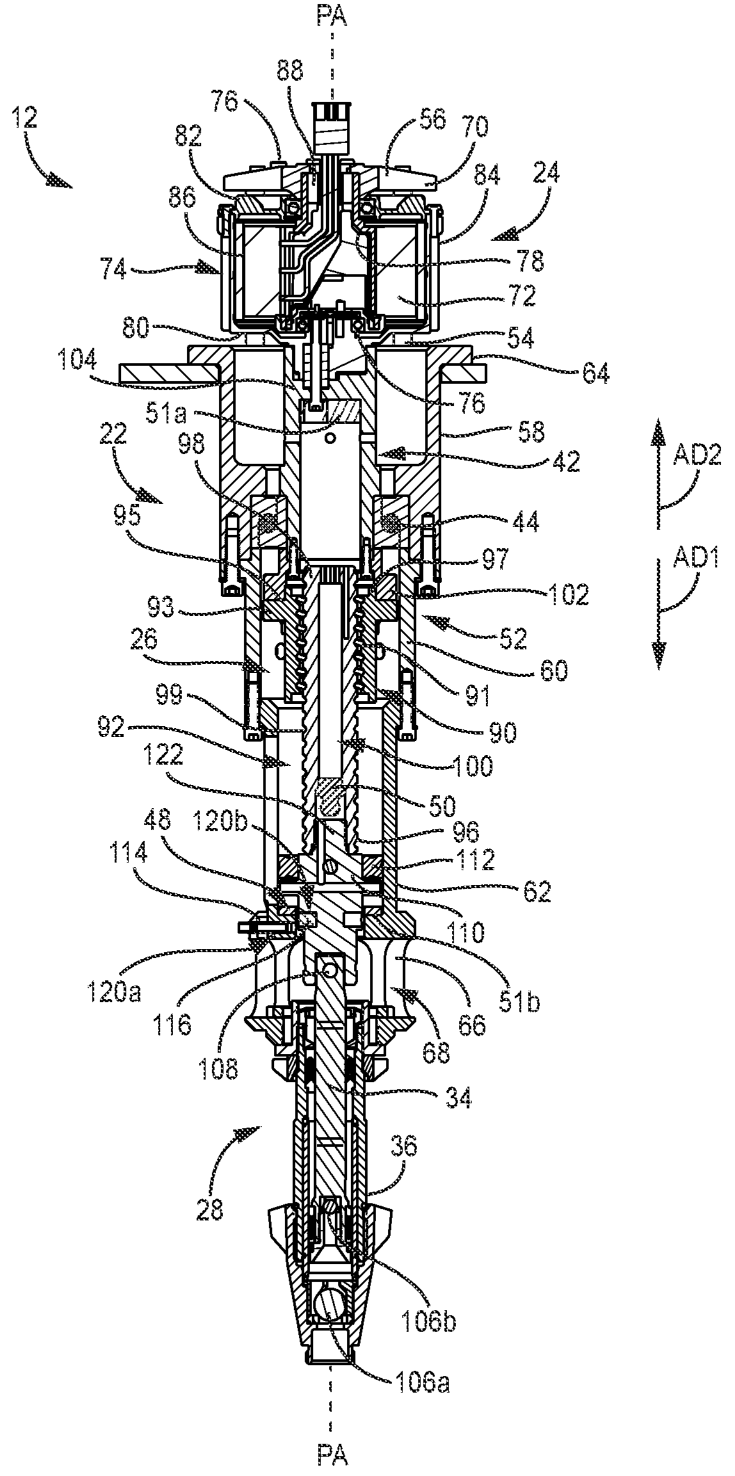
FIG. 2C is a first elevational cross-sectional view taken along line B-B in FIG. 2A.
Figure 2D:
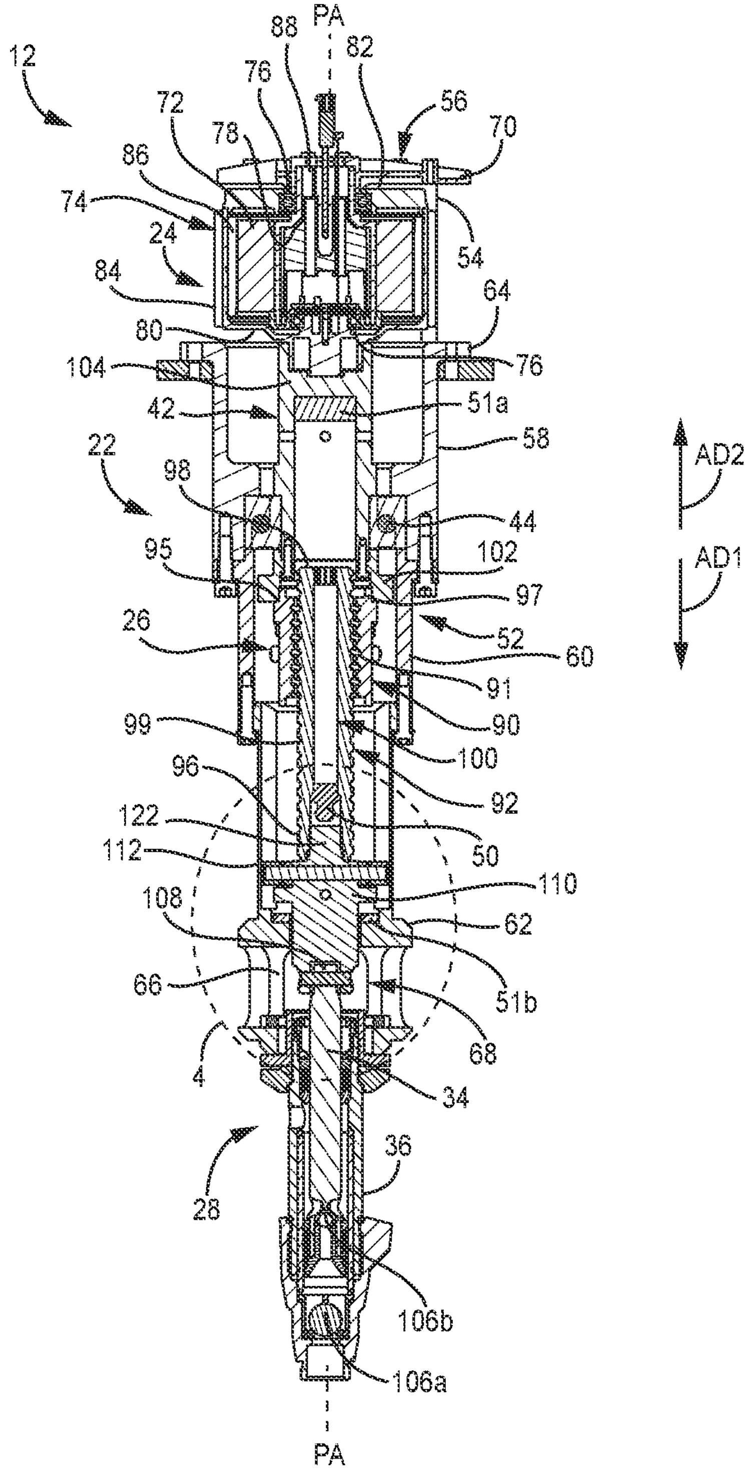
FIG. 2D is a second elevational cross-sectional view taken along line D-D in FIG. 2B.

FIG. 2A is an isometric view of pump assembly 12. FIG. 2B is an isometric cross-sectional view of pump assembly 12 taken along line B-B in FIG. 2A. FIG. 2C is an elevational cross-sectional view taken along line B-B in FIG. 2A. FIG. 2D is an elevational cross-sectional view taken along line D-D in FIG. 2A. FIGS. 2A-2D will be discussed together. Pump frame 22, motor 24, drive mechanism 26, displacement pump 28, rotor shaft 42, bearing 44, sensor 48, lubricant fitting 50, bumpers 51*a*, 51*b*, pump shaft 110, and clocking member 112 are shown. Pump frame 22 includes main body 52, connecting member 54, and frame member 56. Main body 52 includes first frame body 58, second frame body 60, third frame body 62, mounting flange 64, posts 66, and side openings 68. Frame member 56 includes radial projections 70. Motor 24 includes stator 72, rotor 74, motor bearings 76, axle 78, first motor end 80, and second motor end 82. Rotor 74 includes rotor body 84 and permanent magnet array 86. Axle 78 includes outer end 88. Drive mechanism 26 includes drive nut 90, screw 92, and rolling elements 94 (FIG. 2B). Drive nut 90 includes nut threads 91, nut mounting projection 93, nut shoulder 95, and axial extension 97. Screw 92 includes first screw end 96, second screw end 98, screw thread 99, and bore 100. Rotor shaft 42 includes first shaft end 102 and second shaft end 104. Displacement pump 28 includes fluid displacement member 34, cylinder 36, and check valves 106*a*, 106*b*. Fluid displacement member 34 includes connector 108. Sensor 48 includes first transducer component 114 and second transducer component 116.

Pump frame 22 supports other components of pump assembly 12. Main body 52 extends in axial direction AD1 relative to motor 24. In the example shown, main body 52 is spaced axially from first motor end 80. Main body 52 is disposed coaxially with pump axis PA. First frame body 58 forms a portion of main body 52 axially closest to motor 24. Second frame body 60 is connected to first frame body 58 and extends in first axial direction AD1 from first frame body 58. Third frame body 62 is connected to second frame body 60 and extends in first axial direction AD1 from second frame body 60. While main body 52 is shown as formed by first frame body 58, second frame body 60, and third frame body 62, it is understood that main body 52 can be formed by as many or as few portions as desired. Posts 66 and side openings 68 are formed in an end of third frame body 62 opposite second frame body 60. Side openings 68 are formed between posts 66. Side openings 68 provide access to the connection between fluid displacement member 34 and pump shaft 110 to facilitate mounting and dismounting of displacement pump 28. Main body 52 being formed from first frame body 58, second frame body 60, and third frame body 62 facilitates efficient assembly and servicing of pump assembly 12. Main body 52 can be disassembled to provide access to various components of pump assembly, including dynamic components. For example, second frame body 60 can be removed from first frame body 58 to facilitate lubrication of drive mechanism 26. It is understood that, in some examples, drive mechanism 26 can be accessed and serviced without disassembling main body 52. Bumper 51*b* is disposed in third frame body 62 on an opposite side of pump shaft 110 from drive nut 90. Bumper 51*b* can be compressible and can interface with pump shaft 110 in case of overtravel.

Frame member 56 is disposed on an opposite axial side of motor 24 from main body 52. Connecting member 54 extends between main body 52 and frame member 56 and fix main body 52 and frame member 56 together to prevent relative movement between frame member 56 and main body 52. While pump frame 22 is described as formed from multiple parts, it is understood that pump frame 22 functions as a single part to support motor 24 and displacement pump 28 and react loads experienced during pumping. Pump frame 22 can be formed from as many or as few individual parts as desired.

Motor 24 is disposed axially between frame member 56 and main body 52. Motor 24 is an electric motor 24. Stator 72 includes armature windings (not shown) and rotor 74 includes permanent magnet array 86. Stator 72 and rotor 74 are disposed coaxially on pump axis PA. Rotor 74 is configured to rotate about pump axis PA in response to current through stator 72. Motor 24 is a reversible motor in that stator 72 can cause rotation of rotor 74 in either of two rotational directions about pump axis PA (e.g., clockwise or counterclockwise).

Rotor 74 is disposed about stator 72 such that motor 24 includes an outer rotator. Permanent magnet array 86 is disposed on an inner circumferential face of rotor body 84 and array circumferentially about pump axis PA. Rotor body 84 can be formed from a single component or from multiple components fixed together. Stator 72 is fixed to axle 78. Axle 78 extends along and is disposed coaxial with pump axis PA. Outer end 88 of axle 78 extends in second axial direction AD2 beyond an axial end of stator 72. Outer end 88 of axle 78 extends in second axial direction AD2 beyond an axial end of rotor 74. Outer end 88 projects axially beyond second motor end 82. Outer end 88 of axle 78 is open such that electric power (e.g., electric cables) is provided to motor 24 through second motor end 82. As such, motor 24 can receive power through second motor end 82 and provide a rotational output through first motor end 80. Motor bearings 76 support rotor 74 relative stator 72. Motor bearings 76 facilitate rotation of rotor 74 relative to stator 72. Axle 78 extends through the motor bearing 76 disposed at second motor end 82 of motor 24, such that the motor bearing 76 at second motor end 82 is disposed between rotor body 84 and axle 78.

Frame member 56 is disposed proximate second motor end 82. Frame member 56 is fixed to outer end 88 of axle 78. Motor 24 is statically connected to pump frame 22 by the connection of axle 78 and frame member 56. Pump frame 22 fixes motor 24 on pump axis PA and prevents stator 72 from moving relative pump axis PA by the connection of pump frame 22 and axle 78. Connecting member 54 is radially spaced from rotor 74 and extends axially between frame member 56 and main body 52. Connecting member 54 is fixed to radial projections 70 of frame member 56 and to mounting flange 64 of main body 52. Connecting member 54 fixes frame member 56 and main body 52 together. In some examples, connecting member 54 can fully enclose rotor 74. In other examples, connecting member 54 can be formed from a plurality of connecting members spaced circumferentially about rotor 74. In the example shown, connecting member 54 includes a plurality of tie rods extending between and connecting frame member 56 and main body 52. Pump frame 22 forms an exoskeleton extending around and supporting motor 24 in examples where connecting member 54 is formed by a plurality of connecting members.

The portion of pump frame 22 extending circumferentially about rotor 74 is spaced from rotor 74 such that rotor 74 does not contact pump frame 22. Pump frame 22 can be spaced both axially and radially relative to rotor 74. Pump frame 22 is spaced from rotor 74 such that air can flow between pump frame 22 and rotor 74, facilitating additional cooling of motor 24. For example, main body 52 and frame member 56 can be spaced axially relative to rotor 74 and connecting member 54 can be spaced radially relative to rotor 74. Connecting member 54 can have a length greater than rotor 74 to connect main body 52 and frame member 56 and facilitate axial spacing between rotor 74 and pump frame 22.

Rotor shaft 42 extends axially from rotor 74 in first axial direction AD1. Rotor shaft 42 is disposed coaxially on pump axis PA. Second shaft end 104 is connected to rotor body 84 such that rotor shaft 42 rotates with rotor 74. Rotor shaft 42 extends into an interior of main body 52 such that at least a portion of rotor shaft 42 overlaps axially with at least a portion of main body 52. In the example shown, rotor shaft 42 overlaps axially with each of first frame body 58 and second frame body 60. In the example shown, second shaft end 104 is closed and first shaft end 102 is open. The closed second shaft end 104 is disposed at the interface between rotor shaft 42 and rotor 74. Rotor shaft 42 can be removably connected to rotor 74, such as by fasteners. It is understood, however, that rotor shaft 42 can be formed integrally with rotor body 84. Rotor 74 and rotor shaft 42 function as a single part to power drive mechanism 26. Bumper 51*a* is disposed in rotor shaft 42 at the closed end of rotor shaft 42. Bumper 51*a* can be compressible and can interface with second screw end 98 in case of overtravel to prevent damage to screw 92.

Drive mechanism 26 is coaxial with pump axis PA. Drive mechanism 26 is connected to first shaft end 102 of rotor shaft 42. Drive mechanism 26 receives a rotational output from rotor 74 via rotor shaft 42 and is configured to provide a linear input to fluid displacement member 34. Drive mechanism 26 is supported by pump frame 22 via bearing 44. Drive mechanism 26 is located directly between motor 24 and displacement pump 28.

Drive nut 90 of drive mechanism 26 is connected to first shaft end 102 of rotor shaft 42 to rotate about pump axis PA with rotor shaft 42. Drive nut 90 can be attached to rotor shaft 42 via fasteners (e.g., bolts), adhesive, or press-fitting, among other options. In the example shown, nut mounting projection 93 facilitates mounting of drive nut 90 to rotor shaft 42. Fasteners can extend through nut mounting projection 93 into rotor shaft 42. First shaft end 102 interfaces with nut shoulder 95 formed on drive nut 90. Nut shoulder 95 is formed between nut mounting projection 93 and axial extension 97, which extends into and axially overlaps with rotor shaft 42. Screw 92 is disposed radially within drive nut 90. Screw 92 and drive nut 90 are disposed coaxially on pump axis PA.

Components can be considered to axially overlap when the components are disposed at a common position along an axis (e.g., along the axis PA), for example such that a radial line projecting from that axis extends through each of those axially-overlapped components. Similarly, components can be considered to radially overlap when the components are disposed at common positions spaced radially from the axis (e.g., relative to axis PA) such that an axial line parallel to the axis extends through each of those radially-overlapped components.

Rolling elements 94 are disposed between screw 92 and drive nut 90 and support screw 92 relative drive nut 90. Rolling elements 94 are arrayed around, and are arrayed along, an axis that is coaxial with pump axis PA. Rolling elements 94 support screw 92 and drive nut 90 such that gap 118 (FIGS. 3A and 3B) disposed radially between screw 92 and drive nut 90*i* is maintained. Maintaining the gap 118 prevents screw 92 and drive nut 90 from directly contacting one another. Rolling elements 94 can be of any suitable configuration for supporting drive nut 90 relative screw 92 and driving screw 92 linearly due to rotation of drive nut 90. For example, rolling elements 94 can be balls or rollers, as discussed in more detail below with regard to FIGS. 10-13. Rolling elements 94 engage screw thread 99 to exert an axial driving force on screw 92 to cause screw 92 to translate axially along pump axis PA.

Screw 92 is configured to reciprocate along pump axis PA during operation. Rotation of drive mechanism 26 causes rolling elements 94 to exert an axial driving force on screw 92 to drive screw 92 linearly. Screw 92 provides the linear output from drive mechanism 26. Bore 100 extends axially through screw 92. While screw 92 is described as reciprocating along pump axis PA, it is understood that, in some examples, screw 92 is configured to rotate on pump axis PA to drive linear displacement of fluid displacement member 34. For example, a nut can be connected to screw 92 to displace linearly along screw 92 due to rotation of screw 92. For example, pump shaft 110 can be configured to interface with screw 92 and translate along screw 92.

Lubricant fitting 50 is disposed within bore 100. Lubricant fitting 50 is configured to connect to an applicator of a lubricating device, such as a grease gun. Bore 100 can form a lubricant pathway through screw 92 to provide lubricant to rolling elements 94. Lubricant fitting 50 can be a grease zerk.

In some examples, rotor 74 and drive mechanism 26 are sized to provide a one revolution of rotor 74 results in a full stroke of screw 92. A full revolution in an opposite rotational direction results in a full stroke of screw 92 in the opposite axial direction. As such, two revolutions in opposite directions can provide a full pump cycle. Pump assembly 12 can thereby provide a 1:1 ratio between revolutions of rotor 74 and pumping strokes. It is understood, however, that rotor 74 and drive mechanism 26 can be sized to provide any desired ratio between revolutions and pump strokes, such as 0.25 revolutions per stroke, 0.5 revolutions per stroke, two revolutions per stroke, three revolutions per stroke, or any other desired number of revolutions per stroke.

Bearing 44 is disposed radially between rotor shaft 42 and pump frame 22. More specifically, bearing 44 is disposed radially between rotor shaft 42 and main body 52. Bearing 44 is disposed axially between drive nut 90 and motor 24. Bearing 44 supports motor 24 relative pump frame 22 and facilitates rotation of rotor shaft 42 relative pump frame 22. As such, bearing 44 forms a dynamic connection between motor 24 and pump frame 22.

Bearing 44 is configured to support both rotational and axial loads generated during pumping. Bearing 44 supports the axial loads to isolate motor 24 from the axial loads, as discussed in more detail below. Bearing 44 can be referred to as a thrust bearing.

Bearing 44 can be of any configuration suitable for supporting axial loads generated during pumping. In some examples, bearing 44 can be a single bearing element configured to support axial loads in each of first axial direction AD1 and second axial direction AD2, such as a double row angular contact bearing, among other options. In some examples, bearing 44 can be formed from multiple bearing elements to support axial loads in each of first axial direction AD1 and second axial direction AD2. For example, bearing 44 can be formed by a first tapered roller bearing configured to support axial loads in first axial direction AD1 and a second tapered roller bearing configured to support axial loads in second axial direction AD2. The inner race 45, outer race 47, and rolling elements 49 of bearing 44 are shown.

Pump shaft 110 is connected to screw 92 and fluid displacement member 34. Pump shaft 110 is connected to screw 92 to reciprocate with screw 92 and is connected to fluid displacement member 34 to drive reciprocation of fluid displacement member 34. As such, screw 92 and pump shaft 110 can be considered to form a linear drive element of drive mechanism 26. In the example shown, mounting projection 122 extends into bore 100 to connect pump shaft 110 to screw 92. Pump shaft 110 can be connected to screw 92 in any desired manner, such as by interfaced threading, a pin, press-fit, adhesive, or snap lock, among other options. While pump shaft 110 and screw 92 are described as separately formed, it is understood that screw 92 and pump shaft 110 can be formed as a single component. In some examples, fluid displacement member 34 can be directly connected to screw 92 and clocking member 112 can also be mounted to screw 92.

Clocking member 112 is disposed on and supported by pump shaft 110. Pump shaft 110 and clocking member 112 can be considered to form a clocking assembly to prevent rotation of screw 92 about pump axis PA. Pump shaft 110 forms a support of the clocking assembly 110 as pump shaft 110 supports clocking member 112. Clocking member 112 reciprocates with screw 92 and pump shaft 110. Clocking member 112 is clocked to and interfaces with main body 52 such that clocking assembly 46 is prevented from rotating about pump axis PA. Clocking member 112 thereby prevents screw 92 from rotating about axis PA, facilitating translation of screw 92 along pump axis PA. In some examples, the outer surface of clocking member 112 is closely fit to main body 52 to provide a sliding seal at the interface between clocking member 112 and main body 52. The sliding seal interface prevents dust and other contaminants from migrating through main body 52 to drive mechanism 26. In some examples, a seal, such as a u-cup seal, is mounted to the radially outer surface of clocking member 112. In examples where screw 92 rotates about pump axis PA, clocking member 112 can be associated with the nut configured to translate along screw 92 to prevent rotation of the nut about pump axis PA.

Sensor bore 120*a* extends into main body 52 of pump frame 22 and is configured to receive first transducer component 114. Sensor bore 120*b* extends into pump shaft 110 and is configured to receive second transducer component 116. Sensor 48 is configured to sense an end of a pump stroke in the first axial direction AD1. Sensor 48 can generate and provide data to a controller 29 of motor 24 when the linearly displacing elements are at the end of a downstroke, which can be associated with a home position. In some examples, motor 24 is homed on power up. For example, rotor 74 can rotate in a first rotational direction associated with the downstroke until first transducer component 114 senses second transducer component 116, indicating the end of the downstroke. Rotor 74 can then be controlled to rotate a set number of revolutions associated with a stroke to cause subsequent upstrokes and downstrokes. In some examples, motor 24 is rehomed during operation to prevent creep, such as after a pre-determined number of pump cycles.

First transducer component 114 and second transducer component 116 can be of any desired configuration. For example, one of first transducer component 114 and second transducer component 116 can be a magnet while the other of first transducer component 114 and second transducer component 116 can be a magnetic reed switch sensitive to the magnetic field generated by the magnet. For example, first transducer component 114 can be a magnetic field sensor mounted on main body 52 and second transducer component 116 can be a magnet mounted in pump shaft 110. While the magnetic field sensor of first transducer component 114 is described as located on main body 52 and the magnet of second transducer component 116 is located in pump shaft 110, it is understood that the locations can be reversed such that the magnet can be in main body 52 while the magnetic field sensor can be mounted on pump shaft 110.

Displacement pump 28 is mounted to pump frame 22 and disposed on pump axis PA. More specifically, cylinder 36 is mounted to an end of pump frame 22 opposite motor 24. Cylinder 36 is fixedly mounted to pump frame 22.

Fluid displacement member 34 is connected to pump shaft 110. Fluid displacement member 34 is connected to an end of pump shaft 110 opposite screw 92. In the example shown, connector 108 of fluid displacement member 34 extends into pump shaft 110. Connector 108 is secured to pump shaft 110 such that fluid displacement member 34 reciprocates with screw 92 and pump shaft 110. Connector 108 and pump shaft 110 can be connected in any desired manner. For example, a pin can extend through connector 108 and pump shaft 110 to secure connector 108 to pump shaft 110.

Displacement pump 28 is statically connected to pump frame 22 by the connection between cylinder 36 and main body 52 and dynamically connected to motor 24 by the connection between fluid displacement member 34 and pump shaft 110. Check valve 106*a* is a one-way valve disposed in cylinder 36. Check valve 106*b* is a one-way valve disposed in fluid displacement member 34 to reciprocate with fluid displacement member 34. Displacement pump 28 can be a double displacement pump in that displacement pump 28 outputs fluid during both the upstroke in second axial direction AD2 and the downstroke in first axial direction AD1.

An example pump cycle including a downstroke and an upstroke is discussed by way of example. During operation, power is provided to stator 72 to drive rotation of rotor 74 about pump axis PA. Rotor 74 rotates about pump axis PA in a first rotational direction (e.g., one of clockwise and counterclockwise) and causes simultaneous rotation of rotor shaft 42 due to connection between rotor 74 and rotor shaft 42. Rotor shaft 42 rotates about pump axis PA and drives drive mechanism 26 due to connection between rotor shaft 42 and drive nut 90.

Drive nut 90 rotates about pump axis PA. Drive nut 90 rotating about pump axis PA causes rolling elements 94 to exert an axial driving force on screw 92 in axial direction AD1 to drive screw 92 linearly along pump axis PA. Screw 92 is driven linearly in first axial direction AD1. Screw 92 drives pump shaft 110 and thus fluid displacement member 34 through a downstroke along pump axis PA and in first axial direction AD1. During the downstroke, check valve 106*a* is closed and check valve 106*b* is open. Fluid is driven through check valve 106*b* and downstream from displacement pump 28. Sensor 48 can sense the end of the downstroke and provide that data to the controller.

After completing the downstroke, rotor 74 is driven in a second rotational direction opposite the first rotational direction (e.g., the other of clockwise and counterclockwise). Rotor 74 drives rotation of rotor shaft 42, which drives rotation of drive nut 90. Rolling elements 94 exert an axial driving force in second axial direction AD2 on screw 92 to drive screw 92 linearly along pump axis PA. Screw 92 is driven linearly in the second axial direction AD2. Screw 92 pulls fluid displacement member 34 through an upstroke along pump axis PA and in second axial direction AD2. During the upstroke, check valve 106*a* is open and check valve 106*b* is closed. Fluid is drawn into cylinder through check valve 106*a* and simultaneously driven downstream from displacement pump 28. Motor 24 thereby causes pumping by displacement pump 28. Displacement pump 28 outputs fluid during both the upstroke and the downstroke.

Axial forces are generated and experienced during pumping. Bearing 44 permits rotational motion to pass within drive mechanism 26 from motor 24 while preventing some or all of the axial forces generated by displacement pump 28 from transferring to rotor 74. Fluid displacement member 34 moves in a reciprocating linear fashion and experiences axial forces due to fluid resistance experienced during reciprocation. Specifically, fluid displacement member 34 receives a downward reaction force when moving through the upstroke and an upward reaction force when moving through the downstroke, and both of the upward reaction force and the downward reaction force transfer through drive mechanism 26 and to bearing 44. The axial forces generating during pumping can also be referred to as pump reaction forces.

The pump reaction forces are transmitted through fluid displacement member 34 and to the linear drive element of drive mechanism 26. The pump reaction forces are transmitted through the linear drive element to the rotating element of drive mechanism 26. The pump reaction forces are transmitted to bearing 44 at a location axially between the rotating elements of drive mechanism 26 and rotor 74. Bearing 44 supports a sufficient portion of the pump reaction forces and transmits those forces to pump frame 22 and away from motor 24 to protect motor 24 during operation. Bearing 44 can support up to all of the pump reaction forces generated during pumping. Bearing 44 prevents the pump reaction forces from causing axial misalignment between rotor 74 and stator 72, thereby increasing the life and efficiency of motor 24.

In the example shown, the pump reaction forces are transmitted to pump shaft 110 from fluid displacement member 34 and through pump shaft 110 to screw 92. The pump reaction forces are transmitted through screw 92 and rolling elements 94 and to drive nut 90. Drive nut 90 transmits the pump reaction forces to rotor shaft 42, which interfaces with inner race 45 of bearing 44. The pump reaction forces are transmitted through bearing 44, specifically through inner race 45, rolling elements 49, and outer race 47, to pump frame 22. Pump frame 22 is sufficiently sturdy to handle the pump reaction forces generated during pumping. As such, the axial forces generated during pumping are transferred to and experienced by pump frame 22 prior to those forces being experienced by motor 24. Motor 24 is thereby isolated from the pump reaction forces.

Pump assembly 12 provides significant advantages. Motor 24, drive mechanism 26, and displacement pump 28 are disposed coaxially on pump axis PA, providing a compact pumping arrangement that facilitates transport between and within job sites. Bearing 44 reacts pump reaction forces to isolate motor 24 from those pump reaction forces. The pump reaction forces are not transferred to motor 24 to protect components of motor 24 and prevent misalignment between stator 72 and rotor 74. Rotor 74 is an outer rotator, which provides high inertia and torque, facilitating pumping at the high pressures utilized for generating the fluid spray. Each of motor 24, drive mechanism 26, and displacement pump 28 being disposed coaxially on pump axis PA further reduces the number of moving parts of pump assembly 12, providing a simpler, more robust pumping arrangement. In addition, no speed reduction gearing is present between motor 24 and drive mechanism 26, which reduces noise generated during operation, providing a safer and more user-friendly spray environment.

Figure 3A:
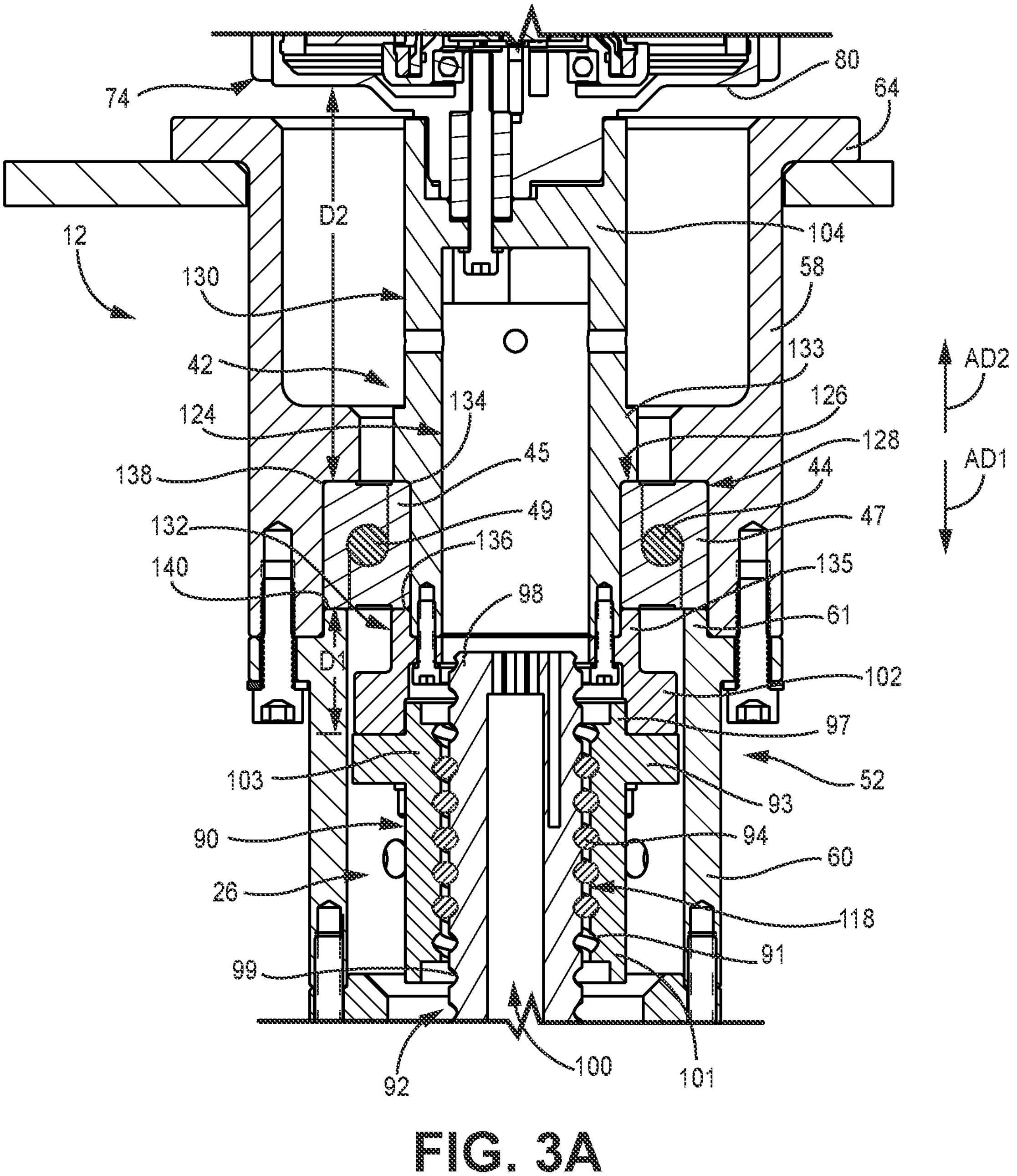
FIG. 3A is an enlarged cross-sectional view of a portion of the pumping assembly shown in FIG. 2C showing a screw at an end of a downstroke.
Figure 3B:
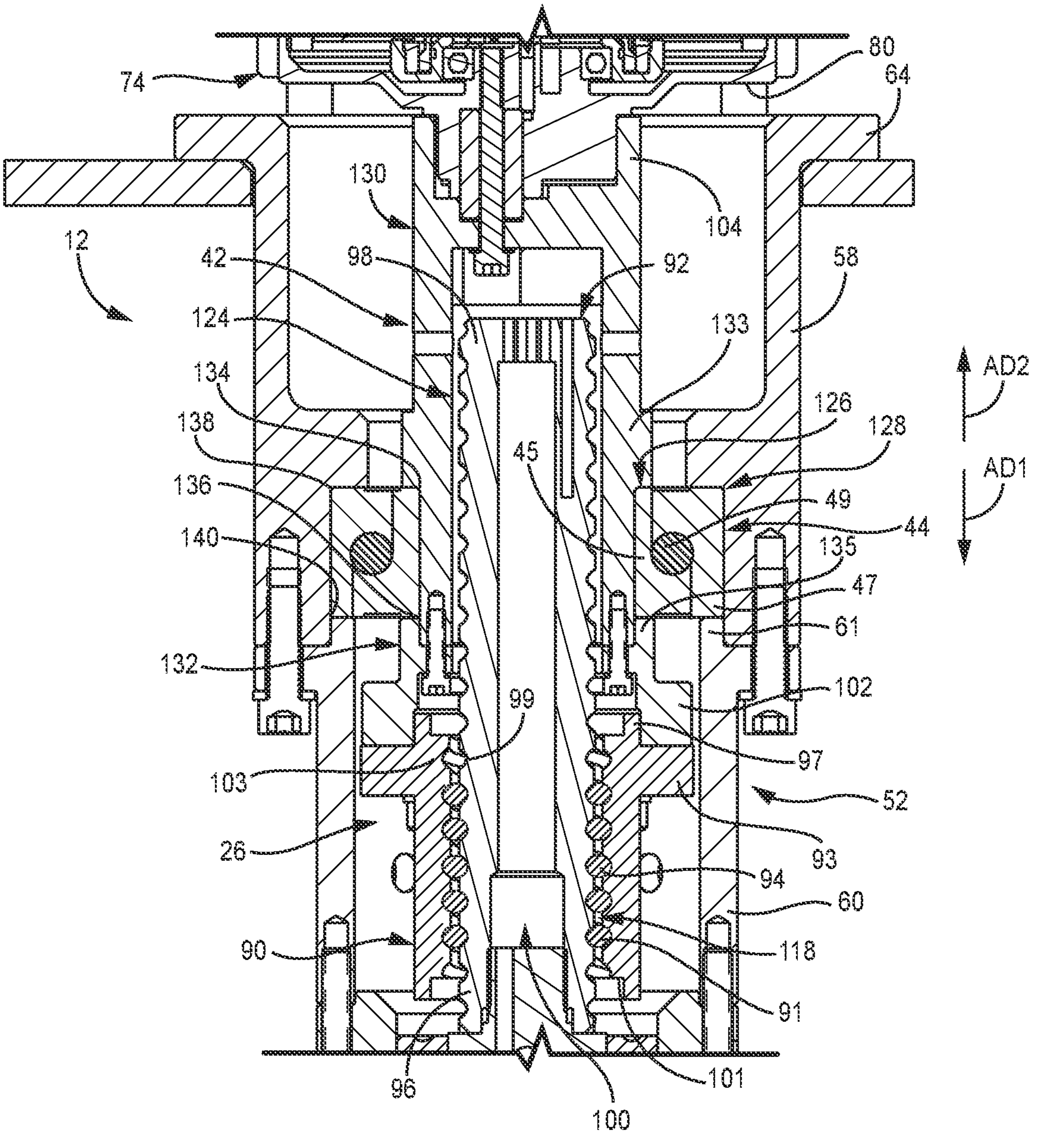
FIG. 3B is an enlarged cross-sectional view similar to FIG. 3A showing the screw at an end of an upstroke.

FIG. 3A is an enlarged cross-sectional view of a portion of pump assembly 12 showing screw 92 at the end of a downstroke. FIG. 3B is an enlarged cross-sectional view of the portion of pump assembly 12 shown in FIG. 3A showing screw 92 at the end of an upstroke. FIGS. 3A and 3B will be discussed together. Drive mechanism 26, rotor shaft 42, bearing 44, main body 52, rotor 74, cavity 124, inner notch 126, and outer notch 128 are shown. Drive mechanism 26 includes drive nut 90, screw 92, and rolling elements 94. Nut thread 91, nut mounting projection 93, nut shoulder 95, axial extension 97, first nut end 101, and second nut end 103 of drive nut 90 are shown. First screw end 96 (FIG. 3B), second screw end 98, screw thread 99, and bore 100 of screw 92 are shown. Rotor shaft 42 includes first shaft end 102, second shaft end 104, first shaft portion 130, and second shaft portion 132. First shaft portion 130 includes radial projection 133. Second shaft portion 132 includes axial extension 135. First frame body 58, second frame body 60, and mounting flange 64 of main body 52 are shown. Second frame body 60 in includes axial extension 61. Inner notch 126 includes first inner shoulder 134 and second inner shoulder 136. Outer notch 128 includes first outer shoulder 138 and second outer shoulder 140.

Main body 52 extends in first axial direction AD1 relative rotor 74. First frame body 58 is a part of main body 52 disposed closest to rotor 74 along pump axis PA. Mounting flange 64 extends radially outward from main body 52. Mounting flange 64 is configured to connect to connecting member 54 (best seen in FIG. 2A) and can further connect to a support frame, such as frame 30 (FIGS. 1A and 1B). Second frame body 60 is connected to an end of first frame body 58 disposed opposite rotor 74 such that first frame body 58 is disposed axially between second frame body 60 and rotor 74. In the example shown, first frame body 58 and second frame body 60 are removably connected by fasteners, but it is understood that first frame body 58 and second frame body 60 can be connected in any desired manner. In some examples, main body 52 is formed as a single component unitary component or can be formed from multiple components permanently fixed together, such as by adhesive or welding, among other options.

Outer notch 128 is configured to receive a portion of bearing 44, such as the outer race 47 of bearing 44, to support bearing 44. In the example shown, outer notch 128 is formed on main body 52 by first frame body 58 and second frame body 60. Bearing 44 is retained axially within outer notch 128 between first outer shoulder 138 and second outer shoulder 140. First outer shoulder 138 is formed on first frame body 58 and second outer shoulder 140 is formed by first frame body 58 and second frame body 60. Axial extension 61 of second frame body 60 is disposed radially within and axially overlaps a portion of first frame body 58. Second frame body 60 extending within and axially overlapping first frame body 58 radially locates second frame body 60 on first frame body 58, maintaining concentricity and facilitating mounting of bearing 44. In the example shown, first frame body 58 forms a base of outer notch 128. In some examples, first outer shoulder 138 is formed by first frame body 58 and second frame body 60 while second outer shoulder 140 and the base of outer notch 128 are formed by second frame body 60. In some examples, first outer shoulder 138 is formed by first frame body 58, second outer shoulder 140 is formed by second frame body 60, and the base of outer notch 128 is formed by a combination of first frame body 58 and second frame body 60. In some examples, outer notch 128 is formed on main body 52 and a separate component, such as a lock nut, is connected to main body 52 to secure bearing 44 within outer notch 128.

Rotor shaft 42 is connected to and extends in first axial direction AD1 from rotor 74. Rotor shaft 42 and rotor 74 are disposed coaxially on pump axis PA. A portion of rotor body 84 extends into and axially overlaps with rotor shaft 42. Rotor body 84 extending into and axially overlapping a portion of rotor shaft 42 maintains concentricity between rotor body 84 and rotor shaft 42. Rotor shaft 42 extends to and is connected with drive mechanism 26. Second shaft end 104 of rotor shaft 42 is connected to rotor 74 and first shaft end 102 of rotor shaft 42 is connected to drive nut 90. In the example shown, second shaft end 104 is formed by first shaft portion 130 and first shaft end 102 is formed by second shaft portion 132. In the example shown, second shaft end 104 is closed and first shaft end 102 is open. Cavity 124 is formed in rotor shaft 42 and extends between first shaft end 102 and second shaft end 104. Cavity 124 receives a portion of screw 92 as screw 92 reciprocates during pumping, as discussed in more detail below.

In the example shown, rotor shaft 42 includes first shaft portion 130 connected to rotor 74 and second shaft portion 132 connected to an end of first shaft portion 130 opposite rotor 74. Second shaft portion 132 extends in first axial direction AD1 from first shaft portion 130 and is connected to drive nut 90. In the example shown, second shaft portion 132 is connected to first shaft portion by fasteners, but it is understood that first shaft portion 130 and second shaft portion 132 can be connected in any suitable manner, such as by adhesive or press-fitting, among other options. While rotor shaft 42 can be formed from more than one part, it is understood that rotor shaft 42 functions as a single part to provide rotational power to drive mechanism 26. Furthermore, while rotor shaft 42 is shown as formed by first shaft portion 130 and second shaft portion 132, rotor shaft 42 can be formed any desired number of parts, such as one or more than two parts. For example, rotor shaft 42 can be formed as a single part.

Inner notch 126 is configured to receive a portion of bearing 44, such as the inner race 45 of bearing 44, to support bearing 44. In the example shown, inner notch 126 is formed on rotor shaft 42 between first shaft portion 130 and second shaft portion 132. Bearing 44 is retained axially within inner notch 126 between first inner shoulder 134 and second inner shoulder 136. First inner shoulder 134 is formed on first shaft portion 130 and second inner shoulder 136 is formed by first shaft portion 130 and second shaft portion 132. First inner shoulder 134 is formed by radial projection 133 of first shaft portion 130, which is a part of first shaft portion 130 extending radially from first shaft portion 130. Axial extension 135 of second shaft portion 132 extends in second axial direction AD2 and is disposed around and axially overlaps a portion of first shaft portion 130. Second shaft portion 132 extending around and axially overlapping first shaft portion 130 radially locates second shaft portion 132 on first shaft portion 130, maintaining concentricity and facilitating mounting of bearing 44. In the example shown, first shaft portion 130 forms a base of inner notch 126. In some examples, first inner shoulder 134 is formed by first shaft portion 130 and second shaft portion 132 while second inner shoulder 136 and the base of inner notch 126 are formed by second shaft portion 132. In some examples, first inner shoulder 134 is formed by first shaft portion 130, second inner shoulder 136 is formed by second shaft portion 132, and the base of inner notch 126 is formed by a combination of first shaft portion 130 and second shaft portion 132. In some examples, drive nut 90 forms at least a portion of second inner shoulder 136, such that bearing 44 is axially disposed between rotor shaft 42 and drive nut 90.

Drive nut 90 is connected to rotor shaft 42 to receive rotational power from rotor shaft 42. More specifically, second nut end 103 is attached to first shaft end 102. First shaft end 102 interfaces with nut shoulder 95. It is understood that drive nut 90 can be attached to rotor shaft 42 in any desired manner, such as by fasteners (e.g., bolts), adhesive, or press-fitting, among other options. For example, fasteners can extend through nut mounting projection 93 into rotor shaft 42. Axial extension 97 of drive nut 90 extends into and axially overlaps with second shaft portion 132, locating drive nut 90 relative rotor shaft 42 and maintaining concentricity between drive mechanism 26 and rotor shaft 42. First nut end 101 is disposed at an opposite axial end of drive nut 90 from second nut end 103. First nut end 101 is free in that first nut end 101 is not mechanically supported by pump frame 22. Nut thread 91 is formed on an inner radial surface of drive nut 90 between first nut end 101 and second nut end 103.

Screw 92 extends axially through drive nut 90 and is disposed coaxially with drive nut 90 on pump axis PA. Screw thread 99 is formed on an outer radial surface of screw 92. Rolling elements 94 are disposed between screw 92 and drive nut 90 and support screw 92 and drive nut 90 relative each other. Rolling elements 94 maintain radial gap 118 between screw 92 and drive nut 90 such that screw 92 does not directly contact drive nut 90. Rolling elements 94 engage screw thread 99 to exert an axial driving force on screw 92 at screw thread 99 to cause screw 92 to translate along pump axis PA. In the example shown, rolling elements 94 are balls that ride in raceways formed by nut thread 91 and screw thread 99. It is understood, however, that rolling elements 94 can be of any suitable configuration for driving linear displacement of screw 92 due to rotation of drive nut 90.

Screw 92 is elongate along pump axis PA between first screw end 96 and second screw end 98. Second screw end 98 forms a distal end of screw 92 oriented towards rotor 74. In the example shown, second screw end 98 is unsupported such that second screw end 98 is free relative rotor shaft 42 as screw 92 reciprocates during operation. For example, no bearing, bushing, or other support element may be disposed between second screw end 98 and rotor shaft 42. Second screw end 98 reciprocates within cavity 124 during operation. Second screw end 98 axially overlaps with a portion of rotor shaft 42. In some examples, second screw end 98 axially overlaps with rotor shaft 42 both with screw 92 at the end of a downstroke (FIG. 3A) and with screw 92 and the end of an upstroke (FIG. 3B). It is understood, however, that in some examples screw 92 does not axially overlap any portion of rotor shaft 42 with screw 92 at the end of the downstroke. For example, drive nut 90 can be axially elongate in second axial direction AD2 such that second screw end 98 axially overlaps drive nut 90 but not rotor shaft 42. The axial overlap between screw 92 and rotor shaft 42 increases as screw 92 shifts in second axial direction AD2 through the upstroke. The axial overlap between screw 92 and rotor shaft 42 decreases as screw 92 shifts in first axial direction AD1 through the downstroke. During at least a portion of a pump cycle, which includes both the upstroke and the downstroke, each of screw 92, rotor shaft 42, bearing 44, and main body 52 axially overlap with one another.

Bearing 44 is disposed proximate drive mechanism 26 to support alignment of drive mechanism 26 on pump axis PA. In the example shown, distance D1 between second nut end 103 and bearing 44 is smaller than distance D2 between first motor end 80 and bearing 44. Bearing 44 being disposed proximate drive mechanism 26 further maintains concentricity between pump frame 22, rotor shaft 42, drive nut 90, and screw 92. Minimizing an axial distance between bearing 44 and drive mechanism 26 prevents wobbling of screw 92 relative pump axis PA.

During operation, rotor 74 is rotated in a first rotational direction (e.g., one of clockwise and counterclockwise) drives rotation of rotor shaft 42 in the first rotational direction. Rotor shaft 42 drives rotation of drive nut 90. Rotation of drive nut 90 causes rolling elements 94 to exert an axial driving force on screw 92 to cause linear displacement of screw 92. Beginning from the position shown in FIG. 3A, where screw 92 is at the end of the downstroke rotation of rotor 74 causes screw 92 to displace linearly in second axial direction AD2 towards rotor 74. Second screw end 98 displaces axially into cavity 124 and towards first shaft end 102 and rotor 74. Screw 92 continues to displace into cavity 124, thereby reducing an axial distance between second screw end 98 and first shaft end 102 and increasing an axial overlap between screw 92 and rotor shaft 42 until screw 92 reaches the end of the upstroke, as shown in FIG. 3B.

With screw 92 at the end of the upstroke, screw 92 is displaced a maximum distance into cavity 124. In some examples, a majority of the volume of cavity 124 is occupied by screw 92. It is understood, however, that screw 92 can occupy any desired portion of the volume of cavity 124 with screw 92 at the end of the upstroke. In the example shown, no portion of screw 92 contacts rotor shaft 42 such that a radial gap is disposed between an inner radial surface of rotor shaft 42 and an outer radial surface of screw 92. Second screw end 98 is axially spaced from the closed first shaft end 102 at the end of the upstroke.

After completing the upstroke, rotor 74 is rotated in a second rotational direction opposite the first rotational direction (e.g., the other of clockwise and counterclockwise) to drive screw 92 through a downstroke. Rotor 74 drives rotation of rotor shaft 42 in the second rotational direction. Rotor shaft 42 drives rotation of drive nut 90 in the second rotational direction. Drive nut 90 causes rolling elements 94 to exert an axial force on screw 92 to linearly displace screw 92 in first axial direction AD1. Screw 92 displaces through a downstroke from the position shown in FIG. 3B towards the position shown in FIG. 3A. The axial overlap between rotor shaft 42 and screw 92 decrease as screw 92 displaces through the downstroke. The axial overlap between screw 92 and rotor shaft 42 is at a minimum when screw 92 reaches the end of the downstroke, thereby completing a pump cycle. After screw 92 reaches the end of the downstroke, rotor 74 can be driven in the first rotational to drive screw 92 back through an upstroke. Screw 92 continues to be reciprocated throughout pumping.

Screw 92 reciprocating within rotor shaft 42 provides significant advantages. Screw 92 reciprocating within cavity 124 provides an axially compact pump assembly 12. The axially compact pump assembly 12 facilitates ease of transport, set up, and use. Screw 92 reciprocating within cavity 124 facilitates mounting of bearing 44 proximate drive nut 90, maintaining concentricity and alignment between drive mechanism 29 and motor 24 during operation.

Pump reaction forces are experienced by fluid displacement member 34 and transmitted to drive mechanism 26 via screw 92 as fluid displacement member 34 displaces axially during each stroke of the pump cycle. The axial forces are experienced by fluid displacement member 34 at least in part due to fluid resistance during each of the upstroke and the downstroke, and are transferred to screw 92 via pump shaft 110. The axial forces experienced by screw 92 are transferred to rolling elements 94 and from rolling elements 94 to drive nut 90. The axial forces experienced by drive nut 90 are transferred to rotor shaft 42. The axial forces experienced by rotor shaft 42 are transferred to bearing 44 and through bearing 44 to main body 52 of pump frame 22. Bearing 44 transfers the pump reaction forces to pump frame 22 thereby isolating rotor 74 from those pump reaction forces and reducing dynamic axial loading on motor 24.

Figure 4A:
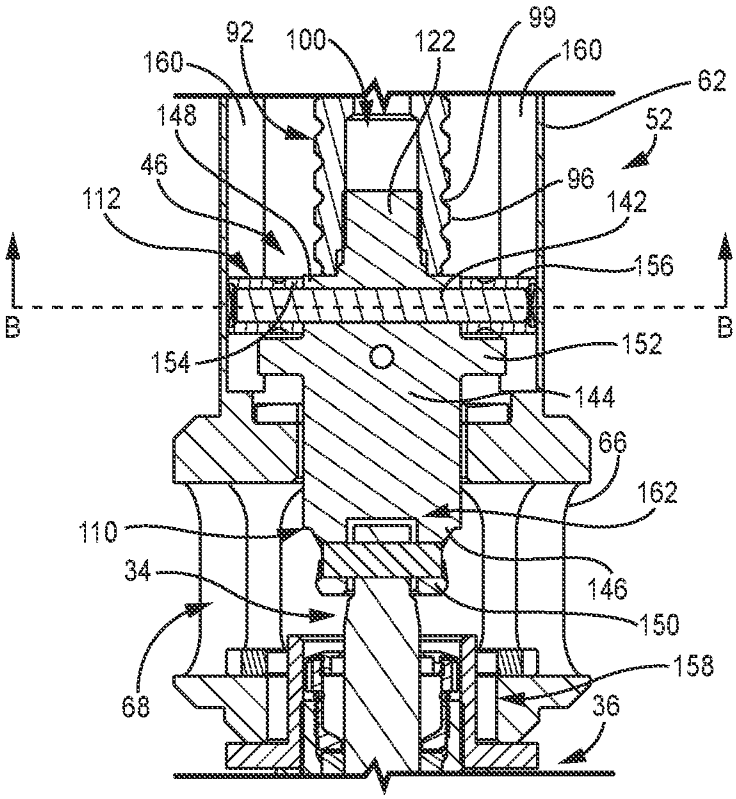
FIG. 4A is an enlarged cross-sectional view of detail 4 in FIG. 2D.
Figure 4B:
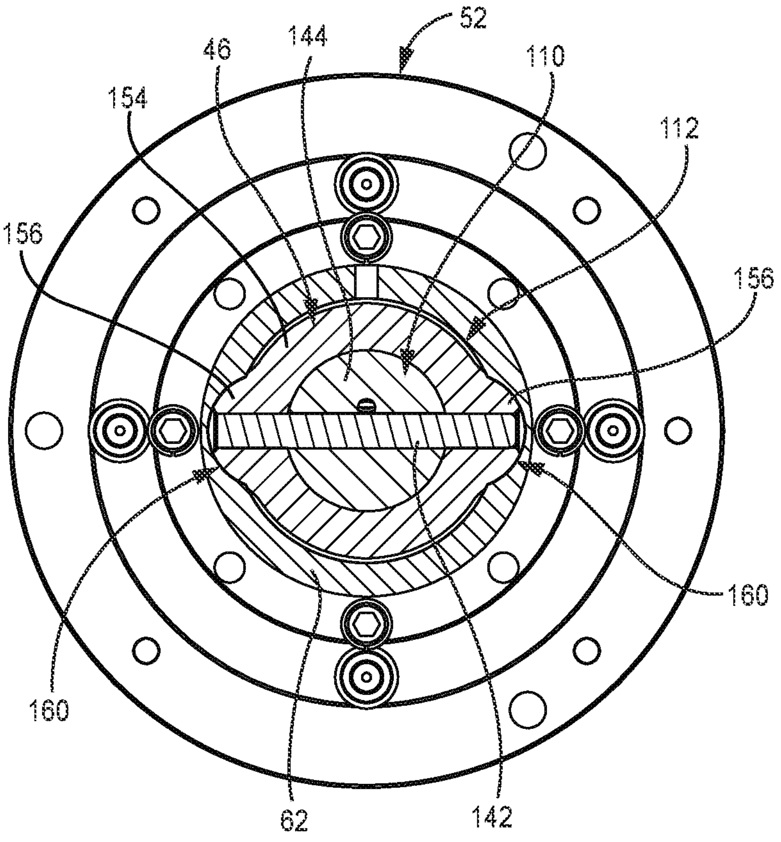
FIG. 4B is a cross-sectional view taken along line B-B in FIG. 4A.
Figure 4C:
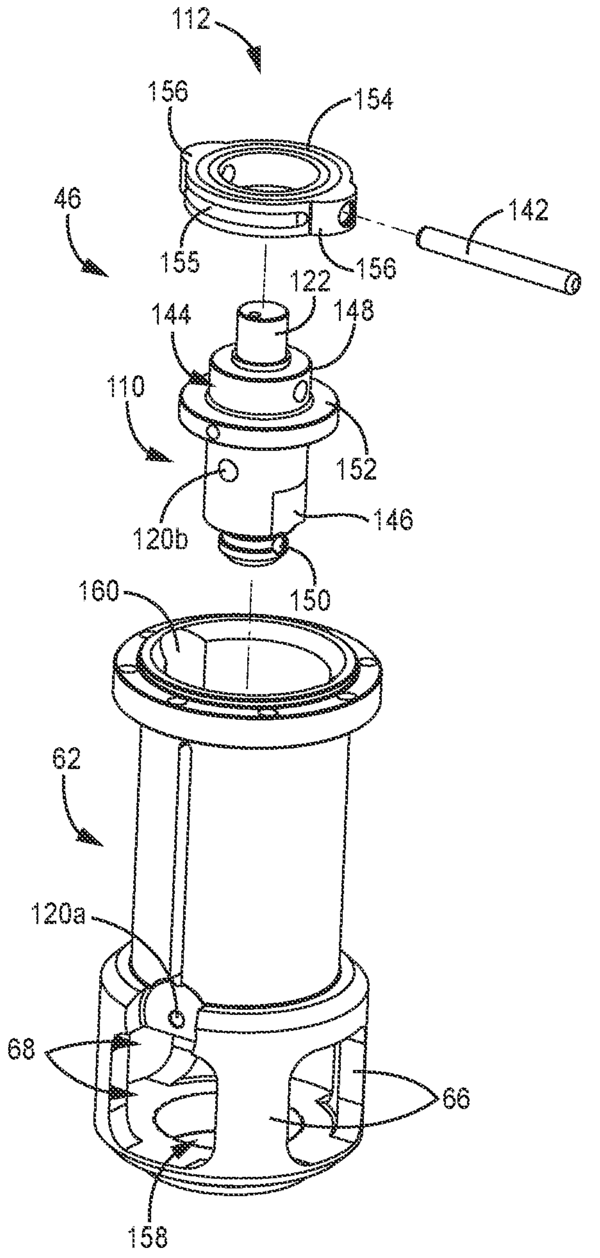
FIG. 4C is an exploded view of a clocking assembly and portion of a pump frame.

FIG. 4A is an enlarged view of detail 4 shown in FIG. 2D. FIG. 4B is a cross-sectional view taken along line B-B in FIG. 4A. FIG. 4C is an exploded view showing clocking assembly 46 and main body 52. FIGS. 4A-4C will be discussed together. Fluid displacement member 34 (FIG. 4A), cylinder 36 (FIG. 4A), third frame body 62, screw 92 (FIG. 4A), pump shaft 110, clocking member 112, and pin 142. Pump shaft 110, clocking member 112, and pin 142 form clocking assembly 46. Pump shaft 110 includes mounting projection 122 (FIGS. 4A and 4C), sensor bore 120*b* (FIG. 4C), pump shaft body 144, first body end 146 (FIGS. 4A and 4C), second body end 148 (FIGS. 4A and 4C), receiver 150 (FIGS. 4A and 4C), and support flange 152 (FIGS. 4A and 4C). Clocking member 112 includes collar 154 and clocking projections 156. Collar 154 includes radial groove 155. First screw end 96, screw thread 99, and bore 100 of screw 92 are shown. Third frame body 62 includes posts 66 (FIGS. 4A and 4C), side openings 68 (FIGS. 4A and 4C), sensor bore 120*a* (FIG. 4C), pump opening 158 (FIGS. 4A and 4C), and axial slots 160.

Clocking assembly 46 is disposed coaxially with screw 92 on pump axis PA. Clocking assembly 46 is configured to prevent screw 92 from rotating about pump axis PA. More specifically, pump shaft 110 is directly connected to screw 92 and clocking member 112 is mounted to pump shaft 110. Pump shaft body 144 is elongate along pump axis PA. Support flange 152 extends radially from pump shaft body 144. In the example shown, support flange 152 extends from pump shaft body 144 such that pump shaft body 144 extends axially in both the first axial direction AD1 and the second axial direction AD2 relative support flange 152. Mounting projection 122 extends axially from second body end 148. Mounting projection 122 extends in second axial direction AD2 from second body end 148. Mounting projection 122 has a smaller diameter than pump shaft body 144. Mounting projection 122 connects to first screw end 96 to mount pump shaft 110 to screw 92. In the example shown, mounting projection 122 extends into screw bore 100 to connect pump shaft 110 to screw 92. In some examples, mounting projection 122 and shaft bore 100 include interfaced threading. It is understood, however, that pump shaft 110 can be connected to screw 92 in any desired manner, such as by fasteners, adhesive, or press-fitting, among other options.

Receiver 150 extends in first axial direction AD1 from first body end 146. Receiver 150 is configured to connect to fluid displacement member 34. In the example shown, receiver 150 receives a portion of fluid displacement member 34 to connect to fluid displacement member 34. Connector 108 of fluid displacement member 34 extends into receiving bore 162 formed in receiver 150. A fastener, such as a pin, extends through receiver 150 and connector 108 to secure fluid displacement member 34 to pump shaft 110. While fluid displacement member 34 is described as connecting to pump shaft 110 by a pinned connection, it is understood that fluid displacement member 34 can be connected to pump shaft 110 in any manner suitable for pump shaft 110 driving reciprocation of fluid displacement member 34.

Clocking member 112 is supported by and connected to pump shaft 110. Clocking member 112 is disposed around pump shaft body 144 adjacent support flange 152. In the example shown, clocking member 112 is disposed axially between support flange 152 and first screw end 96. Collar 154 extends around pump shaft body 144. In the example shown, collar 154 extends around second body end 148 of pump shaft body 144. Clocking member 112 forms a collar extending around pump shaft body 144. While clocking member 112 is shown as a single piece, it is understood that anti-rotation element can be formed from multiple parts. For example, clocking member 112 can be formed from multiple components disposed in a clamshell configuration about pump shaft body 144.

Clocking projections 156 extend radially from collar 154. Clocking projections 156 project radially beyond an outer radial edge of support flange 152. In the example shown, clocking member 112 includes two clocking projections 156, but it is understood that anti-rotation element can include as many or as few clocking projections 156 as desired. In the example shown, clocking projections 156 are formed by rounded projections extending from collar 154. It is understood that clocking projections 156 can be of any suitable configuration for interfacing with main body 52 and preventing rotation relative main body 52, such as cylindrical projections, rectangular projections, or triangular projections, among other options.

Clocking member 112 is secured to pump shaft 110 to prevent relative rotation between pump shaft 110 and clocking member 112. In the example shown, clocking member 112 is secured to pump shaft 110 by a pinned connection. Pin 142 extends through clocking member 112 and pump shaft 110 to connect clocking member 112 to pump shaft 110. Pin 142 extends into each clocking projection 156 of clocking member 112. To assemble clocking assembly 46, clocking member 112 is shifted in first axial direction AD1 over second shaft body end 148 of pump shaft 110. The radial bores through clocking member 112 are aligned with the radial bore through pump shaft 110 and pin 142 in inserted therethrough to secure clocking member 112 to pump shaft 110. While clocking member 112 and pump shaft 110 are described as being connected by pin 142, it is understood that clocking member 112 and pump shaft 110 can be secured in any desired manner, such as by adhesive or press-fitting, among other options. In some examples, the outer radial surface of pump shaft body 144 and the inner radial surface of collar 154 can have mating contours to prevent relative rotation.

Clocking assembly 46 is configured such that the portions fixed to screw 92 reciprocate relative to main body 52 with screw 92. Axial slots 160 are formed on an inner surface of main body 52. Axial slots 160 extend axially and are configured to receive clocking projections 156 of clocking member 112. Clocking projections 156 being received in axial slots 160 prevents clocking assembly 46, and thus screw 92, from rotating relative to pump frame 22 and about pump axis PA. Clocking assembly 46 can be considered to include both the projections 156 and the slots 160 as the projections 156 interface with slots 160 to prevent relative rotation. Clocking assembly 46 can thereby be considered to include both a collar formed by clocking member 112 and a sleeve on which the axial slots 160 are formed. The sleeve is fixed with respect to pump frame 22, and in the example shown is formed by third frame body 62. Both screw 92 and clocking member 112 translate within the sleeve along pump axis PA while the sleeve prevents rotation of clocking member 112 about pump axis PA.

Pump opening 158 extends through main body 52 and is disposed coaxially on pump axis PA. Fluid displacement member 34 extends through pump opening 158 to connect to pump shaft 110. Cylinder 36 (best seen in FIGS. 2A and 2B) of displacement pump 28 can be connected to main body 52 at pump opening 158. Side openings 68 extend radially through main body 52. Posts 66 are disposed between side openings 68. Side openings 68 provide the user access to the connection between pump shaft 110 and fluid displacement member 34 to facilitate mounting and dismounting of fluid displacement member 34 to pump shaft 110. Sensor bore **120*b* extends into first body end 146. Sensor bore 120*b* is configured to receive a component of sensor 48 (FIGS. 2B and 2C) (e.g., one of first transducer component 114 (FIGS. 2B and 2C) and second transducer component 116 (FIGS. 2B and 2C)). Sensor bore 120*a* extends into third frame body 62. Sensor bore 120*a* is configured to receive a component of sensor 48 (e.g., the other one of first transducer component 114 and second transducer component 116**).

During operation, screw 92 reciprocates along pump axis PA to drive reciprocation of fluid displacement member 34. Clocking assembly 46 is disposed axially between screw 92 and fluid displacement member 34. Pump shaft 110 connects fluid displacement member 34 to screw 92 to cause reciprocation of fluid displacement member 34. Clocking member 112 interfaces with main body 52 to prevent rotation of screw 92 about pump axis PA as screw 92 reciprocates along pump axis PA. Clocking projections 156 of clocking member 112 are disposed in axial slots 160 and reciprocate axially within axial slots 160. Clocking projections 156 interfacing with axial slots 160 prevents relative rotation about pump axis PA.

In some examples, both the outer radial surface of collar 154 and the outer radial surface of clocking projections 156 interface with the inner radial surface of third frame body 62. The outer radial surface of clocking member 112 interfacing with the inner radial surface of third frame body 62 can form a sliding seal to prevent contaminants, such as dust or overspray, from migrating past clocking member 112 in second axial direction AD2. For example, radial groove 155 can form a u-cup to seal against third frame body 62. As such, clocking member 112 prevents the contaminants from reaching screw 92 and other elements of drive mechanism 26 (best seen in FIGS. 2B-3B).

Clocking assembly 46 provides significant advantages. Clocking assembly 46 prevents screw 92 from rotating about pump axis PA, thereby causing screw 92 to reciprocate along pump axis PA due to rotation of drive nut 90 (best seen in FIGS. 2B-3B). Clocking member 112 both clocks screw 92 to pump frame 22 to prevent rotation and provides a sliding seal to prevent contaminants from reaching lubricated portions of drive mechanism 26.

Figure 5:
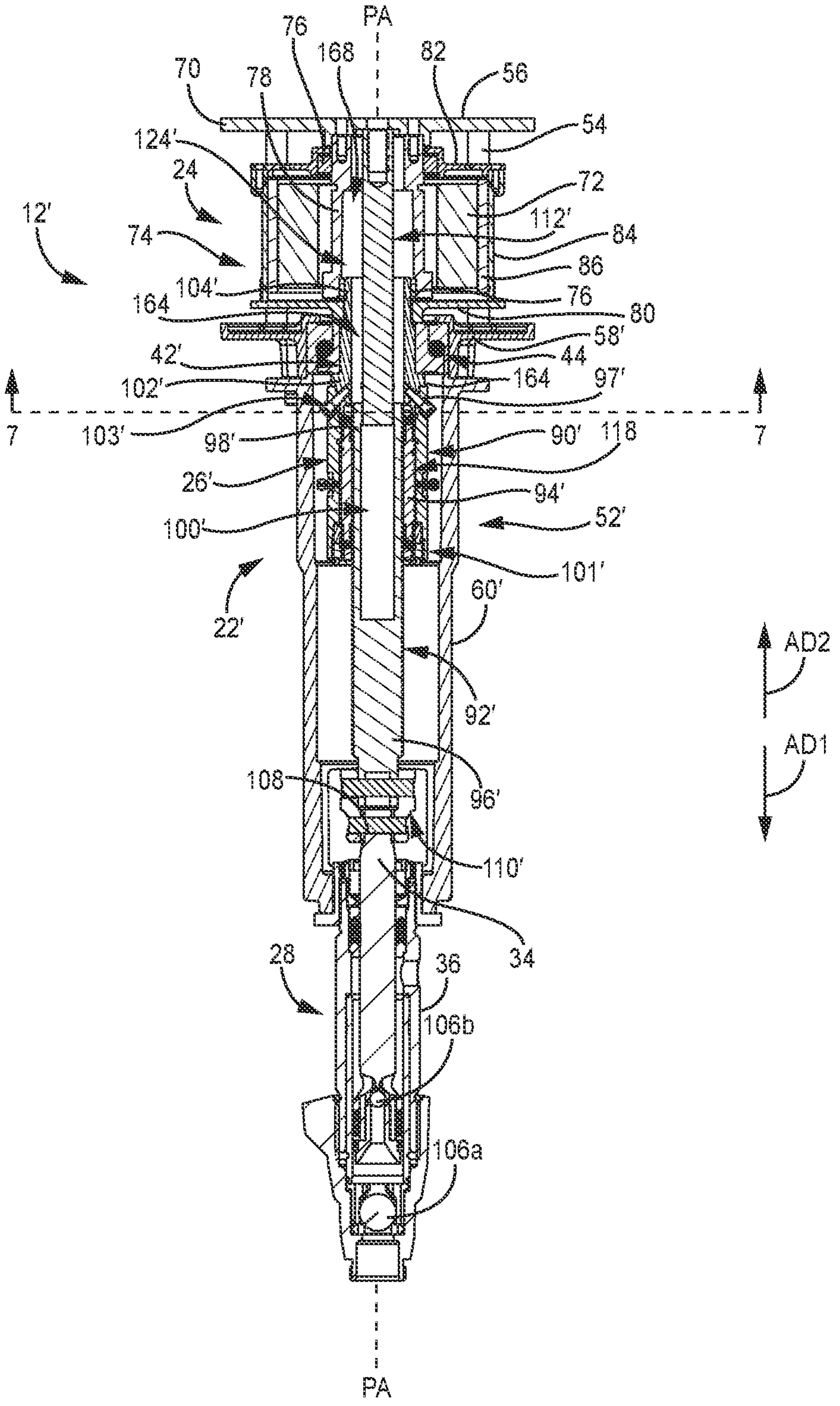
FIG. 5 is an elevational cross-sectional view of a second embodiment of a pumping assembly for use in the spray system of FIGS. 1A and 1B.

FIG. 5 is a cross-sectional view of pump assembly 12'. Pump assembly 12' is substantially similar to pump assembly 12 (best seen in FIGS. 2A-2D) and is configured to generate a rotational output by motor 24 and provide a linear driving input to displacement pump 28 to pump fluid. Pump assembly 12' can be utilized in spray system 10 (FIGS. 1A and 1B). Pump frame 22', motor 24, drive mechanism 26', displacement pump 28, rotor shaft 42', bearing 44, pump shaft 110', clocking member 112', and cavity 124' are shown. Pump frame 22' includes main body 52', connecting member 54, and frame member 56. Main body 52' includes first frame body 58' and second frame body 60'. Frame member 56 includes radial projections 70. Motor 24 includes stator 72, rotor 74, motor bearings 76, axle 78, first motor end 80, and second motor end 82. Rotor 74 includes rotor body 84 and permanent magnet array 86. Drive mechanism 26' includes drive nut 90', screw 92', and rolling elements 94'. Drive nut 90' includes axial extension 97', first nut end 101', and second nut end 103'. Screw 92' includes first screw end 96', second screw end 98', and bore 100'. Rotor shaft 42' includes first shaft end 102', second shaft end 104', and shaft flange 164. Displacement pump 28 includes fluid displacement member 34, cylinder 36, and check valves **106*a*, 106*b*. Fluid displacement member 34 includes connector 108. Cavity 124' includes shaft cavity 164 and motor cavity 168**.

Pump frame 22' supports other components of pump assembly 12'. Main body 52' extends in axial direction AD1 relative to motor 24. In the example shown, main body 52' is spaced in first axial direction AD1 from first motor end 80 of motor 24. Frame member 56 is disposed on an opposite axial side of motor 24 from main body 52' and is adjacent second motor end 82. Frame member 56 is fixed to motor 24. Connecting member 54 extends axially between main body 52' and frame member 56 and fixes main body 52' and frame member 56 together. More specifically, connecting member 54 is attached to mounting flange 64' of main body 52' and radial projections 70 of frame member 56. Connecting member 54 is spaced radially from motor 24. Connecting member 54 can fully enclose rotor 74 or be formed from a plurality of connecting members 52 spaced circumferentially about rotor 74. In the example shown, connecting member 54 includes tie rods extending between and connecting frame member 56 and main body 52'. Pump frame 22' forms an exoskeleton extending around and supporting motor 24 in examples where connecting member 54 formed by a plurality of connecting members.

Motor 24 is an electric motor statically and dynamically connected to pump frame 22'. Motor 24 is disposed axially between frame member 56 and main body 52'. Motor 24 is an electric motor. Stator 72 includes armature windings (not shown) and rotor 74 includes permanent magnet array 86. Rotor 74 is configured to rotate about pump axis PA in response to current through stator 72. Motor 24 is a reversible motor in that stator 72 can cause rotation of rotor 74 in either of two rotational directions about pump axis PA (e.g., clockwise or counterclockwise).

Rotor 74 is disposed about stator 72 such that motor 24 includes an outer rotator. The permanent magnets forming permanent magnet array 86 are disposed on an inner circumferential face of rotor body 84. Stator 72 is fixed to axle 78. Outer end 88 of axle 78 extends in second axial direction AD2 beyond second motor end 82. Outer end 88 extends through rotor body 84. Outer end 88 of axle 78 is connected to frame member 56 such that axle 78 is fixed to frame member 56. Outer end 88 connecting to frame member 56 forms the static connection between motor 24 and pump frame 22'. Motor bearings 76 support rotor 74 relative stator 72. Motor bearings 76 facilitate rotation of rotor 74 relative to stator 72. Axle 78 extends through the motor bearing 76 disposed at second motor end 82 of motor 24, such that the motor bearing 76 at second motor end 82 is disposed between rotor body 84 and axle 78.

Rotor shaft 42' extends axially from rotor 74 in first axial direction AD1 and is connected to rotor 74 to rotate with rotor 74. Rotor shaft 42' is disposed coaxially with rotor 74 on pump axis PA. Rotor shaft 42' extends into an interior of main body 52' such that at least a portion of rotor shaft 42' overlaps axially with at least a portion of main body 52'. In the example shown, rotor shaft 42' overlaps axially with each of first frame body 58' and second frame body 60'. Rotor shaft 42' overlaps axially with a full axial length of first frame body 58'. Rotor shaft 42' is open at each of first shaft end 102' and second shaft end 104'. Second shaft end 104' extends through rotor body 84 and into an interior of motor 24. Second shaft end 104' overlaps axially with axle 78. The motor bearing 76 disposed at first motor end 80 is disposed radially between axle 78 and rotor shaft 42'. In the example shown, second shaft end 104' is disposed on a radially inner side of the motor bearing 76 and axle 78 is disposed on a radially outer side of the motor bearing 76.

Cavity 124' is elongated along pump axis PA. Cavity 124' is formed by shaft cavity 166 extending within rotor shaft 42' and motor cavity 168 extending within motor 24. More specifically, motor cavity 168 is formed within axle 78.

Clocking member 112' interfaces with pump frame 22' such that clocking member 112' is held static relative to pump frame 22' during pumping. In the example shown, clocking member 112' is fixed to frame member 56. Clocking member 112' can be formed separately from frame member 56 and be connected to frame member 56 or can be integrally formed with frame member 56. Clocking member 112' can be removably or permanently fixed to frame member 56. Clocking member 112' extends in first axial direction AD1 from frame member 56 and through cavity 124' to interface with screw 92'. Clocking member 112' is cantilevered from frame member 56. In the example shown, clocking member 112' extends through a full axial length of motor cavity 168 such that clocking member 112' axially overlaps with the full axial length of each of axle 78, stator 72, and rotor 74. Clocking member 112' is connected to frame member 56 at a location spaced in second axial direction AD2 from second motor end 82. In the example shown, clocking member 112' extends through a full axial length of shaft cavity 166 such that clocking member 112' axially overlaps a full axial length of rotor shaft 42'. It is understood, however, that clocking member 112' can extend any desired distance into cavity 124' such that clocking member 112' interfaces with screw 92' when screw 92' is at the end of a downstroke, as discussed in more detail below.

Clocking member 112' interfaces with screw 92' to prevent screw 92' from rotating about pump axis PA. Clocking member 112' is disposed coaxially with screw 92' on pump axis PA. In the example shown, clocking member 112' is a rod elongate along pump axis PA. Clocking member 112' includes a contoured outer surface configured to interface with a contoured surface of screw 92' within bore 100' to prevent rotation of screw 92' about pump axis PA. Clocking member 112' and bore 100' can have any desired contours suitable for mating and preventing rotation of screw 92' about clocking member 112'. For example, one or both of clocking member 112' and screw 92' can have contours that are triangular, rectangular, pentagonal, or hexagonal, among other options. Screw 92' translates axially relative to and along clocking member 112' during operation.

Drive mechanism 26' is connected to rotor shaft 42'. Drive mechanism 26' receives a rotational output from rotor 74 via rotor shaft 42' and is configured to provide a linear input to fluid displacement member 34. More specifically, second nut end 103' of drive nut 90' is connected to first shaft end 102' of rotor shaft 42'. Drive nut 90' is disposed coaxially with rotor shaft 42' to rotate about pump axis PA with rotor shaft 42'. Drive nut 90' can be attached to rotor shaft 42' via fasteners (e.g., bolts), adhesive, or press-fitting, among other options. In the example shown, drive nut 90' is connected to rotor shaft 42' by fasteners oriented on axes transverse and non-orthogonal to pump axis PA. It is understood, however, that the fasteners can be disposed at any desired orientation suitable for fixing drive nut 90' to rotor shaft 42'. First nut end 101' is disposed at an opposite axial end of drive nut 90' from second nut end 103'. First nut end 101' is free in that first nut end 101' is not mechanically supported by pump frame 22'. Axial extension 97' extends in second axial direction AD2 from second nut end 103' and is disposed around a portion of rotor shaft 42'. Axial extension 97' interfaces with shaft flange 164 and is disposed on an opposite axial side of shaft flange 164 from bearing 44.

Screw 92' is disposed coaxially with drive nut 90' on pump axis PA and is elongate along pump axis PA. Screw 92' is reciprocates along pump axis PA during operation. Screw 92' provides the linear input to fluid displacement member 34 to drive fluid displacement member 34 linearly along pump axis PA. Second screw end 98' is oriented towards motor 24. Bore 100' extends axially into screw 92' from second screw end 98'. Pump shaft 110' is attached to first screw end 96' and to fluid displacement member 34. Pump shaft 110' can be connected to each of screw 92' and fluid displacement member 34 in any desired manner, such as by pinned connections, among other options. Screw 92' and pump shaft 110' form a linear drive element of drive mechanism 26'. It is understood that, in some examples, screw 92' and pump shaft 110' are formed as a single component. Screw 92' and pump shaft 110' function as a single part to drive linear reciprocation of fluid displacement member 34 on pump axis PA.

Rolling elements 94' are disposed radially between screw 92' and drive nut 90' and support screw 92' relative drive nut 90' such that gap 118 is disposed between screw 92' and drive nut 90'. Rolling elements 94' thereby prevent screw 92' and drive nut 90' from directly contacting one another during operation. Rolling elements 94' are arrayed around, and are arrayed along, an axis that is coaxial with pump axis PA. Rolling elements 94' are rollers arrayed circumferentially around screw 92'. In the example shown, rolling elements 94' are rollers that are elongate between first nut end 101' and second nut end 103'. It is understood, however, that rolling elements 94' can be of any suitable configuration for maintaining gap 118 between drive nut 90' and screw 92' and for causing axial translation of screw 92' due to rotation of drive nut 90', such as balls, among other options.

Bearing 44 is disposed radially between rotor shaft 42' and pump frame 22'. More specifically, bearing 44 is disposed radially between rotor shaft 42' and main body 52'. Bearing 44 is disposed axially between drive nut 90' and motor 24. Bearing 44 is retained axially on rotor shaft 42' between shaft flange 164 and rotor body 84. In the example shown, shaft flange 164 contacts each of bearing 44 and drive mechanism 26'. More specifically, shaft flange 164 contacts each of bearing 44 and drive nut 90'. Bearing 44 is retained axially on main body 52' between first frame body 58' and second frame body 60'. Bearing 44 is disposed axially between drive nut 90' and motor 24. Bearing 44 supports motor 24 relative pump frame 22' and facilitates rotation of rotor shaft 42' relative pump frame 22'. Bearing 44 thereby forms a dynamic connection between motor 24 and pump frame 22'. Bearing 44 is configured to support both rotational and axial loads generated during pumping. Bearing 44 supports the axial loads and transfers the axial loads to pump frame 22' to isolate motor 24 from the axial loads.

Displacement pump 28 is mounted to pump frame 22'. Displacement pump 28 is disposed coaxially on pump axis PA. More specifically, cylinder 36 is mounted to main body 52' at an end of main body 52' disposed axially opposite motor 24. Cylinder 36 is fixed to main body 52' thereby forming a static connection between displacement pump 28 and pump frame 22'. Fluid displacement member 34 is connected to screw 92' by pump shaft 110'. Fluid displacement member 34 is connected to an end of pump shaft 110' opposite screw 92'. While fluid displacement member 34 is described as connected to screw 92' by pump shaft 110', it is understood that fluid displacement member 34 can be directly connected to screw 92'. Displacement pump 28 is dynamically connected to motor 24 by the connection between fluid displacement member 34 and pump shaft 110'. Check valve **106*a* is a one-way valve disposed in cylinder 36. Check valve 106*b* is a one-way valve disposed in fluid displacement member 34 to reciprocate with fluid displacement member 34. Displacement pump 28 can be a double displacement pump in that displacement pump 28 outputs fluid during both of the upstroke in second axial direction AD2 and the downstroke in first axial direction AD1**.

An example pump cycle including an initial downstroke and a subsequent upstroke is discussed by way of example. During operation, power is provided to stator 72 to drive rotation of rotor 74 about pump axis PA. Rotor 74 rotates about pump axis PA in a first rotational direction (e.g., one of clockwise and counterclockwise) and causes simultaneous rotation of rotor shaft 42' due to connection between rotor 74 and rotor shaft 42'. Rotor shaft 42' rotates about pump axis PA and drives rotation of drive nut 90' about pump axis PA. Rotor shaft 42' provides the rotational output from motor 24 to drive mechanism 26'.

Drive nut 90 rotates about pump axis PA. Drive nut 90 rotating about pump axis PA causes rolling elements 94 to exert an axial driving force on screw 92 in axial direction AD1 to drive screw 92 linearly along pump axis PA. Screw 92 is driven linearly in first axial direction AD1. Screw 92 drives pump shaft 110' and thus fluid displacement member 34 through a downstroke along pump axis PA and in first axial direction AD1. During the downstroke, check valve **106*a* is closed and check valve 106*b* is open. Fluid is driven through check valve 106*b* and downstream from displacement pump 28**.

After completing the downstroke, rotor 74 is driven in a second rotational direction opposite the first rotational direction (e.g., the other of clockwise and counterclockwise). Rotor 74 drives rotation of rotor shaft 42, which drives rotation of drive nut 90. Rolling elements 94 exert an axial driving force in second axial direction AD2 on screw 92 to drive screw 92 linearly along pump axis PA. Screw 92 is driven linearly in the second axial direction AD2. Screw 92 pulls fluid displacement member 34 through an upstroke along pump axis PA and in second axial direction AD2. During the upstroke, check valve **106*a* is open and check valve 106*b* is closed. Fluid is drawn into cylinder through check valve 106*a* and simultaneously driven downstream from displacement pump 28. Motor 24 thereby causes pumping by displacement pump 28. Displacement pump 28** outputs fluid during both the upstroke and the downstroke.

In some examples, rotor 74 and drive mechanism 26' are sized to provide a one revolution of rotor 74 results in a full stroke of screw 92'. A full revolution in an opposite rotational direction results in a full stroke of screw 92' in the opposite axial direction. As such, two revolutions in opposite directions can provide a full pump cycle. Pump assembly 12' can thereby provide a 1:1 ratio between revolutions of rotor 74 and pumping strokes. It is understood, however, that rotor 74 and drive mechanism 26' can be sized to provide any desired ratio between revolutions and pump strokes, such as 0.25 revolutions per stroke, 0.5 revolutions per stroke, two revolutions per stroke, three revolutions per stroke, or any other desired number of revolutions per stroke.

Axial forces are experienced by drive mechanism 26 as screw 92 displaces linearly along pump axis PA during each of the downstroke and the upstroke. The axial forces experienced by fluid displacement member 34, at least in part due to fluid resistance during each of the upstroke and the downstroke, are transferred to screw 92 via pump shaft 110'. The axial forces experienced by screw 92 are transferred to rolling elements 94 and from rolling elements 94 to drive nut 90. The axial forces experienced by drive nut 90 are transferred to rotor shaft 42. The axial forces experienced by rotor shaft 42 are transferred to bearing 44 and through bearing 44 to main body 52 of pump frame 22. As such, the axial forces generated during pumping, which can also be referred to as pump reaction forces, are transferred to and experienced by pump frame 22 prior to those forces being experienced by motor 24. Motor 24 is thereby isolated from the pump reaction forces.

Pump assembly 12' provides significant advantages. Motor 24, drive mechanism 26', and displacement pump 28 are disposed coaxially on pump axis PA, providing a compact pumping arrangement that facilitates transport between and within job sites. Screw 92' translates within each of rotor shaft 42' and motor 24, facilitating the compact axial arrangement. Bearing 44 reacts pump reaction forces to isolate motor 24 from those pump reaction forces. The pump reaction forces are not transferred to motor 24 to protect components of motor 24 and prevent misalignment between stator 72 and rotor 74. Rotor 74 is an outer rotator, which provides high inertia and torque, facilitating pumping at the high pressures utilized for generating the fluid spray. Each of motor 24, drive mechanism 26', and displacement pump 28 being disposed coaxially on pump axis PA further reduces the number of moving parts of pump assembly 12', providing a simpler, more robust pumping arrangement. In addition, no speed reduction gearing is present between motor 24 and drive mechanism 26', which reduces noise generated during operation, providing a safer and more user-friendly spray environment.

Figure 6A:
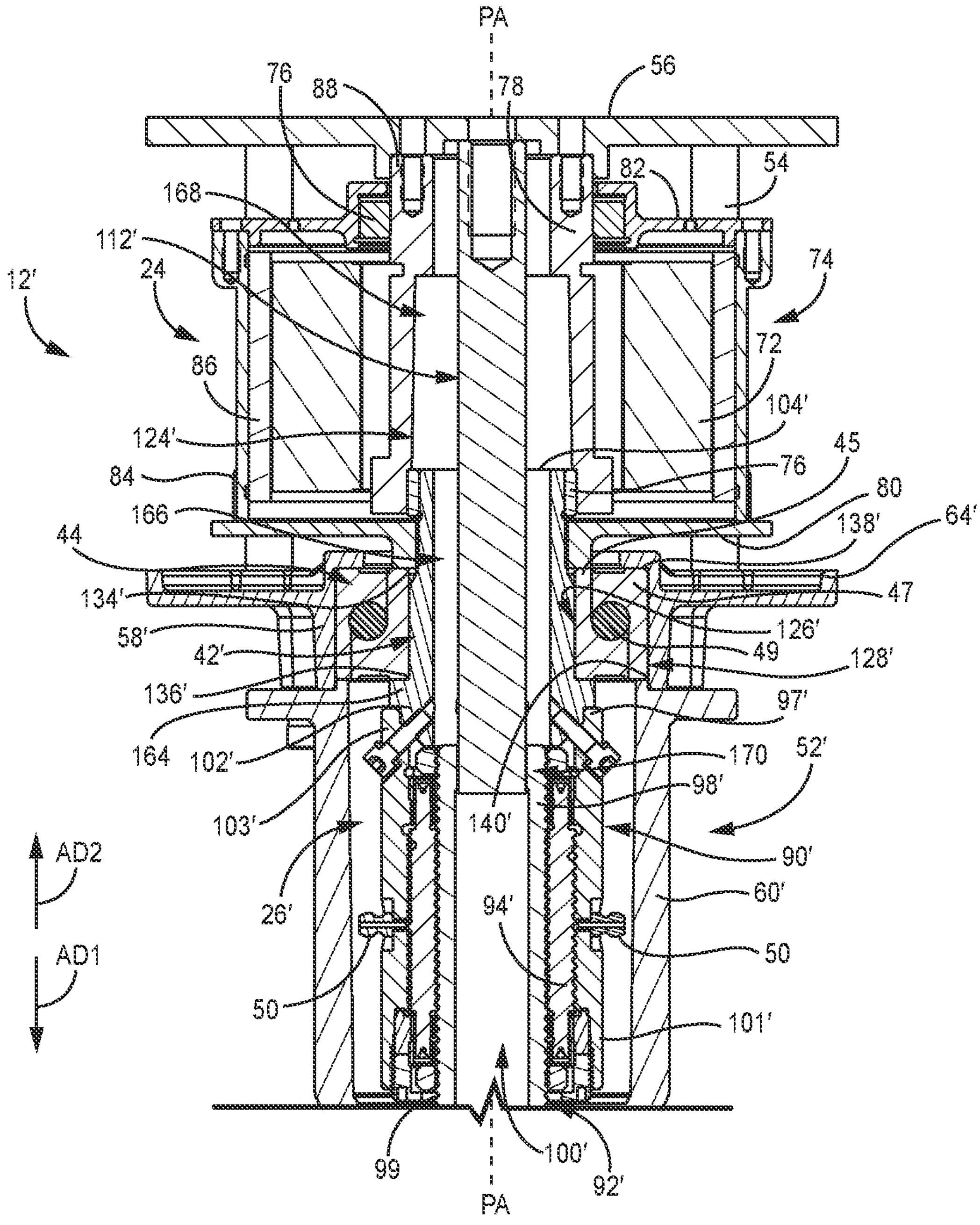
FIG. 6A is an enlarged cross-sectional view of a portion of the pumping assembly shown in FIG. 5 showing a screw at an end of a downstroke.
Figure 6B:
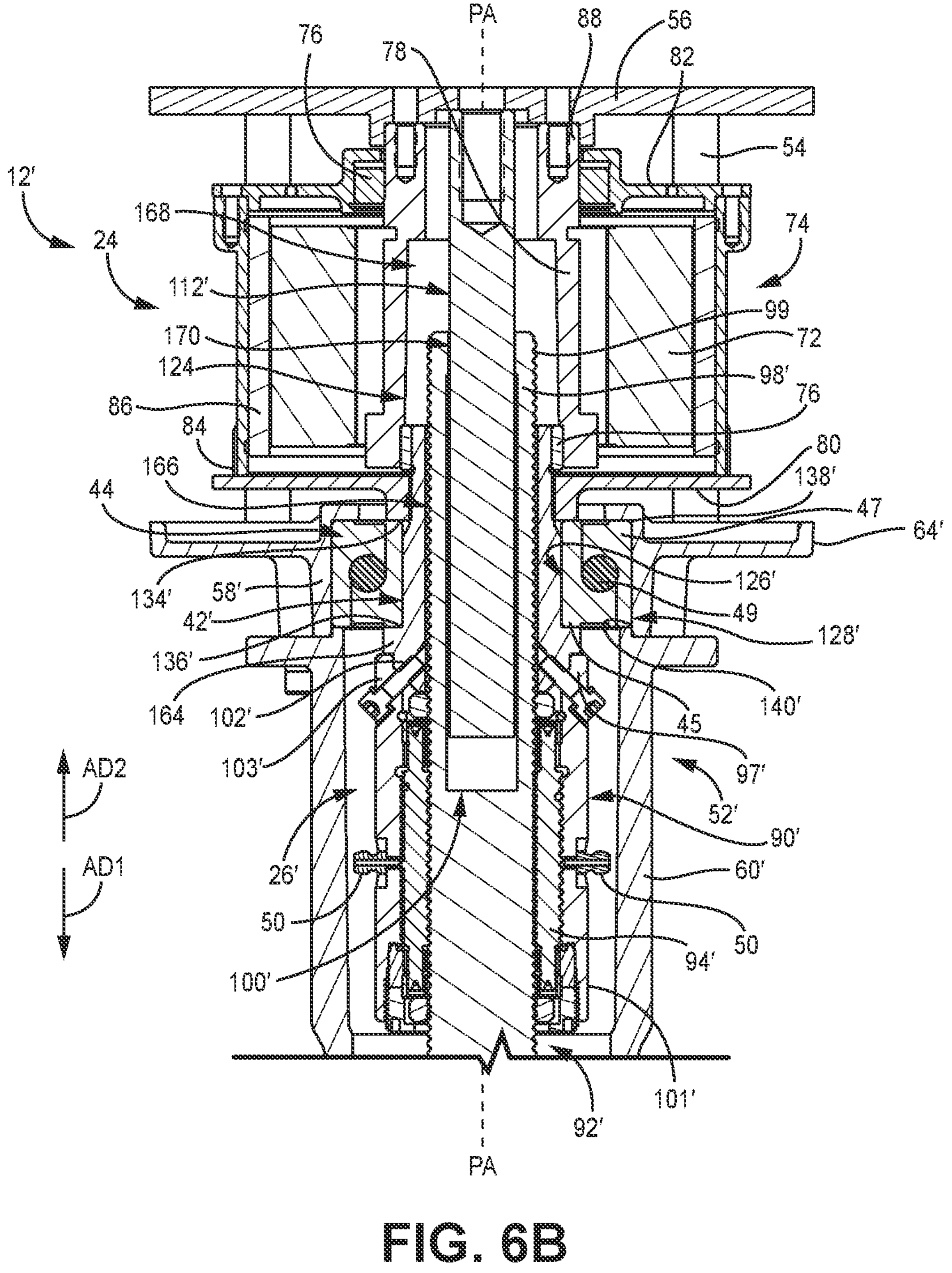
FIG. 6B is an enlarged cross-sectional view similar to FIG. 6A showing the screw at an end of an upstroke.

FIG. 6A is an enlarged cross-sectional view of a portion of pump assembly 12' showing screw 92' at the end of a downstroke. FIG. 6B is an enlarged cross-sectional view of pump assembly 12' showing screw 92' at the end of an upstroke. FIGS. 6A and 6B will be discussed together. Pump frame 22', motor 24, drive mechanism 26', rotor shaft 42', bearing 44, lubricant fittings 50, clocking member 112', cavity 124', inner notch 126', and outer notch 128' are shown. Main body 52', connecting member 54, and frame member 56 of pump frame 22' are shown. First frame body 58', second frame body 60', and mounting flange 64' of main body 52' are shown. Motor 24 includes stator 72, rotor 74, motor bearings 76, axle 78, first motor end 80, and second motor end 82. Rotor 74 includes rotor body 84 and permanent magnet array 86. Axle 78 includes outer end 88. Drive mechanism 26' includes drive nut 90', screw 92', and rolling elements 94'. Drive nut 90' includes axial extension 97', first nut end 101', and second nut end 103'. Second screw end 98', screw thread 99, bore 100', and contoured opening 170 of screw 92' are shown. Rotor shaft 42' includes first shaft end 102', second shaft end 104', and shaft flange 164. Cavity 124' is formed by shaft cavity 166' and motor cavity 168'.

Motor 24 is supported by pump frame 22' and disposed axially between frame member 56 and main body 52'. Motor 24 is an electric motor. Stator 72 is fixed to axle 78 and rotor 74 is disposed about stator 72. Outer end 88 of axle 78 extends in second axial direction AD2 beyond second motor end 82 and is fixed to frame member 56. Outer end 88 connecting to frame member 56 forms the static connection between motor 24 and pump frame 22'. Motor bearings 76 support rotor 74 relative stator 72. Motor bearings 76 facilitate rotation of rotor 74 relative to stator 72.

Main body 52' extends axially in first axial direction AD1 relative motor 24. First frame body 58' is a part of main body 52' disposed closest to rotor 74 along pump axis PA. Second frame body 60' is connected to an end of first frame body 58' disposed opposite motor 24 such that first frame body 58' is disposed axially between second frame body 60' and motor 24. First frame body 58' and second frame body 60' can be removably connected, such as by fasteners, or can be permanently connected, such as by adhesive or welding. In some examples, main body 52' can be formed as a single unitary component.

Outer notch 128' is formed on main body 52'. Outer notch 128' supports an outer race 47 of bearing 44. In the example shown, outer notch 128' is formed by first frame body 58' and second frame body 60'. Bearing 44 is received by outer notch 128'. Bearing 44 is retained axially within outer notch 128' between first outer shoulder 138' and second outer shoulder 140'. First outer shoulder 138' is formed on first frame body 58' and second outer shoulder 140' is formed by first frame body 58' and second frame body 60'. An axially extending flange of second frame body 60' is disposed within and axially overlaps a portion of first frame body 58'. The axially extending flange forms a portion of second frame body 60' forms part of second outer shoulder 140'. Second frame body 60' extending within and axially overlapping first frame body 58' further radially locates second frame body 60' on first frame body 58', maintaining concentricity and facilitating mounting of bearing 44. First frame body 58' forms a base of outer notch 128'. In some examples, first outer shoulder 138' is formed by first frame body 58' and second frame body 60' while second outer shoulder 140' and the base of outer notch 128' are formed by second frame body 60'. In some examples, first outer shoulder 138' is formed by first frame body 58', second outer shoulder 140' is formed by second frame body 60', and the base of outer notch 128' is formed by a combination of first frame body 58' and second frame body 60'. It is understood that outer notch 128' can be formed in any suitable manner for supporting bearing 44 on pump frame 22'.

Rotor shaft 42' is connected to and extends in first axial direction AD1 from rotor body 84. Rotor shaft 42' extends to and is connected with drive mechanism 26'. Second shaft end 104' of rotor shaft 42' is connected to rotor body 84. Second shaft end 104' extends into motor 24. Second shaft end 104' axially overlaps with axle 78. Second shaft end 104' extends through rotor body 84 and into axle 78. The motor bearing 76 disposed at first motor end 80 is disposed between rotor shaft 42' and axle 78. First shaft end 102' of rotor shaft 42' is connected to drive nut 90'. In the example shown, rotor shaft 42' is connected to drive nut 90' by fasteners, but it is understood that rotor shaft 42' and drive nut 90' can be connected in any suitable manner, such as by adhesive or press-fitting, among other options. Second shaft end 104' is open such that screw 92' can reciprocate through second shaft end 104' during operation.

Inner notch 126' supports an inner race 45 of bearing 44. In the example shown, inner notch 126' is formed axially between rotor shaft 42' and rotor body 84. Bearing 44 is retained axially within inner notch 126' between first inner shoulder 134' and second inner shoulder 136'. First inner shoulder 134' is formed by rotor shaft 42' and rotor body and second inner shoulder 136' is formed on rotor shaft 42'. Shaft flange 164 forms a portion of second inner shoulder 136'. Rotor shaft 42' forms a base of inner notch 126'. In some examples, first inner shoulder 134' is formed by rotor body 84 and second inner shoulder 136' is formed by rotor shaft 42' and rotor body 84. In some examples, first inner shoulder 134' is formed by rotor body 84, second inner shoulder 136' is formed by rotor shaft 42', and the base of inner notch 126' is formed by a combination of rotor shaft 42' and rotor body 84. It is understood that inner notch 126' can be formed in any suitable manner for supporting bearing 44 on rotating components of pump assembly 12'.

Cavity 124' is formed in rotor shaft 42' and motor 24. Shaft cavity 166' is defined by rotor shaft 42' and motor cavity 168' is defined by motor 24. More specifically, shaft cavity 166' is disposed within and defined by axle 78. Screw 92' is configured to reciprocate within cavity 124' during pumping, as discussed in more detail below.

Drive nut 90' is connected to first shaft end 102'. It is understood that drive nut 90' can be attached to rotor shaft 42' in any desired manner, such as by fasteners (e.g., bolts), adhesive or press-fitting, among other options. First nut end 101' is disposed at an opposite axial end of drive nut 90' from second nut end 103'. First nut end 101' is free in that first nut end 101' is not mechanically supported by pump frame 22'. Axial extension 97' extends in second axial direction AD2 from second nut end 103' and is disposed around a portion of rotor shaft 42'. Axial extension 97' interfaces with shaft flange 164 and is disposed on an opposite axial side of shaft flange 164 from bearing 44. Shaft flange 164 is disposed axially between bearing 44 and drive nut 90'. Each of drive nut 90' and bearing 44 contact shaft flange 164.

Screw 92' extends axially through drive nut 90' and is disposed coaxially on pump axis PA with drive nut 90'. Rolling elements 94' are disposed between screw 92' and drive nut 90' and support screw 92' and drive mechanism 26'. Rolling elements 94' maintain a radial gap between screw 92' and drive nut 90' such that screw 92' does not directly contact drive nut 90'. In the example shown, rolling elements 94' are rollers, but it is understood that rolling elements 94' can be of any suitable configuration for driving axial displacement of screw 92', such as balls. Lubricant fittings 50 are mounted on drive nut 90' and extends into an outer radial surface of drive nut 90'. Lubricant fittings 50 facilitates lubrication of rolling elements 94'. In the example shown, two lubricant fittings 50 are disposed on opposite sides of drive nut 90', spaced 180-degrees from each other. The two lubricant fittings 50 balance to prevent wobbling of drive nut 90' as drive nut 90' rotates about pump axis PA.

Second screw end 98' forms a distal end of screw 92' oriented in second axial direction AD2 and that translates within cavity 124' during operation. In some examples, second screw end 98' is unsupported such that second screw end 98' is free relative rotor shaft 42' and axle 78 as screw 92' reciprocates within cavity 124' during operation. For example, no bearing, bushing, or other support element may be disposed between second screw end 98' and either of rotor shaft 42' and axle 78. Bore 100' extends axially into screw 92' from second screw end 98'. Contoured opening 170 is formed at second screw end 98' and defines a portion of bore 100'. Contoured opening 170 is an axial opening through second screw end 98' aligned on pump axis PA. Contoured opening 170 is a non-circular opening configured to receive clocking member 112'. In the example shown, contoured opening 170 forms a portion bore 100' disposed furthest in second axial direction AD2. It is understood that the contouring of contoured opening 170 can extend any desired axial distance into bore 100', including up to a full axial length of bore 100'.

Screw 92' axially overlaps with a portion of rotor shaft 42'. In some examples, second screw end 98' axially overlaps with rotor shaft 42' with screw 92' at the end of the downstroke (FIG. 6A). It is understood, however, that in some examples screw 92' does not axially overlap any portion of rotor shaft 42' with screw 92' at the end of the downstroke. For example, drive nut 90' can be axially elongated in second axial direction AD2 such that second screw end 98' axially overlaps drive nut 90' but not rotor shaft 42'. The axial overlap between screw 92' and rotor shaft 42' increases through a portion of the upstroke as screw 92' shifts in second axial direction AD2. The axial overlap between screw 92' and rotor shaft 42' decreases through a portion of the downstroke as screw 92' shifts in first axial direction AD1.

Screw 92' axially overlaps with motor 24 during at least a portion of the pump cycle. Screw 92' extends into motor cavity 168' with screw 92' at the end of the upstroke (FIG. 6B). At the end of the upstroke, screw 92' fully occupies shaft cavity 166' and extends into motor cavity 168'. As such, screw 92' axially overlaps with each of motor 24 and rotor shaft 42' at the end of the upstroke.

Clocking member 112' is elongate along pump axis PA and disposed coaxially on pump axis PA with screw 92'. Clocking member 112' is connected to frame member 56 and extends in first axial direction AD1 from frame member 56. Clocking member 112' is at least partially disposed in cavity 124'. In the example shown, clocking member 112' extends fully through each of motor cavity 168' and shaft cavity 166'. Clocking member 112' interfaces with screw 92' to prevent screw 92' from rotating about pump axis PA. In the example shown, clocking member 112' is a rod extending into bore 100' through contoured opening 170. The outer surface of clocking member 112' interfaces with contoured opening 170 such that the interface between clocking member 112' and contoured opening 170 prevents rotation of screw 92'. In some examples, the outer surface of clocking member 112' is contoured similar to contoured opening 170. Clocking member 112' and screw 92' are telescopically connected such that the axial overlap between clocking member 112' and screw 92' varies during operation. Screw 92' and clocking member 112' have a sliding overlapping interface, which interface prevents rotation of screw 92' by resisting the rotational motion output by motor 24 as screw 92' linearly translates relative to clocking member 112'.

While clocking member 112' is described as extending into bore 100' such that screw 92' is disposed around and receives clocking member 112', it is understood that clocking member 112' and screw 92' can interface in any manner suitable for preventing screw 92' from rotating relative to pump axis PA. For example, clocking member 112' can include a contoured bore and the second screw end 98' can extend into and interface with that contoured bore. Second screw end 98' can include a radially extending portion, such as a flange, that projects radially beyond the threads of screw 92'. The radially extending portion can be contoured to mate with the contoured bore to prevent rotation of screw 92' as screw 92' translate along pump axis PA.

During operation, power is provided to stator 72, such as through second motor end 82, to cause rotation of rotor 74 about pump axis PA. Rotor 74 drives rotation of rotor shaft 42' about pump axis PA. Rotor shaft 42' drives rotation of drive nut 90' about pump axis PA. Rotation of drive nut 90' causes rolling elements 94' to exert an axial driving force on screw 92' to cause linear displacement of screw 92'.

By way of example, a pump cycle beginning from the position associated with the end of the downstroke shown in FIG. 6A is discussed in more detail. Rotor 74 is rotated in a first rotational direction (e.g., one of clockwise and counterclockwise) and causes screw 92' to displace linearly in second axial direction AD2 through an upstroke. Screw 92' shifts in second axial direction AD2 through cavity 124'. The axial overlap between screw 92' and rotor shaft 42' increases as screw 92' shifts in second axial direction AD2. The axial overlap between screw 92' and clocking member 112' increases as screw 92' shifts through the upstroke such that clocking member 112' extends further into bore 100' as screw 92' shifts in second axial direction AD2. Screw 92' shifts axially through shaft cavity 166' such that screw 92' axially overlaps with bearing 44. Screw 92' shifts fully through shaft cavity 166' and enters motor cavity 168'. Screw 92' translates into motor 24 through first motor end 80. Screw 92' extends into motor cavity 168' through the opening in rotor body 84 where rotor body 84 connects to first shaft end 102'. Screw 92' translates in second axial direction AD2 within motor cavity 168' and towards second motor end 82. The axial overlap between screw 92' and rotor shaft 42' increase during a first portion of the upstroke, as second screw end 98' translates axially through motor cavity 168', and remains constant during a second portion of the upstroke, when second screw end 98' is disposed within and translates through motor cavity 168'. Screw 92' continues to translate in second axial direction AD2 until reaching the end of the upstroke, which position is shown in FIG. 6B.

Screw 92' is displaced a maximum distance in second axial direction AD2 into cavity 124' when screw 92' is at the end of the upstroke. Second screw end 98' of screw 92' is disposed within motor 24 with screw 92' at the end of the upstroke. Screw 92' fully extends through shaft cavity 166' and occupies at least a portion of motor cavity 168'. Screw 92' axially overlaps with portions of motor 24 at the end of the upstroke, including with the motor bearing 76 disposed between axle 78 and rotor shaft 42', with rotor body 84, with axle 78, and with stator 72.

After completing the upstroke, rotor 74 is rotated in a second rotational direction (e.g., the other of clockwise and counterclockwise) and causes screw 92' to translate in first axial direction AD1 through the downstroke. During the downstroke, screw 92' translates from the position shown in FIG. 6B to the position shown in FIG. 6A. Rotor 74 drive rotation of rotor shaft 42', which drives rotation of drive nut 90'. Drive nut 90' causes rolling elements 94' to exert an axial force on screw 92' to linearly displace screw 92' in first axial direction AD1. The axial overlap between motor 24 and screw 92' decreases as screw 92' translates through the downstroke. Screw 92' is fully withdrawn form motor cavity 168' and continues to translate in first axial direction AD1 away from second motor end 82. Clocking member 112' withdraws from bore 100' as screw 92' shifts in first axial direction AD1, such that the axial overlap between screw 92' and clocking member 112' decreases as screw 92' translates through the downstroke. The axial overlap between screw 92' and rotor shaft 42' remains constant through a first portion of the downstroke, where at least a portion of screw 92' is disposed in motor cavity 168', and decreases through a second portion of the downstroke. After completing the downstroke, rotor 74 is rotated in the first rotational direction to drive screw 92' back through the upstroke, thereby reciprocating screw 92' for pumping.

Screw 92' reciprocating within cavity 124' provides significant advantages. Screw 92' reciprocates within each of rotor shaft 42' and motor 24 during operation. Screw 92' extending into motor 24 to axially overlap with portions of motor 24 facilitates a more compact axial arrangement of pump assembly 12'. An axially compact pump assembly 12' provides more efficient spray operations by facilitating transport to and within a job site. Screw 92' telescopically interfacing with clocking member 112' further facilitates a compact pump assembly 12' as the axial overlap between screw 92' and clocking member 112' can vary throughout operation.

Figure 7:
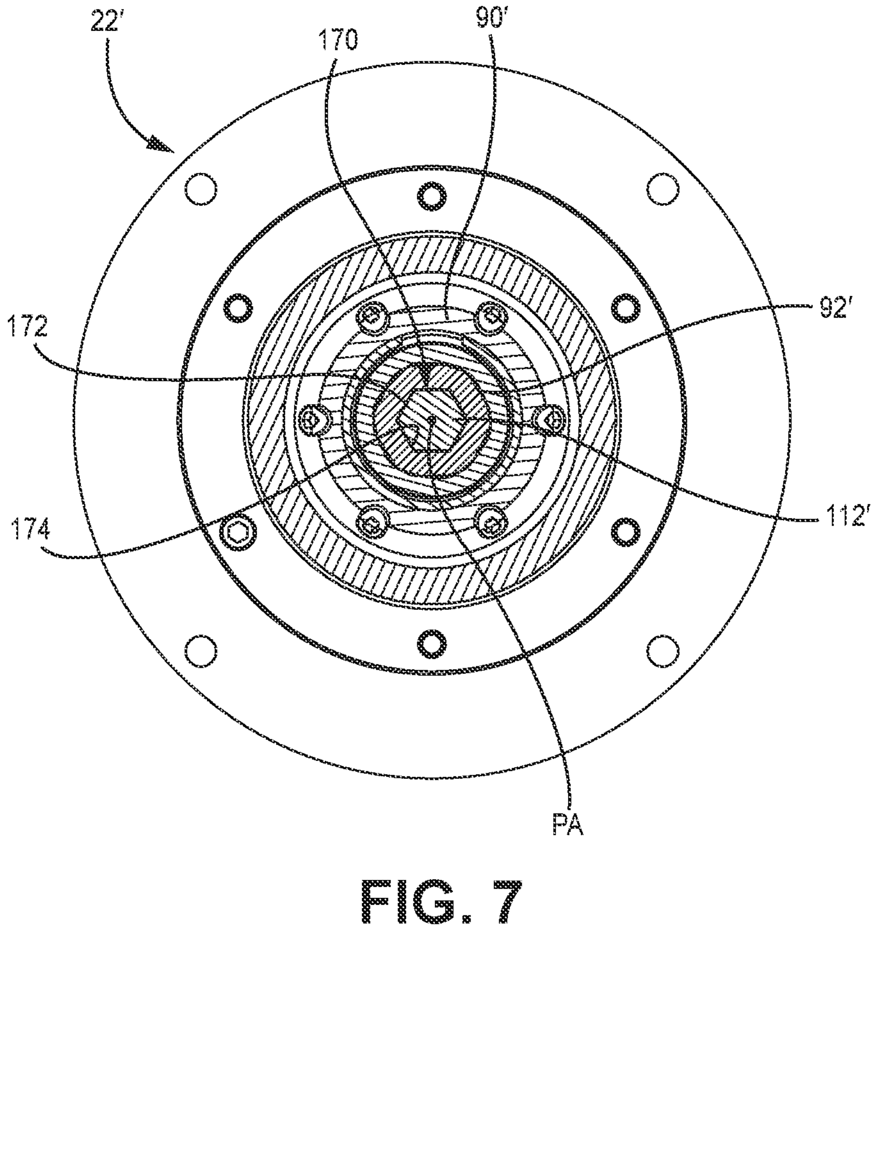
FIG. 7 is a cross-sectional view taken along line 7-7 in FIG. 5.

FIG. 7 is a cross-sectional view taken along line 7-7 in FIG. 5. Pump frame 22', drive nut 90', screw 92', and clocking member 112' are shown. Contoured opening 170 of screw 92' is shown, and contoured opening 170 includes first contour 172. Clocking member 112' includes second contour 174. Drive nut 90', screw 92', and clocking member 112' are disposed coaxially on pump axis PA. Drive nut 90' is disposed about screw 92' and screw 92' is disposed about clocking member 112'. Clocking member 112' extends into bore 100' (best seen in FIG. 6B) of screw 92' through contoured opening 170. First contour 172 is formed on an outer radial surface of clocking member 112'. Second contour 174 is formed on an inner radial surface of contoured opening 170.

Second contour 174 interfaces with first contour 172 to clock screw 92' relative clocking member 112' and prevent screw 92' from rotating relative to clocking member 112' about pump axis PA. Clocking member 112' thereby rotationally locks screw 92' on pump axis PA. As discussed above, the interface between screw 92' and clocking member 112' can be telescopic such that screw 92' reciprocates along pump axis PA relative clocking member 112'. In the examples shown, first contour 172 and second contour 174 each have hexagonal cross-sectional profiles. It is understood, however, that first contour 172 and second contour 174 can be of any desired shape suitable for clocking screw 92' to clocking member 112' to prevent rotation of screw 92' about pump axis PA.

Figure 8:
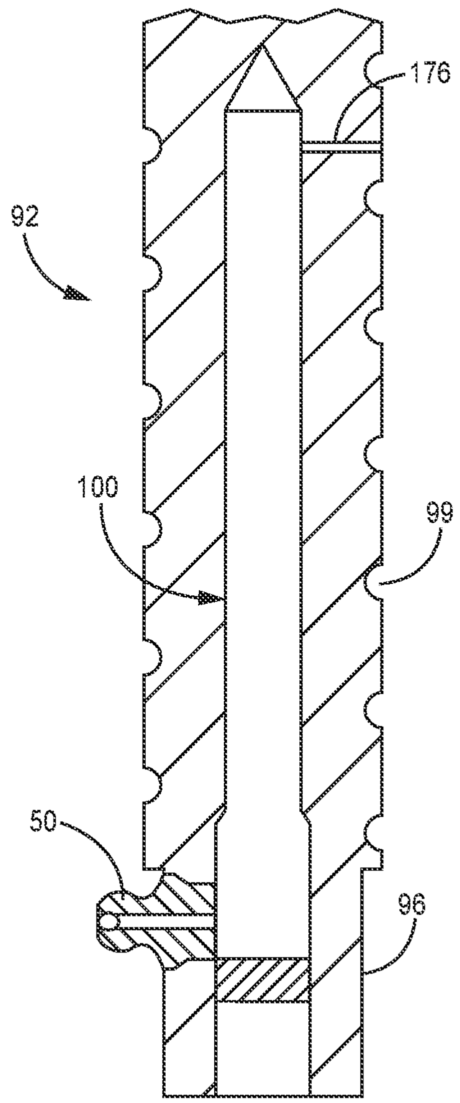
FIG. 8 is a cross-sectional diagram of a screw showing a lubricant fitting mounted on an exterior of the screw.

FIG. 8 is a cross-sectional diagram of screw 92 showing lubricant fitting 50 mounted on an exterior of screw 92. First screw end 96, screw thread 99, bore 100, and outlet passage 176 of screw 92 are shown.

Bore 100 is elongate along pump axis PA and disposed axially on pump axis PA. Bore 100 extends axially into screw 92 from first screw end 96. Lubricant fitting 50 is mounted on an exterior of screw 92. Lubricant fitting 50 projects radially from the exterior of screw 92 such that lubricant fitting 50 can be accessed without disconnecting other components from screw 92. For example, lubricant fitting 50 can be accessed without disconnecting fluid displacement member 34 (best seen in FIG. 2B) from screw 92.

Lubricant fitting 50 is fluidly connected to bore 100 to provide lubricant to bore 100. Outlet passage 176 extends from bore 100 to an exterior of screw 92. Outlet passage 176 extends along an axis transverse to pump axis PA. In some examples, outlet passage 176 extends along an axis orthogonal to pump axis PA. Outlet passage 176 provides a flowpath for lubricant in bore 100 to flow to an exterior of screw 92. Outlet passage 176 extends to the exterior of screw 92 at a location where the exterior of screw 92 is disposed within drive nut 90 (best seen in FIGS. 2B-3B) to provide lubricant to rolling elements 94 (best seen in FIG. 10) disposed between screw 92 and drive nut 90. In some examples, lubricant fitting 50 is a grease zerk. Bore 100 can act as a lubricant reservoir to store lubricant during operation.

To lubricate the rolling elements 94 an applicator of a lubricating device, such as a grease gun, is connected to lubricant fitting 50. The applicator supplies lubricant, such as oil or grease, to bore 100. The lubricant flows through bore 100 to outlet passage 176 and through outlet passage 176 to the gap disposed between screw 92 and drive nut 90. The lubricant is thereby provided to the rolling elements 94 disposed in and maintaining the gap between screw 92 and drive nut 90 via bore 100 and outlet passage 176.

Figure 9:
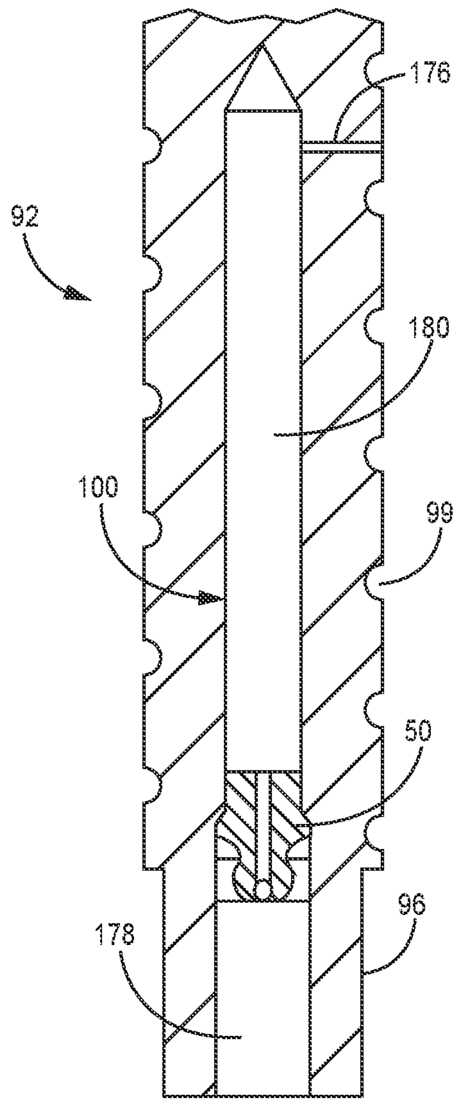
FIG. 9 is a cross-sectional diagram of a screw showing a lubricant fitting mounted within a bore of the screw.

FIG. 9 is a cross-sectional diagram of screw 92 showing lubricant fitting 50 mounted within screw 92. First screw end 96, screw thread 99, bore 100, and outlet passage 176 of screw 92 are shown. Bore 100 includes first diameter portion 178 and second diameter portion 180.

Bore 100 is elongate along pump axis PA and disposed axially on pump axis PA. Bore 100 extends axially into screw 92 from first screw end 96. First diameter portion 178 of bore 100 extends axially into screw 92 from first screw end 96. Second diameter portion 180 of bore 100 extends axially into screw 92 from first diameter portion 178. Lubricant fitting 50 is disposed in bore 100 at the interface between first diameter portion 178 and second diameter portion 180. Lubricant fitting 50 is secured to screw 92 within bore 100. Lubricant fitting 50 can be secured within second diameter portion 180 and a portion of lubricant fitting 50 can extend into first diameter portion 178. Lubricant fitting 50 can be a grease zerk. Second diameter portion 180 of bore 100 can act as a lubricant reservoir to store lubricant during operation.

Outlet passage 176 extends from bore 100 to an exterior of screw 92. Outlet passage 176 provides a flowpath for lubricant in bore 100 to flow to an exterior of screw 92. Outlet passage 176 extends along an axis transverse to pump axis PA. In some examples, outlet passage 176 extends along an axis orthogonal to pump axis PA. Outlet passage 176 provides a flowpath for lubricant in bore 100 to flow to an exterior of screw 92. Outlet passage 176 extends to the exterior of screw 92 at a location where the exterior of screw 92 is disposed within drive nut 90 (best seen in FIGS. 2B-3B) to provide lubricant to rolling elements 94 (best seen in FIG. 10) disposed between screw 92 and drive nut 90. In some examples, lubricant fitting 50 is a grease zerk. Bore 100 can act as a lubricant reservoir to store lubricant during operation.

First diameter portion 178 of bore 100 is sized to receive an applicator of a lubricating device, such as a grease gun. To lubricate the rolling elements 94 an applicator of the lubricating device is inserted into first diameter portion 178 and connected to lubricant fitting 50. The applicator supplies lubricant, such as oil or grease, to second diameter portion 180 through lubricant fitting 50. The lubricant flows through bore 100 to outlet passage 176 and through outlet passage 176 to the gap disposed between screw 92 and drive nut 90. The lubricant is thereby provided to the rolling elements 94 disposed in and maintaining the gap between screw 92 and drive nut 90 via bore 100 and outlet passage 176.

In any of the examples discussed above in FIGS. 1-9, rotor 74 and drive mechanism 26, 26' are sized to provide a desired revolution to stoke ratio. In some examples, rotor 74 and drive mechanism 26, 26' are sized such that one revolution of rotor 74 results in a full stroke of fluid displacement member 34 in one of first axial direction AD1 and second axial direction AD2. A full revolution in an opposite rotational direction results in a full stroke of fluid displacement member 34 in the opposite axial direction. As such, two revolutions in opposite directions can provide a full pump cycle of fluid displacement member 34. Pump assembly 12, 12' can thereby provide a 1:1 ratio between revolutions of rotor 74 and pumping strokes.

It is understood, however, that rotor 74 and drive mechanism 26, 26' can be sized to provide any desired revolution to stroke ratio. It is further understood that controller 29 can control operation of motor 24 such that the actual stroke length is dynamic and varies can during operation. Controller 29 can cause the stroke length to vary between the downstroke and the upstroke. In some examples, controller 29 is configured to control operation between a maximum revolution to stroke ratio and a minimum revolution to stroke ratio. Pump assembly 12, 12' can be configured to provide any desired revolution to stroke ratio. In some examples, pump assembly 12, 12' provides a revolution to stroke ratio of up to about 4:1. It is understood that other maximum revolution to stroke ratios are possible, such as about 1:1, 2:1, 3:1, or 5:1, among other options. In some examples, pump assembly 12, 12' can provide a revolution to stroke ratio between about 0.25:1-7:1. It is understood that any of the ranges discussed can be an inclusive range such that the boundary values are included within the range. It is further understood that each of the ranges discussed can vary from the specified range while still falling within the scope of this disclosure.

Motor 24 and drive mechanism 26, 26' can be configured to displace fluid displacement member 34 at least about 6.35 mm (about 0.25 in.) per rotor revolution. In some examples, motor 24 and drive mechanism 26, 26' are configured to displace fluid displacement member 34 between about 8.9-30.5 mm (about 0.35-1.2 in.) per rotor revolution. In some examples, motor 24 and drive mechanism 26, 26' are configured to displace fluid displacement member 34 between about 8.9-11.4 mm (about 0.35-0.45 in.). In some examples, motor 24 and drive mechanism 26, 26' are configured to displace fluid displacement member 34 between about 19-21.6 mm (about 0.75-0.85 in.). In some examples, motor 24 and drive mechanism 26, 26' are configured to displace fluid displacement member 34 between about 24.1-26.7 mm (about 0.95-1.05 in.). The axial displacement per rotor revolution provided by pump assembly 12, 12' facilitates precise control and quick responsiveness during pumping. The axial displacement per rotor revolution facilitates quick changeover and provides more efficient pumping while reducing wear on components of pump assembly 12, 12'.

Pump assembly 12, 12' is configured to pump according to a revolution to displacement ratio. More specifically, motor 24 and drive mechanism 26, 26' are configured to provide a desired revolution to displacement ratio between revolutions of rotor 74 and the linear travel distance of fluid displacement member 34, as measured in inches, for each revolution of rotor 74. In some examples, the revolution to displacement ratio (rev/in.) is less than about 4:1. In some examples, the revolution to displacement ratio is between about 0.85:1 and 3.25:1. In some examples, the revolution to displacement ratio is between about 1:1-3:1. In some examples, the revolution to displacement ratio is between about 1:1-2.75:1. In some examples, the revolution to displacement ratio between is about 1:1-2.55:1. In some examples, the revolution to displacement ratio is between about 1:1-1.3:1. In some examples, the revolution to displacement ratio is between about 0.9:1-1.1:1. In some examples, the revolution to displacement ratio is between about 2.4:1-2.6:1. The low revolution to displacement ratio provided by pump assembly 12, 12' relative to other electrically-powered pumps, such as crank-powered pumps that require reduction gearing to generate sufficient pumping torque and typically have revolution to displacement ratios of about 8:1 or higher, facilitates more efficient pumping, generates less wear, and provides quick responsiveness for changing stroke direction. Rotor 74 can be driven at a lower rotational speed to generate the same linear speed, thereby generating less heat during operation.

Figure 10A:
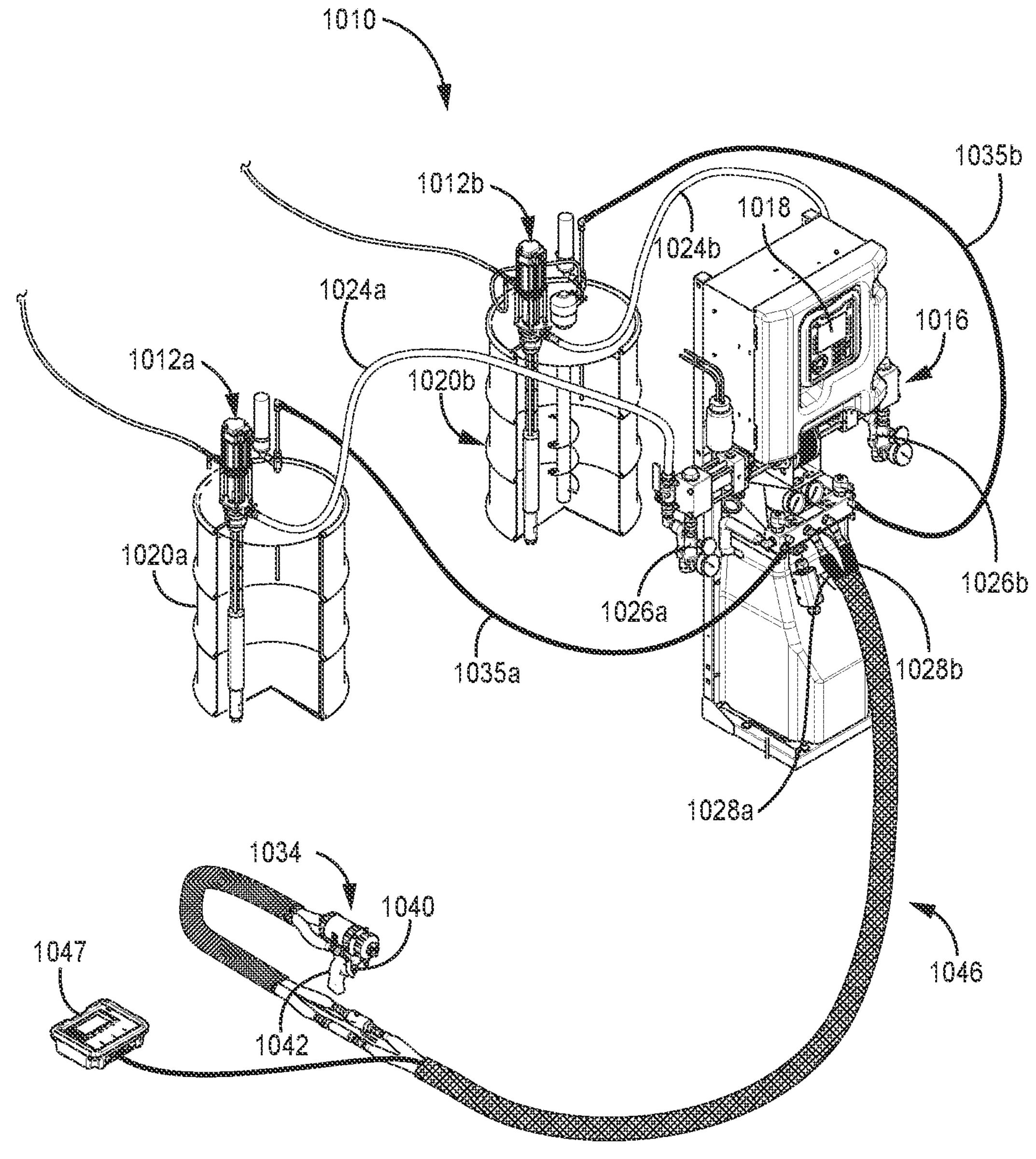
FIG. 10A is an isometric view of a plural component system.
Figure 10B:
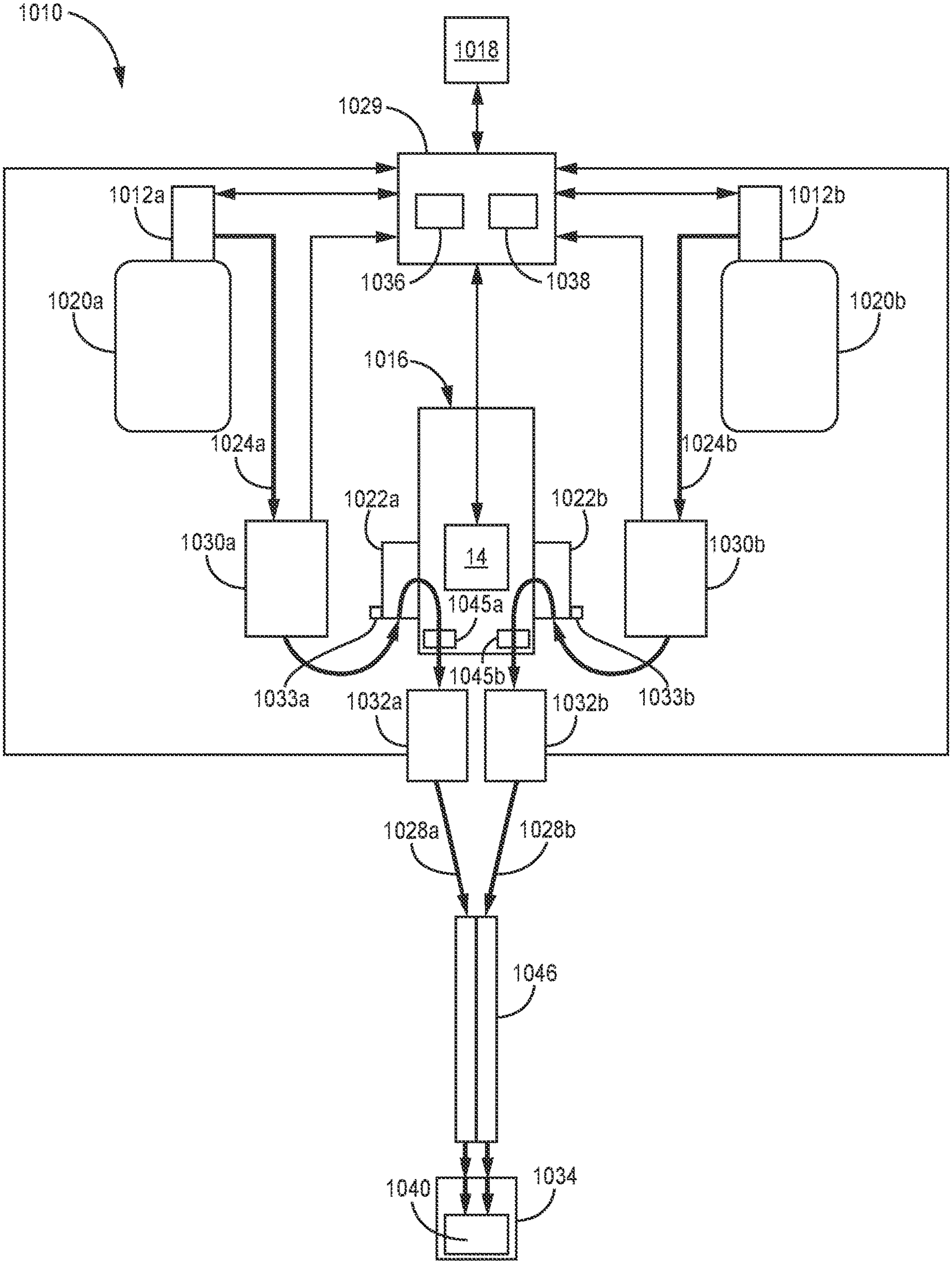
FIG. 10B is a block schematic diagram of the plural component system.

FIGS. 10A and 10B will be discussed concurrently. FIG. 10A is an isometric view of spray system 1010. FIG. 10B is a block schematic diagram of spray system 1010. Spray system 1010 is a plural component system that receives separate inert material components, mixes the components in a predetermined ratio, and then dispenses the components as an activated compound. As shown in FIGS. 1A and 1B, spray system 1010 includes proportioner 1016; motor 1014; controller 1029; user interface 1018; fluid tanks 1020*a*, 1020*b*; feed pumps 1012*a*, 1012*b*; feed lines 1024*a*, 1024*b*, proportioner pumps 1022*a*, 1022*b*; supply lines 1028*a*, 1028*b*; upstream sensors 1030*a*, 1030*b*; downstream sensors

1032*a*, 1032*b*; and applicator 1034. Controller 1029 includes memory 1036 and control circuitry 1038. Applicator 1034 includes mixer 1040, handle 1042, and trigger 1044. Spray system 1010 also includes primary heaters 1045*a*, 1045*b* (shown in FIG. 10B). Heated portion 1046 of supply lines 1028*a*, 1028*b* and heat controller 1047 are shown.

Spray system 1010 is a system configured to pump a first component material and a second component material to applicator 1034 to form a plural component spray material. The component materials are pumped according to target parameters, such as ratio, temperature, flow rate and/or pressure. The first and second component materials are mixed at applicator 1034 to form the spray material that is sprayed onto a substrate by applicator 1034. For example, one of the first and second component materials can be a catalyst, such as isocyanate, and the other one of the first and second component materials can be a resin, such as polyol resin, that combine to form a plural component material, such as a spray foam.

Fluid tanks 1020*a*, 1020*b* hold the individual component materials during spraying. In some examples, fluid tanks 1020*a*, 1020*b* are portable and can be moved between and around job sites. In some examples, fluid tanks 1020*a*, 1020*b* can be drums, such as 55-gallon drums, among other options.

Feed pumps 1012*a*, 1012*b* are respectively mounted to fluid tanks 1020*a*, 1020*b*. One or both of feed pumps 1012 can be substantially similar to pump apparatus 12 (best seen in FIGS. 2A-2D). Feed lines 1024*a*, 1024*b* respectively extend from feed pumps 1012*a*, 1012*b* to proportioner pumps 1022*a*, 1022*b*. Feed line 1024*a* fluidically connects an outlet of feed pump 1012*a* to an inlet of proportioner pump 1022*a*, and feed line 1024*b* fluidically connects an outlet of feed pump 1012*b* to an inlet of proportioner pump 1022*b*. Feed pumps 1012*a*, 1012*b* draw the first and second component materials from fluid tanks 1020*a*, 1020*b* and pump the component materials through feed lines 1024*a*, 1024*b* to proportioner pumps 1022*a*, 1022*b*. In some examples, feed pumps 1012*a*, 1012*b* can be referred to as drum pumps. Feed pumps 1012*a*, 1012*b* provide the component materials to proportioner pumps 1022*a*, 1022*b* under pressure. In some examples, feed pumps 1012*a*, 1012*b* are configured to pump the component materials to proportioner pumps 1022*a*, 1022*b* at pressures of at least about 0.35 Megapascal (MPa) (about 50 pounds per square inch (psi)). In some examples, feed pumps 1012*a*, 1012*b* are configured to pump the component materials at pressures of up to about 1.75 MPa (about 250 psi).

Feed pumps 1012*a*, 1012*b* provide the component materials to proportioner pumps 1022*a*, 1022*b* under pressure to fully fill proportioner pumps 1022*a*, 1022*b* during pumping. Fully filling proportioner pumps 1022*a*, 1022*b* prevents proportioner pumps 1022*a*, 1022*b* from starving and maintains the desired balance between the first and second component materials being pumped to applicator 1034. Feeding proportioner pumps 1022*a*, 1022*b* under pressure prevents the component materials from being pumped downstream at a ratio other than the target ratio due to insufficient fill of proportioner pumps 1022*a*, 1022*b*. As discussed further herein with particular reference to FIGS. 11-12B, each of feed pumps 1012*a*, 1012*b* comprises an electric motor to drive feed pumps 1012*a*, 1012*b*.

Proportioner 1016 supports various components of system 1010. In some examples, controller 1029 is supported by proportioner 1016. It is understood that controller 1029 can be formed by more than one discrete component operatively connected together, such as electrically and/or communicatively. Proportioner 1016 can further support proportioner pumps 1022*a*, 1022*b* and motor 1014. Primary heaters 1045*a*, 1045*b* can be disposed in and supported by proportioner 1016.

Proportioner pumps 1022*a*, 1022*b* receive the first and second component materials from feed pumps 1012*a*, 1012*b* and pump the component materials downstream to applicator 1034. Proportioner pumps 1022*a*, 1022*b* increase the pressure of the first and second component materials from the feed pressure to a spray pressure. The spray pressure is greater than the feed pressure generated by feed pumps 1012*a*, 1012*b*. In some examples, proportioner pumps 1022*a*, 1022*b* can pump the component materials at pressures between about 3.45 MPa (about 500 psi) and about 35.5 MPa (about 5000 psi). In some examples, proportioner pumps 1022*a*, 1022*b* can pump the component materials at pressures between about 6.9 MPa (about 1000 psi) and about 25.6 MPa (about 4000 psi). In some examples, proportioner pumps 1022*a*, 1026*b* are configured to pump at pressures between about 11.7 MPa (1700 psi) and about 24.1 MPa (about 3500 psi). While proportioner pumps 1022*a*, 1022*b* are described as generating the spray pressures, it is understood that feed pumps 1012*a*, 1012*b* can, in some examples, generate sufficient spray pressure, such as in applications other than plural component spray systems. In some examples, a feed pump 1012 can be utilized in a transfer system to transfer material to a downstream location. In some examples, a feed pump 1012 can be utilized in a spray system similar to spray system 10 (FIGS. 1A and 1B).

Flush valves 1033*a*, 1033*b* are disposed downstream of proportioner pumps 1022*a*, 1022*b* and are configured to control flow from proportioner pumps 1022*a*, 1022*b*. In some examples, flush valves 1033*a*, 1033*b* are disposed at the outlets of proportioner pumps 1022*a*, 1022*b*. Flush valves 1033*a*, 1033*b* are fluidly connected to flush lines 1035*a*, 1035*b*, which provide return paths for fluid to return to fluid tanks 1020*a*, 1020*b*. While flush lines 1035*a*, 1035*b* are shown as fluidly connected to fluid tanks 1020*a*, 1020*b*, it is understood that flush lines 1035*a*, 1035*b* can be connected to any external vessel to flush fluid and air before operation. In some examples, flush valves 1033*a*, 1033*b* can be fluidly connected to each of flush lines 1035*a*, 1035*b* and supply lines 1028*a*, 1028*b* to control flow to one or both of flush lines 1035*a*, 1035*b* and supply lines 1028*a*, 1028*b*.

Motor 1014 can be mechanically connected to both proportioner pump 1022*a* and proportioner pump 1022*b*. Motor 1014 can be a pneumatic, hydraulic, or electric motor. Motor 1014 is connected to proportioner pumps 1022*a*, 1022*b* such that motor 1014 simultaneously causes displacement of the fluid displacement members of each of proportioner pumps 1022*a*, 1022*b*. Proportioner pumps 1022*a*, 1022*b* are linked to motor 1014 for simultaneous displacement of the fluid displacement members of proportioner pumps 1022*a*, 1022*b*. In some examples, proportioner pumps 1022*a*, 1022*b* are fixed to a displacement component of motor 1014 such that the fluid displacement members proportioner pumps 1022*a*, 1022*b* are linked together for simultaneous displacement. In some examples, the fluid displacement members of proportioner pumps 1022*a*, 1022*b* are fixed together such that each fluid displacement member displaces the same distance for each stroke.

Primary heaters 1045*a*, 1045*b* are disposed downstream from proportioner pumps 1022*a*, 1022*b* respectively, and receive the component materials from proportioner pumps 1022*a*, 1022*b*. Primary heaters 1045*a*, 1045*b* include heating elements configured to raise a temperature of the first and second component materials to an operating temperature above the ambient temperature during spraying. In some examples, primary heaters 1045*a*, 1045*b* are configured to heat the component materials to temperatures between about 37 degrees C. (about 100 degrees F.) and 82 degrees C. (about 180 degrees F.).

Supply lines 1028*a*, 1028*b* respectively extend from proportioner pumps 1022*a*, 1022*b* to applicator 1034. Supply line 1028*a* fluidically connects an outlet of proportioner pump 1022*a* to applicator 1034, and supply line 1028*b* fluidically connects an outlet of proportioner pump 1022*b* to applicator 1034. Heated portion 1046 of supply lines 1028*a*, 1028*b* includes heating elements configured to maintain the temperature of the component materials above ambient as the component materials travel through supply lines 1028*a*, 1028*b*. Heated portion 1046 can form up to the full length of supply lines 1028*a*, 1028*b*. Supply lines 1028*a*, 1028*b* can also be referred to as a heated hose. In some examples, heated portion 1046 can operate at temperatures up to about 82 degrees C. (about 180 degrees F.). Maintaining the first and second component materials at elevated temperatures facilitates proper mixing and the formation of desired material characteristics in the spray material. Heat controller 1047 can communicate with primary heaters 1045*a*, 1045*b* and/or heated portion 1046 of supply lines 1028*a*, 1028*b*. Heat controller 1047 can provide an interface for an operator to view the temperature of the component materials while at the position of the applicator and to input commands to adjust the heating of the component materials by primary heaters 1045*a*, 1045*b* and/or heated portion 1046. Heat controller 1047 can form a portion of controller 1029.

Applicator 1034 receives the first and second component materials from outlets of supply lines 1028*a*, 1028*b*. The first and second component materials are mixed in mixer 1040, which is connected to and, in some examples, disposed within applicator 1034. The component materials mix within a chamber in mixer 1040 to form the plural component spray material. Mixer 1040 is the first location within system 1010 where the first and second component materials mix. The first and second component materials are isolated from each other at all locations upstream of mixer 1040. The spray material is ejected through a spray orifice of applicator 1034 and applied to the substrate. For example, the user can grasp handle 1042 and actuate trigger 1044 to cause spraying by applicator 1034.

Upstream sensors 1030*a*, 1030*b* are disposed upstream of proportioner pumps 1022*a*, 1022*b* respectively. Upstream sensors 1030*a*, 1030*b* are disposed downstream of feed pumps 12*a*, 12*b*. Upstream sensors 1030*a*, 1030*b* are disposed fluidically between feed pumps 1012*a*, 1012*b* and proportioner pumps 1022*a*, 1022*b*. Upstream sensors 1030*a*, 1030*b* can be disposed proximate the inlets of proportioner pumps 1022*a*, 1022*b*. Upstream sensors 1030*a*, 1030*b* are parameter sensors configured to generate data regarding parameters of the component materials feeding proportioner pumps 1022*a*, 1022*b*. The data generated by upstream sensors 1030*a*, 1030*b* indicates the parameters of the fluids after exiting feed pumps 1012*a*, 1012*b* and prior to entering proportioner pumps 1022*a*, 1022*b*. For example, upstream sensors 1030*a*, 1030*b* can include any one or more of pressure sensors, flow rate sensors, and temperature sensors, among other options. Upstream sensors 1030*a*, 1030*b* are configured to provide the upstream parameter data to controller 1029.

Downstream sensors 1032*a*, 1032*b* are disposed downstream of proportioner pumps 1022*a*, 1022*b* respectively. Downstream sensors 1032*a*, 1032*b* are disposed fluidically between proportioner pumps 1022*a*, 1022*b* and applicator 1034. Downstream sensors 1032*a*, 1032*b* can be disposed proximate the outlets of proportioner pumps 1022*a*, 1022*b*. Downstream sensors 1032*a*, 1032*b* are parameter sensors configured to generate data regarding parameters of the component materials at a location downstream of proportioner pumps 1022*a*, 1022*b*. The fluid sensed by downstream sensors 1032*a*, 1032*b* flows downstream through supply lines 1028*a*, 1028*b*. Downstream sensors 1032*a*, 1032*b* can include any one or more of pressure sensors, flow rate sensors, and temperature sensors, among other options. In some examples, pressure and flow rate sensors of downstream sensors 1032*a*, 1032*b* are disposed proximate the outlets of proportioner pumps 1022*a*, 1022*b* and temperature sensors of downstream sensors 1032*a*, 1032*b* are disposed within heated portion 1046. Downstream sensors 1032*a*, 1032*b* are configured to provide the downstream parameter data to controller 1029. In some examples, downstream sensors 1032*a*, 1032*b* are disposed downstream of proportioner pumps 1022*a*, 1022*b*

Controller 1029 is configured to store software, implement functionality, and/or process instructions. Controller 1029 can be substantially similar to controller 29 (FIGS. 1A and 1B). Controller 1029 is configured to perform any of the functions discussed herein, including receiving an output from any sensor referenced herein, detecting any condition or event referenced herein, and controlling operation of any components referenced herein. Controller 1029 can be of any suitable configuration for controlling operation of the pumps within system 1010, gathering data, processing data, etc. Controller 1029 can include hardware, firmware, and/or stored software, and controller 1029 can be entirely or partially mounted on one or more boards. Controller 1029 can be of any type suitable for operating in accordance with the techniques described herein. While controller 1029 is illustrated as a single unit, it is understood that controller 1029 can be disposed across one or more boards. In some examples, controller 1029 can be implemented as a plurality of discrete circuitry subassemblies. For example, controller 1029 can be disposed across each of proportioner 1016 and heat controller 1047.

Controller 1029 is operatively connected to the electric motors of feed pumps 1012*a*, 1012*b*, either electrically or communicatively, to control pumping by feed pumps 1012*a*, 1012*b*. In some examples, controller 1029 can also be operatively connected to motor 1014, either electrically or communicatively, to control pumping by portioner pumps 1022*a*, 1022*b*. Controller 1029 can be connected to motor 1014 and feed pumps 1012*a*, 1012*b* via either wired or wireless connections to provide commands to and cause operation of feed pumps 1012*a*, 1012*b* and motor 1014. Controller 1029 is operatively connected to upstream sensors 1030*a*, 1030*b* and downstream sensors 1032*a*, 1032*b*, either electrically or communicatively. Controller 29 can be connected to upstream sensors 1030*a*, 1030*b* and downstream sensors 1032*a*, 1032*b* by either wired or wireless connections. Controller 1029 receives data regarding the sensed parameters for the first component material and the second component material from upstream sensors 1030*a*, 1030*b* and downstream sensors 1032*a*, 1032*b*. Controller 1029 can control operation of any one or more of motor 1014 and feed pumps 1012*a*, 1012*b* based on the data received from one or more of upstream sensors 1030*a*, 1030*b* and downstream sensors 1032*a*, 1032*b*.

Memory 1036 is configured to store software that, when executed by control circuitry 1038, controls operation of feed pumps 12*a*, 12*b*. For example, control circuitry 1038 can include one or more of a microprocessor, a controller, a digital signal processor (DSP), an application specific integrated circuit (ASIC), a field-programmable gate array (FPGA), or other equivalent discrete or integrated logic circuitry. Memory 1036, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 1036 is a temporary memory, meaning that a primary purpose of memory 1036 is not long-term storage. Memory 1036, in some examples, is described as volatile memory, meaning that memory 1036 does not maintain stored contents when power to controller 1029 is turned off. Examples of volatile memories can include random access memories (RAM), dynamic random access memories (DRAM), static random access memories (SRAM), and other forms of volatile memories. Memory 1036, in one example, is used by software or applications running on control circuitry 1038 to temporarily store information during program execution. Memory 1036, in some examples, also includes one or more computer-readable storage media. Memory 1036 can further be configured for long-term storage of information. Memory 1036 can be configured to store larger amounts of information than volatile memory. In some examples, memory 1036 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 1018 can be any graphical and/or mechanical interface that enables user interaction with controller 1029. For example, user interface 1018 can implement a graphical user interface displayed at a display device of user interface 1018 for presenting information to and/or receiving input from a user. User interface 1018 can include graphical navigation and control elements, such as graphical buttons or other graphical control elements presented at the display device. User interface 1018, in some examples, includes physical navigation and control elements, such as physically actuated buttons or other physical navigation and control elements. In general, user interface 1018 can include any input and/or output devices and control elements that can enable user interaction with controller 1029.

During operation, the first and second component materials are pumped to applicator 1034 from fluid tanks 1020*a*, 1020*b* by feed pumps 1012*a*, 1012*b* and proportioner pumps 1022*a*, 1022*b*, and are mixed at applicator 1034 to form the plural component spray material. Flows of the first component material and the second component material to the applicator 1034 are controlled based on one or more target operating parameters, such as fluid ratio, pressure, and temperature.

Controller 1029 controls operation of feed pumps 1012*a*, 1012*b* based on at least one of the target operating parameters. The electric current to the electric motors of feed pumps 1012*a*, 1012*b* controls the pressure output by feed pumps 1012*a*, 1012*b*. It is understood that a reference to the term "current" can be replaced with a different measure of power such as voltage or the term "power" itself. Controller 1029 can also control operation of motor 1014 based on at least one of the target operating parameters. Controlling the flow based on the target operating parameters generates a spray material having desired material properties, such as porosity, expansion rate, expansion volume, thermal resistivity, etc. Spraying according to the target operating parameters further provides an even spray pattern, fine droplet size, adequate flow, and good mixing. Spraying according to the target operating parameters further prevents excessive overspray, undesirably high flow rates, difficult control, and excessive wear.

Controller 1029 controls electric current flow to the electric motors of feed pumps 1012*a*, 1012*b* to pump the component materials to proportioner pumps 1022*a*, 1022*b* according to target feed parameters. Controller 1029 can be configured to operate feed pumps 1012*a*, 1012*b* at or below a maximum operating parameter and/or current level. Controller 1029 can control the current provided to the electric motors of feed pumps 1012*a*, 1012*b* based on parameter data received from one or more of upstream sensors 1030*a*, 1030*b* and/or downstream sensors 1032*a*, 1032*b*.

Controller 1029 can control operation of motor 1014 to cause proportioner pumps 1022*a*, 1022*b* to pump the component materials according to target spray parameters. For example, controller 1029 can control flows of working fluid or electricity to motor 1014. Controller 1029 can be configured to operate proportioner pumps 1022*a*, 1022*b* according to the target spray parameter. Controller 1029 can control operation of motor 1014 based on parameter data received from downstream sensors 1032*a*, 1032*b* and/or operation of applicator 1034

To apply the spray material, the user manipulates applicator 1034 by grasping handle 1042. The user depresses trigger 1044 to cause flow through applicator 1034 and mixing within mixer 1040. The upstream pressures generated by proportioner pumps 1022*a*, 1022*b* drive the component materials through mixer 1040, causing mixing of the component materials within mixer 1040 to form the spray material. The pressures upstream of applicator 1034 drive the material out through the orifice of applicator 1034 to cause spraying by applicator 1034. As such, proportioner pumps 1022*a*, 1022*b* drive the component materials through mixer 1040 and generate the spray ejected from applicator 1034. The pressures and flow rates generated by proportioner pumps 1022*a*, 1022*b* affect flow to and through mixer 1040.

Feed pump 1012*a* draws the first component material from fluid tank 1020*a* and pumps the first component material through feed line 1024*a* to proportioner pump 1026*a*. Upstream sensor 1030*a* generates data regarding one or more operating parameters of the first component material and provides that data to controller 1029. Feed pump 1012*b* draws the second component material from fluid tank 1020*b* and pumps the second component material through feed line 1024*b* to proportioner pump 1026*b*. Upstream sensor 1030*b* generates data regarding one or more operating parameters of the second component material and provides that data to controller 1029.

Motor 1014 drives linear displacement of the fluid displacement members of proportioner pumps 1022*a*, 1022*b*. Motor 1014 can simultaneously drive proportioner pumps 1022*a*, 1022*b*, causing proportioner pumps 1022*a*, 1022*b* to simultaneously pump the first and second component materials downstream to applicator 1034. While proportioner pumps 1022*a*, 1022*b* are described as connected to a common motor 1014, it is understood that proportioner pumps 1022*a*, 1022*b* can, in some examples, be individually powered. Proportioner pumps 1022*a*, 1022*b* can be double displacement pumps, such that proportioner pumps 1022*a*, 1022*b* output fluid during both strokes of a pump cycle. While proportioner pumps 1022*a*, 1022*b* output fluid during both strokes of the pump cycle, proportioner pumps 1022_a_, 1022_b_ receive fluid from feed pumps 1012_a_, 1012_b_ during only one stroke of the pump cycle, which stroke can be referred to as a fill stroke. Controller 1029 can control motor 1014 to control pumping by proportioner pumps 1022_a_, 1022_b_ and control the downstream parameters of the flows generated by proportioner pumps 1022_a_, 1022_b_. Downstream sensors 1032_a_, 1032_b_ generate parameter data regarding the individual component material in supply lines 1028_a_, 1028_b_, respectively. Controller 1029 can adjust the current provided to the electric motors of feed pumps 1012_a_, 1012_b_ based on the parameter data received from one or both of downstream sensors 1032_a_, 1032_b_ and one or both of upstream sensors 1030_a_, 1030_b_ to maintain a desired parameter ratio across proportioner pumps 1022_a_, 1022_b_ and to ultimately maintain the supply parameters at the target supply parameters.

The component materials are pumped downstream through supply lines 1028_a_, 1028_b_ disposed between proportioner pumps 1022_a_, 1022_b_ and applicator 1034. Primary heaters 1045_a_, 1045_b_ increase the temperature of the component materials after the component materials exit proportioner pumps 1022_a_, 1022_b_ and prior to entering supply lines 1028_a_, 1028_b_ to temperatures above ambient. Heated portion 1046 of supply lines 1028_a_, 1028_b_ maintains the temperature of the materials flowing through supply lines 1028_a_, 1028_b_ above ambient. Heating the component materials reduces the viscosity of the component materials and enhances mixing to cause the formation of desired characteristics in the spray material. The first and second component materials combine within mixer 1040 of applicator 1034 to form the spray material that is sprayed from applicator 1034 onto the substrate.

The user can depress and release trigger 1044 multiple times during any spray job. The user releasing trigger 1044 deadheads proportioner pumps 1022_a_, 1022_b_, meaning that the flowpaths through supply lines 1028_a_, 1028_b_ are closed and material is not flowing downstream from proportioner pumps 1022_a_, 1022_b_. Controller 1029 is configured to control current flow to the electric motors of feed pumps 1012_a_, 1012_b_ and current flow to motor 1014 both when proportioner pumps 1022_a_, 1022_b_ are actively pumping and when proportioner pumps 1022_a_, 1022_b_ are stalled.

In a stalled state, feed pumps 1012_a_, 1012_b_ are prevented from pumping due to downstream pressure extending the target operating pressure. With feed pumps 1012_a_, 1012_b_ in stalled states, controller 1029 can maintain, reduce, or stop the current to the electric motors of feed pumps 1012_a_, 1012_b_. System 1010 can include multiple check valves (not shown) to maintain the feed pressure within feed lines 1024_a_, 1024_b_ and the downstream pressure in supply lines 1028_a_, 1028_b_ when feed pumps 1012_a_, 1012_b_ and/or proportioner pumps 1022_a_, 1022_b_ are stalled. Feed pumps 1012_a_, 1012_b_ resume pumping once the downstream pressure falls below the pumping pressure, such as when the user actuates trigger 1044 and resumes spraying. Continuing to apply power to feed pumps 1012_a_, 1012_b_ during a stall provides quick reaction when the user resumes spraying, as proportioner pumps 1022_a_, 1022_b_ and feed pumps 1012_a_, 1012_b_ can resume pumping as soon as the downstream pressure drops, increasing spray efficiency and avoiding undesired pressure loss. In some examples, controller 1029 can reduce or stop current flow to feed pumps 1012_a_, 1012_b_ while in the stalled state, to conserve energy and reduce heat generation. Controller 1029 can increase the current to cause feed pumps 1012_a_, 1012_b_ to resume pumping at the target operating current based on any one of upstream sensors 1030_a_, 1030_b_ and downstream sensors 1032_a_, 1032_b_ indicating a drop in the pressure downstream of feed pumps 1012_a_, 1012_b_.

During pumping and spraying, controller 1029 can control operation of feed pumps 1012_a_, 1012_b_ to maintain the component materials at desired fluid parameters in supply lines 1028_a_, 1028_b_. Controller 1029 can control operation of feed pumps 1012_a_, 1012_b_ by adjusting the speeds of the electric motors of feed pumps 1012_a_, 1012_b_. Controller 1029 can independently control each feed pump 1012_a_, 1012_b_. For example, downstream sensors 1032_a_, 1032_b_ can indicate that the sensed downstream parameters in supply lines 1028_a_, 1028_b_ are imbalanced. In an example where the desired output of component materials is at a 1:1 ratio, controller 1029 can monitor the sensed downstream parameters to ensure that the materials are provided according to that ratio. If controller 1029 detects that the parameter, such as pressure, in supply line 1028_a_ differs from the parameter in supply line 1028_b_, then controller 29 can control operation of feed pumps 1012_a_, 1012_b_ to correct the imbalance, as discussed in more detail below. Controller 1029 can control operation of each feed pump 1012_a_, 1012_b_ based on data received from one or more of upstream sensors 1030_a_, 1030_b_ and downstream sensors 1032_a_, 1032_b_. Controller 1029 can individually control operation of each feed pump 1012_a_, 1012_b_ based on the data received. Controller 1029 controls operation of feed pumps 1012_a_, 1012_b_ to ensure that proportioner pumps 1022_a_, 1022_b_ fully fill during the fill stroke of each proportioner pump 1022_a_, 1022_b_. Ensuring that proportioner pumps 1022_a_, 1022_b_ fully fill prevents proportioner pumps 1022_a_, 1022_b_ from starving and maintains the material ratio at applicator 1034, thereby generating a material spray having desired material characteristics. Factors such as ambient temperature, clogging, leakage, seal failure, etc. can affect material flows. For example, cooler ambient temperatures increase the viscosity of the component materials. One material may be more viscous than the other such that the feed pump 1012_a_, 1012_b_ associated with the more viscous material requires more power to achieve similar flows. Controller 1029 discretely controlling operation of each feed pump 1012_a_, 1012_b_ facilitates fine control when such factors affect the flow. Controller 1029 individually controls each feed pump 1012_a_, 1012_b_ to address any flow issues that may arise regarding the flow of the component material associated with that feed pump 1012_a_, 1012_b_. As such, controller 1029 provides discrete A-side control (for the component material from fluid tank 1020_a_) and B-side control (for the component material from fluid tank 1020_b_).

An example ratio of 1:1 between the first and second component materials is discussed by way of example. It is understood that system 1010 and pumps 1012_a_, 1012_b_, 1022_a_, 1022_b_ can be configured to provide materials at any desired ratio. Controller 1029 can further controls operation of each feed pump 1012_a_, 1012_b_ based on data generated downstream of a pump other than the feed pump 1012_a_, 1012_b_. Specifically, can controller 1029 controls operation of each feed pump 1012_a_, 1012_b_ based on data regarding flows downstream of and generated by proportioner pumps 1022_a_, 1022_b_.

In one example, if downstream sensors 1032_a_, 1032_b_ communicate to controller 1029 that the downstream pressures in supply lines 1028_a_, 1028_b_ are out of ratio, such that the flow is imbalanced, controller 1029 can determine that additional flow is required to one of proportioner pumps 1022_a_, 1022_b_ to correct the imbalance. For example, downstream sensors 1032_a_ can indicate an unexpected pressure drop or rise, or a comparison between the data from downstream sensors 1032*a*, 1032*b* can indicate that the pressure in supply line 1028*a* is lower than the supply line 1028*b*. Such a pressure variation can indicate that proportioner pump 1026*a* is not fully filling on the fill stroke (i.e., proportioner pump 1026*a* is being starved). In response, controller 1029 can increase power to the electric motor of feed pump 1012*a* to increase the pumping speed and/or pressure output of feed pump 1012*a*. Increasing power to feed pump 1012*a* will increase the flow through and feed pressure in feed line 1024*a* and provide an increased volume of the component material to proportioner pump 1026*a* to ensure that proportioner pump 1026*a* fully fills on the fill stroke. Proportioner pump 1026*a* can thereby generate increased flow and downstream pressure in supply line 1028*a*. Controller 1029 can thus control operation of an individual feed pump 1012*a* based on the data from downstream sensor 1032*a* or both downstream sensors 1032*a*, 1032*b*, even though only one of those sensors (downstream sensor 1032*a*) is in-line with feed pump 1012*a*.

Similarly, controller 1029 can increase power to feed pump 1012*b* based on any one of downstream sensor 1032*b* indicating a spike or drop in the downstream pressure of the component material in supply line 1028*b* or the comparison between the data from downstream sensors 1032*a*, 1032*b* indicating that the pressure in supply line 1028*b* is lower than the supply line 1028*a*. Increasing power to feed pump 1012*b* increases flow and pressure generated by feed pump 1012*b*, thereby providing additional material to proportioner pump 1026*b*. Controller 1029 can ramp the power increase such that controller 1029 continues to increase power to feed pump 1012*b* until the parameter variation is smoothed and/or the parameter imbalance is alleviated. In some examples, controller 1029 can decrease power to feed pump 1012*a* to decrease pressure in supply line 1028*a* and alleviate the parameter imbalance.

In another example, if downstream sensor 1032*a* measures a downstream pressure in supply line 1028*a* that matches a downstream pressure in supply line 1028*b*, however, downstream sensor 1032*a* measures a flow in supply line 1028*a* that is lower than a flow in supply line 1028*b*, controller 1029 can determine that feed pump 1012*a* is not supplying enough of the component material to proportioner pump 26*a* based on the flow imbalance. In response, controller 1029 can increase the power to the electric motor of feed pump 1012*a* to increase the flow and the feed pressure of the component material to proportioner pump 1026*a*, and ultimately increase the flow of the component material in supply line 1028*a*. Alternatively, controller 1029 can determine supply line 1028*a* contains a blockage that is decreasing the flow in supply line 1028*a*. For example, upstream sensor 1030*a* can indicate expected pressures and low/no flow. In response to detecting an error, controller 1029 can shut down proportioner pumps 1022*a*, 1022*b* and feed pumps 1012*a*, 1012*b* and/or send an alert to the user, such as via user interface 1018, communicating the existence of the blockage to the user.

In some examples, controller 1029 can detect an error based on data from downstream sensors 1032*a*, 1032*b* indicating a drop in the downstream pressure while upstream sensors 1030*a*, 1030*b* indicate an increase in feed pressure. In response to detecting the malfunction, controller 1029 can stop operation of each of proportioner pumps 1022*a*, 1022*b* and feed pumps 1012*a*, 1012*b* to prevent damage to system 1010 and to reduce waste of the component materials. Controller 1029 can send a prompt to user interface 1018 to communicate the malfunction to the user. For example, the prompt can be audio, visual, or a combination of audio and visual, among other options.

Controller 1029 can further control operation of feed pumps 1012*a*, 1012*b* based on data generated by upstream sensors 1030*a*, 1030*b*. Controller 1029 can control operation of feed pumps 1012*a*, 1012*b* based on the upstream parameter data or a combination of the upstream parameter data and the downstream parameter data generated by downstream sensors 1032*a*, 1032*b*. For example, upstream sensor 1030*a* can indicate a change in flow and/or pressure and controller 1029 can increase or decrease power to feed pump 1012*a* based on that indication.

Controller 1029 can further control operation of each feed pump 1012*a*, 1012*b* based on the operating state of each proportioner pump 1022*a*, 1022*b*. Controller 1029 can control operation of feed pumps 1012*a*, 1012*b* such that feed pumps 1012*a*, 1012*b* changeover (change stroke direction) in coordination with the strokes of proportioner pumps 1022*a*, 1022*b*. As such, the changeover point of each feed pump 1012*a*, 1012*b*, which is the point where the piston of the feed pumps 1012*a*, 1012*b* changes between a first stroke direction (in one of the first axial direction AD1 and the second axial direction AD2) and a second stroke direction (in the other one of the first axial direction AD1 and the second axial direction AD2), is dynamic in that the changeover point and the stroke length can each vary. Unlike fluid-powered motors, such as pneumatic motors, that have a set changeover point such as when a shuttle valve is actuated to direct compressed air to an opposite side of the motor, the electric motors of feed pumps 1012*a*, 1012*b* can be controlled to have a dynamic changeover point. Fluid-powered motors require a full stroke in one direction prior to actuating the shuttle valve, such that changeover points are fixed.

Controller 1029 controls operation of feed pumps 1012*a*, 1012*b* to coordinate the changeover of feed pumps 1012*a*, 1012*b* with the fill strokes of proportioner pumps 1022*a*, 1022*b*. Feed pumps 1012*a*, 1012*b* are controlled such that feed pumps 1012*a*, 1012*b* do not changeover during the fill stroke of proportioner pumps 1022*a*, 1022*b* or changeover during a predetermined portion of the fill stroke.

When proportioner pumps 1022*a*, 1022*b* are undergoing a fill stroke (i.e., when component materials enter proportioner pumps 1022*a*, 1022*b* from feed lines 1024*a*, 1024*b*), feed pumps 1012*a*, 1012*b* are undergoing a stroke to supply component material to proportioner pumps 1022*a*, 1022*b* under pressure. In some examples, proportioner pumps 1022*a*, 1022*b* are arranged out-of-phase, such that only one of proportioner pumps 1022*a*, 1022*b* is proceeding through a fill stroke while the other is proceeding through a return stroke. As such, controller 29 can control each feed pump 1012*a*, 1012*b* such that the feed pump 1012*a*, 1012*b* associated with the proportioner pump 1022*a*, 1022*b* proceeding through the fill stroke drives fluid while the other feed pump 1012*a*, 1012*b* is stalled or inactive. It is understood that controller 1029 can continue to provide power to the feed pump 1012*a*, 1012*b* associated with the proportioner pump 1022*a*, 1022*b* proceeding through the return stroke, but that feed pump 1012*a*, 1012*b* is stalled as the pressures generated by proportioner pumps 1022*a*, 1022*b* are greater than the pressures generated by feed pumps 1012*a*, 1012*b*. In some examples, proportioner pumps 1022*a*, 1022*b* operated in-phase such that each proportioner pump 1022*a*, 1022*b* proceeds through concurrent fill strokes and return strokes. Controller 1029 can thus control feed pumps 1012*a*, 1012*b* such that each feed pump 1012*a*, 1012*b* concurrently pumps fluid to fill proportioner pumps 1022*a*, 1022*b*.

Feed pumps 1012*a*, 1012*b* are configured such that each stroke (both up and down) of feed pumps 1012*a*, 1012*b* supplies component material to proportioner pumps 1022*a*, 1022*b*. Feed pumps 1012*a*, 1012*b* are thus double displacement pumps. Feed pumps 1012*a*, 1012*b* can be sized such that each stroke of a feed pump 1012*a*, 1012*b* has sufficient displacement so that a single stroke of the feed pump 1012*a*, 1012*b* fully fills the proportioner pump 1022*a*, 1022*b* associated with the feed pump 1012*a*, 1012*b*. In some examples, feed pumps 1012*a*, 1012*b* are oversized by a buffer volume such that the feed pump displacement for a full stroke is at least 40% larger than the fill volume of the proportioner pump 1022*a*, 1022*b*. In some examples, feed pumps 1012*a*, 1012*b* are sized such that the feed pump displacement for a full stroke is at least one of 10%, 20%, or 30% larger than the fill volume of the proportioner pump 1022*a*, 1022*b*. In some examples, feed pumps 1012*a*, 1012*b* are sized such that the feed pump displacement for a full stroke is up to 40% larger than the fill volume of the proportioner pump 1022*a*, 1022*b*. Sizing the feed pumps 1012*a*, 1012*b* to have a buffer volume such that the displacement is larger than the fill volume of proportioner pumps 1022*a*, 1022*b* ensures sufficient room for feed pump 1012*a*, 1012*b* to complete a full stroke in one direction while avoiding changeover. Feed pumps 1012*a*, 1012*b* can be configured such that the piston floats between buffer zones on either end of each stroke. As such, feed pumps 1012*a*, 1012*b* have a buffer for both a stroke in first axial direction AD1 and second axial direction AD2.

Feed pumps 1012*a*, 1012*b* provide fluid to proportioner pumps 1022*a*, 1022*b* during each stroke of the pump cycle and are controlled such that feed pumps 1012*a*, 1012*b* do not changeover from one stroke to another while proportioner pumps 1022*a*, 1022*b* are filling. Changeover occurs for feed pumps 1012*a*, 1012*b* between fill strokes of proportioner pumps 1022*a*, 1022*b*. An example of a pump cycle for feed pumps 1012*a*, 1012*b* is discussed in more detail. Initially, proportioner pump 1022*a* proceeds through a fill stroke and proportioner pump 1022*b* proceeds through a return stroke. Feed pump 1012*a* is powered through a first stroke in one of the first axial direction AD1 and second axial direction AD2 and feed pump 1012*b* does not pump (e.g., stalls or is depowered). Feed pump 1012*a* continues through the first stroke until proportioner pump 1026*a* completes the fill stroke. Proportioner pumps 1022*a*, 1022*b* reverse direction, feed pump 1012*b* begins to pump fluid to proportioner pump 1022*b* and feed pump 1012*a* stops pumping. Feed pump 1012*b* is powered through a first stroke in one of the first axial direction AD1 and second axial direction AD2. Feed pump 1012*b* continues through the first stroke until proportioner pump 1022*b* completes the fill stroke.

After proportioner pumps 1022*a*, 1022*b* complete the first pump cycle, proportioner pumps 1022*a*, 1022*b* proceed through a second pump cycle. Proportioner pump 1022*a* proceeds through a fill stroke and proportioner pumps 1022*b* proceeds through a return stroke. Feed pump 1012*a* is powered through a second stroke in an opposite axial direction from the first stroke of feed pump 1012*a* and feed pump 1012*b* stops pumping. Feed pump 1012*a* has thereby changed stroke direction outside of the fill stroke of proportioner pump 1022*a*. Feed pump 1012*a* continues through the second stroke until proportioner pump 1022*a* completes the fill stroke. Proportioner pumps 1022*a*, 1022*b* reverse direction, feed pump 1012*b* begins to pump fluid to proportioner pump 1022*b*, and feed pump 1012*a* stops pumping. Feed pump 1012*b* is powered through a second stroke in an opposite axial direction from the first stroke of feed pump 1012*b*. Feed pump 1012*b* continues through the second stroke until proportioner pump 1022*b* completes the fill stroke. Feed pump 1012*b* has thereby changed stroke direction outside of the fill stroke of proportioner pump 1022*b*.

Each feed pump 1012*a*, 1012*b* completes half of a feed pump cycle (e.g., a single stroke) for the first pump cycle of proportioner pumps 1022*a*, 1022*b*. Each feed pump 1012*a*, 1012*b* completes a full feed pump cycle (e.g., two opposite strokes) for two pump cycles of proportioner pumps 1022*a*, 1022*b*. Feed pumps 1012*a*, 1012*b* fully fill proportioner pumps 1022*a*, 1022*b* twice for each feed pump cycle completed. In the example discussed, feed pumps 1012*a*, 1012*b* and proportioner pumps 1022*a*, 1022*b* have a feed pump cycle to proportioner pump cycle ratio of 1:2. In some examples, feed pumps 1012*a*, 1012*b* can be sized such that a single feed stroke can fully fill more than one fill stroke of the proportioner pump 1022*a*, 1022*b*. As such, feed pumps 1012*a*, 1012*b* and proportioner pumps 1022*a*, 1022*b* can have any desired feed pump cycle to proportioner pump cycle ratio. For example, feed pump 1012*a*, 1012*b* can be sized such that a single stroke provides sufficient fluid for two fill cycles of proportioner pump 1022*a*, 1022*b*, providing a 1:4 ratio of feed pump cycles to proportioner pump cycles.

In some examples, each feed pump 1012*a*, 1012*b* completes two strokes with a single changeover for every two proportioner pump cycles. In some examples, each feed pump 1012*a*, 1012*b* completes a single stroke without changing over for a single proportioner pump fill stroke. In some examples, controller 1029 causes feed pumps 1012*a*, 1012*b* to reverse stroke direction between each proportioner pump cycle. In some examples, the first feed stroke of a feed pump 1012*a*, 1012*b* is the only stroke that pumps fluid during a first fill stroke of proportioner pump 1022*a*, 1022*b* and the second feed stroke of feed pump 1012*a*, 1012*b* is the only stroke that pumps fluid during a second, immediately subsequent fill stroke of proportioner pump 1022*a*, 1022*b*. As such, no two immediately subsequent fill strokes of the proportioner pump 1022*a*, 1022*b* is filled by strokes of its associated feed pump 1012*a*, 1012*b* in the same axial direction.

Reducing power to feed pumps 1012*a*, 1012*b* between fill strokes of proportioner pumps 1022*a*, 1022*b* reduces pressure on the feed lines 1024*a*, 1024*b* and the inlets of proportioner pumps 1022*a*, 1022*b* between fill strokes of proportioner pumps 1022*a*, 1022*b*. Furthermore, timing the changeover of strokes for feed pumps 1012*a*, 1012*b* to correspond with the changeover of proportioner pumps 1022*a*, 1022*b* ensures that proportioner pumps 1022*a*, 1022*b* are receiving a consistent supply of component material at a smooth and steady pressure. Preventing changeover of feed pumps 1012*a*, 1012*b* during the fill stroke prevents undesired pressure spikes from occurring that can inhibit filling of proportioner pumps 1022*a*, 1022*b* and cause inaccurate readings from upstream sensors 1030*a*, 1030*b* and downstream sensors 1032*a*, 1032*b*.

In some examples, feed pumps 1012*a*, 1012*b* are sized such that a full fill stroke requires feed pumps 1012*a*, 1012*b* to changeover during the fill stroke. In such an example, controller 1029 controls operation of feed pumps 1012*a*, 1012*b* to cause the changeover to occur during a predetermined portion of the feed pump stroke. For example, controller 1029 can determine the relative location of the feed pump piston prior to initiating the feed stroke and can drive the piston of feed pump 1012*a*, 1012*b* in one of the two axial directions AD1, AD2 based on the predetermined portion and the relative location. For example, the predetermined portion can be the first 50% of a fill stroke. Controller 1029 will initially cause the piston to displace in the axial direction that will cause the changeover to occur within the predetermined portion of the stroke.

For example, assuming a maximum stroke length of feed pump 1012*a*, 1012*b* is 5.08 centimeters (cm) (2 inches (in.)), the stroke required to fill proportioner pump 1022*a*, 1022*b* is 1.8 inches, and the piston traveled 1.6 inches through a stroke in the second axial direction AD2 on the previous stroke. The piston is thus 0.4 inches from completing the stroke in the second axial direction AD2 and 1.6 inches from completing the stroke in the first axial direction AD1. Controller 1029 will thus cause the piston to displace in the second axial direction AD2 to complete a first portion of the fill stroke and then displace in the first axial direction AD1 to complete the fill stroke to cause the changeover to occur within the predetermined portion of the stroke. In some examples, controller 1029 is configured to minimize the number of changeovers during a fill stroke. For example, if the stroke required to fill proportioner pump 1022*a*, 1022*b* is instead 2.5 inches, then feed pump 1012*a*, 1012*b* must complete two changeovers if the piston first displaces in second axial direction AD2. As such, controller 1029 can instead cause the piston to displace in first axial direction AD1 which will cause a single changeover. That single changeover is also earlier in the fill stroke than the second changeover, providing additional benefits.

Controller 1029 can also synchronize feed pumps 1012*a*, 1012*b* and proportioner pumps 1022*a*, 1022*b* respectively during a flush mode of system 1010. Feed pumps 1012*a*, 1012*b* can run dry and draw air into feed lines 1024*a*, 1024*b* when fluid tanks 1020*a*, 1020*b* empty and when feed pumps 1012*a*, 1012*b* are attached to a new set of fluid tanks 1020*a*, 1020*b*. The air pockets need to be flushed from feed pumps 1012*a*, 1012*b*, feed lines 1024*a*, 1024*b*, and proportioner pumps 1022*a*, 1022*b* prior to operation. The user can cause system 1010 to enter the flush mode via user interface 1018 and/or controller 1029 can cause system 1010 to automatically enter the flush mode based on the detection of parameters indicating air in the system. During flush mode, controller 1029 causes feed pumps 1012*a*, 1012*b* and proportioner pumps 1022*a*, 1022*b* to deactivate. Controller 1029 can alert the user that the flush mode has been activated and can prompt the user to actuate flush valves 1033*a*, 1033*b* to dump positions. The dump position can also be referred to as a recirculation position where flush lines 1035*a*, 1035*b* are connected to fluid tanks 1020*a*, 1020*b*. The user can provide an input to controller 1029 to indicate that the flush valves 1033*a*, 1033*b* are in the dump positions. In some examples, flush valves 1033*a*, 1033*b* can be activated by controller 1029.

Controller 1029 activates the electric motors of feed pumps 1012*a*, 1012*b* causes feed pumps 1012*a*, 1012*b* to build pressure in supply lines 1028*a*, 1028*b*. Proportioner pumps 1022*a*, 1022*b* are activated to generate constant flow. In some examples, controller 1029 activates proportioner pumps 1022*a*, 1022*b* based on upstream sensors 1030*a*, 1030*b* indicating sufficient pressure in feed lines 1024*a*, 1024*b*. Feed pumps 1012*a*, 1012*b* and proportioner pumps 1022*a*, 1022*b* actuate at synchronized and periodic stokes to drive air pockets inside system 1010 out of system 1010 via flush valves 1033*a*, 1033*b*. Flush lines 1035*a*, 1035*b* are connected to flush valves 1033*a*, 1033*b* and to fluid tanks 1020*a*, 1020*b* respectively. Any component material that exits flush valves 1033*a*, 1033*b* during the flushing of system 1010 can be returned to fluid tanks 1020*a*, 1020*b* via flush lines 1035*a*, 1035*b* to avoid waste of the component materials. Controller 1029 can be configured to control a duration of the flush pumping during the flush mode based on any suitable parameter, such as a count of pump cycles, a time duration, a volume pumped, etc. In one example, controller 1029 can base the duration of the flush mode on a count of pump cycles for any one of proportioner pumps 1022*a*, 1022*b* and feed pumps 1012*a*, 1012*b*. For example, controller 1029 can cause operation in the flush mode for thirty proportioner pump cycles. It is understood, however, that any desired number of proportioner pump or fill pump cycles can be utilized. In some examples, proportioner pumps 1022*a*, 1022*b* and feed pumps 1012*a*, 1012*b* continue to pump after the flush pumping duration is reached.

After completing the flush pumping, flush valves 1033*a*, 1033*b* are returned to the spray position, such that feed lines 1024*a*, 1024*b* are fluidly connected to supply lines 1028*a*, 1028*b*. For example, controller 29 can alert the user to actuate flush valves 1033*a*, 1033*b* and the user can actuate flush valves 1033*a*, 1033*b*. In other examples, controller 1029 can cause feed valves 1033*a*, 1033*b* to return to respective spray positions. With the flush valves 1033*a*, 1033*b* in the respective spray positions and applicator 1034 deactivated, each of proportioner pumps 1022*a*, 1022*b* and feed pumps 1012*a*, 1012*b* stall. With the proportioner pumps 1022*a*, 1022*b* and feed pumps 1012*a*, 1012*b* stalled, each of supply lines 1028*a*, 1028*b* and feed lines 1024*a*, 1024*b* are pressurized.

Controller 1029 deactivates proportioner pumps 1022*a*, 1022*b* and feed pumps 1012*a*, 1012*b* based on flush valves 1033*a*, 1033*b* returning to the spray positions. For example, controller 1029 can deactivate proportioner pumps 1022*a*, 1022*b* and feed pumps 1012*a*, 1012*b* based on a user input indicating that the flush valves 1033*a*, 1033*b* are in the spray positions. Controller 1029 can deactivate proportioner pumps 1022*a*, 1022*b* and feed pumps 1012*a*, 1012*b* based on parameter data from downstream sensors 1032*a*, 1032*b* and upstream sensors 1030*a*, 1030*b*. Such as where the data indicates pressure and no flow in supply lines 1028*a*, 1028*b* and feed lines 1024*a*, 1024*b*.

After proportioner pumps 1022*a*, 1022*b* and feed pumps 1012*a*, 1012*b* are deactivated, flush valves 1033*a*, 1033*b* are returned to respective dump positions. Controller 1029 can prompt the user to actuate flush valves 1033*a*, 1033*b* or automatically actuate flush valves 1033*a*, 1033*b*. With flush valves again returned to the dump positions, the pressure in feed lines 1024*a*, 1024*b* can drive the fluid through return lines 1035*a*, 1035*b*. Flow through return lines 1035*a*, 1035*b* is observed to determine if air is still present in the fluid. Such observation can be audio or visual. For example, spitting of the fluid can indicate that air is still present. Such spitting can be detected audibly by the user or by an audio sensor connected to controller 1029. In some examples, flush lines 1035*a*, 1035*b* can be formed from a transparent material to facilitate visual inspection of the return flow. The user can visually determine if air is still present or a sensor can be associated with a return lines 1035*a*, 1035*b* to monitor the return lines 1035*a*, 1035*b* for the presence of air pockets. In some examples, a flow meter can be associated with return lines 1035*a*, 1035*b*, and controller 1029 can determine if air is present based on data received from the flow meter. For example, fluid flow without air can show a steady flow while the presence of air can cause the flow rate to suddenly change.

If air is still present, the flush mode is repeated until all air is purged. In some examples, controller 1029 can automatically restart the purge process based on the detection of air in return lines 1035*a*, 1035*b*. Once all air is purged, system 1010 can return to the operating mode to apply the spray material. For example, each of the A-side and B-side can include dedicated dump valve to prevent undesired mixing of the component materials.

System 1010 provides significant advantages. Controller 1029 can control the pressure output by proportioner pumps 1022*a*, 1022*b* by controlling operation of feed pumps 1012*a*, 1012*b*. The user can control the downstream pressure by simply setting a target spray pressure. Controller 1029 controls operation of the electric motors of feed pumps 1012*a*, 1012*b* based on feedback from downstream sensor 1032*a*, 1032*b* and/or upstream sensors 1030*a*, 1030*b* to achieve the desired downstream pressure in supply lines 1028*a*, 1028*b* and the desired target spray pressure in applicator 1034. Feed pumps 1012*a*, 1012*b* ensure that proportioner pumps 1022*a*, 1022*b* fully fill on each fill stroke, preventing proportioner pumps 1022*a*, 1022*b* from starving, preventing parameter imbalance, and providing proper mixing such that the spray material has desired material properties. Unlike feed pumps with a hydraulic or pneumatic drive, the user is not required to adjust the pressure at the feed pumps 1012*a*, 1012*b* such as by a series of knobs to set the downstream pressure. Instead, controller 1029 adjusts the current flow to the electric motors of feed pumps 1012*a*, 1012*b* to maintain the desired downstream pressure and spray pressure. Maintaining the desired downstream pressure and the desired spray pressure provides the individual component materials downstream according to the desired ratio. Controller 1029 further controls operation of feed pumps 1012*a*, 1012*b* to prevent changeover during the fill stroke of proportioner pumps 1022*a*, 1022*b*, thereby avoiding undesired pressure variations caused by the changeover. Controller 1029 further coordinates operation of proportioner pumps 1022*a*, 1022*b* and feed pumps 1012*a*, 1012*b* to ensure air is purged from system 1010 during the flush mode.

Figure 11:
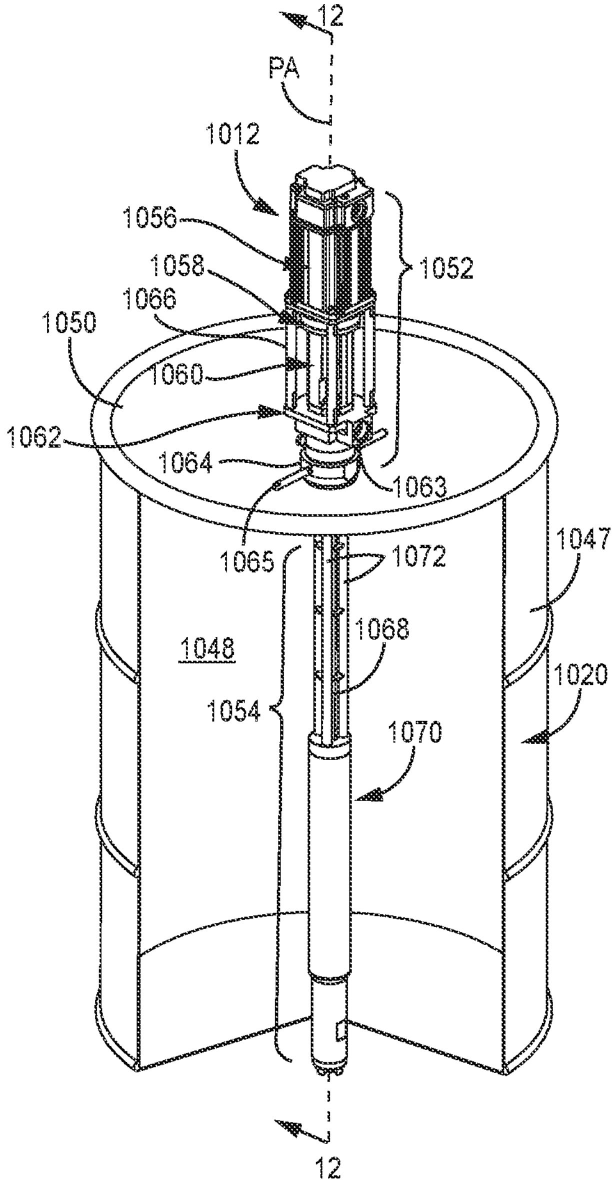
FIG. 11 is an isometric view of a feed pump and a fluid tank with a partial cross-section of the supply drum.

FIG. 11 is an isometric view of feed pump 1012 and a fluid tank 1020 with a partial cross-section of fluid tank 1020. Feed pump 1012 is an example of feed pumps 1012*a*, 1012*b* shown in FIGS. 10A and 10B. Fluid tank 1020 is an example of fluid tanks 1020*a*, 1020*b* shown in FIGS. 10A and 10B. As shown in FIG. 11, fluid tank 1020 includes body 1047, interior 1048, and top 1050. Feed pump 1012 includes upper portion 1052 and lower portion 1054. Upper portion 1052 of feed pump 1012 includes electric motor 1056, bearing assembly 1058, clocking assembly 1060, fluid outlet manifold 1062 with outlet 1063, mounting collar 1064, handles 1065, and tie rods 1066. Lower portion 1054 of feed pump 1012 includes drive shaft 1068, displacement assembly 1070, and tubes 1072. Axis PA of feed pump 1012 is shown.

Feed pump 1012 is configured to draw fluid from fluid tank 1020 and pump the fluid downstream from fluid tank 1020. Feed pump 1012 can be a two ball piston pump including first and second one-way check valves within displacement assembly 1070. In some examples, feed pump 1012 can be referred to as a drum pump. Displacement assembly 1070 can be configured to output fluid during each of an upstroke and downstroke of its piston such that feed pump 1012 is a double displacement pump.

Upper portion 1052 and lower portion 1054 are disposed coaxially on axis PA. Lower portion 1054 of feed pump 1012 is disposed within interior 48 of fluid tank 1020 and can be inserted into interior 48 through top 50 of fluid tank 1020. In some examples, fluid tank 1020 contains one of the component materials discussed above in the discussion of FIGS. 10A and 10B. In some examples fluid tank 1020 can be similar to reservoir 20 (FIGS. 1A and 1B) and can store a supply of a material for spraying without combining with another component, such as paints, coatings, varnishes, etc. Displacement assembly 1070 can be at least partially submerged in the material stored within tank 1020. Mounting collar 1064 connects feed pump 1012 to top 1050 of fluid tank 1020. Below mounting collar 1064 (e.g., in axial direction AD1), lower portion 1054 of feed pump 1012 extends axially into fluid tank 1020 along axis PA. Above mounting collar 1064 (e.g., in axial direction AD2), upper portion 1052 of feed pump 1012 extends axially above fluid tank 1020 and away from the interior 1048 of fluid tank 1020 along axis PA. In some examples, mounting collar 1064 can be threaded onto top 1050 of fluid tank 1020 to connect feed pump 1012 to fluid tank 1020. It is understood, however, that feed pump 1012 can be supported relative to fluid tank 1020 in any desired manner Handles 1065 extend radially outward from mounting collar 1064 relative axis PA. A user can use handles 1065 to grip and turn feed pump 1012 while threading mounting collar 1064 onto top 1050.

Fluid outlet manifold 1062 is disposed axially between electric motor 1056 and displacement assembly 1070 relative to axis PA. Tubes 1072 attach displacement assembly 1070 to fluid outlet manifold 1062 and provide fluid passages that allow displacement assembly 1070 to fluidically communicate with fluid outlet manifold 1062. Tubes 1072 receive fluid from displacement assembly 1070 and provide the fluid to outlet manifold 1062. In some examples, tie rods 1066 mechanically attach fluid outlet manifold 1062 directly to a housing of electric motor 1056. In other examples, tie rods 1066 attach fluid outlet manifold 1062 to a portion of bearing assembly 1058 that is connected to the housing of electric motor 1056. Bearing assembly 1058 is axially between electric motor 1056 and fluid outlet manifold 1062 and is disposed coaxially on axis PA with electric motor 1056.

Bearing assembly 1058 is disposed axially between electric motor 1056 and fluid tank 1020. Bearing assembly 1058 is configured to receive axial thrust loads generated during pumping, which loads can also be referred to as pump reaction loads transmit those loads to structural components, such as tie rods 1066, to isolate electric motor 1056 from those loads. Clocking assembly 1060 is axially between bearing assembly 1058 and fluid outlet manifold 1062 and is disposed coaxially with bearing assembly 1058 on axis PA. Clocking assembly 1060 is axially between electric motor 1056 and top 1050 of fluid tank 1020. Clocking assembly 1060 is configured to prevent rotation of the linearly displacing components of feed pump 1012 about axis PA. As discussed below with reference to FIGS. 12A and 12B, a drive mechanism connects drive shaft 1068 with a rotor shaft of electric motor 1056.

Figure 12A:
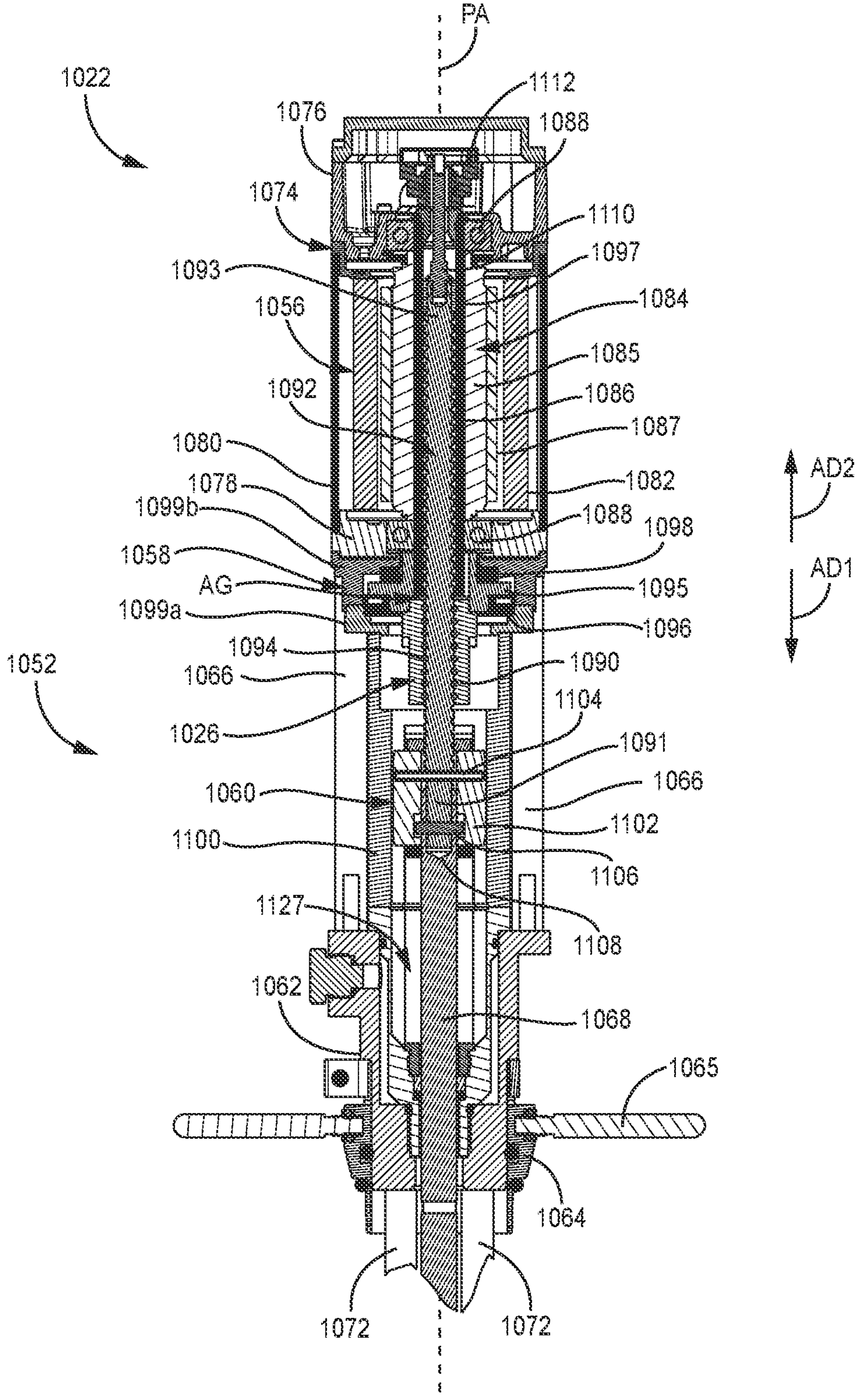
FIG. 12A is a cross-sectional view of an upper portion of the feed pump from FIG. 11 showing an electric motor, a drive mechanism, a bearing assembly, and a clocking assembly of the feed pump.
Figure 12B:
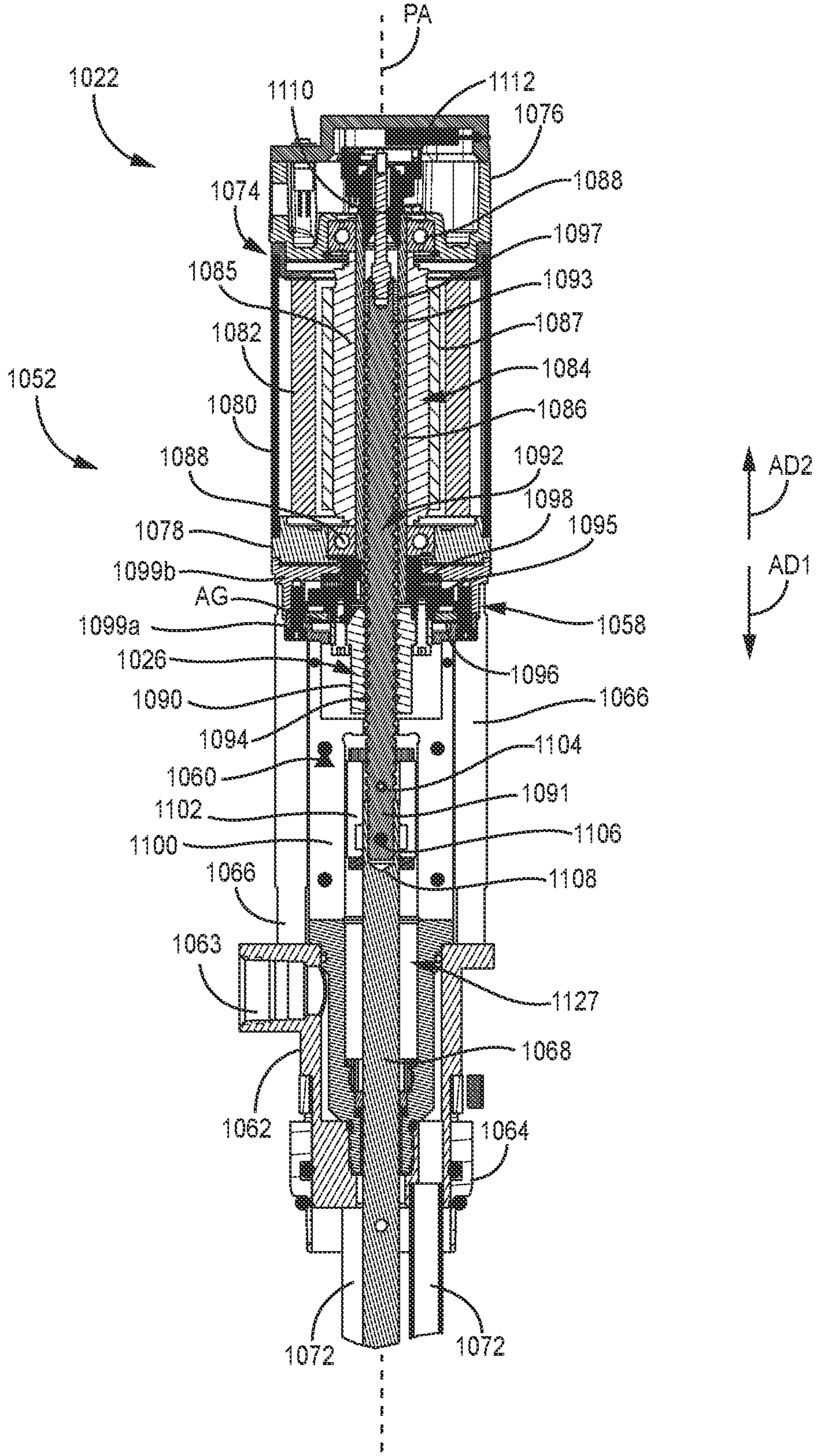
FIG. 12B is a cross-sectional view of the upper portion of the feed pump from FIG. 12A rotated 90 degrees and showing the electric motor, the drive mechanism, the bearing assembly, and the clocking assembly of the feed pump.

FIG. 12A is a cross-sectional view of upper portion 1052 of feed pump 1012 taken along line 12-12 in FIG. 11, and FIG. 12B is a cross-sectional view of upper portion 1052 rotated 90-degrees from the view shown in FIG. 12A. FIGS. 12A and 12B will be discussed together. As shown in FIGS. 12A and 12B, electric motor 1056 includes housing 1074 with first end cap 1076, second end cap 1078, and side wall 1080. Electric motor 1056 also includes stator 1082, rotor 1084, rotor shaft 1086, and bearings 1088. Feed pump 1012 also includes drive mechanism 1026. Drive mechanism 1026 includes drive nut 1090, screw 1092, and rolling elements 1094. Screw 1092 includes second end 1093 and first end 1091. Spacer 1097 is disposed about second end

1093 of screw 1092. Bearing assembly 1058 includes sleeve coupler 1095, first roller bearing subassembly 1096, second roller bearing subassembly 1098, first housing 1099*a*, and second housing 1099*b*. Clocking assembly 1060 includes clocking housing 1100, collar 1102, anti-rotation pin 1104, and link pin 1106. Collar 1102, anti-rotation pin 1104, and screw 1092 can be considered to form a clocking mechanism. Drive shaft 1068 includes hollow end 1108. Feed pump 1012 also includes switch pin 1110 and direction control switch 1112.

Electric motor 1056 includes stator 1082 and rotor 1084. Electric motor 1056 is substantially similar to electric motor 24 (FIGS. 1A-2D and 5-6B) except that electric motor 1056 includes an inner rotator where rotor 1084 is disposed within stator 1082. It is understood, however, that some examples of electric motor 1056 include an outer rotator similar to electric motor 24.

Stator 1082 and rotor 1084 are disposed within housing 1074. Stator 1082 includes armature windings (not shown) and is fixed to housing 1074 such that stator 1082 does not rotate about axis PA. Rotor 1084 includes permanent magnet array 1087 disposed on and extending circumferentially about rotor body 1085. Rotor 1084 is configured to rotate about axis PA within housing 1074 in response to a current (such as a direct current (DC) signals and/or alternating current (AC) signals) through stator 1082. Rotor 1084 is configured to rotate about axis PA in response to the current through stator 1082. Each of stator 1082 and rotor 1084 are coaxial with axis PA. Rotor 1084 is disposed within stator 1082 such that electric motor 1056 includes an inner rotator. As such, the permanent magnet array 1087 is disposed on the radially outer side of rotor body 1085 relative to axis PA. It is understood, however, that electric motor 1056 could be configured similar to electric motor 24 such that rotor 1084 is disposed around stator 1082 and electric motor 1056 is an outer rotator. In such an example, permanent magnet array 1087 is mounted on a radially inner side of rotor body 1085 relative to axis PA.

Electric motor 1056 is a reversible motor in that stator 1082 can cause rotor 1084 to rotate in either of two rotational directions about axis PA (e.g., clockwise and counterclockwise). Rotor 1084 is connected to rotor shaft 1086 such that rotor shaft 1086 rotates with rotor 1084. Rotor shaft 1086 extends axially on axis PA from first end cap 1076 and through second end cap 1078. Rotor shaft 1086 is disposed coaxially with rotor 1084 and extends through body 1085 of rotor 1084. Rotor shaft 1086 is disposed coaxially with drive shaft 1068 on axis PA. Rotor shaft 1086 is disposed coaxially with an axis of reciprocation of the fluid displacement member of feed pump 1012 (e.g., piston 1115). Rotor shaft 1086 can have a greater axial length than body 1085 of rotor 1084 along axis PA. Rotor shaft 1086 can be fixed to rotor body 1085 for simultaneous rotation, such as by press-fitting, adhesive, or fasteners, among other options.

Side wall 1080 axially spaces first end cap 1076 from second end cap 1078 along axis PA and extends circumferentially around stator 1082, rotor 1084, and rotor shaft 1086. Bearings 1088 interface with and support rotor shaft 1086. In the example shown, bearings 1088 are supported by housing 1074. More specifically, bearings 1088 are supported by first end cap 1076 and second end cap 1078 of housing 1074. Bearings 1088 support rotation of rotor 1084. In the example shown, bearings 1088 are connected to rotor shaft 1086 and housing 1074 and facilitate relative rotation between the rotating components of electric motor 1056 (rotor 1084 and rotor shaft 1086) and the static components of electric motor 1056 (e.g., stator 1082, housing 1080, and end caps 1076, 1078).

Rotor shaft 1086 is connected to drive shaft 1068 by drive mechanism 1026 and bearing assembly 1058. Drive mechanism 1026 is configured to receive the rotational output from motor 1056 via rotor shaft 1086 and to convert that rotational output into a linear input to drive shaft 1068. As described in greater detail in the discussion of FIGS. 13A-13C, drive shaft 1068 is connected to a fluid displacement member (e.g., a piston) in displacement assembly 1070 such that drive shaft 1068 drives reciprocation of the fluid displacement member along axis PA due to the linear input from drive mechanism 1026. Drive shaft 1068 reciprocates axially along axis PA of feed pump 1012 and is coaxial with rotor shaft 1086 and drive mechanism 1026. The axis of rotation of rotor 1084 and the axis of reciprocation of drive shaft 1068 are coaxial with each other and coaxial with the axis PA.

Bearing assembly 1058 connects rotor shaft 1086 to drive mechanism 1026. Bearing assembly 1058 isolates electric motor 1056 (including rotor shaft 1086 and rotor 1084) from axial thrust loads generated by displacement assembly 1070 during operation and transmitted along drive shaft 1068 and drive mechanism 1026, which thrust loads form pump reaction forces. Bearing assembly 1058 isolates rotor shaft 1086 and rotor 1084 from these thrust loads by transferring the thrust loads to the stationary, structural portions of feed pump 1012 (e.g., tie rods 1066 and fluid outlet manifold 1062) and thus to fluid tank 1020. Isolating rotor shaft 1086 from the thrust loads of displacement assembly 1070 reduces wear on electric motor 1056 and increases the operational life of electric motor 1056. Bearing assembly 1058 is described in greater detail in the discussion referencing FIGS. 15-16B.

As shown in FIGS. 12A and 12B, drive mechanism 1026 includes drive nut 1090, rolling elements 1094, and screw 1092. Drive nut 1090 is coaxial with rotor shaft 1086 and is connected to rotor shaft 1086 by bearing assembly 1058. More specifically, drive nut 1090 and rotor shaft 1086 are each coupled to sleeve coupler 1095. In the example shown, drive nut 1090 is cantilevered from sleeve coupler 1095 and extends axially along axis PA. Sleeve coupler 1095, drive nut 1090, and rotor shaft 1086 are rotationally fixed relative to one another such that sleeve coupler 1095, drive nut 1090, and rotor shaft 1086 rotate in unison. Sleeve coupler 1095 is coupled to rotor shaft 1086 such that rotor shaft 1086 drives rotation of sleeve coupler 1095 when rotor 1084 rotates about axis PA. Drive nut 1090 is coupled to sleeve coupler 1095 such that sleeve coupler 1095 drives rotation of drive nut 1090 about axis PA. Rotor 1084, rotor shaft 1086, sleeve coupler 1095, and drive nut 1090 are disposed coaxially on axis PA.

Drive nut 1090 is axially spaced from rotor shaft 1086 along axis PA such that axial gap AG exists between drive nut 1090 and rotor shaft 1086 during operation. Drive nut 1090 does not directly contact rotor shaft 1086. In some examples, drive nut 1090 is fixed to sleeve coupler 1095 such that drive nut 1090 is prevented from moving axially along axis PA relative to sleeve coupler 1095. In some examples, rotor shaft 1086 is not axially fixed to sleeve coupler 1095 such that rotor shaft 1086 can instead float relative to sleeve coupler 1095. However, rotor shaft 1086 is rotationally fixed to sleeve coupler 1095 such that rotor shaft 1086 and sleeve coupler 1095 rotate together on axis PA. Axial gap AG is a variable gap that can expand and contract axially, such that the axial distance between rotor shaft 1086 and drive nut 1090 can grow and shrink during operation. However, sleeve coupler 1095 is configured such that axial gap AG is present throughout operation such that rotor shaft 1086 and drive nut 1090 do not contact. Drive nut 1090 forms a rotating element of drive mechanism 90. Maintaining axial gap AG prevents drive nut 1090 from transferring pump reaction forces to rotor shaft 1086, and thus to rotor 1084, during operation.

Screw 1092 is elongate along axis PA and disposed on axis PA. Screw 1092 extends axially through drive nut 1090 and is coaxial with drive nut 1090 on axis PA. Screw 1092 extends in both first axial direction AD1 and second axial direction AD2 relative to drive nut 1090. Screw 1092 is configured to only one of linearly translate along or rotate on axis PA. While screw 1092 is generally discussed as linearly translating along axis PA, it is understood that, in some examples, screw 1092 can on about axis PA without translating along axis PA. For example, a nut can be connected to the rotating screw 1092 and the nut can be clocked to prevent the nut from rotating about axis PA, such as by clocking assembly 1060. Rotation of screw 1092 causes the nut to translate axially along axis PA. The nut can be connected to piston 1113 to cause reciprocation of piston 1113 along axis PA. The nut can translate in each of first axial direction AD1 and second axial direction AD2 based on the rotational direction of screw 1092 such that reversing screw 1092 causes the nut to translate in a different axial direction.

Rolling elements 1094 are disposed radially between screw 1092 and drive nut 1090. Rolling elements 1094 can be of any configuration suitable for causing linear displacement of screw 1092 based on rotation of drive nut 1090. For example, rolling elements 1094 can be formed by balls or elongate rollers, among other options. Rolling elements 1094 engage the thread of screw 1092 to drive linear displacement of screw 1092 along axis PA. In some examples, rolling elements 1094 are disposed in raceways formed by opposing threads on drive nut 1090 and screw 1092. Rolling elements 1094 are disposed circumferentially about screw 1092 and evenly arrayed around screw 1092. Rolling elements 1094 maintain a radial gap between drive nut 1090 and screw 1092 such that drive nut 1090 does not directly contact screw 1092. Instead, both drive nut 1090 and screw 1092 ride on rolling elements 1094. Rolling elements 1094 maintain the radial gap, such as gap 118 (FIG. 18, between drive nut 1090 and screw 1092. Drive nut 1090 receives the rotational output from electric motor 1056 and screw 1092 provides the linear output from drive mechanism 1026.

Rotor shaft 1086, bearing assembly 1058, drive nut 1090, screw 1092, and drive shaft 1068 are all coaxially aligned on axis PA of feed pump 1012. Screw 1092 extends axially on axis PA from first end 92 to first end 1091. Screw 1092 extends through drive nut 1090, through bearing assembly 1058, and into electric motor 1056. Screw 1092 axially overlaps with bearing assembly 1058 and reciprocates relative to bearing assembly 1058.

As shown in FIGS. 12A and 12B, rotor shaft 1086 is a hollow tube, and screw 1092 extends into the cavity of rotor shaft 1086 such that second end 1093 of screw 1092 is disposed within the center cavity of rotor shaft 1086. Screw 1092 thus extends into a cavity within electric motor 1056. At least a portion of screw 1092 is disposed within the central cavity of motor 1056. Spacer 1097 is disposed on second end 1093 of screw 1092 and is radially between screw 1092 and rotor shaft 1086. Spacer 1097 contacts each of screw 1092 and rotor shaft 1086. Spacer 1097 is disposed axially between the two motor bearings 1088. The axial distance between spacer 1097 and each motor bearing 88 changes throughout operation. One of the motor bearings 1088 and bearing assembly 1058 are spaced in first axial direction AD1 from spacer 1097 and the other motor bearing 88 is spaced in second axial direction AD2 from spacer 1097.

Spacer 1097 can be a damper, bumper, bushing, or linear bearing that prevents second end 1093 from wobbling inside rotor shaft 1086 as screw 1092 reciprocates axially up and down along axis PA. Spacer 1097 forms a low friction interface configured to not transfer rotational moment from rotor shaft 1086 to screw 1092. Spacer 1097 supports second end 1093 relative to rotor shaft 1086 to minimize any unsupported length of screw 1092. Screw 1092 is supported on axis PA by spacer 1097 and drive nut 1090 and spans between spacer 1097 and drive nut 1090. Screw 1092 extends though drive nut 1090 such that driver nut 1090 is disposed axially between second end 1093 and first end 1091. In the example shown, spacer 1097 is fixed to screw 1092 such that spacer 1097 reciprocates with screw 1092 along axis PA. Spacer 1097 is disposed between screw 1092 and rotor shaft 1086 such that screw 1092 does not directly contact rotor shaft 1086. As such, drive mechanism 1026 does not directly contact any portion of rotor 1084 during operation. Spacer 1097 can be formed from a non-ferrous material to prevent interference with operation of motor 1056. In some examples, spacer 1097 is formed from a plastic. In one example, spacer 1097 is formed from polyether ether ketone (PEEK).

Screw 1092 reciprocates within rotor shaft 1086 during operation. Screw 1092 displaces in each of first axial direction AD1 and second axial direction AD2 along axis PA. The axial overlap between screw 1092 and rotor shaft 1086 increases as screw 1092 displaces in second axial direction AD2 and decreases as screw 1092 displaces in first axial direction AD1. During at least a portion of the stroke of screw 1092, at least a portion of screw 1092 axially overlaps with each of rotor 1084, rotor shaft 1086, and stator 1082 such that a radial line extending from axis PA would pass through each of screw 1092, rotor shaft 1086, rotor 1084, permanent magnet array 1087, and stator 1082.

First end 1091 of screw 1092 is connected to drive shaft 1068. Drive shaft 1068 can form a piston shaft of piston 1113. Screw 1092 is connected to drive shaft 1068 to cause axial displacement of drive shaft 1068 along axis PA. Drive shaft 1068 is elongate along axis PA and disposed coaxially with screw 1092 on axis PA. As shown in FIGS. 12A and 12B, end 1108 of drive shaft 1068 is hollow and is sized to be received by first end 1091 of screw 1092. Link pin 1106 extends through hollow end 1108 of drive shaft 1068 and first end 1091 of screw 1092 to fasten drive shaft 1068 to screw 1092. In other embodiments, first end 1091 of screw 1092 can be hollow and sized to receive end 1108 of drive shaft 1068. In the example shown, link pin 1106 extends through and connects screw 1092 and drive shaft 1068. It is understood that screw 1092 and drive shaft 1068 can be connected in any desired manner, such as by press-fitting, fasteners, or adhesive, among other options.

Clocking assembly 1060 is connected to screw 1092 and configured to prevent screw 1092 from rotating about axis PA. Rotation of drive nut 1090 generates a rotational force on screw 1092 that is resisted by clocking assembly 1060. Clocking assembly 1060 preventing rotation of screw 1092 on axis PA causes screw 1092 to displace linearly along axis PA due to rotation of drive nut 1090.

Clocking assembly 1060 is disposed axially between fluid outlet manifold 1062 and bearing assembly 1058. Clocking assembly 1060 is disposed axially between drive nut 1090 and displacement assembly 1070 (best seen in FIGS. 13A and 13B). Clocking assembly 1060 is disposed around screw 1092 proximate first end 1091 of screw 1092. Clocking assembly 1060 is connected to screw 1092 to prevent rotation of screw 1092 and drive shaft 1068 about axis PA. Collar 1102 is connected to screw 1092 such that collar 1102 and screw 1092 are rotationally fixed together relative axis PA. The interface between screw 1092 and drive shaft 1068 is covered by collar 1102. Collar 1102 further covers the ends of link pin 1106 to secure link pin 1106 in position and thus secure the connection between screw 1092 and drive shaft 1068 by link pin 1106.

Clocking assembly 1060 includes clocking housing 1100 that is connected to a housing of bearing assembly 1058 and/or fluid outlet manifold 1062. Clocking housing 1100 is stationary and does not rotate or move relative axis PA. A chamber is formed inside clocking housing 1100 and collar 1102 of clocking assembly 1060 is disposed inside the chamber. Collar 1102 is configured to slide axially along axis PA within the chamber. As shown in FIGS. 12A and 12B, the chamber can also extend into a portion of fluid outlet manifold 1062 to make the chamber longer and allow collar 1102 to slide a longer distance along axis PA.

Anti-rotation pin 1104 extends through collar 1102 and screw 1092 transverse to axis PA. Anti-rotation pin 1104 rotationally fixes screw 1092 to collar 1102 to prevent rotation of screw 1092 relative to collar 1102. As described in greater detail below with reference to FIGS. 17A-17C, clocking assembly 1060 includes an anti-rotation interface between collar 1102 and clocking housing 1100 that prevents collar 1102 from rotating relative clocking housing 1100 and about axis PA. Clocking assembly 1060 ensures that screw 1092 and drive shaft 1068 reciprocate axially on axis PA and do not rotate with drive nut 1090 and rotor shaft 1086 because screw 1092 is connected to collar 1102 and is unable to rotate relative to collar 1102, because collar 1102 interfaces with clocking housing 1100 and is unable to rotate relative to clocking housing 1100, and because clocking housing 1100 is fixed and unable to rotate relative axis PA.

Switch pin 1110 is connected to second end 1093 of screw 1092 and is disposed at least partially inside rotor shaft 1086. Switch pin 1110 can extend axially beyond the end of rotor shaft 1086 oriented towards first end cap 1076. As such, the linear displacement member of drive mechanism 1026 can be considered to extend beyond each axial end of rotor shaft 1086, in some examples. Direction control switch 1112 is disposed in first end cap 1076 of housing 1074 of electric motor 1056. During operation, the electrical current in stator 1082 causes rotor 1084 (and thus rotor shaft 1086, sleeve coupler 1095, and drive nut 1090) to rotate in a first rotational direction (e.g., in one of the clockwise and counterclockwise direction). Rotor 1084 rotates and drives rotation of rotor shaft 1086 due to the connection of rotor 1084 and rotor shaft 1086. Rotor shaft 1086 drives rotation of sleeve coupler 1095 due to the interface between rotor shaft 1086 and sleeve coupler 1095. Sleeve coupler 1095 drives rotation of drive nut 1090 due to the connection between sleeve coupler 1095 and drive nut 1090. Drive nut 1090 exerts axial force on screw 1092 via rolling elements 1094 to drive screw 1092 linearly along axis PA. Screw 1092 causes drive shaft 1068 to move axially due to the connection between screw 1092 and drive shaft 92.

Rotor 1084 rotating in the first rotational direction cause screw 1092 to shift upward in the second axial direction AD2 along axis PA and towards first end cap 1076. As screw 1092 and drive shaft 1068 move axially upward on axis PA toward first end cap 1076, switch pin 1110 can contact direction control switch 1112. When switch pin 1110 contacts direction control switch 1112, direction control switch 1112 generates a signal and provides that signal to controller 1029 (FIG. 10B) causing controller 1029 to provide current to stator 1082 to cause rotor 1084 to rotate in a second rotational direction opposite the first rotational direction (e.g., the other of clockwise and counterclockwise). Rotating rotor 1084 in the second rotational direction causes rotor shaft 1086, sleeve coupler 1095 and drive nut 1090 to rotate in the second rotational direction. With the direction of rotation changed for drive nut 1090, drive nut 1090 exerts an axial force on screw 1092 via rolling elements 1094 to drive screw 1092 linearly along axis PA and in first axial direction AD1. Screw 1092 and drive shaft 1068 are driven axially downward on axis PA and away from first end cap 1076 of housing 1074 of electric motor 1056. The direction of rotation will change again (e.g., back to the first one of clockwise and counterclockwise) when screw 1092 and drive shaft 1068 reach a bottom of a downstroke of feed pump 1012. Switch pin 110 and switch 1112 form a position sensor configured to indicate when the fluid displacement member is at the end of an upstroke.

The bottom of a stroke in first axial direction AD1 can be set and adjusted by controller 1029. Controller 1029 can determine when screw 1092 and drive shaft 1068 have reached the bottom of the pump stroke based on a count of the rotations of rotor 1084, drive nut 1090, and/or rotor shaft 1086 (via a position sensor, such as an encoder or Hall-effect sensor, among other options). Each rotation of rotor 1084 is associated with a set axial displacement of screw 1092 such that the total axial displacement can be calculated based on the rotations (full or partial) of rotor 1084. In some examples, controller 1029 determines the axial distance traveled by screw 1092 based on the number of rotations since the last instance switch pin 1110 contacted direction control switch 1112.

As discussed in more detail below, screw 1092 actuates piston 1113 to cause pumping by displacement assembly 1070. Drive shaft 1068 extends between screw 1092 and piston 1113 and can be considered to form at least a portion of a piston rod 1127 of piston 1113.

Rotor 1084 and drive mechanism 1026 are sized to provide a desired revolution to stroke ratio. In some examples, rotor 1084 and drive mechanism 1026 are sized such that one revolution of rotor 1084 results in a full stroke of piston 1113 in one of first axial direction AD1 and second axial direction AD2. A full revolution in an opposite rotational direction results in a full stroke of piston 1113 in the opposite axial direction. As such, two revolutions in opposite directions can provide a full pump cycle of piston 1113. Feed pump 1012 can thereby provide a 1:1 ratio between revolutions of rotor 1084 and pumping strokes.

It is understood, however, that rotor 1084 and drive mechanism 1026 can be sized to provide any desired revolution to stroke ratio. It is further understood that controller 1029 can control operation of motor 1056 such that the actual stroke length is dynamic and varies can during operation. Controller 1029 can cause the stroke length to vary between the downstroke and the upstroke. In some examples, controller 1029 is configured to control operation between a maximum revolution to stroke ratio and a minimum revolution to stroke ratio. Feed pump 1012 can be configured to provide any desired revolution to stroke ratio. In some examples, feed pump 1012 provides a revolution to stroke ratio of up to about 4:1. It is understood, however, that other maximum revolution to stroke ratios are possible, such as about 1:1, 2:1, 3:1, or 5:1, among other options. In some examples, feed pump 1012 can provide a revolution to stroke ratio between about 0.25:1-7:1. It is understood that any of the ranges discussed can be an inclusive range such that the boundary values are included within the range. It is further understood that each of the ranges discussed can vary from the specified range while still falling within the scope of this disclosure.

Motor 1056 and drive mechanism 1026 can be configured to displace piston 1113 at least about 6.35 mm (about 0.25 in.) per rotor revolution. In some examples, motor 1056 and drive mechanism 1026 are configured to displace piston 1113 between about 8.9-30.5 mm (about 0.35-1.2 in.) per rotor revolution. In some examples, motor 1056 and drive mechanism 1026 are configured to displace piston 1113 between about 8.9-11.4 mm (about 0.35-0.45 in.) per rotor revolution. In some examples, motor 1056 and drive mechanism 1026 are configured to displace piston 1113 between about 19-21.6 mm (about 0.75-0.85 in.). In some examples, motor 1056 and drive mechanism 1026 are configured to displace piston 1113 between about 24.1-26.7 mm (about 0.95-1.05 in.). The axial displacement per rotor revolution provided by feed pump 1012 facilitates precise control and quick responsiveness during pumping. The axial displacement per rotor revolution facilitates quick changeover and provides more efficient pumping while reducing wear on components of feed pump 1012.

Feed pump 1012 is configured to pump according to a revolution to displacement ratio. More specifically, motor 1056 and drive mechanism 1026 are configured to provide a desired revolution to displacement ratio between revolutions of rotor 1084 and the linear travel distance of piston 1113, as measured in inches, for each revolution of rotor 1084. In some examples, the revolution to displacement ratio (rev/in.) is less than about 4:1. In some examples, the revolution to displacement ratio is between about 0.85:1 and 3.25:1. In some examples, the revolution to displacement ratio is between about 1:1-3:1. In some examples, the revolution to displacement ratio is between about 1:1-2.75:1. In some examples, the revolution to displacement ratio between is about 1:1-2.55:1. In some examples, the revolution to displacement ratio is between about 1:1-1.3:1. In some examples, the revolution to displacement ratio is between about 0.9:1-1.1:1. In some examples, the revolution to displacement ratio is between about 2.4:1-2.6:1. The low revolution to displacement ratio provided by feed pump 1012 relative to other electrically-powered pumps, such as crank-powered pumps that require reduction gearing to generate sufficient pumping torque and typically have revolution to displacement ratios of about 8:1 or higher, facilitates more efficient pumping, generates less wear, and provides quick responsiveness for changing stroke direction. Rotor 1084 can be driven at a lower rotational speed to generate the same linear speed, thereby generating less heat during operation.

Figure 13A:
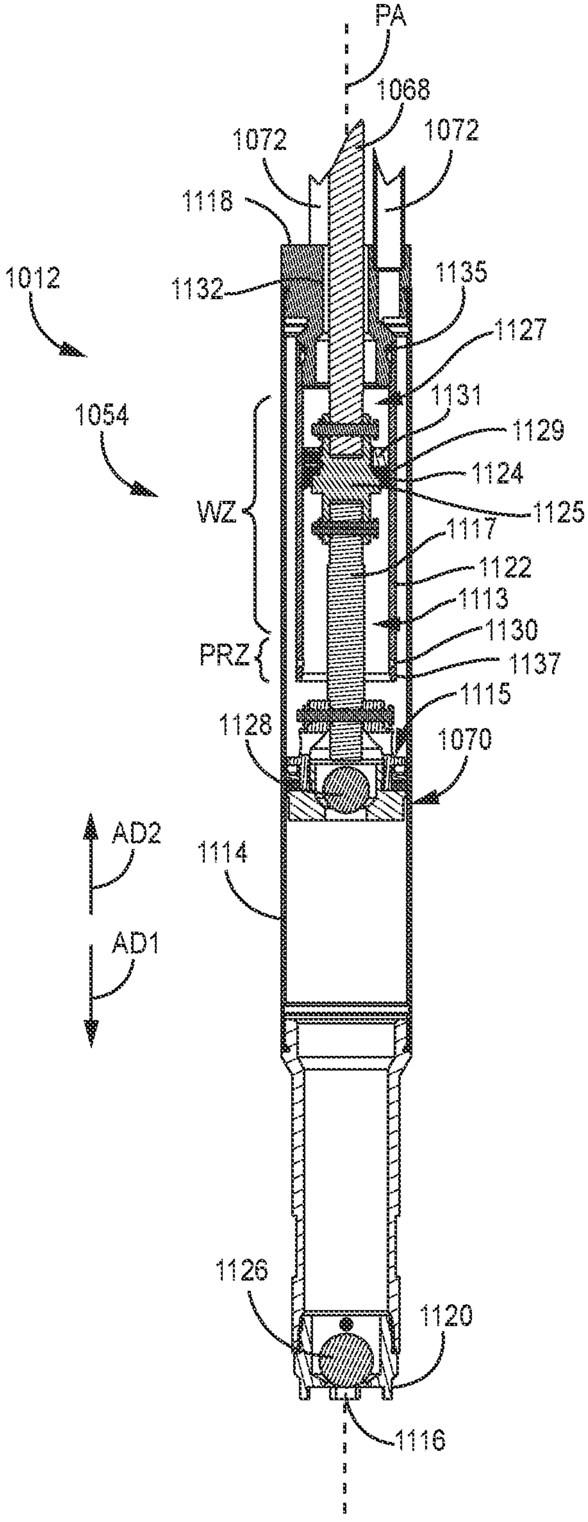
FIG. 13A is a cross-sectional view of a lower portion of the feed pump from FIG. 11 showing a drive shaft, a piston, a seal, and check valves of the feed pump.
Figure 13B:
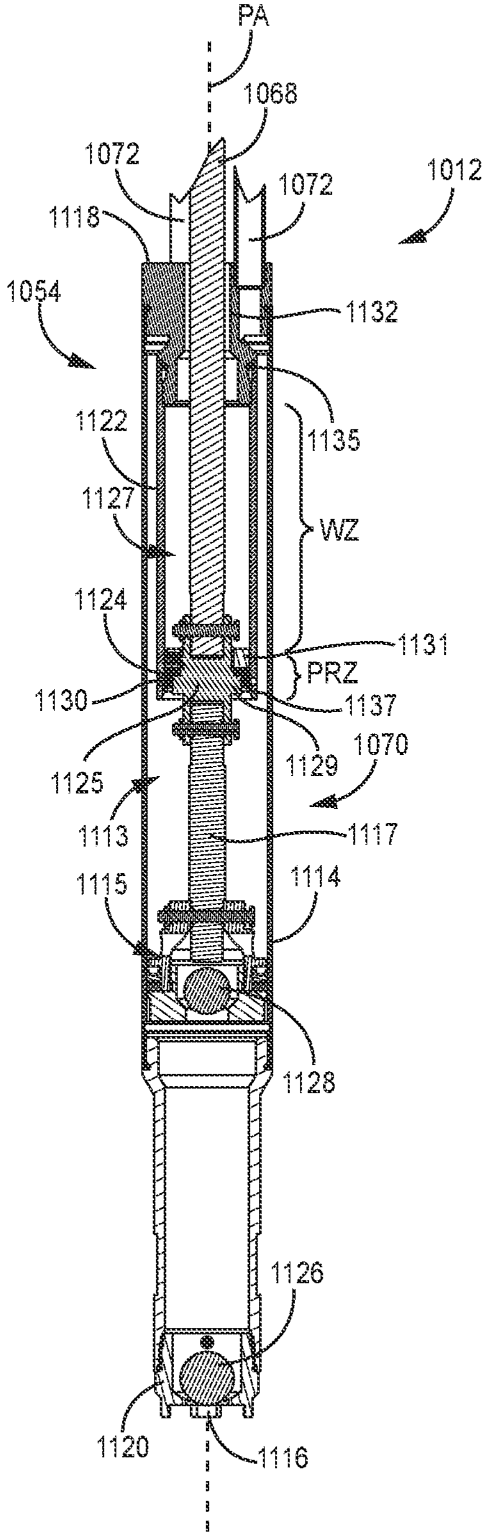
FIG. 13B is another cross-sectional view of the lower portion of the feed pump from FIG. 13A showing the drive shaft, the piston, and the seal in a pressure relief position.
Figure 13C:
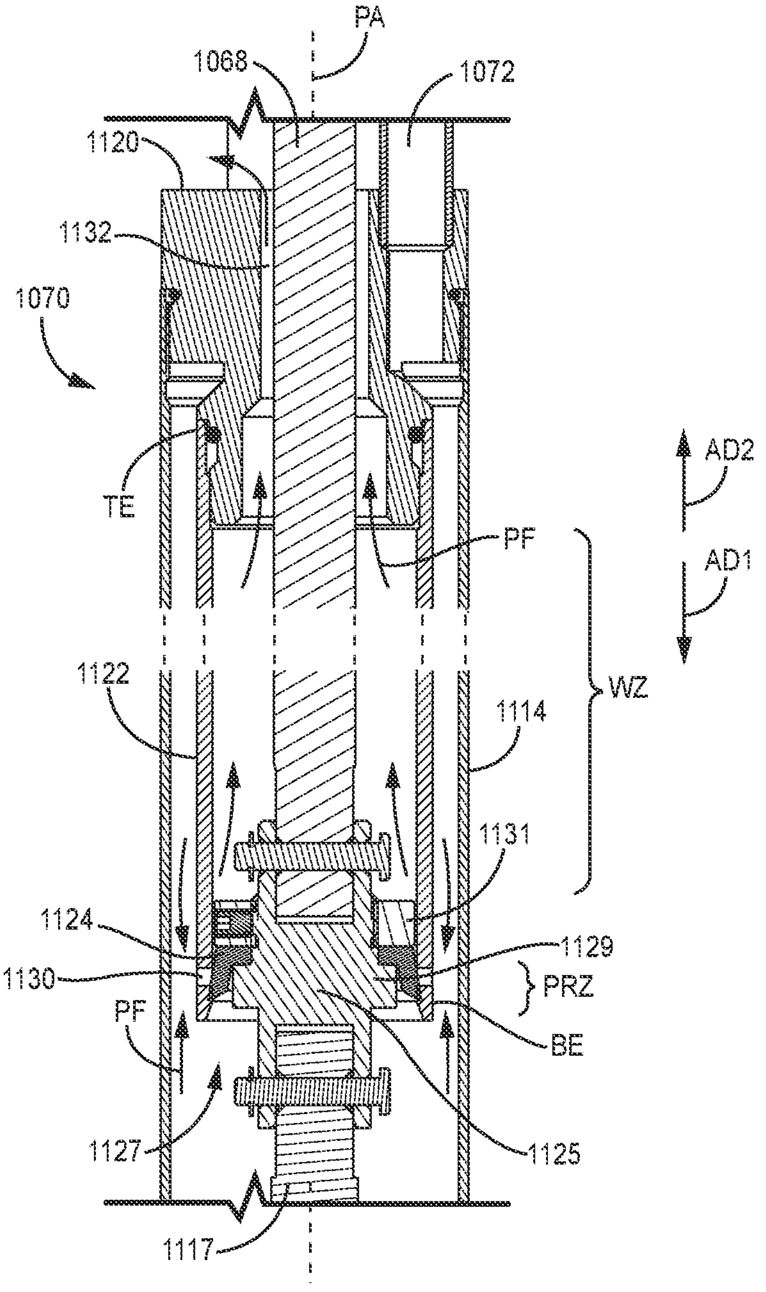
FIG. 13C is an enlarged cross-sectional view of the lower portion of the feed pump from FIG. 13B showing the seal in a pressure relief position.

FIGS. 13A and 13B are cross-sectional views of lower portion 1054 of feed pump 1012. FIG. 13C is an enlarged cross-sectional view of lower portion 1054. FIGS. 13A-13C will be discussed concurrently. As shown in FIGS. 13A and 13B, displacement assembly 1070 of feed pump 1012 includes piston 1113, piston housing 1114, and pump inlet 1116. Piston housing 1114 includes upper end 1118 and lower end 1120. Piston 1113 includes piston head 1115 and piston rod 1127. Displacement assembly 1070 also includes seal housing 1122, seal 1124, first check valve 1126, and second check valve 1128. Seal housing 1122 includes pressure relief ports 1130, top end 1135, bottom end 1137, working zone WZ, and pressure release zone PRZ. Opening 132 is formed in upper end 1118 of piston housing 1114. As discussed below, pressure relief ports 1130 facilitate depressurizing feed pump 1012, such as when feed pump 1012 requires maintenance or storage.

Piston housing 1114 extends axially on axis PA of feed pump 1012 and provides a piston chamber that encloses piston 113. Piston housing 1114 extends axially between upper end 1118 and lower end 1120. Piston housing 1114 can be cylindrical and be disposed coaxially with rotor 1084. Opening 1132 extends axially through upper end 1118 and is disposed coaxially on axis PA. Piston rod 1127 extends axially between screw 1092 and piston head 1115. Drive shaft 1068 extends through opening 1132 to connect with piston head 1115. As discussed above, drive shaft 1068 can be considered to form part of piston rod 1127. As such, piston rod 1127 extends out of displacement assembly 1070 to connect with drive mechanism 1026. Opening 1132 is sufficiently larger in diameter than drive shaft 1068 to form a radial gap between drive shaft 1068 and upper end 1118 of piston housing 1114. As such, drive shaft 1068 does not directly or indirectly contact piston housing 1114 along the axial length of opening 132.

Pump inlet 1116 is formed in lower end 1120 of piston housing 1114. First check valve 1126 is disposed at pump inlet 1116. In the example shown, first check valve 1126 is a one-way ball valve that is configured to prevent back flow through pump inlet 1116. It is understood, however, that check valve 1126 can be formed in any desired manner, such as by a flapper valve, disk valve, etc. Piston 1113 is disposed inside piston housing 1114 between upper end 1118 and lower end 1120. Piston 1113 is connected to drive shaft 1068 and reciprocates inside piston housing 1114 along axis PA when drive shaft 1068 is actuated by electric motor 1056 and drive mechanism 1026 as discussed above with reference to FIGS. 12A and 12B. Second check valve 1128 is integrated into piston 1113 and moves axially along axis PA with piston 1113. In the example shown, second check valve 1128 is a one-way ball valve that is configured to allow flow across piston 1113 toward upper end 1118 of piston housing 1114 and prevent back flow towards lower end 1120 of piston housing 1114. It is understood, however, that second check valve 1128 can be of any desired configuration, such as a flapper valve or disk valve, among other options. First check valve 1126 and second check valve 1128 are disposed coaxially on axis PA with piston 1113. First check valve 1126 and second check valve 1128 are thereby disposed coaxially on axis PA with electric motor 1056.

Displacement assembly 1070 is a double displacement pump such that displacement assembly 1070 outputs fluid during both an upstroke in second axial direction AD2 and a downstroke in first axial direction AD1. During the upstroke, first check valve 1126 is open and second check valve 1128 is closed. During the downstroke, first check valve 1126 is closed and second check valve 1128 is open. Piston 1113 reciprocates on axis PA and can be elongate along, cylindrical, and coaxial with axis PA.

Lower shaft 1117 extends from drive shaft 1068 and is disposed coaxially with drive shaft 1068 on axis PA. More specifically, lower shaft 1117 and drive shaft 1068 are each connected to seal support 1125. Piston head 1115 is disposed at an end of lower shaft 1117 axially opposite drive shaft 1068. Piston head 1115 interfaces with piston housing 1114 to form a sliding seal. In some examples, a sealing element is mounted on piston head 1115 to travel with piston head

1115 and create the fluid tight seal between piston head 1115 and piston housing 1114. Piston head 1115 divides piston housing 1114 into an upstream chamber, between lower end 1120 and piston head 1115, and a downstream chamber, between piston head 1115 and upper end 1118. The volumes of the upstream and downstream chambers vary during pumping as piston 1113 reciprocates on axis PA. As such, the interface between piston head 1115 and piston housing 1114 can form a first dynamic seal of displacement assembly 1070. Second check valve 1128 is disposed in piston head 1115.

Seal housing 1122 is disposed inside piston housing 1114 and is positioned axially between piston head 1115 and upper end 1118 of piston housing 1114. Piston 1113 extends through seal housing 1122. Seal housing 1122 is tubular and extends axially between top end 1135 and bottom end 1137 and is coaxially aligned with piston housing 1114 on axis PA. Top end 1135 of seal housing 1122 is connected to upper end 1118 of piston housing 1114. Seal housing 1122 is smaller in diameter than piston housing 1114 and piston 1113 so as to form an annular flow path between seal housing 1122 and piston housing 1114. Seal housing 1122 is larger in diameter than opening 1132 and is coaxial with opening 1132. Seal housing 1122 extends circumferentially around drive shaft 1068 and piston 1113. The linearly displacing elements of feed pump 1012 extend fully through seal housing 1122 between top end 1135 and bottom end 1137 to connect drive mechanism 1026 to piston 1113. Seal 1124 is disposed inside seal housing 1122 and is connected to linearly displacing components of feed pump 1012. In the example shown, seal 1124 is mounted to seal support 1125 that is connected to each drive shaft 1068 and lower shaft 1117. Seal 1124 reciprocates relative seal housing 1122 during operation. As such, the interface between seal 1124 and seal housing 1122 can form a second dynamic seal of displacement assembly 1070.

Seal 1124 extends radially outward from seal support 1125 to contact an inner surface of seal housing 1122. Seal 1124 forms a fluid-tight seal with seal housing 1122 to prevent pressurized fluid in the downstream chamber of piston housing 1114 from flowing around seal 1124 to outlet 1132. For example, seal 1124 can be an elastomeric cup seal with flanges extending generally axially from a base. In the example shown, the flanges extend generally axially towards lower end 1120 such that the cup of seal 1124 is oriented in first axial direction AD1 towards piston head 1115. Flange 1129 extends radially from a body of seal support 1125. Seal 1124 is disposed on a side of flange 1129 facing top end 1135 and portions of seal 1124 extend axially over and surround at least a portion of an exterior radial surface of flange 1129. Mounting ring 1131 is disposed on seal support 1125 and secures seal 1124 on seal support 1125. For example, mounting ring 1131 can be a threaded ring configured to connect to seal support 1125 by interfacing threading. In some examples, mounting ring 1131 is fixed to seal support 1125 by a set screw or other fastener. Seal 1124 can be sandwiched axially between mounting ring 1131 and flange 1129.

Pressure relief ports 1130 extend radially through seal housing 1122 proximate bottom end 1137 of seal housing 1122. Working zone WZ is formed in the portion of seal housing 1122 that extends from top end 1135 to just above pressure relief ports 1130. Pressure release zone PRZ is formed in the portion of seal housing 1122 that extends from pressure relief ports 1130 to bottom end 1137 of seal housing 1122. Seal 1124 is configured to reciprocate within working zone WZ during typical operation, preventing venting of fluid to pressure relief ports 1130 and maintaining pressure in the downstream chamber of piston housing 1114.

Tubes 1072 are connected to upper end 1118 of piston housing 1114 and fluidically communicate with the annular flow path 1142 (FIG. 14A) between seal housing 1122 and piston housing 1114. Tubes 1072 fluidly connect displacement assembly 1070 to fluid outlet manifold 1062 to provide flowpaths for fluid to flow to fluid outlet manifold 1062 from displacement assembly 1070 to be output by feed pump 1012. Tubes 1072 can connect displacement assembly 1070 to outlet manifold 1062 and can support displacement assembly 1070 relative to outlet manifold 1062.

During regular operation, electric motor 1056 and drive mechanism 1026 drive displacement of drive shaft 1068 to cause drive shaft 1068 to reciprocate axially along and on axis PA. As drive shaft 1068 reciprocates on axis PA, drive shaft 1068 moves piston 1113 axially upward in second axial direction AD2 and axially downward in first axial direction AD1 inside piston housing 1114. Seal 1124 reciprocates axially with drive shaft 1068 and piston 1113 due to the connection of seal support 1125 with drive shaft 1068 and piston 1113. During regulator operation, the stroke length of feed pump 1012 is controlled such that seal 1124 reciprocates inside seal housing 1122 within working zone WZ.

As drive shaft 1068 moves axially upward in second axial direction AD2 on axis PA, piston 1113 moves upward toward upper end 1118 of piston housing. As piston 1113 moves upward, second check valve 1128 closes and first check valve 1126 opens. Fluid is drawn into the upstream chamber through first check valve 1126. Piston head 1115 moves through piston housing 1114 in first axial direction AD1, decreasing the volume of the downstream chamber and driving fluid through tubes 1072 and to outlet manifold 1062. Second check valve 1128 prevents retrograde flow from the downstream chamber to the upstream chamber. As piston 1113 moves upward, seal 1124 also moves upward inside seal housing 1122 toward upper end 1118 of piston housing 1114. Seal 1124 prevents pressurized fluid from leaking out of piston housing 1114 via opening 1132 around drive shaft 1068.

As drive shaft 1068 moves axially downward in first axial direction AD1 on axis PA, piston 1113 moves downward, second check valve 1128 opens and first check valve 1126 closes. First check valve 1126 being closed prevents retrograde flow from the upstream chamber and back into the interior 1048 of fluid tank 1020. Piston head 1115 moves through piston housing 1114 in first axial direction AD1, decreasing a volume of the upstream chamber and increasing a volume of the downstream chamber. Fluid is driven through piston head 1115 and second check valve 1128 and from the upstream chamber into the downstream chamber. Fluid is driven downstream from the downstream chamber through tubes 1072 and downstream from pump 1012 through the outlet 1063 of pump 1012 during both of the upstroke and the downstream. As such, displacement assembly 1070 is a double displacement pump that outputs fluid during each of the upstroke and the downstroke. As piston 1113 moves downward, seal 1124 moves axially downward inside seal housing 1122 within working zone WZ. Seal 1124 continues to block fluid from escaping piston housing 1114 via opening 1132. Seal 1124 does not move into pressure release zone PRZ or into contact with pressure relief ports 1130 during regular cycling of piston 1113 for pumping by feed pump 1012. Displacement assembly 1070 can include both the first dynamic seal formed by the interface between piston head 1115 and piston housing 1114 and the second dynamic seal formed by the interface between seal 1124 and seal housing 1122. In the example shown, displacement assembly 1070 does not include a static seal, which is a seal that remains static relative to axis PA, though it is understood that not all examples may be so limited.

Controller 1029 can control operation of feed pump 1012 to depressurize feed pump 1012. During the depressurization routine, controller 1029 causes over-travel of piston 1113 in first axial direction AD1 to open a vent path through displacement assembly 1070 and relieve pressure from within displacement assembly 1070. Opening the vent path allows pressurized components of and connected to feed pump 1012 to be depressurized. For example, feed lines 1024*a*, 1024*b* can vent pressure to fluid tank 1020 through outlet manifold 1062, fluid tube 1072, piston housing 1114, seal housing 1122, and outlet 1132.

When feed pump 1012 needs to be depressurized, such as during maintenance or before storage of feed pump 1012, controller 1029 can send a command to feed pump 1012 to cause rotation of rotor 1084 such that drive shaft 1068 and piston 1113 displace axially downward in first axial direction AD1. Drive shaft 1086 and piston 1113 continue to displace in first axial direction AD1 such that seal 1124 shifts in first axial direction AD1 out of working zone WZ and in to pressure release zone PRZ. Seal 1124 thus overtravels and shifts axially beyond the regular pump cycling range. With seal 1124 in pressure release zone PRZ, an edge of seal 1124 encounters and, in some examples, moves axially beyond relief ports 1130, as shown in FIGS. 13B and 13C. Seal 1124 can thereby axially overlap with relief ports 1130 during depressurization. When the edge of seal 1124 encounters relief ports 1130, pressurized fluid PF (shown by arrows in FIG. 13C) in piston housing 1114 is able to push past seal 1124, enter the portion of seal housing 1122 above seal 1124 and axially between seal 1124 and opening 1132, and exit displacement assembly 1070 through opening 1132. The pressure of the fluid in piston housing 1114 drives the pressurized fluid PF through opening 1132. The pressurized fluid PF exiting displacement assembly 1070 through opening 1132 returns to fluid tank 1020. The pressurized fluid PF dumping back to fluid tank 1020 relieves pressure within piston housing 1114 thereby depressurizing feed pump 1012.

Additional pressure is generated in piston housing 1114, fluid lines 1072, and outlet housing 1062 as piston 1113 moves through the pressure relief stroke. An over-pressurization valve 1134 is disposed on the fluid pathway between piston housing 1114 and the outlet 1063 of outlet housing 6102. Over-pressurization valve 1134 is a one-way pressure actuated valve configured to actuate to an open state to dump fluid back to the interior 1048 of fluid tank 1020, thereby preventing pressures from building to undesired levels in the fluid paths through feed pump 1012. The over-pressurization valve 1134 is discussed below with reference to FIGS. 14A and 14B.

Venting pressure by overtravel of piston 1113 provides significant advantages. Venting pressure by overtravel of piston 1113 provides a simple and safe pressure relief procedure for feed pump 1012. In addition, venting pressure from feed pump 1012 allows maintenance to be performed on those components upstream of proportioner pumps 1022*a*, 1022*b* (FIGS. 10A and 10B) without venting pressure from the full system. Relieving pressure through a vent path in displacement assembly 1070 ensures that all pressure is relieved within and downstream of displacement assembly 1070, preventing unexpected, sudden pressure release when disconnecting components. Venting pressure through displacement assembly 1070 thereby prevents sputtering and waste of fluid and provides a safer work environment. Depressurizing feed pump 1012 further removes pressure from the inlets of proportioner pumps 1022*a*, 1022*b*, thereby preventing the upstream pressure from exerting undesired pressure on the motor driving proportioner pumps 1022*a*, 1022*b*.

Figure 14A:
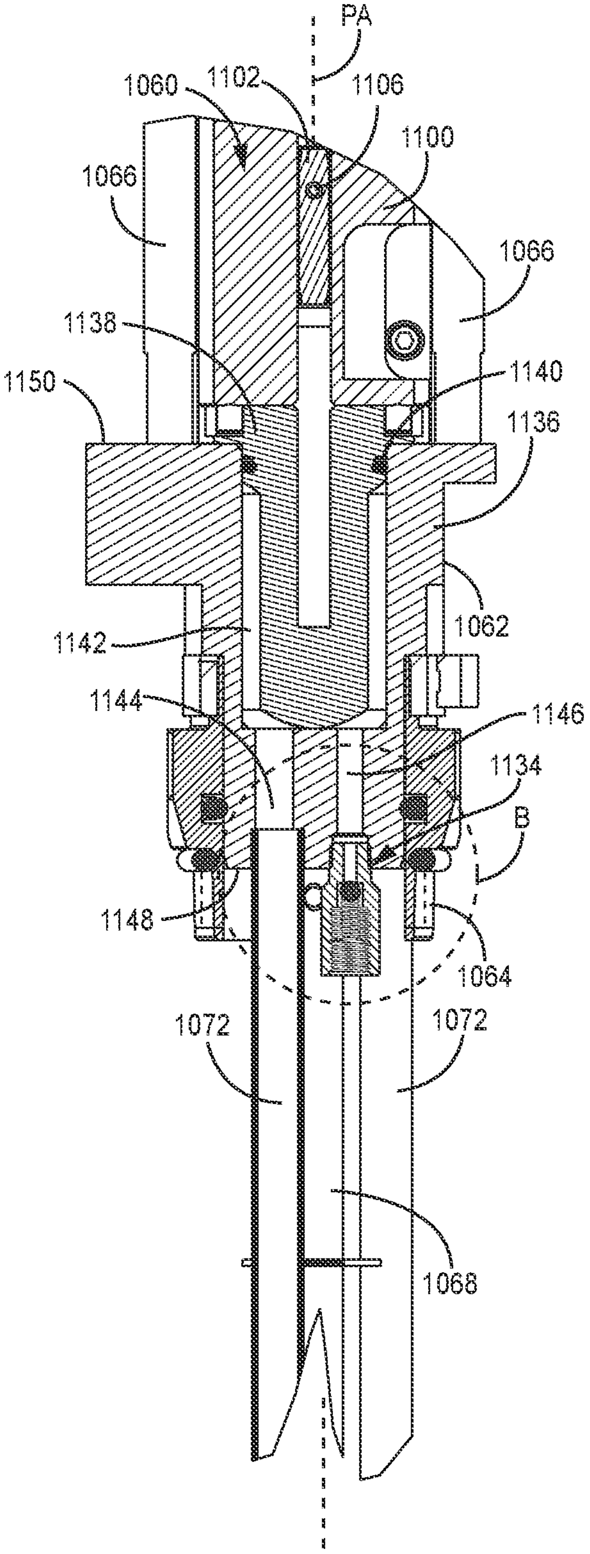
FIG. 14A is a cross-sectional view of a fluid outlet manifold of the feed pump and an over-pressurization relief valve connected to the fluid outlet manifold.
Figure 14B:
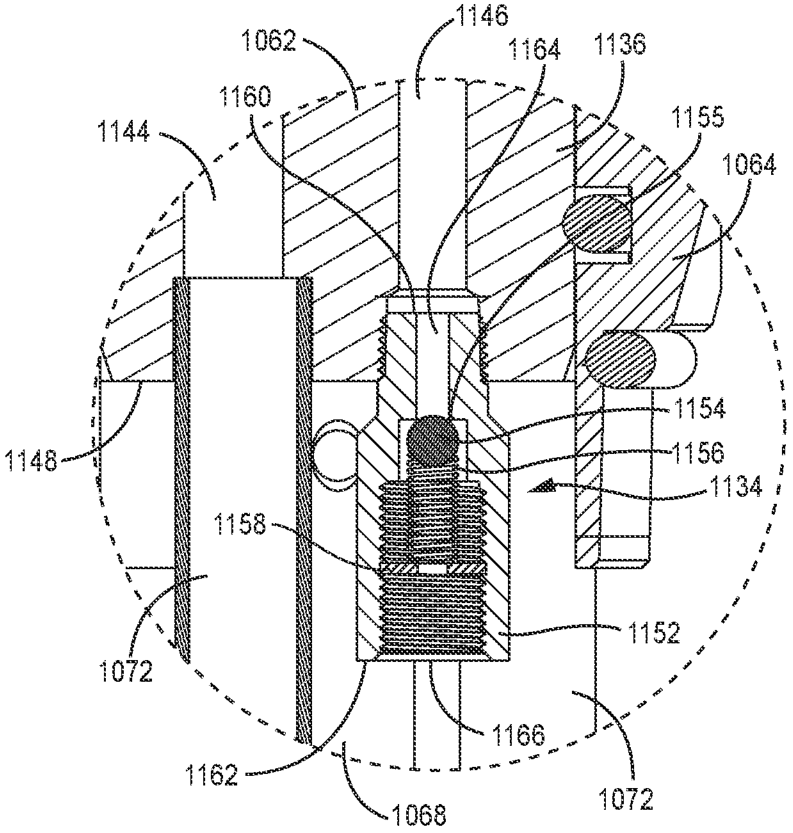
FIG. 14B is an enlarged cross-sectional view of detail B from FIG. 14A.

FIG. 14A is a cross-sectional view of fluid outlet manifold 1062 of feed pump 1012 and over-pressurization valve 1134. FIG. 14B is an enlarged cross-sectional view of detail B in FIG. 14A. FIGS. 14A and 14B will be discussed concurrently. As shown in FIGS. 14A and 14B, fluid outlet manifold 1062 includes outer housing 1136, inner housing 1138, O-ring 1140, manifold passage 1142, manifold inlets 1144, over-pressure outlet 1146, base end 1148, and top end 1150. Over-pressurization valve 1134 includes, as shown best in FIG. 14B, valve housing 1152, ball 1154, valve seat 1155, spring 1156, spring seat 1158, first end 1160, second end 1162, inlet 1164, and outlet 1166.

Fluid outlet manifold 1062 extends axially between base end 1148 and top end 1150. Outer housing 1136 of fluid outlet manifold 1062 extends axially from base end 1148 to top end 1150. Outer housing 1136 includes a cavity extending axially into outer housing 1136 from top end 1150. Inner housing 1138 of fluid outlet manifold 1062 is received by the cavity of outer housing 1136. As such, inner housing 1138 is disposed radially inward of outer housing 1136. Outer housing 1136 extends circumferentially about inner housing 1138. Inner housing 1138 can form a portion of clocking housing 1100. Inner housing 1138 can interface with collar 1102 to prevent rotation of collar 1102 about axis PA. Collar 1102 can extend axially into and reciprocate within inner housing 1138 during at least a portion of a stroke. At the end of a stroke in first axial direction AD1, collar 1102, and thus a portion of screw 1092 about which collar 1102 extends, can be disposed within inner housing 1138 such that collar 1102 and a portion of screw 1092 axially overlap with the fluid flowpath formed by manifold passage 1142. As such, at least a portion of collar 1102 axially overlaps with a portion of the fluid flowpath of the fluid being pumped by feed pump 1012. Collar 1102 is disposed radially inside of the annular flowpath formed by manifold passage 1142. Moreover, at least a portion of the drive mechanism 1026 that causes linear reciprocation of piston 1113 axially overlaps with a portion of the fluid path (e.g., the portion of screw 1092 within inner housing 1138). At least a portion of the drive mechanism 1026 (e.g., that portion of screw 1092 within inner housing 1138) can be disposed radially within a portion of the fluid path. For example, a radial line extending from axis PA can intersect with a portion of screw 1092 and with the portion of the fluid passage 1142. The radial line intersects first with the portion of the screw 1092, then with the inner housing 1138, then with the fluid passage 1142.

O-ring 1140 is disposed between outer housing 1136 and inner housing 1138 at top end 1150. O-ring 1140 provides a seal between outer housing 1136 and inner housing 1138 to prevent fluid from leaking out of fluid outlet manifold 1062 at top end 1150. Manifold passage 1142 is formed between outer housing 1136 and inner housing 1138. Manifold passage 1142 is in fluidic communication with outlet 1063 of feed pump 1012 (shown in FIGS. 11 and 12B) and with flow tubes 1072. Manifold inlets 1144, only one of which is shown in FIGS. 14A and 14B, extend axially through base end 1148 of fluid outlet manifold 1062 and intersect with manifold passage 1142. Each of manifold inlets 1144 is connected to one of tubes 1072.

Tubes 1072 attach displacement assembly 1070 to fluid outlet manifold 1062 and provide fluid passages that provide fluid from displacement assembly 1070 to fluid outlet manifold 1062. Over-pressure outlet 1146 extends axially through base end 1148 of fluid outlet manifold 1062 and intersects with manifold passage 1142. Over-pressurization valve 1134 is attached to base end 1148 at over-pressure outlet 1146. Over-pressurization valve 1134 and over-pressure outlet 1146 are both radially offset from axis PA of feed pump 1012. Mounting collar 1064 extends circumferentially around base end 1148 and is configured to connect feed pump 1012 to top 1050 of fluid tank 1020, such as by interfaced threading, among other options. With feed pump 1012 mounted on fluid tank 1020, base end 1148 of fluid outlet manifold 1062 and over-pressurization valve 1134 are disposed within fluid tank 1020 and exposed to the interior 48 of fluid tank 1020.

Valve housing 1152 of over-pressurization valve 1134 extends axially from first end 1160 to second end 1162. Inlet 1164 is formed in first end 1160 and outlet 1166 is formed in second end 1162. Inlet 1164 is smaller in diameter than outlet 1166 to form valve seat 1155 between inlet 1164 and outlet 1166. Ball 1154 is disposed inside valve housing 1152 between valve seat 1155 and outlet 1166. Ball 1154 forms a valve member of over-pressurization valve 1134. It is understood, however, that over-pressurization valve 1134 can include any desired form of valve member. Spring seat 1158 is disposed inside valve housing 1152 between ball 1154 and outlet 1166. Spring seat 1158 includes at least one passage to allow fluid to flow past spring seat 1158 when ball 1154 is in an open position away from valve seat 1155. Spring 1156 is disposed inside valve housing 1152 between spring seat 1158 and ball 1154. Spring 1156 is compressed between spring seat 1158 and ball 1154 and biases ball 1154 against valve seat 1155 into a closed position such that over-pressurization valve 1134 is a normally-closed valve.

First end 1160 of over-pressurization valve 1134 is connected to over-pressure outlet 1146 of fluid outlet manifold 1062 (e.g., by interfaced threading, among other mounting options). The spring force generated by spring 1156 is set such that over-pressurization valve 1134 does not open with fluid pressures at or below the maximum operating pressure. The spring force is set such that over-pressurization valve 1134 opens only in response to an over-pressure event. Over-pressurization valve 1134 can be configured to open in response to the pressure reaching a level above the maximum operating pressure to prevent unintended dumping during operation, such as at 10%, 20%, 30% or any desired level greater than the maximum operating pressure.

During operation of feed pump 1012, whenever the internal pressure of the fluid inside feed pump 1012 exceeds a predetermined threshold, the internal pressure of the fluid acting on ball 1154 can overcome the biasing force of spring 1156 and move ball 1154 away from valve seat 1155. When ball 1154 is pushed away from valve seat 1155, the fluid exits fluid outlet manifold 1062 through outlet 1166 of over-pressurization valve 1134 and flows into fluid tank 1020 that feed pump 1012 is mounted to. Over-pressurization valve 1134 closes when the internal pressure of the fluid inside feed pump 1012 decreases below the predetermined pressure threshold. In this way, over-pressurization valve 1134 prevents the internal pressure of the fluid inside feed pump 1012 from increasing to a level that could cause damage to feed pump 1012 or system 1010.

Figure 15:
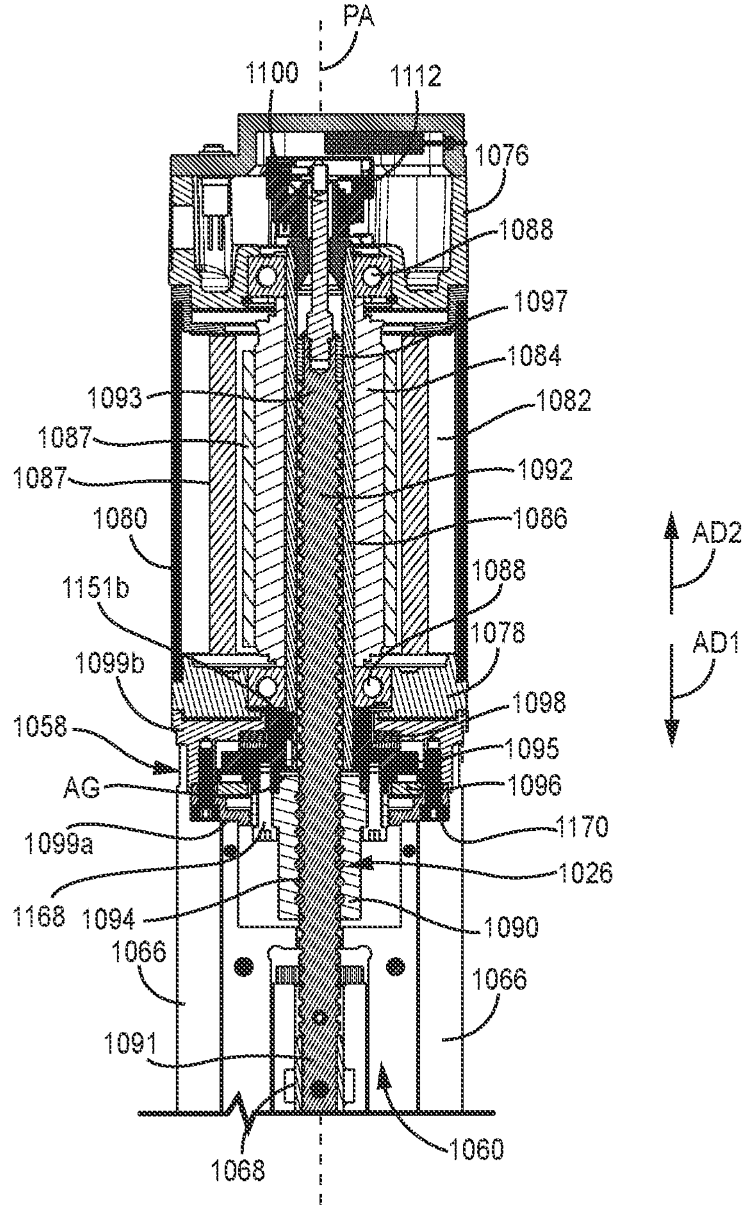
FIG. 15 is an enlarged cross-sectional view of the electric motor, the drive mechanism, and the bearing assembly from FIG. 12B.
Figure 16A:
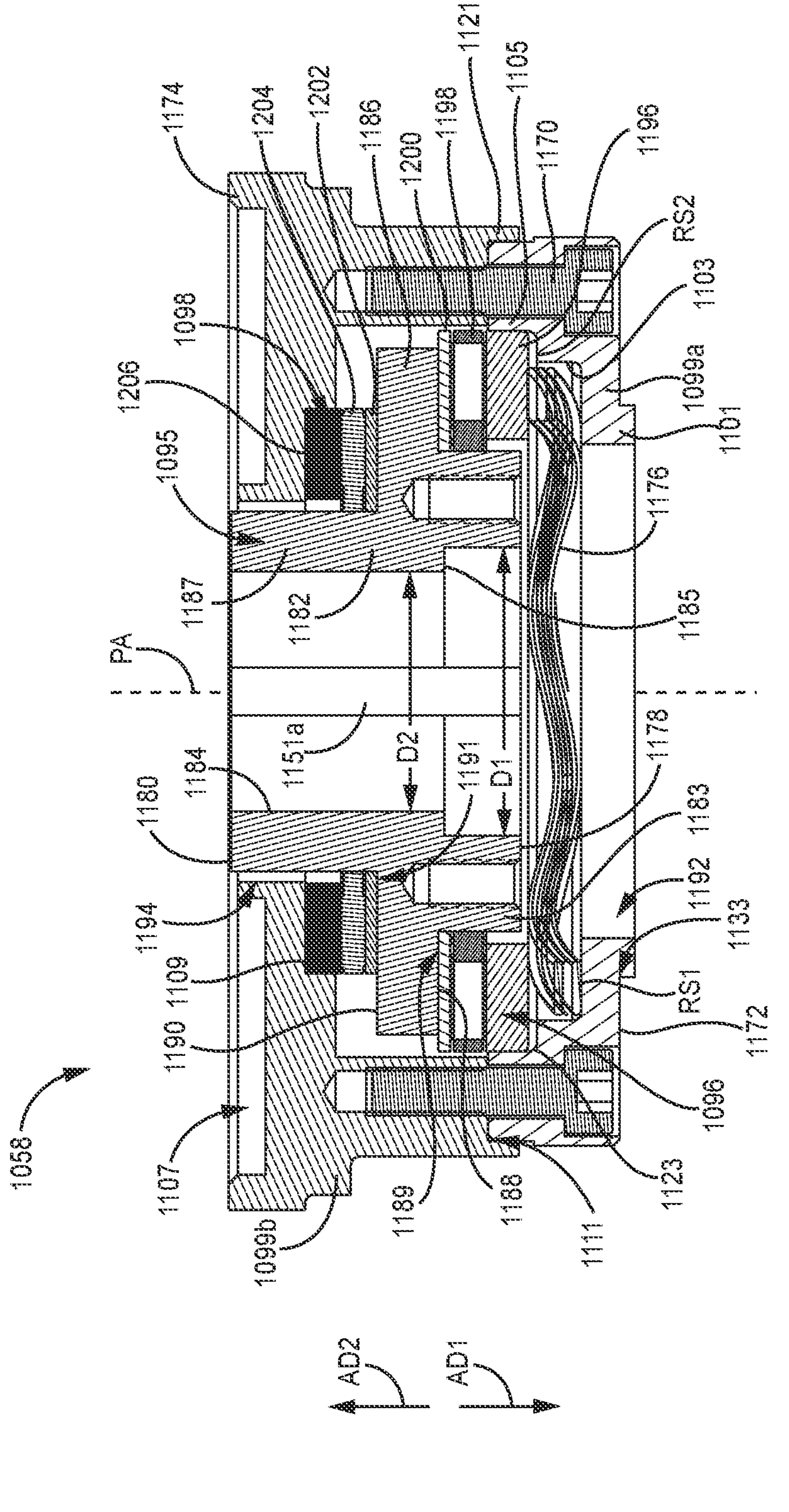
FIG. 16A is a cross-sectional view of an embodiment of the bearing assembly with a spring.
Figure 16B:
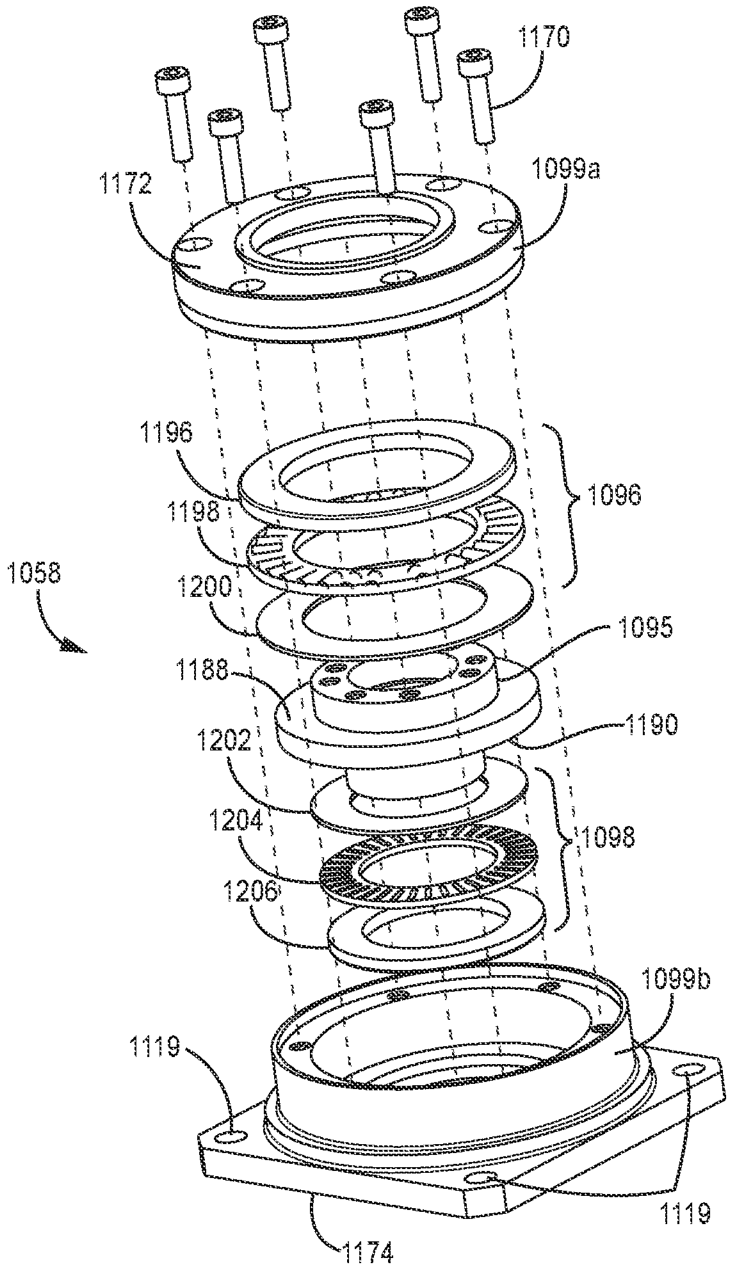
FIG. 16B is an exploded view of an embodiment of the bearing assembly.

FIG. 15 is an enlarged cross-sectional view of electric motor 1056, drive mechanism 1026, and bearing assembly 1058 from FIG. 12B. FIG. 16A is a cross-sectional view of bearing assembly 1058. FIG. 16B is an exploded view of bearing assembly 1058. FIGS. 15-16B will be discussed together. Electric motor 1056 and drive mechanism 1026 are as described above. Bearing assembly 1058 includes sleeve coupler 1095, first roller bearing subassembly 1096, second roller bearing subassembly 1098, first housing piece 1099*a*, and second housing piece 1099*b*. First fasteners 1168 are shown. Bearing assembly 1058 also includes second fasteners 1170, first end 1172, second end 1174, and spring 1176. Sleeve coupler 1095 includes first end 1178, second end 1180, body 1182, bore 1184, shoulder 1185, and flange 1186. Flange 1186 includes first surface 1188 and second surface 1190. First housing piece 1099*a* includes first opening 1192, and second housing piece 1099*b* includes second opening 1194. First roller bearing subassembly 1096 includes first race 1196, first rolling elements 1198, and second race 1200. Second roller bearing subassembly 1098 includes third race 1202, second rolling elements 1204, and fourth race 1206. First housing piece 1099*a* includes first diameter portion 1101, second diameter portion 1103, and third diameter portion 1105. Second housing piece 1099*b* includes mounting depression 1107, bearing shoulder 1109, and seating shoulder 1111.

Bearing assembly 1058 connects rotor 1084 to drive mechanism 1026. Bearing assembly 1058 permits rotational motion to pass within drive mechanism 1026 from motor 1056 while preventing some or all of the axial forces generated by displacement assembly 1070 from transferring to rotor 1084. Piston 1113 moves in a reciprocating linear fashion and experiences axial forces due to fluid resistance experienced during reciprocation. Specifically, piston 1113 experiences a downward axial reaction force (e.g., in axial direction AD1) when moving through the upstroke and an upward axial reaction force (e.g., in axial direction AD2) when moving through the downstroke, and both of the upward reaction force and the downward reaction force transfer through drive mechanism 1026 and to bearing assembly 1058.

Bearing assembly 1058 is configured to react the axial loads generated during pumping to isolate electric motor 1056 (including rotor shaft 1086 and rotor 1084) from those axial loads generated by displacement assembly 1070 and transmitted to and through drive mechanism 1026. Bearing assembly 1058 isolates rotor 1084 from these thrust loads by transferring the thrust loads to the stationary, structural portions of feed pump 1012 (e.g., tie rods 1066, and fluid outlet manifold 1062) and to fluid tank 1020.

The pump reaction forces are transmitted through piston 1113 and to the linear drive element of drive mechanism 1026 (e.g., through drive shaft 1068 and screw 1092). The pump reaction forces are transmitted through the linear drive element to the rotating element of drive mechanism 1026. The pump reaction forces are transmitted to bearing assembly 1058 at a location axially between the rotating elements of drive mechanism 1026 and rotor 1084. Bearing assembly 1058 supports a sufficient portion of the pump reaction forces and transmits those forces to stationary frame components of feed pump 1012 (e.g., tie rods 1066, and fluid outlet manifold 1062) and away from motor 1056 to protect motor 1056 during operation. Bearing assembly 1058 can support up to all of the pump reaction forces generated during pumping. Bearing assembly 1058 prevents the pump reaction forces from causing axial misalignment between rotor 1084 and stator 1082, thereby increasing the life and efficiency of motor 1056.

First housing member 1099*a* is coaxially aligned with electric motor 1056 on axis PA and includes first opening 1192 extending through first housing member 1099*a* along axis PA. First housing member 1099*a* includes first diameter portion 1101 that is the part of first housing member 1099*a* furthest in first axial direction AD1. Second diameter portion 1103 is adjacent first diameter portion 1101 and has a larger inner diameter than first diameter portion 1101. The larger diameter of second diameter portion 1103 forms a radial shelf RS1 that supports at least a portion of wave spring 1176. Third diameter portion 1105 is adjacent second diameter portion 1103 such that second diameter portion 1103 is disposed axially between first diameter portion 1101 and third diameter portion 1105. Third diameter portion 1105 has an inner diameter larger than the inner diameter of second diameter portion 1103. The larger diameter of third diameter portion 1105 facilitates third diameter portion 1105 receiving a portion of first roller bearing subassembly 1096. More specifically, third diameter portion 1105 receives and radially supports first race 1196. First housing member 1099*a* further includes axial projection 1133. A portion of clocking housing 1100 extends around and interfaces with axial projection 1133, facilitating axial alignment between bearing assembly 1058 and clocking assembly 1060.

Second housing member 1099*b* is positioned axially between first housing member 1099*a* and electric motor 1056 and is disposed coaxially with first housing member 1099*a* and electric motor 1056 on axis PA. First housing member 1099*a* is connected to second housing member 1099*b*. In the example shown, second housing member 1099*b* is connected to first housing member 1099*a* by second fasteners 1170. It is understood, however, that first housing member 1099*a* and second housing member 1099*b* can be fixed in any suitable manner, such as by press-fitting or adhesive, among other options. A portion of first housing member 1099*a* extends into a portion of second housing member 1099*b*. More specifically, third diameter portion 1105 extends into second housing member 1099*b* and interfaces with seating shoulder 1111. Axial flange 1121 extends partially over an exterior of third diameter portion 1105. First housing member 1099*a* extending into and being received by second housing member 1099*b* assists in aligning and maintaining alignment between first housing member 1099*a* and second housing member 1099*b* on axis PA.

Second housing member 1099*b* further includes second opening 1194 extending through second housing member 1099*b* along axis PA. Second housing member 1099*b* interfaces with the housing of electric motor 1056. Mounting depression 1107 is formed at second end 1174 of bearing assembly 1058 and is configured to receive a portion of the housing of electric motor 1056. For example, mounting depression 1107 can receive a portion of second end cap 1078. Mounting depression 1107 receiving a portion of the housing of motor 1056 assists in aligning bearing assembly 1058 and electric motor 1056 coaxially on axis PA. In some examples, second housing member 1099*b* can be fixed to second end cap 1078. Second housing member 1099*b* is further configured to connect to tie rods 1066, such as by fasteners extending through mounting openings 1119. As such, bearing assembly 1058 is rigidly connected to components forming the frame of feed pump 1012.

First end 1172 of bearing assembly 1058 is formed by first housing member 1099*a*, and second end 1174 of bearing assembly 1058 is formed by second housing member 1099*b*. First housing member 1099*a* and second housing member 1099*b* are stationary relative axis PA and do not rotate about axis PA. Second housing member 1099*b* is fixed to frame components of feed pump 1012 to fix second housing member 1099*b* relative to axis PA. First housing member 1099*a* is connected to second housing member 1099*b* to fix first housing member 1099*a* relative second housing member 1099*b* on axis PA. Together, first housing member 1099*a* and second housing member 1099*b* enclose other components of bearing assembly 1058. First housing member 1099*a* and second housing member 1099*b* radially surround the rotating components of bearing assembly 1058.

Sleeve coupler 1095 is the radially innermost component of bearing assembly 1058. Portions of sleeve coupler 1095 are disposed axially between first housing member 1099*a* and second housing member 1099*b*. Sleeve coupler 1095, first housing member 1099*a*, and second housing member 1099*b* are all coaxial with axis PA of feed pump 1012. Body 1182 of sleeve coupler 1095 extends axially from first end 1178 to second end 1180.

Flange 1186 is an annular flange that extends radially outward from body 1182 between first end 1178 and second end 1180. First surface 1188 of flange 1186 faces toward first housing member 1099*a*. First surface 1188 contacts and supports first roller bearing subassembly 1096. More specifically, first surface 1188 contacts and supports second race 1200. Second race 1200 is supported by sleeve coupler 1095 such that second race 1200 rotates with sleeve coupler 1095. Coupler shoulder 1189 is formed on sleeve coupler 1095 and interfaces with first roller bearing subassembly 1096. Coupler shoulder 1189 is formed at the interface between first surface 1188 and first portion 1183. Coupler shoulder 1189 axially and radially interfaces with first roller bearing subassembly 1096. Second surface 1190 of flange 1186 faces toward second housing member 1099*b*. Second surface 1190 contacts and supports second roller bearing subassembly 1098. More specifically, second surface 1190 contacts and supports third race 1202. Third race 1202 is supported by sleeve coupler 1095 such that third race 1202 rotates with sleeve coupler 1095. Coupler shoulder 1191 is formed on sleeve coupler 1095 and interfaces with second roller bearing subassembly 1098. Coupler shoulder 1191 axially and radially interfaces with second roller bearing subassembly 1098. Coupler shoulder 1191 is formed at the interface between second surface 1190 and second portion 1187. In the example shown, coupler shoulder 1191 is disposed radially closer to axis PA than coupler shoulder 1189.

Bore 1184 extends axially through body 1182 from first end 1178 to second end 1180. As shown best in FIG. 16A, body 1182 of sleeve coupler 1095 incudes first portion 1183 extending axially from first end 1178 to first surface 1188 of flange 1186. Body 1182 of sleeve coupler 1095 includes second portion 1187 extending axially from second end 1180 to second surface 1190 of flange 1186. The first portion 1183 of body 1182 comprises an inner diameter D1 that is larger than an inner diameter D2 of the second portion 1187. First portion 1183 is configured to receive an axial projection of drive nut 1090, facilitating coaxial alignment of drive nut 1090 and bearing assembly 1058. The inner diameter D1 of the first portion 1183 of body 1182 is larger than inner diameter D2 forming shoulder 1185 at the interface between first portion 1183 and second portion 1187. Shoulder 1185 interfaces with the end of the axial projection of drive nut 1090 to limit the extent that drive nut 1090 extends into bore 1184. Second portion 1187 facilitates connection with rotor 1084. More specifically, second portion 1187 is configured to receive an end of rotor shaft 1086.

First roller bearing subassembly 1096 is disposed axially between sleeve coupler 1095 and first housing member 1099*a*. In the example shown, first roller bearing subassembly 1096 is disposed axially between flange 1186 of sleeve coupler 1095 and first housing member 1099*a*. First roller bearing subassembly 1096 radially overlaps with each of second diameter portion 1103 and third diameter portion

1105. Second roller bearing subassembly 1098 is disposed axially between sleeve coupler 1095 and second housing member 1099*b*. In the example shown, second roller bearing subassembly 1098 is disposed axially between flange 1186 of sleeve coupler 1095 and second housing member 1099*b*. Flange 1186 is disposed axially between each of first roller bearing subassembly 1096 and second roller bearing subassembly 1098. Flange 1186 contacts both first roller bearing subassembly 1096 and second roller bearing subassembly 1098. In the example shown, flange 1186 contacts both second race 1200 and third race 1202, which races 1200, 1202 form the rotating races of first bearing subassembly 1096 and second bearing subassembly 1098, respectively.

Spring 1176, shown only in FIG. 16A, is a damper spring that can be positioned axially between first housing member 1099*a* and first roller bearing subassembly 1096. In the example shown, spring 1176 is supported on radial shelf RS1. Spring 1176 can be an annular wave spring formed by one or more spring components. Spring 1176 is coaxially aligned with axis PA. Spring 1176 is coaxial with bore 1184, first opening 1192, and second opening 1194. Spring 1176 axially loads first roller bearing subassembly 1096 against sleeve coupler 1095. Spring 1176 interfaces with first race 1196 of first roller bearing subassembly 1096 to axially load first roller bearing subassembly 1096. Spring 1176 can prevent direct contact between first race 1196 and the radial shelf RS2 extending radially inward from shoulder 1123. In some examples, spring 1176 holds first bearing assembly 1096 axially away from radial shelf RS2 but can allow contact during operation. First race 1196 is a non-rotating race of first roller bearing subassembly 1096. The axial force exerted by spring 1176 is transmitted through sleeve coupler 1095 and further axially loads second roller bearing subassembly 1098. Spring 1176 is configured to dampen vibrations inside bearing assembly 1058. While spring 1176 is shown as interfacing with first roller bearing subassembly 1096, it is understood that spring 1176 can be disposed on an opposite side of flange 1186 such that spring 1176 interfaces with second roller bearing subassembly 1098. For example, spring can be disposed axially between second bearing housing 1099*b* and fourth race 1206. In such an example, first race 1196 can seat on the shoulder 1123 of third diameter portion 1121.

First roller bearing subassembly 1096 is configured to react to and transmit axial loads when drive shaft 1068 and screw 1092 are moving axially. For example, first roller bearing subassembly 1096 can react downward axial loads when drive shaft 1068 and screw 1092 move axially upward in second axial direction AD2 through an upstroke and towards electric motor 1056. First roller bearing subassembly 1096 includes first race 1196, first rolling elements 1198, and second race 1200. In first roller bearing subassembly 1096, first race 1196 is adjacent first housing member 1099*a* and spring 1176. Second race 1200 is adjacent first surface 1188 of flange 1186 and interfaces with coupler shoulder 1189. First rolling elements 1198 are axially between first race 1196 and second race 1200. Rolling elements 1198 can be of any suitable configuration for supporting and transferring axial loads from sleeve coupler 1095 to first housing member 1099*a*. For example, rolling elements 1198 can be elongate rollers that are elongate along axes transverse to axis PA. In some examples, the axes of rolling elements 1198 are orthogonal to axis PA. In some examples, rolling elements 1198 can be cylindrical rollers, tapered rollers, balls, or of any other configuration suitable for transmitting axial forces and facilitating rotation of sleeve coupler 1095. First bearing subassembly 1096 is loaded axially between spring 1176 and sleeve coupler 1095.

Second roller bearing subassembly 1098 is configured to react to and transmit axial loads when drive shaft 1068 and screw 1092 are moving axially. For example, second roller bearing subassembly 1098 can react downward axial loads when drive shaft 1068 and screw 1092 move axially downward in first axial direction AD1 through a downstroke and away from electric motor 1056. Second roller bearing subassembly 1098 includes third race 1202, second rolling elements 1204, and fourth race 1206. In second roller bearing subassembly 1098, third race 1202 is adjacent second surface 1190 of flange 1186 and interfaces with coupler shoulder 1191. Fourth race 1206 is adjacent second housing member 1099*b* and interfaces with bearing shoulder 1109 of second housing member 1099*b*. Second rolling elements 1204 are disposed axially between third race 1202 and fourth race 1206. Rolling elements 1204 can be of any suitable configuration for supporting and transferring axial loads from sleeve coupler 1095 to second housing member 1099*b*. For example, rolling elements 1204 can be elongate rollers that are elongate along axes transverse to axis PA. In some examples, the axes of rolling elements 1204 are orthogonal to axis PA. In some examples, rolling elements 1204 can be cylindrical rollers, tapered rollers, balls, or of any other configuration suitable for transmitting axial forces and facilitating rotation of sleeve coupler 1095. Second bearing subassembly 1098 is loaded axially between second housing member 1099*b* and sleeve coupler 1095.

As shown in FIG. 15, drive mechanism 1026 is mounted to bearing assembly 1058 and includes drive nut 1090 and screw 1092. Drive nut 1090 is coaxial with rotor shaft 1086 and is connected to rotor shaft 1086 by sleeve coupler 1095 of bearing assembly 1058. Drive nut 1090 extends through first opening 1192 of first housing member 1099*a* and is connected to first end 1178 of sleeve coupler 1095 by first fasteners 1168. A portion of drive nut 1090 extends into bore 1184 between first end 1178 and shoulder 1185 of sleeve coupler 1095, thereby axially aligning drive nut 1090 with sleeve coupler 1095 on axis PA. A radial flange of drive nut 1090 abuts against first end 1178 to limit the extent that drive nut 1090 can axially extend into bore 1184. Fasteners 1168 extend through the flange of drive nut 1090 can into sleeve coupler 1095, though it is understood that other forms of connecting can be used, such as press-fitting or adhesive, among other options.

The radial flange of drive nut 1090 is sized to not contact spring 1176. The portion of drive nut 1090 extending into bearing assembly 1058 can axially overlap with some or all of first roller bearing subassembly 1096. The portion of drive nut 1090 extending into bearing assembly 1058 can extend further in second axial direction AD2 than first housing member 1099*a*. As such, drive nut 1090 can axially overlap with a full axial extent of first housing member 1099*a* and can axially overlap with at least a part of second housing member 1099*b*.

Rotor shaft 1086 is disposed coaxially with bearing assembly 1058 on axis PA and rotationally fixed to bearing assembly 1058. Rotor shaft 1086 extends into bearing assembly 1058 through second opening 1194 of second housing member 1099*b* and extends into bore 1184 of sleeve coupler 1095 to interface with sleeve coupler 1095. Bore 1184 axially aligns rotor shaft 1086 with sleeve coupler 1095 and drive nut 1090.

Sleeve coupler 1095, drive nut 1090, and rotor shaft 1086 are rotationally fixed relative to one another such that sleeve coupler 1095, drive nut 1090, and the rotor shaft 1086 rotate in unison when electric motor 1056 rotates rotor shaft 1086. Rotor shaft 1086 is rotationally fixed to sleeve coupler 1095 by interface components 1151*a*, 1151*b*. For example, one of interface components 1151*a*, 1151*b* can be a tab and the other one of interface components 1151*a*, 1151*b* can be a groove configured to receive the tab. One of rotor shaft 1086 and sleeve coupler 1095 can include a first one of interface components 1151*a*, 1151*b* that interlocks with a second one of interface components 1151*a*, 1151*b* formed in the other one of rotor shaft 1086 and sleeve coupler 1095. For example, a groove can be formed in one of sleeve coupler 1095 and rotor shaft 1086 and a tab configured to interface within the groove can extend from the other of sleeve coupler 1095 and rotor shaft 1086. It is understood, however, that interface components 1151*a*, 1151*b* can be of any configuration suitable for rotationally locking sleeve coupler 1095 and rotor shaft 1086 for simultaneous rotation while allowing for relative axial movement.

Interface components 1151*a*, 1151*b* interface within bore 1184. The interface between interface components 1151*a*, 1151*b* facilitates rotor shaft 1086 transmitting torque to sleeve coupler 1095 while still allowing relative axial movement between sleeve coupler 1095 and rotor shaft 1086. Allowing relative axial movement between sleeve coupler 1095 and rotor shaft 1086 prevents bearing assembly 1058 from transferring axial thrust loads from drive mechanism 1026 to rotor 1084. Rather, bearing assembly 1058 transfers the thrust loads to the stationary portions of feed pump 1012 (i.e., tie rods 1066, clocking housing 1100, and fluid outlet manifold 1062) via first roller bearing subassembly 1096, shaft coupler 1095, second roller bearing subassembly 1098, and housing portions 1099*a*, 1099*b*. Isolating rotor 1084 from the thrust loads generated by displacement assembly 1070 reduces wear on electric motor 1056 and increases the operational life of electric motor 1056.

For example, when piston 1113 is moving axially upward in an upstroke toward electric motor 1056, drive mechanism 1026 experiences a downward reaction force pulling axially downward on drive mechanism 1026. This downward reaction force is transferred from piston 1113 to drive shaft 1068 and through drive shaft 1068 to screw 1092. The pump reaction force is transmitted through screw 1092 and rolling elements 1094 to drive nut 1090. The forces are transmitted through drive nut 1090 to sleeve coupler 1095. The downward reaction force is transferred within sleeve coupler 1095 from first end 1178 to flange 1186 and from flange 1186 to first roller bearing subassembly 1096. The axial force is transmitted through first roller bearing subassembly 1096 to first housing member 1099*a*. More specifically, the axial force is transmitted through second race 1200, rolling elements 1198, and first race 1196 to first housing member 1099*a*. The axial forces can be transmitted through spring 1176. The axial forces are transmitted from first housing member 1099*a* to second housing member 1099*b* due to the rigid connection between first housing member 99*a* and second housing member 1099*b*. From second housing member 1099*b*, the downward reaction force is transferred to tie rods 1066, from tie rods 1066 to fluid outlet manifold 1062, and from fluid outlet manifold 1062 to fluid tank 1020. In this manner, reaction forces are transmitted out of feed pump 1012 to fluid tank 1020 without transferring the reaction forces through electric motor 1056.

When piston 1113 moves axially downward in a downstroke away from electric motor 1056, drive mechanism 1026 experiences an upward reaction force pushing axially upward on drive mechanism 1026. This upward reaction force is transferred from piston 1113 to drive shaft 1068 and through drive shaft 1068 to screw 1092. The pump reaction force is transmitted through screw 1092 and rolling elements 1094 to drive nut 1090. The forces are transmitted through drive nut 1090 to sleeve coupler 1095. The upward reaction force is transferred within sleeve coupler 1095 from first end 1178 to flange 1186 and from flange 1186 to second roller bearing subassembly 1098. The axial force is transmitted through second roller bearing subassembly 1098 then to second housing member 1099*b*. More specifically, the axial force is transmitted through third race 1202, rolling elements 1204, and fourth race 1206 to second housing member 1099*b*. From second housing member 1099*b*, the upward reaction force is transferred to tie rods 1066, from tie rods 1066 to fluid outlet manifold 1062, and from fluid outlet manifold 1062 to fluid tank 1020. In this manner, upward reaction forces are transmitted out of feed pump 1012 to fluid tank 1020 without transferring the upward reaction forces through electric motor 1056.

Bearing assembly 1058 provides significant advantages. Bearing assembly 1058 facilitates the transmission of torque from motor 1056 to drive mechanism 1026 while inhibiting transmission of axial forces from drive mechanism 1026 to motor 1056. Bearing assembly 1058 allows for relative axial movement between rotor shaft 1086 and bearing assembly 1058 and maintains an axial gap AG between drive nut 1090 and rotor shaft 1086 preventing direct contact therebetween and further preventing transmission of axial forces. Bearing assembly 1058 isolates motor 1056 from pump reaction forces, maintaining alignment between stator 1082 and rotor 1084, preventing undesired wear and facilitating efficient operation.

Figure 17A:
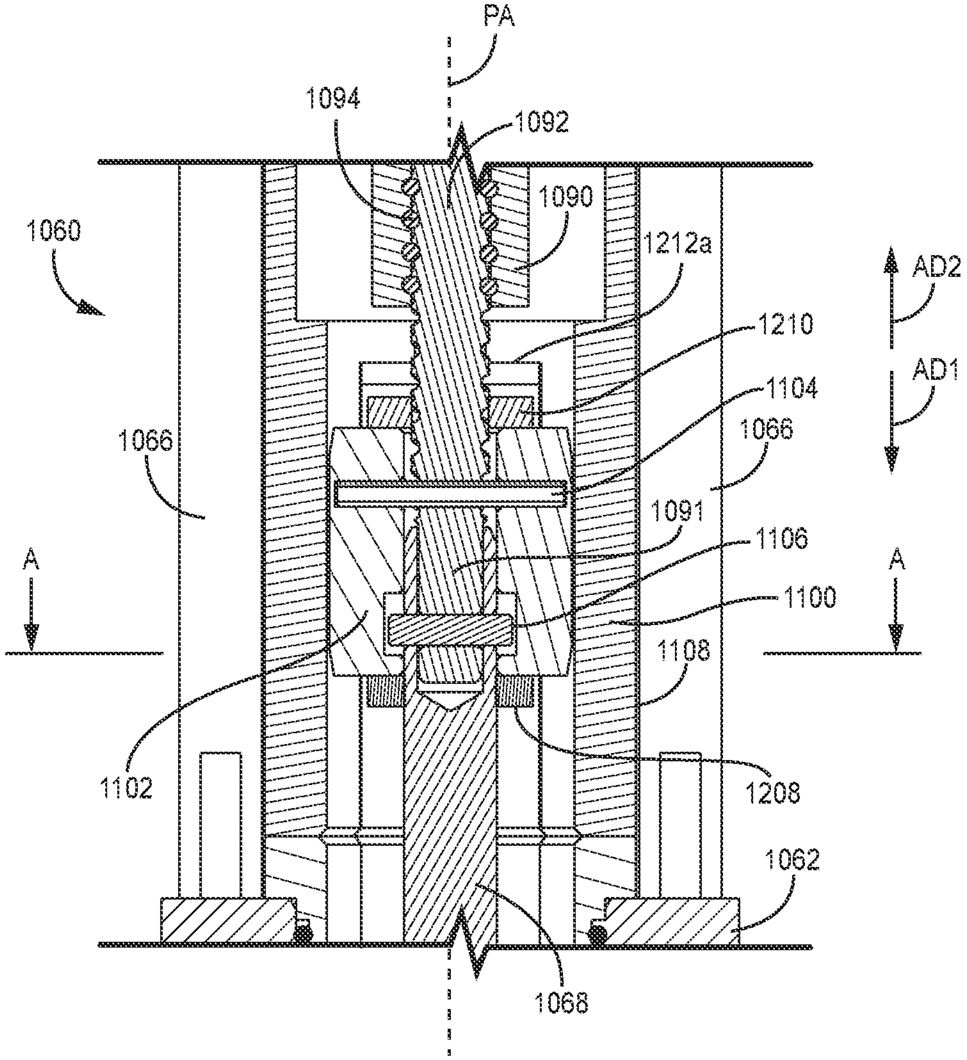
FIG. 17A is an enlarged cross-sectional view of the clocking assembly from FIG. 12A.
Figure 17B:
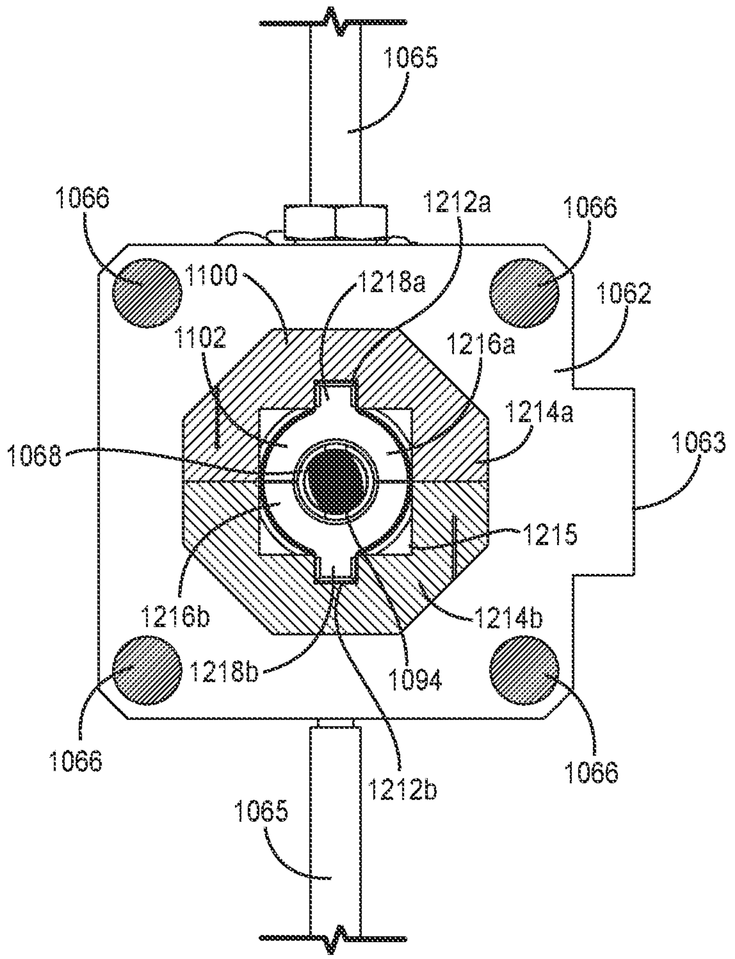
FIG. 17B is a cross-sectional view of the clocking assembly taken along line A-A from FIG. 17A.
Figure 17C:
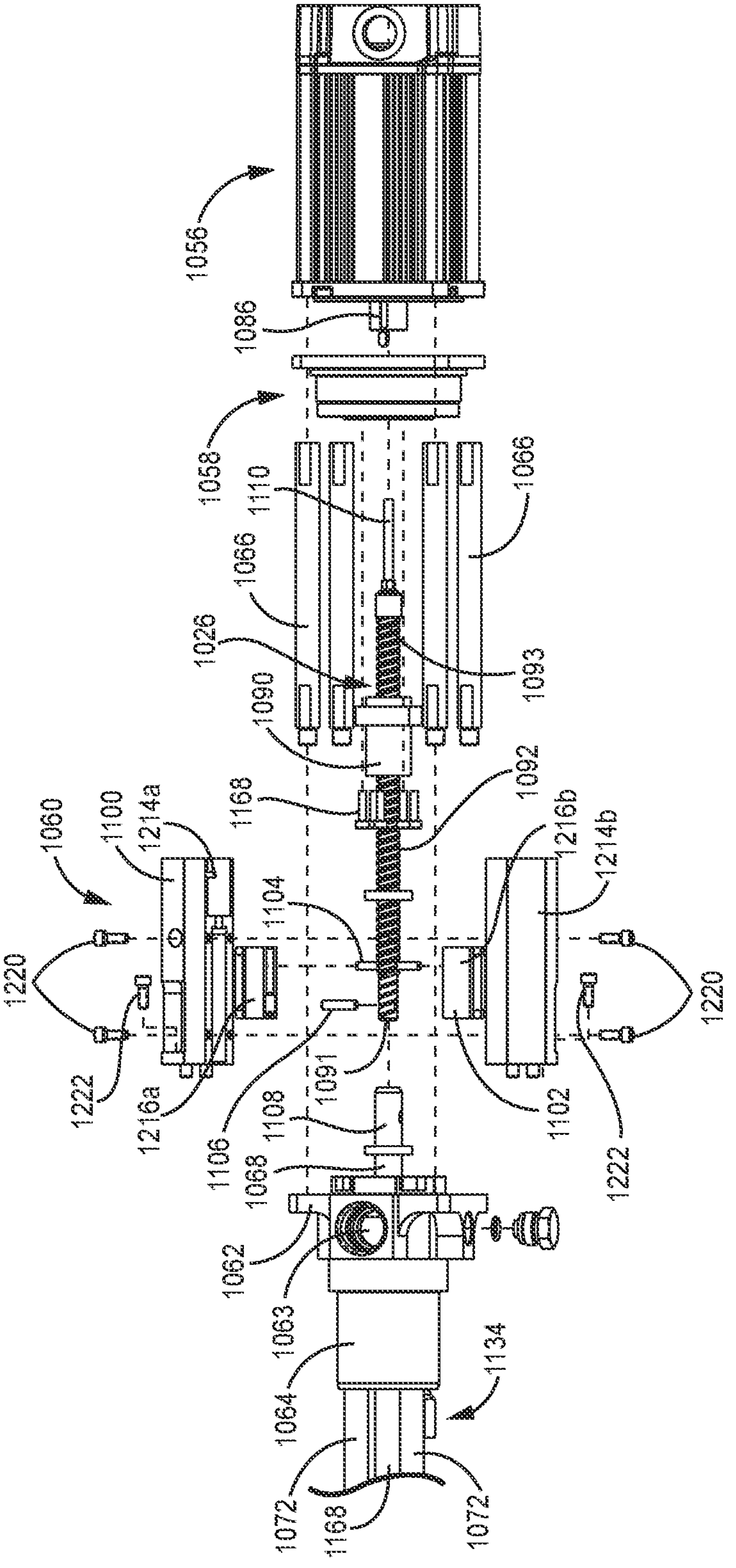
FIG. 17C is an exploded view of the upper portion of the feed pump from FIG. 12A.

FIG. 17A is an enlarged cross-sectional view of clocking assembly 1060. FIG. 17B is a cross-sectional view of clocking assembly 1060 taken along line A-A from FIG. 17A. FIG. 17C is an exploded view of a portion of feed pump 1012 for an additional view of clocking assembly 1060. FIGS. 17A-17C will be discussed together. As discussed above with regard to FIGS. 12A and 12B, clocking assembly 1060 is disposed axially between fluid outlet manifold 1062 and bearing assembly 1058. Clocking assembly 1060 is disposed axially between drive nut 1090 and fluid outlet manifold 1062. Bearing assembly 1058 is disposed axially between clocking assembly 1060 and motor 1056. Drive nut 1090 is disposed axially between clocking assembly 1060 and motor 1056.

Clocking assembly 1060 is disposed around screw 1092 proximate first end 1091 of screw 1092. Clocking assembly 1060 is connected to screw 1092 to prevent rotation of screw 1092 and drive shaft 1068 about axis PA. Because of clocking assembly 1060, screw 1092 and drive shaft 1068 move axially along axis PA and do not rotate about axis PA. Clocking assembly 1060 includes clocking housing 1100, collar 1102, anti-rotation pin 1104, and link pin 1106. Clocking assembly 1060 can further include lower bumper 1208; upper bumper 1210; slots 1212*a*, 1212*b*; housing segments 1214*a*, 1214*b*; chamber 1215; collar segments 1216*a*, 1216*b*; tabs 1218*a*, 1218*b*; fasteners 1220; and fasteners 1222.

Clocking housing 1100 includes housing segments 1214*a*, 1214*b*. Housing segments 1214*a*, 1214*b* come together around screw 1092 and axis PA of feed pump 1012 to form chamber 1215. As such, clocking housing 1100 can be considered to be of a clamshell configuration. It is understood, however, that in other examples clocking housing 1100 can be formed as a single part or as more than two parts connected together. Fasteners 1220 connect housing segment 1214*a* to housing segment 1214*b*. Clocking housing 1100 is fastened to fluid outlet manifold 1062 by fasteners 1222. By fastening clocking housing to fluid outlet manifold 1062, clocking housing 1100 is stationary and does not rotate or move relative axis PA. In some embodiments, clocking housing 1100 can be fastened to the housing of bearing assembly 1058. Clocking housing 1100 can transmit axial forces from bearing assembly 1058 to outlet manifold 1062.

Collar 1102 includes collar segments 1216*a*, 1216*b* that come together to form collar 1102. As such, collar 1102 can be considered to be of a clamshell configuration. It is understood, however, that collar 1102 can be formed as a single part or as more than two parts connected together. Collar segments 1216*a*, 1216*b* are disposed inside chamber 1215 of clocking housing 1100. Collar 1102 can slide axially within chamber 1215 along axis PA with screw 1092. As shown in FIGS. 12A, 12B, and 17A, chamber 1215 can also extend into a top of fluid outlet manifold 1062 to make chamber 1215 longer and allow collar 1102 to slide a longer distance along axis PA. For example, chamber 1215 can be at least partially defined by inner housing 1138 (FIG. 14A). Chamber 1215 can thus axially overlap with a portion of the fluid flowpath through feed pump 1012 (e.g., the portion disposed radially between inner housing 1138 and outer housing 1136).

Upper bumper 1210 is connected to a first axial end of collar 1102. Lower bumper 1208 is connected to a second axial end of collar 1102 opposite upper bumper 1210. Upper bumper 1210 and lower bumper 1208 protect collar 1102 from impacting a top and a bottom of chamber 1215 and provide damping in the event such contact occurs. Anti-rotation pin 1104 extends through collar 1102 and screw 1092 transverse to axis PA to connect screw 1092 to collar 1102 and to prevent rotation of screw 1092 relative collar 1102. Anti-rotation pin 1104 also connects collar segments 1216*a*, 1216*b* together. Anti-rotation pin 1104 thereby locks collar 1102 to screw 1092, preventing relative movement therebetween.

Slots 1212*a*, 1212*b* and tabs 1218*a*, 1218*b* provide an anti-rotation interface between collar 1102 and clocking housing 1100 that prevents collar 1102 from rotating relative clocking housing 1100. Slots 1212*a*, 1212*b*, shown best in FIG. 17B, are formed on interior surfaces of housing segments 1214*a*, 1214*b* and can extend up to a full axial length of chamber 1215. Slots 1212*a*, 1212*b* can be open on both axial ends of chamber 1215 or on at least one common axial end of chamber 1215 to facilitate insertion of collar 1102 into clocking housing 1100. In some examples, such as where clocking housing 1100 is formed from multiple components fastened together, slots 1212*a*, 1212*b* can be closed at each axial end. Tabs 1218*a*, 1218*b* are formed on collar segments 1216*a*, 1216*b*, respectively, and extend radially outward from collar 1102 relative axis PA. Tabs 1218*a*, 1218*b* are sized to mate with slots 1212*a*, 1212*b* and thereby prevent rotation between collar 1102 and clocking housing 1100. Tabs 1218*a*, 1218*b* are further sized to mate with slots 1212*a*, 1212*b* while still allowing collar 1102 to slide axially relative axis PA with screw 1092. Because screw 1092 is connected to collar 1102 and is unable to rotate relative collar 1102, and because collar 1102 and clocking housing 1100 are unable to rotate relative axis PA, clocking assembly 1060 ensures that screw 1092 and drive shaft 1068 reciprocate axially on axis PA and do not rotate with drive nut 1090 and rotor shaft 1086.

First end 1091 of screw 1092 is connected to drive shaft 1068 inside clocking housing 1100. Link pin 1106 extends through screw 1092 and drive shaft 1068 to connect screw 1092 and drive shaft 1068 together. Collar segments 1216*a*, 1216*b* sandwich first end 1091 of screw 1092 and end 1108 of drive shaft 1068. As shown in FIG. 17A, collar 1102 is disposed around the connection between drive shaft 1068 and screw 1092. By surrounding the connection between drive shaft 1068 and screw 1092, collar 1102 can protect the connection between drive shaft 1068 and screw 1092 by holding link pin 1106 in place.

Clocking housing 1100 can extend axially between fluid outlet manifold 1062 to the housing of bearing assembly 1058. By extending completely between fluid outlet manifold 1062 and bearing assembly 1058, clocking housing 1100 can cover drive nut 1090, screw 1092, and collar 1102 and protect those components from dust and dirt. Furthermore, clocking housing 1100 increases the safety of feed pump 1012 by covering moving parts (e.g., drive nut 1090, screw 1092, and collar 1102) and shielding these moving parts from hands and fingers of users during use of feed pump 1012. Clocking housing 1100 thereby provides pinch protection.

The gaps between adjacent tie rods 1066 are larger than the width of clocking housing 1100. The arrangement of tie rods 1066 and clamshell configuration of clocking housing 1100 facilitate disassembly of clocking housing 1100 without requiring disassembly of feed pump 1012. The user can remove fasteners 1222 and fasteners 1220 and pull housing segments 1214*a*, 1214*b* radially away from axis PA, thereby removing clocking housing 1100 between tie rods 1066. Removing clocking housing 1100 provides user access to drive mechanism 1026, collar 1102, and the connection between screw 1092 and drive shaft 1068. The user can thereby access and service various components of feed pump 1012 without disassembling feed pump 1012 or even removing feed pump 1012 from fluid tank 1020. Such servicing saves time and cost and reduces downtime of system 1010.

Clocking assembly 1060 provides significant advantages. Clocking assembly 1060 facilitates pumping by locking screw 1092 rotationally relative axis PA such that screw 1092 translates along axis PA. Clocking assembly 1060 travels with screw 1092 to provide a compact arrangement for feed pump 1012. Clocking housing 1100 completely encloses collar 1102, preventing contaminants from reaching drive mechanism 1026 and protecting the user. The user can disassemble clocking assembly 1060 to access and service various components of feed pump 1012 without disassembling feed pump 1012 or even removing feed pump 1012 from fluid tank 1020. Such servicing saves time and cost and reduces downtime of system 1010.

Figure 18:
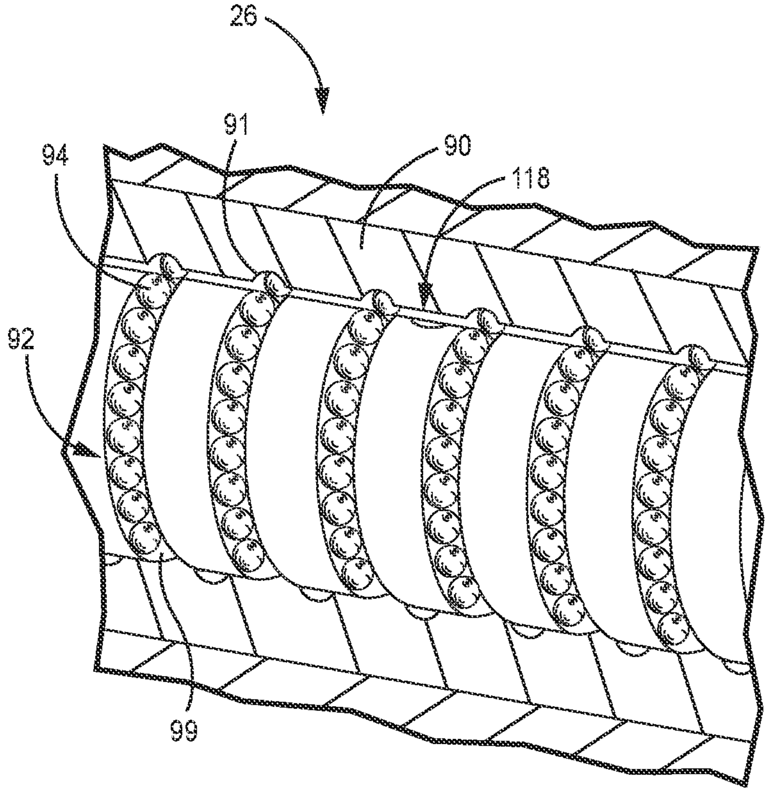
FIG. 18 is an isometric partial cross-sectional view of a first drive mechanism.
Figure 19:
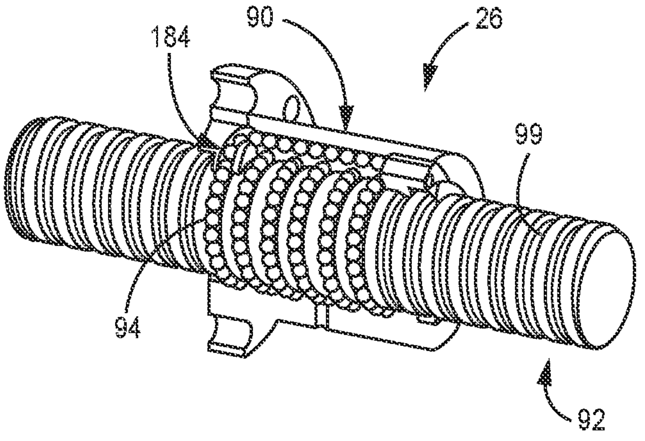
FIG. 19 is an isometric view of a second drive mechanism with the body of a drive nut removed.

FIG. 18 is an isometric partial cross-sectional view of drive mechanism 26. FIG. 19 is an isometric partial cross-sectional view of drive mechanism 26. FIGS. 18 and 19 will be discussed together. Drive nut 90, screw 92, and rolling elements 94 of drive mechanism 26 are shown. Nut thread 91 and screw thread 99 are shown. Drive mechanism 26 is substantially similar to drive mechanism 1026 (best seen in FIGS. 12A, 12B, and 15). Drive nut 90 is substantially similar to drive nut 1090 (best seen in FIGS. 12A, 12B, and 15). Screw 92 is substantially similar to screw 1092 (best seen in FIGS. 12A, 12B, and 15). Rolling elements 94 are substantially similar to rolling elements 1094 (FIGS. 12A, 12B, and 15).

Drive mechanism 26 receives a rotational output at drive nut 90 and provides a linear input along pump axis PA via screw 92. Drive nut 90 is disposed coaxially on pump axis PA with screw 92. Drive nut 90 is configured to rotate about pump axis PA. A hole or bore is formed axially through drive nut 90 to form an inner radial surface of drive nut 90. Nut thread 91 is formed on an inner radial surface of drive nut 90. Nut thread 91 can be formed by a single helical or spiral groove that extends circumferentially and axially along the inner radial surface of drive nut 90. In other examples, nut thread 91 can be formed by multiple spiral grooves that extend circumferentially along the inner radial surface of drive nut 90. Screw 92 extends axially through the central bore in drive nut 90. Screw thread 99 is formed on an exterior surface of screw 92. Together, nut thread 91 and screw thread 99 define a raceway that interfaces with rolling elements 94.

Rolling elements 94 are disposed in raceways formed by screw thread 99 and nut thread 91. Rolling elements 94 are disposed in radial gap 118 formed between drive nut 90 and screw 92. In the example shown in FIGS. 18 and 19, rolling elements 94 are balls that are guided between screw 92 and drive nut 90 by screw thread 99 and nut thread 91. As such, drive mechanism 26 can be considered to be a ball screw. Ball return 184 is configured to pick up rolling elements 94 and recirculate the rolling elements 94 within the raceway formed by screw thread 99 and nut thread 91. Ball return 184 can be of any type suitable for circulating rolling elements 94. In some examples, ball return 184 is an internal ball return such that rolling elements 94 not within the raceway pass through the body of drive nut 90.

Rolling elements 94 support screw 92 relative drive nut 90 such that each of drive nut 90 and screw 92 ride on rolling elements 94. Rolling elements 94 support screw 92 relative drive nut 90 to maintain gap 118 between drive nut 90 and screw 92 and such that drive nut 90 and screw 92 are not in direct contact during operation. Rolling elements 94 are arrayed around, and are arrayed along, an axis that is coaxial with pump axis PA. Drive nut 90 is configured to rotate relative to screw 92 about the axis. Nut thread 91 rotates with drive nut 90, while screw thread 99 travels axially with screw 92 without rotating. Rolling elements 94 exert axial driving forces on screw 92 at screw thread 99 to cause axial displacement of screw 92 along the axis (e.g., along pump axis PA). Drive mechanism 26 can thereby convert a rotational input to a linear output. Rolling elements 94 allow drive nut 90 to rotate relative to screw 92 with less friction loss and greater efficiency than if drive nut 90 was in direct contact with screw 92.

Drive nut 90 can be driven in a first rotational direction by a rotor shaft, such as rotor shaft 1086 (best seen in FIG. 15) or rotor shaft 42 (best seen in FIGS. 3A and 3B) to drive screw 92 in a first axial direction. For example, the first rotational direction can be the clockwise direction about axis PA and the first axial direction can be axially upward relative axis PA and gravity. Drive nut 90 can be driven by the rotor shaft in a second rotational direction opposite the first rotational direction to drive screw 92 in a second axial direction opposite the first axial direction. For example, the second rotational direction can be the counterclockwise direction about axis PA and the second axial direction can be axially downward relative to axis PA and gravity. While the above description provides drive mechanism 228 with a ball screw, another embodiment of drive mechanism is described below with reference to FIGS. 20 and 21.

Figure 20:
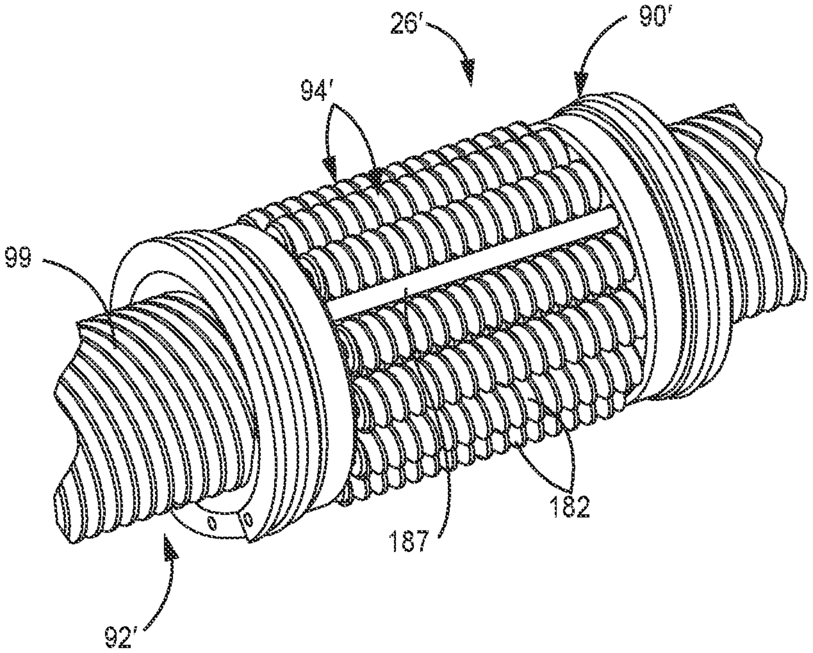
FIG. 20 is a partial cross-sectional view of a third drive mechanism.
Figure 21:
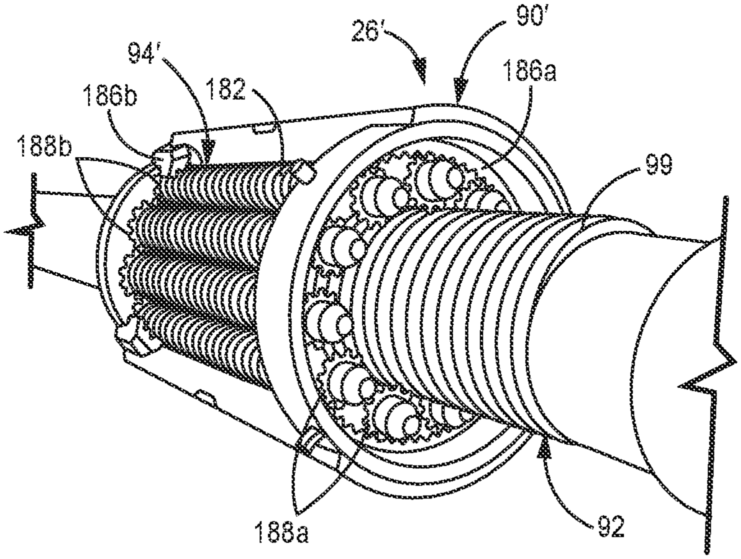
FIG. 21 is an isometric view of the drive mechanism shown in FIG. 12 with a portion of a drive nut removed.

FIG. 20 is an isometric view of drive mechanism 26' with the body of drive nut 90' removed to show rolling elements 94'. FIG. 21 is an isometric view of drive mechanism 26' with a portion of drive nut 90' removed. Drive mechanism 26' is substantially similar to drive mechanism 26 (best seen in FIGS. 3A and 3B) and drive mechanism 1026 (best seen in FIGS. 12A, 12B, and 15). Drive mechanism 26 includes drive nut 90', screw 92, and rolling elements 94'. Screw thread 99 of screw 92 is shown. Drive nut 90' includes drive rings 186*a*, 186*b* and support member 187. Each of rolling elements 94' include roller shafts 182 and end rollers 188*a*, 188*b*.

Screw 92 and drive nut 90' are disposed coaxially. Screw 92 extends axially through each of drive ring 186*a* and drive ring 186*b*. Rolling elements 94' are disposed radially between drive nut 90' and screw 92. Rolling elements 94' are arrayed around, and are arrayed along, an axis that is coaxial with pump axis PA. Drive ring 186*a* is spaced axially from drive ring 186*b* along the axis PA. Support member 187 is connected to both drive ring 186*a* and drive ring 186*b* and axially spaces drive ring 186*a* apart from drive ring 186*b*. Support member also rotationally locks first drive ring 186*a* to second drive ring 186*b* such that the drive rings 186*a*, 186*b* are unable to rotate relative to each other. Each drive ring 186*a*, 186*b* includes a plurality of gear teeth formed on a radially inner surface of that drive ring 186*a*, 186*b*. Drive rings 186*a*, 186*b* are the same shape and size and include the same number and size of gear teeth. Drive rings 186*a*, 186*b* can be considered to be rings gears.

Rolling elements 94' each include a common design. In the example shown, rolling elements 94' are rollers including end rollers 188*a*, 188*b* and roller shafts 182. As such, drive mechanism 26' can be considered to be a roller screw. Roller shafts 182 have threaded bodies that extend between the axial ends of each rolling element 94'. End rollers 188*a*, 188*b* are disposed at opposite axial ends of each roller shaft 182. End rollers 188*a*, 188*b* each include a plurality of gear teeth formed on an exterior surface of the rolling element 94'. Rolling elements 94' support drive nut 90' relative screw 92 such that each of drive nut 90' and screw 92 ride on rolling elements 94' and such that radial gap 118 is maintained between drive nut 90' and screw 92. Rolling elements 94' are disposed circumferentially and symmetrically about screw 92. Rolling elements 94' maintain radial gap 118 between drive nut 90' and screw 92 such that drive nut 90' and screw 92 are not in direct contact during operation. The teeth of end rollers 188*a*, 188*b* mesh with the teeth of drive rings 186*a*, 186*b*. End rollers 188*a*, 188*b* can be considered to be planetary gears. End rollers 188*a*, 188*b* do not directly engage with screw 92. Instead, each roller shaft 182 includes threading configured to mate with screw thread 99 to exert driving force on screw 92 by that threaded interface. As drive nut 90' rotates, engagement between end rollers 188*a*, 188*b* and drive rings 186*a*, 186*b* causes each rolling element 94' to rotate about its own axis and causes the array of rolling elements 94' to rotate about pump axis PA. Roller shafts 182 engage screw thread 99 and exert an axial driving force on screw thread 99 to linearly displace screw 92 along pump axis PA.

Figure 22:
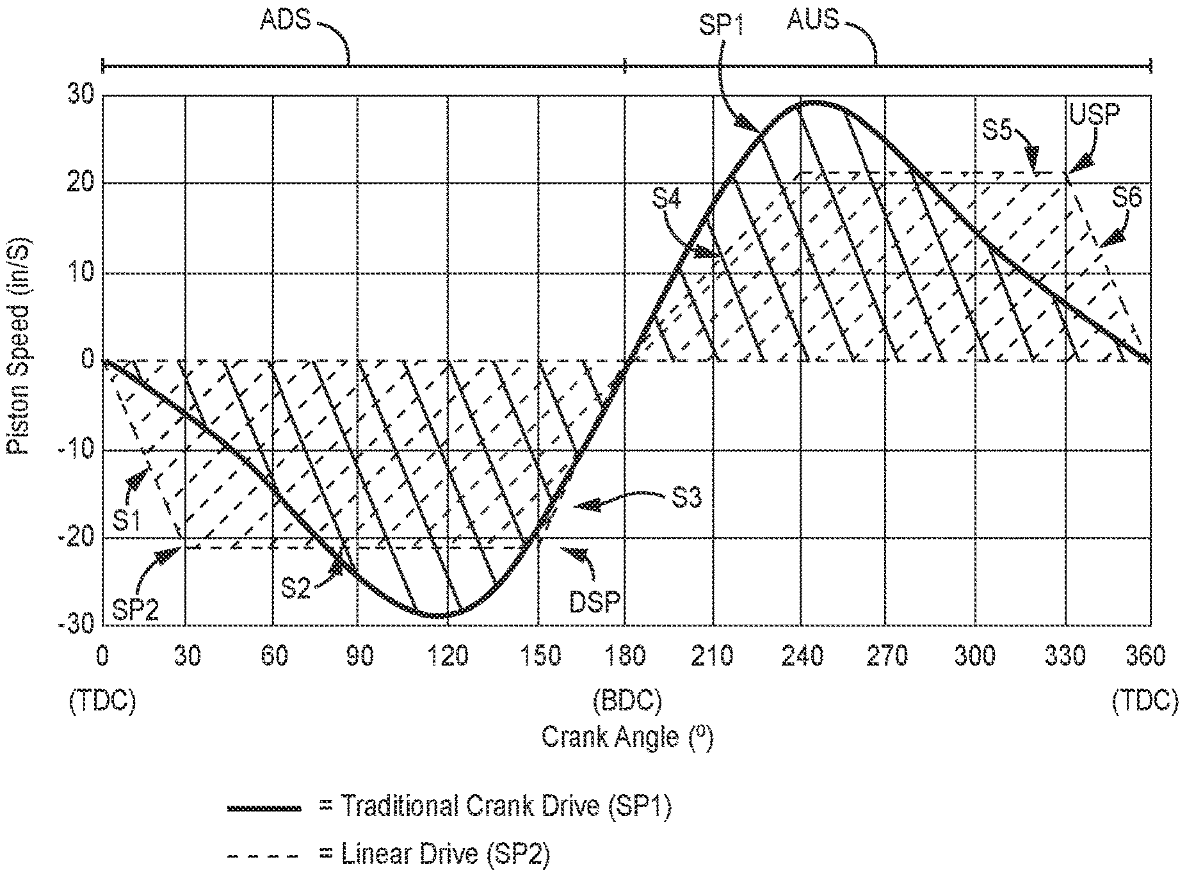
FIG. 22 is a graph illustrating a piston speed profile for a conventional crank drive overlaid with a piston speed profile for an electrically powered co-linear pumping assembly.

FIG. 22 is a graph illustrating a piston speed profile SP1 for a conventional crank drive overlaid with piston speed profile SP2 for pumps 12, 12', 1012. The lower horizontal axis relates to crank angle for piston speed profile SP1, which crank angle is not applicable to pumps 12, 12', 1012 as pumps 12, 12', 1012 linearly displace its associated fluid displacement member (e.g., fluid displacement members 34, 1113) without a crank. Downstroke profile DSP is associated with a downstroke of the fluid displacement member and upstroke profile USP is associated with an upstroke of the fluid displacement member. Pump 12, 12', 1012 displaces fluid already within the pump during the downstroke and both displaces fluid from the pump and intakes additional fluid during the upstroke. The downstroke can also be referred to as a pumping stroke and the upstroke can also be referred to as a suction stroke.

Piston speed profile SP1 shows a speed profile for a typical crank drive that consists of an offset crankshaft, a connecting link that connects the offset portion of the crankshaft to a linear slider that slides in a bearing, and the slider is connect to the top of a pump rod. As the crankshaft rotates, the connecting link oscillates side to side, typically from +30° to −30°, which creates a side load on the bearing. The linear slider and the pump rod motions are purely axial and reciprocate up and down.

Piston speed profile SP1 is a skewed sinusoid. If the connecting link length were infinite, the profile would approach a perfect sinusoid, and the two peaks would occur at 90° and 270°. But because the connecting link length is limited, the first peak is delayed to ~110°, and the second peak occurs sooner at ~250°. Because these peaks are not in the middle of either the upstroke or down stroke, the accelerations and side loads are higher; the piston speed is higher, which result in higher wear and undesirable pump filling speed, which may result in undesirable cavitation.

Piston speed profile SP2 is overlaid on piston speed profile SP2 for illustrative purposes. It is understood that the slopes and plateau values can vary from those shown. Furthermore, pump 12, 12', 1012, for which piston speed profile SP2 applies, does not include a crank, so the lower Crank Angle horizontal axis applies only to piston speed profile SP1, while the areas associated with a downstroke ADS and upstroke AUS are shown along the upper horizontal axis and apply to both piston speed profiles SP1 and SP2.

Controller 29, 1029 is configured to control operation of motor 24, 1056 to control the speed, acceleration rate, and deceleration rate of the fluid displacement member through each of the upstroke and the downstroke. Controller 29, 1029 can control the rotational speed and acceleration of the rotor 74, 1084 such that rotor 74, 1084 accelerates slower on the upstroke than on the downstroke. The slower acceleration on the upstroke prevents formation of a vacuum within the pump, thereby preventing undesired cavitation during the upstroke. Controller 29, 1029 can further control rotation of rotor 74, 1084 such that the steady state speed on the upstroke is less than the steady state speed on the downstroke, further avoiding cavitation. Piston speed profile SP2 can thereby be asymmetric, with different profiles for the upstroke and the downstroke. It is understood that controller 29, 1029 can adjust the slope and plateau values for each of the pressure stroke and the suction stroke based on feedback from any one or more sensors and/or from motor 24, 1056.

The downstroke profile DSP includes acceleration segment S1, steady speed segment S2, and deceleration segment S3. The upstroke profile USP includes acceleration segment S4, steady speed segment S5, and deceleration segment S6. Controller 29, 1029 is capable of controlling the speed of rotation of rotor 74, 1084 and thus the speed of reciprocation of the fluid displacement member to provide any desired piston speed profile SP2. Piston speed profile SP2 reduces wear and provides greater pumping efficiency and can provide greater flow through a single pump cycle. Piston speed profile SP2 reduces pressure drop at changeover, reduces the chance of cavitation, and causes the pump to output fluid at consistent pressure and/or flow rate. The reciprocation of the fluid displacement member is controlled such that the pump powered by the electric motor 24, 1056 can provide an output similar to that of a pneumatically powered pump, but at higher pressures and with greater responsiveness and control.

During acceleration segment S1, the fluid displacement member is moving through the downstroke and accelerating. For pumps 12, 12', check valve 106*a* closes and check valve 106*b* opens during the downstroke. For pump 1012, check valve 1126 closes and check valve 1128 opens. After accelerating, the fluid displacement member moves at a set, steady speed. In steady speed segment S2, the motor 24, 1056 causes the fluid displacement member to move through the downstroke but at a steady linear speed. The constant speed of the fluid displacement member results in stable pressure that maintains a constant spray pattern width as fluid is emitted from the sprayer (e.g., spray gun 16 or applicator 1034). In deceleration segment S3, the fluid displacement member decelerates as the fluid displacement member approaches the end of the downstroke. The fluid displacement member changes over from the downstroke to the upstroke at the intersection between deceleration segment S3 and acceleration segment S4, where the speed of the fluid displacement member is zero.

After completing the downstroke, the fluid displacement member is driven through an upstroke. During acceleration segment S4, fluid the displacement member is moving through the upstroke and accelerating. In pumps 12, 12', check valve 106*a* opens and check valve 106*b* closes during the upstroke. In pump 1012, check valve 1126 opens and check valve 1128 closes. It is desirable to have check valve 106*b*, 1128 close in the shortest time period possible to minimize any flow retrograde flow through that check valve 106*a*, 1126 and to minimize pressure drop. Acceleration segment S4 has a more gradual slope than acceleration profile S1, such that the fluid displacement member can take a longer portion of the upstroke to accelerate to the steady speed than used to accelerate to the steady speed during the downstroke. Acceleration segment S4 has a more gradual slope than acceleration segment S1 to ensure that the fluid flows into the pump without generating a vacuum that could cause the fluid to cavitate. The gentler acceleration profile S4 relative to acceleration profile S1 avoids such cavitation. Cavitation is not an issue during the downstroke as additional fluid is not being drawn into the pump.

After accelerating, the fluid displacement member moves at a set, steady speed. In steady speed segment S5, the fluid displacement member continues to displace through the upstroke and moves at a steady speed. In some examples, the speed of steady speed segment S5 is less than the speed of steady speed segment S2, to further avoid cavitation. The slower acceleration of acceleration profile S1 and the lower speed of steady speed segment S5 provides additional time for fluids to move into the pumping chamber of displacement pump 28, reducing vacuum pressure and avoiding cavitation. In examples of plural component spray systems, such as system 1010, reducing vacuum pressure also helps maintain the component materials at desired ratios.

The constant speed of the fluid displacement member during steady speed segment S5 also results in stable pressure that maintains a constant spray pattern width as fluid is emitted from the sprayer. In deceleration segment S6, the fluid displacement member decelerates as the fluid displacement member approaches the end of the upstroke. The fluid displacement member changes over from the upstroke to the downstroke at the end of deceleration segment S6.

Acceleration segments S1 and S4 and deceleration segments S3 and S6 are periods of time where the fluid displacement member is changing speed, which can also be referred to as periods of changeover. The changeover periods can reduce flow from the pump, thereby resulting in lower pressures and flowrates. A reduced pressure reduces the spray fan width and makes it more difficult to atomize the fluid, which can result in coarser droplets and unatomized fluid at the extreme ends of the spray pattern. Reduced pressure from a feed pump 1012 in a plural component spray system can also increase the chance of cavitation in the downstream proportioner pumps 1022*a*, 1022*b*. Piston speed profile SP2 provides significantly less changeover time for acceleration and deceleration as compared to piston speed profile SP1, providing greater pump efficiency, a more consistent spray pattern, a more consistent pressure and flow rate, improved spray quality, and reduced pump wear, among other benefits.

Steady speed segments S2 and S4 are periods of time where the piston speed, and therefore the pump flow and pressure, is constant. The electric motor 24, 1056 provides quick reaction to accelerate back to the speed of steady speed segments S2, S4 if the pump stalls mid-stroke due to the sprayer being detriggered. The peak speeds of piston speed profile SP2 are substantially lower than the peak speeds of piston speed profile SP1. This reduces the wear on the pump, provides enhanced pressure stabilization, and prevents cavitation.

The area of the curves of each of piston speed profile SP1 and piston speed profile SP2 are proportional to the total flow from the pump. The areas under the curves of each of piston speed profile SP1 and piston speed profile SP2 are approximately equal, such that the pumps 12, 12', 1012 reduce undesired acceleration and deceleration and provides lower peak forces while providing the same or similar flow and pressure.

While the pumping assemblies of this disclosure are discussed in the context of a spraying system, it is understood that the pumping assemblies and controls can be utilized in a variety of fluid handing contexts and systems and are not limited to those discussed. Any one or more of the pumping assemblies discussed can be utilized alone or in unison with one or more additional pumps to transfer fluid for any desired purpose, such as location transfer, spraying, metering, application, etc.

DISCUSSION OF NON-EXCLUSIVE EXAMPLES

The following are non-exclusive descriptions of possible embodiments of the present disclosure.

A pumping assembly for pumping a fluid from an upstream fluid source to a downstream location includes a motor including a stator and a rotor, the rotor configured to rotate relative the stator on a pump axis; a pump frame supporting the motor by a first static connection and a first dynamic connection; and a drive mechanism connected to the rotor, the drive mechanism configured to receive a rotational output from the rotor and convert the rotational output into a linear input along the pump axis to cause pumping of the fluid.

The pumping assembly of the preceding paragraph can optionally include, additionally and/or alternatively, any one or more of the following features, configurations and/or additional components:

The drive mechanism includes a drive nut connected to the rotor to rotate with the rotor; a screw elongated along the pump axis and disposed coaxially on the pump axis; and a plurality of rolling elements disposed radially between the drive nut and the screw and supporting the drive nut relative the screw to maintain a radial gap between the drive nut and the screw.

The plurality of rolling elements are formed by one of balls and rollers.

A lubricant fitting connected to one of the drive nut and the screw.

The lubricant fitting is fluidly connected to a bore extending axially through the screw.

The lubricant fitting is disposed within the bore.

A main body of the pump frame extends in a first axial direction relative a first axial end of the motor, and wherein the first static connection is formed between the pump frame and a second axial end of the motor disposed opposite the first axial end.

The pump frame further comprises a frame member disposed at the second axial end of the motor and fixed to the motor; and a connecting member extending between the frame member and the main body and fixing the frame member to the main body. The motor is disposed axially between the main body and the frame member.

The connecting member includes a plurality of connecting members forming an exoskeleton about the motor.

The exoskeleton is formed by a plurality of tie rods.

At least a portion of the drive mechanism is disposed within the main body.

The main body is formed from a plurality of component parts fastened together.

The first dynamic connection is formed by a bearing supporting the motor on the pump frame, the bearing configured to react axial loads in each of a first axial direction and a second axial direction.

The bearing is disposed radially between and a rotor shaft and the pump frame, wherein the rotor shaft extends in the first axial direction from the rotor and is disposed at least partially within the pump frame.

The rotor shaft extends in the first axial direction on the pump axis, and wherein the rotor shaft includes a first shaft end connected to the drive mechanism and a second shaft end connected to a rotor body of the rotor.

The rotor shaft is disposed radially between the main body and a screw of the drive mechanism with the screw disposed in a first position associated with an end of an upstroke.

The rotor shaft is disposed radially between the screw and the bearing with the screw disposed in the first position.

The first static connection is formed at a second axial end of the motor disposed opposite a first axial end of the motor, and wherein a permanent magnet array of the rotor is disposed axially between the first static connection and the bearing.

The pump frame includes a frame member connected to the motor at the second axial end to form the first static connection.

A main body of the pump frame extends in the first axial direction relative the motor, and wherein the motor is disposed axially between the main body and the first static connection.

The bearing is disposed axially between a rotating component of the drive mechanism and the motor.

The drive mechanism comprises a drive nut connected to an end of the rotor shaft to rotate with the rotor; a screw elongate along the pump axis and disposed coaxially on the pump axis; and a plurality of rolling elements disposed radially between the drive nut and the screw and supporting the drive nut relative the screw to maintain a radial gap between the drive nut and the screw. The bearing is disposed axially between the drive nut and the motor.

The rotor is disposed about the stator such that the motor includes an outer rotator A displacement pump having a pump body and a piston. The pump body is connected to the pump frame by a second static connection; and the piston is connected to the drive mechanism by a second dynamic connection.

The first dynamic connection is disposed axially between the first static connection and the second static connection.

The pump frame is mounted to a support frame having wheels.

A fluid spray system includes a handheld spray gun configured to atomize a pumped fluid into a fluid spray and the pumping assembly of any of the previous examples disposed upstream of and fluidly connected to the spray applicator to pump spray fluid to the spray applicator.

A pumping assembly for pumping a fluid includes a motor including a stator and a rotor, the rotor configured to rotate relative the stator on a pump axis; a pump frame supporting the motor by a first static connection and a first dynamic connection; a drive mechanism connected to the rotor, the drive mechanism configured to receive a rotational output from the rotor and convert the rotational output into a linear input along the pump axis to cause pumping of the fluid; and a displacement pump fixed to the pump frame by a second static connection and connected to the drive mechanism by a second dynamic connection.

The pumping assembly of the preceding paragraph can optionally include, additionally and/or alternatively, any one or more of the following features, configurations and/or additional components:

The first dynamic connection is disposed axially between the first static connection and the second static connection.

The first dynamic connection is formed by a bearing configured to transfer axial loads generated by the displacement pump in each of a first axial direction and a second axial direction to the pump frame, thereby isolating the motor from the axial loads.

The second dynamic connection is formed between a screw of the drive mechanism and a fluid displacement member of the displacement member, wherein the screw and the fluid displacement member are disposed coaxially on the pump axis.

A fluid sprayer includes a frame elongate along an axis to have a first end and a second end; a motor mounted on the first end of the frame, the motor electrically powered, the motor comprising a rotor and a stator, the rotor rotating about an axis, the motor configured to output rotational motion; a pump mounted on the second end of the frame, the pump comprising a piston and a cylinder, the piston reciprocating along the axis within the cylinder; a drive mechanism supported by the frame and located directly between the motor and the pump, the drive mechanism comprising a screw that is elongate along the axis, the screw only one of linearly translating along or rotating about the axis, the drive mechanism outputting linear reciprocating motion, wherein the piston receives the linear reciprocating motion output by the drive mechanism to reciprocate the piston along the axis while the cylinder is braced by the frame such that the piston reciprocates within the cylinder.

The fluid sprayer of the preceding paragraph can optionally include, additionally and/or alternatively, any one or more of the following features, configurations and/or additional components:

The drive mechanism includes a drive nut connected to the rotor to rotate with the rotor; a screw elongated along the pump axis and disposed coaxially on the pump axis; and a plurality of rolling elements disposed radially between the drive nut and the screw and supporting the drive nut relative the screw to maintain a radial gap between the drive nut and the screw.

A lubricant fitting connected to one of the drive nut and the screw.

The lubricant fitting is fluidly connected to a bore extending axially through the screw.

A main body of the frame extends in a first axial direction relative the motor, and wherein a first static connection is formed between the frame and an end of the motor disposed opposite the first end of the frame.

The pump frame further includes a frame member disposed at the second axial end of the motor and fixed to the motor; and a connecting member extending between the frame member and the main body and fixing the frame member to the main body. The motor is disposed axially between the main body and the frame member.

The connecting member includes a plurality of connecting members forming an exoskeleton about the motor.

At least a portion of the drive mechanism is disposed within the main body.

The main body is formed from a plurality of component parts fastened together.

A first dynamic connection is formed by a bearing supporting the motor on the frame, the bearing configured to react axial loads in each of a first axial direction and a second axial direction.

The bearing is disposed radially between and a rotor shaft and the frame, wherein the rotor shaft extends in the first axial direction from the rotor and is disposed at least partially within the frame.

The rotor shaft extends in the first axial direction on the axis, and wherein the rotor shaft includes a first shaft end connected to the drive mechanism and a second shaft end connected to a rotor body of the rotor.

The rotor shaft is disposed radially between the main body and a screw of the drive mechanism with the screw disposed in a first position associated with an end of an upstroke.

The rotor shaft is disposed radially between the screw and the bearing with the screw disposed in the first position.

A first static connection is formed at an end of the motor disposed opposite the first end of the frame, and wherein a permanent magnet array of the rotor is disposed axially between the first static connection and the bearing.

A main body of the frame extends in the first axial direction relative the motor, and wherein the motor is disposed axially between the main body and the first static connection.

The bearing is disposed axially between a rotating component of the drive mechanism and the motor.

The drive mechanism includes a drive nut connected to an end of the rotor shaft to rotate with the rotor; a screw elongate along the pump axis and disposed coaxially on the pump axis; and a plurality of rolling elements disposed radially between the drive nut and the screw and supporting the drive nut relative the screw to maintain a radial gap between the drive nut and the screw. The bearing is disposed axially between the drive nut and the motor.

The rotor is disposed about the stator such that the motor includes an outer rotator.

The cylinder is connected to the frame by a second static connection and the piston is connected to the drive mechanism by a second dynamic connection.

The first dynamic connection is disposed axially between the first static connection and the second static connection.

The pump frame is mounted to a support frame having wheels.

A pumping assembly includes a motor including a stator and a rotor, the rotor configured to rotate on a pump axis about the stator to cause reciprocation of a fluid displacement member of a pump on the pump axis; a drive mechanism connected to the rotor, the drive mechanism configured to convert a rotational output from the rotor into a linear input along the pump axis to cause pumping of the fluid by the fluid displacement member; and a bearing supporting the rotor and configured to react axial loads in both a first axial direction along the pump axis and a second axial direction along the pump axis.

The pumping assembly of the preceding paragraph can optionally include, additionally and/or alternatively, any one or more of the following features, configurations and/or additional components:

The rotor is supported on an axle of the motor by a first bearing disposed at a first axial end of the motor and a second bearing disposed at a second axial end of the motor.

The rotor includes a rotor body supporting a plurality of permanent magnets and a rotor shaft extending in the first axial direction from the rotor body.

The rotor shaft extends into a pump frame and the bearing is disposed radially between the rotor shaft and the pump frame.

The motor is disposed at a first end of the pump frame.

A displacement pump mounted to a second send of the pump frame disposed opposite the first end of the pump frame, wherein the displacement pump includes a piston connected to the drive mechanism to be translated along the pump axis by the drive mechanism.

The displacement pump is a double displacement pump such that the displacement pump is configured to output fluid during an upstroke of the piston and during a downstroke of the piston.

The rotor shaft includes a first shaft component extending in the first axial direction from a first end of the rotor body; and a second shaft component extending in the first axial direction from the first shaft component. The bearing is disposed in a first notch formed by the first shaft component and the second shaft component.

The pump frame includes a first body component at least partially axially overlapping the first shaft component; and a second body component at least partially axially overlapping the second shaft component. The bearing is disposed in a second notch formed by the first body component and the second body component.

The bearing extends radially between a first notch formed on the rotor shaft and a second notch formed on the pump frame.

The rotor body contacts the bearing.

The bearing is disposed axially between a drive nut of the drive mechanism and the motor.

The drive mechanism includes a drive nut connected to the rotor to be rotatably driven by the rotor; a screw disposed coaxially with the drive nut on the pump axis and configured to be driven linearly by rotation of the drive nut; and a plurality of rolling elements disposed radially between the screw and the drive nut.

The drive nut is spaced from the bearing in the first axial direction and the motor is spaced from the bearing in the second axial direction.

The screw axially overlaps with the bearing with the screw in a first position associated with the end of an upstroke.

The rotor includes a rotor shaft extending in the first axial direction from the rotor into a pump frame; the bearing is disposed between the rotor shaft and the pump frame; and the drive nut is mounted to an end of the rotor shaft disposed opposite the motor.

The end of the rotor shaft includes a radial flange, wherein a first side of the radial flange forms at least a part of an inner groove supporting the bearing.

The drive nut contacts a second side of the radial flange.

The bearing comprises a double row angular contact bearing.

A fluid spray system includes a handheld spray gun configured to atomize a pumped fluid into a fluid spray; and the pumping assembly of any one of the previous examples disposed upstream of and fluidly connected to the spray applicator to pump spray fluid to the spray applicator.

A pumping assembly includes a motor having a stator and a rotor disposed coaxially about the stator on a pump axis, the rotor including a rotor shaft extending in a first axial direction from a rotor body of the rotor; a pump frame extending in the first axial direction from a first end of the motor such that the rotor shaft extends into the pump frame, wherein the pump frame is connected to the stator to support the motor; a drive mechanism connected to the rotor shaft, the drive mechanism configured to convert a rotational output from the rotor to a linear input along the pump axis; and a bearing supporting the motor relative the pump frame and configured to transmit axial forces to the pump frame.

The pumping assembly of the preceding paragraph can optionally include, additionally and/or alternatively, any one or more of the following features, configurations and/or additional components:

A fluid displacement member connected to a screw of the drive mechanism to be driven in the first axial direction and a second axial direction by the screw.

The drive mechanism includes a drive nut disposed coaxially with the screw on the pump axis, the drive nut connected to the rotor shaft to receive the rotational output.

The bearing is disposed axially between the drive nut and the rotor body.

A method of pumping fluid to a spray gun to generate an atomized fluid spray includes driving rotation of a rotor of an electric motor about a pump axis and about a stator of the motor; displacing a screw of a drive mechanism axially along the pump axis by the rotation of the rotor; reciprocating a fluid displacement member connected to the screw along the pump axis by displacing the screw along the pump axis, wherein reciprocating the fluid displacement member causes the fluid displacement member to pump fluid; receiving axial loads generated during pumping at the drive mechanism; and transmitting the axial loads to a pump frame by a bearing disposed radially between the pump frame and a rotor shaft connecting the drive mechanism to the rotor.

A portable fluid sprayer includes a frame having a first end and a second end; a motor mounted on the first end of the frame, the motor electrically powered and having a rotor and a stator, wherein the motor is configured to output rotational motion about an axis; a pump mounted on the second end of the frame, the pump comprising a piston and a cylinder, wherein the piston is configured to reciprocate along the axis within the cylinder; a drive mechanism supported by the frame and located axially between the motor and the pump, the drive mechanism comprising a screw that is elongate along the axis, the screw configured to only one of linearly translate along or rotate about the axis, the drive mechanism configured to output linear reciprocating motion; a bearing assembly located between the drive mechanism and the motor. The piston is configured to receive the linear reciprocating motion output by the drive mechanism and to reciprocate within the cylinder through an upstroke and a downstroke. The piston receives a downward reaction force when moving through the upstroke and an upward reaction force when moving through the downstroke. The drive mechanism and the bearing assembly are arranged such that both of the upward reaction force and the downward reaction force transfer through the drive mechanism and to the bearing assembly. The bearing assembly permits rotational motion to pass within the bearing assembly from the motor to the drive mechanism while the bearing assembly prevents some or all of both of the downward reaction force and the upward reaction force from transferring to the rotor.

The fluid sprayer of the preceding paragraph can optionally include, additionally and/or alternatively, any one or more of the following features, configurations and/or additional components:

The bearing assembly transfers the downward reaction force and the upward reaction force to the rotor frame.

The bearing assembly comprises a double row angular contact bearing.

The bearing assembly includes an inner race, an outer race, and a plurality of rolling elements disposed between the inner race and the outer race.

The inner race is supported by a rotor shaft extending between and connecting the rotor and the drive mechanism.

The outer race is supported by the frame.

The bearing assembly includes a first annular array of rolling elements and a second annular array of rolling elements spaced axially from the first annular array of rolling elements.

The rolling elements include balls.

The rolling elements include rollers.

The rotor is supported on an axle of the motor by a first motor bearing disposed at a first axial end of the motor and a second motor bearing disposed at a second axial end of the motor.

The rotor includes a rotor body supporting a plurality of permanent magnets and a rotor shaft extending in the first axial direction from the rotor body.

The rotor shaft extends into the frame and the bearing assembly is disposed radially between the rotor shaft and the frame.

The pump is a double displacement pump such that the pump is configured to output fluid during both the upstroke of the piston and the downstroke of the piston.

The rotor shaft includes a first shaft component extending in the first axial direction from a first end of the rotor body; and a second shaft component extending in the first axial direction from the first shaft component. The bearing is disposed in a first notch formed by the first shaft component and the second shaft component.

The frame includes a first body component at least partially axially overlapping the first shaft component; and a second body component at least partially axially overlapping the second shaft component. The bearing is disposed in a second notch formed by the first body component and the second body component.

The bearing extends radially between a first notch formed on the rotor shaft and a second notch formed on the pump frame.

A rotor body of the rotor contacts the bearing assembly.

The bearing is disposed axially between a drive nut of the drive mechanism and the motor.

The drive mechanism includes a drive nut connected to the rotor to be rotatably driven by the rotor; a screw disposed coaxially with the drive nut on the pump axis and configured to be driven linearly by rotation of the drive nut; and a plurality of rolling elements disposed radially between the screw and the drive nut.

The drive nut is spaced from the bearing in the first axial direction and the motor is spaced from the bearing in the second axial direction.

The screw axially overlaps with the bearing assembly with the screw in a first position associated with the end of the upstroke.

The rotor includes a rotor shaft extending in a first axial direction from the rotor into the frame; the bearing assembly is disposed between the rotor shaft and the frame; and the drive nut is mounted to an end of the rotor shaft disposed opposite the motor.

The end of the rotor shaft includes a radial flange, wherein a first side of the radial flange forms at least a part of an inner groove supporting the bearing.

The drive nut contacts a second side of the radial flange.

A pumping assembly includes a motor and a drive mechanism. The motor including a stator and a rotor, the rotor configured to rotate about the stator on a pump axis. The rotor includes a rotor body including a plurality of permanent magnets; and a rotor shaft disposed coaxially on the pump axis and extending in a first axial direction from the rotor body. The drive mechanism connected to an end of the rotor shaft opposite the rotor body, wherein the drive mechanism is configured to receive a rotational output from the rotor and generate a linear input along the pump axis to cause pumping of the fluid. The rotor shaft defines a cavity, and wherein at least a portion of the drive mechanism is disposed within the cavity.

The pumping assembly of the preceding paragraph can optionally include, additionally and/or alternatively, any one or more of the following features, configurations and/or additional components:

The drive mechanism comprises a drive nut connected to the end of the rotor shaft to be rotatably driven by the rotor; and a screw disposed coaxially with the drive nut on the pump axis, the screw configured to be driven linearly on the pump axis by rotation of the drive nut.

The drive mechanism further comprises a plurality of rolling elements disposed radially between the screw and the drive nut and supporting the drive nut relative the screw.

The screw includes a first end oriented towards the motor and a second end disposed opposite the first end, wherein the first end is disposed within the cavity.

The cavity extends in a second axial direction into the rotor shaft from a first shaft end of the rotor shaft, wherein the first shaft end is connected to the drive nut, and wherein the screw extends into the cavity through the first shaft end.

The cavity extends in the second axial direction to a second shaft end of the rotor shaft.

The second shaft end is connected to the rotor body.

The second shaft end is closed.

The second cavity end is open.

The screw extends through the second cavity end with the screw disposed in a first position associated with the end of a stroke in the second axial direction.

The screw occupies a majority of a volume of the cavity with the screw disposed in a first position associated with the end of a stroke in the second axial direction.

The screw includes a first end oriented towards the motor and a second end disposed opposite the first end, wherein the first end axially overlaps with the rotor shaft for at least a portion of a stroke of the screw.

The second end does not axially overlap with the rotor shaft during the stroke.

The first end of the screw axially overlaps with the rotor shaft with the screw disposed in a first position associated with an end of a stroke in the second axial direction.

The first end of the screw does not axially overlap with the rotor shaft with the screw disposed in a second position associated with an end of a stroke in the first axial direction.

The rotor shaft includes a first shaft component extending in the first axial direction from the rotor body; and a second shaft component extending in the first axial direction from the first shaft component. The drive nut is connected to the second shaft component.

The rotor shaft does not axially overlap with the stator.

A first static connection is formed between a pump frame and the stator at a second end of the motor, wherein the rotor shaft extends axially from a first end of the motor disposed opposite the second end.

A first dynamic connection is formed between the rotor shaft and the pump frame, the first dynamic connection allowing for relative rotational movement between the rotor shaft and the pump frame and preventing relative axial movement between the rotor shaft and the pump frame.

The rotor shaft, the drive mechanism, and a fluid displacement member of a pump are disposed coaxially on the pump axis.

A fluid spray system includes a handheld spray gun configured to atomize a pumped fluid into a fluid spray; and the pumping assembly of any of the preceding paragraphs disposed upstream of and fluidly connected to the spray applicator to pump spray fluid to the spray applicator.

A pumping assembly includes a motor having a stator and a rotor, the rotor disposed coaxially about the stator on a pump axis and including a rotor shaft extending in a first axial direction from a rotor body of the rotor, wherein the rotor shaft at least partially defines a cavity; a pump frame supporting the motor, wherein the rotor shaft extends into the pump frame; a drive mechanism connected to the rotor shaft, the drive mechanism configured to convert a rotational output from the rotor shaft to a linear input along the pump axis, wherein at least a portion of a linear drive element of the drive mechanism axially extends into the cavity of the rotor shaft.

The pumping assembly of the preceding paragraph can optionally include, additionally and/or alternatively, any one or more of the following features, configurations and/or additional components:

The drive mechanism further comprises a drive nut connected to the rotor shaft to rotate with the rotor shaft, and wherein the linear drive element includes a screw configured to be driven linearly by rotation of the drive nut.

The screw occupies a majority of a volume of the cavity with the screw in a first position associated with an end of a stroke in a second axial direction opposite the first axial direction.

A method of pumping fluid to a spray gun to generate an atomized fluid spray includes driving rotation of a rotor of an electric motor about a pump axis and about a stator of the motor, the rotor including a rotor shaft coaxial with the pump axis and extending in a first axial direction from a rotor body of the rotor; displacing a screw of a drive mechanism axially along the pump axis by the rotation of the rotor; and reciprocating a fluid displacement member connected to the screw along the pump axis by displacing the screw along the pump axis to pump a fluid. At least a portion of the screw axially overlaps with the rotor shaft for at least a portion of a reciprocation cycle of the screw.

The method of the preceding paragraph can optionally include, additionally and/or alternatively, any one or more of the following features, configurations and/or additional components:

Displacing the screw of the drive mechanism axially along the pump axis includes displacing the screw in a second axial direction opposite the first axial direction and within a cavity defined by the rotor shaft thereby increasing an axial overlap between the screw and the rotor shaft.

Displacing the screw in the second axial direction includes displacing the screw within the cavity and to a first position associated with an end of a stroke in the second axial direction.

Displacing the screw of the drive mechanism axially along the pump axis further comprises decreasing the axial overlap between the screw and the rotor shaft by displacing the screw in the first axial direction and to a second position associated with an end of a stroke in the first axial direction.

A fluid pump apparatus includes a frame having a first end and a second end; a motor mounted on the first end of the frame, the motor electrically powered, the motor comprising a rotor and a stator, the rotor rotating about an axis, the motor configured to output rotational motion; a pump mounted on the second end of the frame, the pump comprising a piston and a cylinder; a drive mechanism supported by the frame and located directly between the motor and the pump, the drive mechanism comprising a screw having a first end, the drive mechanism outputting linear reciprocating motion; and a rotor shaft located between the motor and the drive mechanism, the rotor shaft conveying the rotational motion from the motor to the drive mechanism, the rotor shaft comprising a cavity within which the first end of the screw linearly translates.

The fluid pump of the preceding paragraph can optionally include, additionally and/or alternatively, any one or more of the following features, configurations and/or additional components:

The drive mechanism further includes a drive nut connected to the rotor shaft to be rotatably driven by the rotor; and wherein the screw is disposed coaxially with the drive nut on the pump axis, the screw configured to be driven linearly on the pump axis by rotation of the drive nut.

The drive mechanism further comprises a plurality of rolling elements disposed radially between the screw and the drive nut and supporting the drive nut relative the screw.

The cavity extends in a second axial direction into the rotor shaft from a first shaft end of the rotor shaft, wherein the first shaft end is connected to the drive nut, and wherein the screw extends into the cavity through the first shaft end.

The cavity extends in the second axial direction to a second shaft end of the rotor shaft.

The second shaft end is connected to the rotor body.

The second shaft end is closed.

The second cavity end is open.

The screw extends through the second cavity end with the screw disposed in a first position associated with the end of a stroke in the second axial direction.

The screw occupies a majority of a volume of the cavity with the screw disposed in a first position associated with the end of a stroke in the second axial direction.

The screw includes a second end disposed opposite the first end, wherein the first end axially overlaps with the rotor shaft for at least a portion of a stroke of the screw.

The second end does not axially overlap with the rotor shaft during the stroke.

The first end of the screw axially overlaps with the rotor shaft with the screw disposed in a first position associated with an end of a stroke in the second axial direction.

The first end of the screw does not axially overlap with the rotor shaft with the screw disposed in a second position associated with an end of a stroke in the first axial direction.

The rotor shaft includes a first shaft component extending in the first axial direction from the rotor body; and a second shaft component extending in the first axial direction from the first shaft component. The drive nut is connected to the second shaft component.

The rotor shaft does not axially overlap with the stator.

A first static connection is formed between a pump frame and the stator at a second end of the motor, wherein the rotor shaft extends axially from a first end of the motor disposed opposite the second end.

A first dynamic connection is formed between the rotor shaft and the pump frame, the first dynamic connection allowing for relative rotational movement between the rotor shaft and the pump frame and preventing relative axial movement between the rotor shaft and the pump frame.

The rotor shaft, the drive mechanism, and a fluid displacement member of a pump are disposed coaxially on the pump axis.

A pumping assembly includes a motor including a stator and a rotor, the rotor configured to rotate about the stator on a pump axis; a drive mechanism connected the rotor and configured to convert a rotational output from the rotor into a linear input along the pump axis to cause pumping of the fluid, wherein the drive mechanism includes a linear drive element configured to displace axially along the pump axis; and a clocking member interfacing with the linear drive element to prevent rotation of the linear drive element about the pump axis.

The pumping assembly of the preceding paragraph can optionally include, additionally and/or alternatively, any one or more of the following features, configurations and/or additional components:

The clocking member is fixed to the linear drive element.

The clocking member interfaces with a pump frame mechanically fixed to the stator.

The clocking member is configured to move linearly relative to the pump frame with the linear drive element.

The pump frame includes an axially elongate slot and the clocking member includes a projection disposed in the slot.

The drive mechanism includes a drive nut connected to the rotor to be rotatably driven by the rotor; a screw disposed on the pump axis and forming at least a portion of the linear drive element; and a plurality of rolling elements disposed radially between the screw and the drive nut.

The clocking member is disposed at a first end of the screw and fixed relative the screw to reciprocate with the screw.

The drive nut is disposed axially between the first end of the screw and the motor.

A clocking assembly mounted to the first end of the screw, the clocking assembly includes a support fixed to the first end of the screw and disposed coaxially with the screw; and the clocking member mounted to the support.

The clocking member includes a collar disposed around a body of the support; and at least one projection extending radially from the collar.

A pin fixes the clocking member to the support.

The support includes a support body extending axially along the pump axis; and a radial support flange extending from the support body. The clocking member is disposed adjacent the radial support flange.

The clocking member is disposed axially between the radial support flange and the screw.

The support further includes a mounting projection extending axially from a first end of the support body and into a bore of the screw to secure the clocking assembly to the screw.

The support further includes a receiver disposed at a second end of the support body, the receiver configured to connect to a fluid displacement member of a displacement pump.

The clocking member interfaces with a pump frame mechanically fixed to the motor, and wherein the clocking member seals against the pump frame to form a sliding seal with the pump frame.

A fluid spray system includes a handheld spray gun configured to atomize a pumped fluid into a fluid spray; and the pumping assembly of any one of the previous examples disposed upstream of and fluidly connected to the spray applicator to pump spray fluid to the spray applicator.

A pumping assembly includes a motor having a stator and a rotor, the rotor disposed coaxially about the stator on a pump axis, wherein the motor includes a first motor end and a second motor end; a pump frame fixed to the second motor end and including a main body extending in a first axial direction relative the motor, wherein the rotor shaft extends into the main body; a drive mechanism connected to the rotor, the drive mechanism configured to convert a rotational output from the rotor to a linear input along the pump axis; and a clocking member connected to a linear drive element of the drive mechanism and interfacing with the main body to prevent the linear drive element from rotating about the pump axis.

The pumping assembly of the preceding paragraph can optionally include, additionally and/or alternatively, any one or more of the following features, configurations and/or additional components:

The motor is disposed axially between a portion of the pump frame fixed to the second motor end and the main body.

The drive mechanism includes a drive nut spaced in the first axial direction from the motor, and wherein the clocking member is spaced in the first axial direction from the drive nut.

The linear drive element includes a screw disposed coaxially with the drive nut.

The clocking member includes at least one radial projection disposed within an axial slot formed on the main body.

A method of pumping fluid to a spray gun to generate an atomized fluid spray includes driving rotation of a rotor of an electric motor about a pump axis and about a stator of the motor; displacing a screw of a drive mechanism axially along the pump axis by rotation of the rotor; reciprocating a fluid displacement member connected to the screw along the pump axis by displacing the screw along the pump axis, the fluid displacement member pumping a fluid downstream to the spray gun; and preventing rotation of the screw relative a pump frame mechanically fixed to both the stator and a cylinder of a pump by a clocking member interfacing with each of the screw and the pump frame.

The method of the preceding paragraph can optionally include, additionally and/or alternatively, any one or more of the following features, configurations and/or additional components:

Preventing rotation of the screw relative the pump frame includes disposing a projection of the clocking member within a slot formed in the pump frame, the projection interfacing with the slot to prevent rotation of the screw relative the pump frame.

Preventing rotation of the screw relative the pump frame further includes reciprocating the clocking member with the screw such that the clocking member shifts axially relative the pump frame with the screw.

A fluid pump apparatus includes a frame having a first end and a second end; a motor mounted on the first end of the frame, the motor electrically powered, the motor comprising a rotor and a stator, the motor configured to output rotational motion; a pump mounted on the second end of the frame, the pump comprising a piston and a cylinder; a drive mechanism supported by the frame and located directly between the motor and the pump, the drive mechanism comprising a screw, the drive mechanism outputting linear reciprocating motion, the piston receiving the linear reciprocating motion output by the drive mechanism to reciprocate the piston within the cylinder; and a clocking assembly located between the motor and the pump, the clocking assembly configured to resist rotation of the screw due to the rotational motion output by the motor, the clocking assembly comprising a collar fixed about the screw, the clocking assembly further comprising a sleeve fixed with respect to the frame. Both the screw and the collar linearly translate within the sleeve while the sleeve prevents rotation of the collar.

The fluid pump of the preceding paragraph can optionally include, additionally and/or alternatively, any one or more of the following features, configurations and/or additional components:

The sleeve includes an axially elongate slot and the collar includes a projection disposed in the slot.

The drive mechanism further includes a drive nut connected to the rotor to be rotatably driven by the rotor; and a plurality of rolling elements disposed radially between the screw and the drive nut.

The drive nut is disposed axially between the collar and the motor.

A support fixed to a first end of the screw and disposed coaxially with the screw. The collar is mounted to the support.

A pin fixes the collar to the support.

The support includes a support body extending axially along the pump axis; and a radial support flange extending from the support body. The collar is disposed adjacent the radial support flange.

The support further includes a mounting projection extending axially from a first end of the support body and into a bore of the screw to secure the clocking assembly to the screw.

The collar seals against the sleeve to form a sliding seal with the sleeve.

A fluid spray system includes a handheld spray gun configured to atomize a pumped fluid into a fluid spray; and the fluid pump of any one of the preceding examples disposed upstream of and fluidly connected to the spray applicator to pump spray fluid to the spray applicator.

A pumping assembly includes a motor including a stator and a rotor, the rotor configured to rotate about the stator on a pump axis; a drive mechanism connected the rotor and configured to convert a rotational output from the rotor into a linear input along the pump axis to cause pumping of the fluid, wherein the drive mechanism includes a linear drive element configured to displace axially along the pump axis; and a clocking member interfacing with the linear drive element to prevent rotation of the linear drive element about the pump axis.

The pumping assembly of the preceding paragraph can optionally include, additionally and/or alternatively, any one or more of the following features, configurations and/or additional components:

The linear drive element is movable relative to the clocking member.

The clocking member is elongate along the pump axis.

The clocking member axially overlaps with at least a portion of the stator.

The clocking member is fixed to a pump frame supporting the motor.

The clocking member telescopically interfaces with the linear drive element.

The rotor includes a rotor body supporting a plurality of permanent magnets and a rotor shaft extending in a first axial direction from the rotor body and disposed coaxially with the rotor.

The drive mechanism includes a drive nut connected to the rotor shaft to receive a rotational output from the rotor via the rotor shaft; a screw disposed coaxially on the pump axis with the drive nut and forming at least a portion of the linear drive element; and a plurality of rolling elements disposed radially between the screw and the drive nut.

The clocking member extends into the rotor shaft.

The clocking member includes a rod extending into a bore of the screw, the rod having an exterior surface contour configured to mate with an interior surface contour of the bore.

An axial overlap between the clocking member and the screw is larger with the screw disposed at a first position associated with an end of a stroke in a second axial direction than with the screw disposed at a second position associated with an end of a stroke in the first axial direction.

A bearing is disposed between the rotor shaft and a pump frame fixed to the stator, and wherein the clocking member at least partially axially overlaps with the bearing.

The clocking member extends axially through the bearing such that a first portion of the clocking member extends in the first axial direction relative to the bearing and a second portion of the clocking member extends in a second axial direction relative the bearing, the second axial direction being opposite the first axial direction.

The drive mechanism includes a drive nut connected to the rotor shaft to be rotatably driven by the rotor shaft; a screw disposed on the pump axis and forming at least a portion of the linear drive element; and a plurality of rolling elements disposed radially between the screw and the drive nut. The clocking member does not extend in the first axial direction beyond the drive nut.

A pump frame including a frame member fixed to the motor; and a main body extending in a first axial direction relative the motor, wherein the motor is disposed axially between the frame member and the main body. The clocking member is fixed to the frame member and extends in the first axial direction from the frame member and through the motor.

The clocking member telescopically interfaces with the linear drive element.

The clocking member includes a contoured rod elongate along the pump axis, and wherein the clocking member extends into a bore of a screw, the screw forming at least a portion of the linear drive element.

The bore includes a contoured opening receiving and interfacing with the contoured rod.

A fluid spray system includes a handheld spray gun configured to atomize a pumped fluid into a fluid spray; and the pumping assembly of any one of the preceding examples disposed upstream of and fluidly connected to the spray gun to pump spray fluid to the spray gun.

A pumping assembly includes a motor having a stator and a rotor, the rotor disposed coaxially about the stator on a pump axis and including a rotor shaft extending in a first axial direction from a first axial end of the motor; a pump frame extending in the first axial direction such that the rotor shaft extends into the pump frame, wherein the pump frame is fixed to the motor at a second axial end of the motor opposite the first axial end; a drive mechanism connected to the rotor shaft, the drive mechanism configured to convert a rotational output from the rotor shaft to a linear input along the pump axis; and a clocking member fixed relative the pump frame and interfacing with a linear drive element of the drive mechanism to prevent the linear drive element from rotating about to the pump axis.

The pumping assembly of the preceding paragraph can optionally include, additionally and/or alternatively, any one or more of the following features, configurations and/or additional components:

A double displacement pump fixed to the pump frame, wherein a fluid displacement member of the double displacement pump is connected to the linear drive element to be reciprocated by the linear drive element.

The rotor, the rotor shaft, the clocking member, the drive mechanism, and the fluid displacement member are disposed coaxially.

The clocking member includes a rod extending through the motor from the second end of the motor and into the rotor shaft, wherein the rod extends into a bore formed in a screw of the drive mechanism, wherein the screw forms at least a portion of the linear drive element, and wherein an exterior surface of the rod includes a first contour interfaces with a second contour formed on an interior surface of the bore to prevent the screw from rotating relative to the pump frame.

The second contour extends less than a full axial length of the bore.

The clocking member is cantilevered from the pump frame.

A method of pumping fluid includes driving rotation of a rotor of an electric motor about a pump axis and about a stator of the motor; displacing a screw of a drive mechanism axially along the pump axis by rotation of the rotor; reciprocating a fluid displacement member of a displacement pump, the fluid displacement member connected to the screw such that reciprocation of the screw causes reciprocation of the fluid displacement member, wherein reciprocating the fluid displacement member along the pump axis pumps a fluid downstream for spraying; and preventing rotation of the screw relative a pump frame mechanically fixed to the electric motor and the displacement pump by a clocking member telescopically interfacing with the screw.

A fluid pump apparatus includes a frame having a first end and a second end; a motor mounted on the first end of the frame, the motor electrically powered, the motor comprising a rotor and a stator, the motor configured to output rotational motion; a pump mounted on the second end of the frame, the pump comprising a piston and a cylinder; a drive mechanism supported by the frame and located directly between the motor and the pump, the drive mechanism comprising a screw, the drive mechanism outputting linear reciprocating motion, the piston receiving the linear reciprocating motion output by the drive mechanism to reciprocate the piston within the cylinder; and a clocking assembly, the clocking assembly comprising a telescope member that has a sliding overlapping interface with the screw, the telescope member preventing rotation of the screw by resisting the rotational motion output by the motor as the screw linearly translates relative to the telescope member.

The fluid pump apparatus of the preceding paragraph can optionally include, additionally and/or alternatively, any one or more of the following features, configurations and/or additional components:

The telescope member is elongate along the pump axis.

The telescope member axially overlaps with at least a portion of the stator.

The telescope member is fixed to a pump frame supporting the motor.

The rotor includes a rotor body supporting a plurality of permanent magnets and a rotor shaft extending in a first axial direction from the rotor body and disposed coaxially with the rotor.

The drive mechanism includes a drive nut connected to the rotor shaft to receive a rotational output from the rotor via the rotor shaft; and a plurality of rolling elements disposed radially between the screw and the drive nut.

The telescope member extends into the rotor shaft.

The telescope member includes a rod extending into a bore of the screw, the rod having an exterior surface contour configured to mate with an interior surface contour of the bore.

An axial overlap between the telescope member and the screw is larger with the screw disposed at a first position associated with an end of a stroke in a second axial direction than with the screw disposed at a second position associated with an end of a stroke in the first axial direction.

A bearing is disposed between the rotor shaft and a pump frame fixed to the stator, and wherein the telescope member at least partially axially overlaps with the bearing.

The telescope member extends axially through the bearing such that a first portion of the telescope member extends in the first axial direction relative to the bearing and a second portion of the telescope member extends in a second axial direction relative the bearing, the second axial direction being opposite the first axial direction.

The telescope member includes a contoured rod elongate along the pump axis, and wherein the telescope member extends into a bore of the screw.

The bore includes a contoured opening receiving and interfacing with the contoured rod.

A fluid spray system includes a handheld spray gun configured to atomize a pumped fluid into a fluid spray; and the pumping assembly of any of the preceding claims upstream of and fluidly connected to the spray gun to pump spray fluid to the spray gun.

A pumping assembly includes a motor including a stator and a rotor, the rotor configured to rotate about the stator on a pump axis; and a drive mechanism connected to the rotor disposed coaxially with the rotor, the drive mechanism configured to convert a rotational output from the rotor into a linear input along the pump axis in each of a first axial direction and a second axial direction to cause pumping of the fluid. A screw of the drive mechanism extends into the motor with the screw disposed at a first position associated with an end of a stroke in the second axial direction.

The pumping assembly of the preceding paragraph can optionally include, additionally and/or alternatively, any one or more of the following features, configurations and/or additional components:

The screw is movable relative to the rotor.

The drive mechanism further includes a drive nut connected to the rotor to be rotatably driven by the rotor, the drive nut disposed around and disposed coaxially with the screw; and a plurality of rolling elements disposed radially between the screw and the drive nut.

The screw is configured to translate within the motor in the first axial direction and the second axial direction.

The drive nut is spaced in the first axial direction from the rotor such that the drive nut does not axially overlap with the rotor.

The screw is not disposed within the motor with the screw disposed at a second position associated with an end of a stroke in the first axial direction.

The motor includes an axle supporting the stator and at least partially defining a motor cavity, wherein the screw extends into the motor cavity with the screw in the first position.

A rotor shaft extends in the first axial direction from a rotor body of the rotor, the rotor shaft at least partially defining a shaft cavity, and wherein the screw extends fully through the shaft cavity with the screw in the first position.

The drive nut is connected to an end of the rotor shaft opposite the rotor body.

A displacement pump supported by a pump frame, wherein the pump frame fixed to the motor; the displacement pump includes a fluid displacement member connected to the screw to be reciprocated by the screw.

A fluid spray system includes a handheld spray gun configured to atomize a pumped fluid into a fluid spray; and the pumping assembly any one of the preceding paragraphs disposed upstream of and fluidly connected to the spray gun to pump spray fluid to the spray gun.

A pumping assembly includes a motor having a stator and a rotor, the rotor disposed coaxially about the stator on a pump axis, wherein the motor includes a first motor end and a second motor end; a rotor shaft extending in a first axial direction from a rotor body of the rotor; a pump frame fixed to the second motor end and including a main body extending in a first axial direction relative the motor, wherein the rotor shaft extends into the main body; and a drive mechanism connected to the rotor shaft, the drive mechanism configured to convert a rotational output from the rotor shaft to a linear input along the pump axis. The drive mechanism includes a linear drive element configured to provide the linear input, and wherein at least a portion of the linear drive element is disposed within a motor cavity within the motor with the linear drive element disposed at a first position associated with an end of a stroke in a second axial direction opposite the first axial direction.

The pumping assembly of the preceding paragraph can optionally include, additionally and/or alternatively, any one or more of the following features, configurations and/or additional components:

The first portion of the linear drive element does not axially overlap with the rotor with the linear drive element in a second position associated with an end of a stroke in the first axial direction.

The linear drive element is a screw connected to a drive nut of the drive mechanism and disposed coaxially with the drive nut, wherein the drive nut is fixed to the rotor shaft.

The screw extends axially through a shaft cavity within the rotor shaft and into the motor cavity with the screw in the first position.

A displacement pump fixed to the pump frame by a static connection and attached to the motor by a dynamic connection between the drive mechanism and a fluid displacement member of the displacement pump.

A method of pumping fluid includes driving rotation of a rotor of an electric motor about a pump axis and about a stator of the electric motor; displacing a screw of a drive mechanism axially along the pump axis through a first stroke in a first axial direction and a second stroke in a second axial direction by rotation of the rotor; reciprocating a fluid displacement member connected to a first end of the screw along the pump axis by displacement of the screw along the pump axis to pump fluid; and translating a second end of the screw disposed opposite the first end into a motor cavity within the motor during the second stroke.

The method of the preceding paragraph can optionally include, additionally and/or alternatively, any one or more of the following features, configurations and/or additional components:

Translating the second end of the screw disposed opposite the first end into the motor cavity within the motor during the second stroke includes translating the screw in the second axial direction through a shaft cavity defined by a rotor shaft extending axially between the rotor and a drive nut of the drive mechanism and into the motor cavity.

Increasing an axial overlap between the screw and the rotor shaft as the screw translates in the second axial direction; and decreasing an axial overlap between the screw and the rotor shaft as the screw translates in the first axial direction.

Increasing an axial overlap between the screw and the motor as the screw translates in the second axial direction; and decreasing an axial overlap between the screw and the motor as the screw translates in the first axial direction.

Withdrawing the second end of the screw from the motor cavity during the first stroke.

A fluid sprayer includes a frame having a first end and a second end; a motor mounted on the first end of the frame, the motor electrically powered, the motor comprising a rotor and a stator, the rotor rotating about an axis, the motor configured to output rotational motion, the motor comprising a motor cavity that is coaxial with the axis; a pump mounted on the second end of the frame, the pump comprising a piston and a cylinder; a drive mechanism supported by the frame and located directly between the motor and the pump, the drive mechanism comprising a screw that is elongate along the axis, the screw having a first end, the first end of the screw linearly translating within the motor cavity along the axis, the drive mechanism outputting linear reciprocating motion, wherein the piston receives the linear reciprocating motion output by the drive mechanism to reciprocate the piston within the cylinder.

The fluid sprayer of the preceding paragraph can optionally include, additionally and/or alternatively, any one or more of the following features, configurations and/or additional components:

The screw is movable relative to the rotor.

The drive mechanism further includes a drive nut connected to the rotor to be rotatably driven by the rotor, the drive nut disposed around and disposed coaxially with the screw; and a plurality of rolling elements disposed radially between the screw and the drive nut.

The drive nut is spaced in the first axial direction from the rotor such that the drive nut does not axially overlap with the rotor.

The screw is not disposed within the motor with the screw disposed at a second position associated with an end of a stroke in a first axial direction.

The motor includes an axle supporting the stator and at least partially defining the motor cavity.

A rotor shaft extends in the first axial direction from a rotor body of the rotor, the rotor shaft at least partially defining a shaft cavity, and wherein the screw extends fully through the shaft cavity with the screw disposed at an end of a first stroke.

The drive nut is connected to an end of the rotor shaft opposite the rotor body.

A pumping assembly includes a motor including a stator and a rotor, the rotor configured to rotate on a pump axis; a fluid displacement member operatively connected to the rotor to be reciprocated through an upstroke and a downstroke along the pump axis; and a controller configured to control operation of the motor such that the fluid displacement member displaces according to a first speed profile during the upstroke and according to a second speed profile during the downstroke, the first speed profile different than the second speed profile.

The pumping assembly of the preceding paragraph can optionally include, additionally and/or alternatively, any one or more of the following features, configurations and/or additional components:

The first speed profile has a first acceleration profile and the second speed profile has a second acceleration profile different than the first acceleration profile.

A difference between the first speed profile and the second speed profile is when accelerating out of a changeover.

A fluid spray system includes a handheld spray gun configured to atomize a pumped fluid into a fluid spray; and the pumping assembly of any of the preceding paragraphs disposed upstream of and fluidly connected to the spray gun to pump spray fluid to the spray gun.

A pumping system includes a first upstream pump having a first electric motor connected to a first fluid displacement member; a first downstream pump having an inlet fluidically connected to an outlet of the first upstream pump; a first sensor disposed downstream from an outlet of the first downstream pump; and a controller in communication with the first electric motor and the first sensor. The controller is configured to receive first parameter data from the first sensor and control operation of the first electric motor based on the first parameter data.

The pumping system of the preceding paragraph can optionally include, additionally and/or alternatively, any one or more of the following features, configurations and/or additional components:

A second upstream pump having a second electric motor connected to a second fluid displacement member; a second downstream pump having an inlet fluidically connected to an outlet of the second upstream pump; a second sensor disposed downstream from an outlet of the second downstream pump; a controller in communication with the first electric motor, the second electric motor, the first sensor, and the second sensor. The controller is configured to receive first parameter data from the first sensor and control operation of at least one of the first electric motor and the second electric motor based on the first parameter data.

The controller is configured to receive second parameter data from the second sensor and to control operation of at least one of the first electric motor and the second electric motor based on to at least one of the first parameter data, the second parameter data, and a comparison of the first parameter data and the second parameter data.

The controller is configured to adjust power to at least one of the first electric motor and the second electric motor based on the comparison indicating that a ratio between a first parameter indicated by the first parameter data and a second parameter indicated by the second parameter data differs from a target ratio between the first parameter and the second parameter.

The first pump is sized to fill the third pump during a fill stroke of the third pump with a single stroke of the first pump such that the first pump does not change stroke direction during the fill stroke of the third pump.

The second pump is sized to fill the fourth pump during a fill stroke of the fourth pump a single stroke of the second pump such that the second pump does not change stroke direction during the fill stroke of the fourth pump.

The controller is configured to stop rotation of the first electric motor during a return stroke of the third pump, the return stroke being in an opposite stroke direction from the fill stroke of the third pump.

The controller is configured to control a stroke direction of the first upstream pump such that a changeover of the stroke direction occurs during a predetermined portion of a fill stroke of the first downstream pump.

The first sensor comprises a first pressure sensor and the second sensor comprises a second pressure sensor.

The first sensor comprises a first flow sensor and the second sensor comprises a second flow sensor.

The controller is configured to adjust power to the first electric based on the first parameter data.

The controller is configured to adjust a speed of the first electric motor based on the first parameter data.

The controller is configured to adjust a pressure output by the first feed pump based on the first parameter data.

An applicator comprising a mixing chamber fluidically connected to the outlet of the first downstream pump and fluidic ally connected to the outlet of the second downstream pump.

A first heated hose disposed between the outlet of the third pump and to the mixing chamber of the applicator; and a second heated hose disposed between the outlet of the fourth pump and to the mixing chamber of the applicator.

The first pump includes a piston configured to reciprocate axially along a pump axis of the first pump; and a drive mechanism connected to the piston. The drive mechanism is connected to a first rotor of the first electric motor. The drive mechanism is configured to receive a rotational output from the first rotor and provide a linear input to the piston to cause the piston to displace axially along the pump axis. The piston, the drive mechanism, and the first rotor are disposed coaxially.

The drive mechanism includes a drive nut connected to the rotor of the first electric motor and configured to rotate with the rotor of the first electric motor; and a screw connected with the drive nut and connected to a piston shaft of the piston of the first pump.

A third sensor disposed downstream from the first upstream pump and upstream from the first downstream pump; and a fourth sensor disposed downstream from the second upstream pump and upstream from the second downstream pump. The controller is in communication with the third sensor and the fourth sensor. The controller is configured to receive third parameter data from the third sensor and control operation of at least one of the first electric motor and the second electric motor based on the third parameter data.

The controller is configured to receive fourth parameter data from the fourth sensor and to control operation of at least one of the first electric motor and the second electric motor based on to at least one of the third parameter data, the fourth parameter data, and a comparison of the third parameter data and the fourth parameter data.

A method of operating a pumping system includes driving rotation of a first rotor of a first electric motor to drive reciprocation of a first fluid displacement member of a first feed pump to pump the first component material to an inlet of a first proportioner pump; increasing a pressure of the first component material via the first proportioner pump; generating first parameter data regarding the first component material downstream of the first proportioner pump by a first sensor; and controlling operation of the first electric motor by a controller based on the first parameter data.

The method of the preceding paragraph can optionally include, additionally and/or alternatively, any one or more of the following features, configurations and/or additional components:

Driving rotation of a second rotor of a second electric motor to drive reciprocation of a second fluid displacement member of a second feed pump to pump the second component material to an inlet of a second proportioner pump; increasing a pressure of the second component material via the second proportioner pump; generating second parameter data regarding the second component material downstream of the second proportioner pump by a second sensor; and controlling operation of at least one of the first electric motor and the second electric motor based on a comparison of the first parameter data and the second parameter data.

Measuring a pressure of the first component material downstream of the first proportioner pump by the first sensor; measuring a pressure of the second component material downstream of the second proportioner pump by the second sensor; communicating the measured pressure of the first component material and the measured pressure of the second component material to the controller; and adjusting power to at least one of the first electric motor and the second electric motor by the controller based on at least one of the measured pressure of the first component material and the measured pressure of the second component material.

Measuring a flow rate of the first component material downstream of the first proportioner pump by the first sensor; measuring a flow rate of the second component material downstream of the second proportioner pump by the second sensor; communicating the measured flow rate of the first component material and the measured flow rate of the second component material to the controller; and adjusting power to at least one of the first electric motor and the second electric motor by the controller based on at least one of the measured flow rate of the first component material and the measured flow rate of the second component material.

The controller adjusts the rotational speed of at least one of the first electric motor and the second electric motor by modulating an electrical current to at least one of the first electric motor and the second electric motor.

Controlling the first electric motor such that the first feed pump pumps fluid to the first proportioner pump during a fill stroke of the first proportioner pump.

Controlling the first electric motor such that the first feed pump does not pump fluid to the first proportioner pump during a return stroke of the first proportioner pump, the return stroke being an opposite stroke from the fill stroke.

Outputting fluid by the proportioner pump during each of the fill stroke and the return stroke.

Controlling the first electric motor such that the first piston does not change stroke direction during the fill stroke.

A method of operating a pumping system configured to pump different first and second component materials to an applicator for mixing and forming a plural component material, the method includes pumping a first component material, with a first upstream pump including a first electric motor, from a first fluid tank to a first downstream pump; pumping a second component material, with a second upstream pump including a second electric motor, from a first fluid tank to a second downstream pump; controlling, by a controller, pumping by the first upstream pump, the second upstream pump, the first downstream pump, and the second downstream pump in each of a spray mode and a flush mode. The spray mode includes increasing a pressure of the first component material with the first downstream pump and pumping the first component material to an applicator with the first downstream pump; and increasing a pressure of the second component material with the second downstream pump and pumping the second component material to the applicator with the second downstream pump. The flush mode includes pumping the first component material to a first dump tank from the first proportioner pump; and pumping the second component material to a second dump tank from the second proportioner pump.

The method of the preceding paragraph can optionally include, additionally and/or alternatively, any one or more of the following features, configurations and/or additional components:

Initiating a flush routine to enter the flush mode from the operating mode; and depowering each of the first upstream pump, second upstream pump, first downstream pump, and second downstream pump based on the flush routine being initiated.

Actuating a first flush valve from a first position to a second position, the second position of the first flush valve fluidly connecting an outlet of the first downstream pump with a first flush line configured to provide the first component material to the first dump tank; and actuating a second flush valve from a first position to a second position, the second position of the second flush valve fluidly connecting an outlet of the second downstream pump with a second flush line configured to provide the second component material to the second dump tank.

Powering the first electric motor with the first flush valve in the second position and powering the second electric motor with the second flush valve in the second position.

Activating the first downstream pump with the first flush valve in the second position and activating the second downstream pump with the second flush valve in the second position.

Causing pumping by the first upstream pump, the second upstream pump, the first downstream pump, and the second downstream pump for a flush duration based on a flush parameter.

The flush parameter is a count of pump cycles and the flush duration is a number of pump cycles.

Actuating the first flush valve from the second position to the first position; and actuating the second flush valve from the second position to the second position.

Depowering each of the first upstream pump, second upstream pump, first downstream pump, and second downstream pump based on the first flush valve returning to the first position and on the second flush valve returning to the first position.

Actuating the first flush valve from the first position to the second position based on the first upstream pump and the first downstream pump being depowered; and actuating the second flush valve from the first position to the second position based on the second upstream pump and the second downstream pump being depowered.

Determining a completion status of the flush mode based on detection of air in one of the first component material entering the first dump tank and the second component material entering the second dump tank; and exiting the flush mode based on an absence of air in each of the first component material and the second component material.

Recirculating the first component material during the flush mode such that the first fluid tank is the first dump tank; and recirculating the second component material during the flush mode such that the second fluid tank is the second dump tank.

A pump includes an electric motor comprising a stator and a rotor, the rotor configured to rotate about a pump axis; a drive mechanism connected to the rotor and configured to translate a rotating input from the rotor to a linear output, wherein the drive mechanism is coaxial with the rotor; and a displacement assembly including a piston, wherein the piston is connected to the drive mechanism to receive the linear output and is disposed coaxially with the drive mechanism and the rotor, wherein the piston is configured to reciprocate axially along the pump axis to pump fluid.

The pump of the preceding paragraph can optionally include, additionally and/or alternatively, any one or more of the following features, configurations and/or additional components:

The drive mechanism includes a drive nut connected to the rotor and configured to rotate with the rotor; and a screw connected with the drive nut and the piston, wherein the screw and the drive nut are coaxially aligned with the rotor and the piston.

The drive mechanism includes a plurality of rolling elements disposed within a gap between the screw and the drive nut. The plurality of rolling elements axially align the screw inside the drive nut and are configured to be driven by rotation of drive nut to drive the screw axially. The plurality of rolling elements maintain the gap and prevent direct contact between the drive nut and the screw.

The drive mechanism further includes a drive nut bore extending axially through the drive nut and inner threading formed on a surface of the hole, wherein the inner threading rotates with the drive nut; and outer threading on the screw, wherein the outer threading moves axially with the screw. Each rolling element of the plurality of rolling elements interfaces with both the inner threading and the outer threading.

The plurality of rolling elements includes one of balls and elongate rollers.

The rolling elements are mechanically attached to the drive nut and are configured to rotate with the drive nut and configured to rotate relative the drive nut.

A rotor shaft connected to the rotor and coaxial with the rotor, wherein the rotor shaft rotates with the rotor and connects the rotor to the drive mechanism.

The screw extends into the rotor shaft.

The rotor shaft is at least partially disposed within and surrounded by the rotor.

A spacer is disposed on the screw and radially between the screw and the rotor shaft, wherein the spacer prevents the screw from directly contacting the rotor shaft.

The spacer is connected to the screw to translate axially with the screw.

The spacer is disposed at an end of the screw opposite the piston.

The spacer is disposed coaxially on the central axis and aligns the screw on the central axis.

The spacer is formed from a non-ferrous material.

The spacer is formed from a plastic.

The screw extends within each of the rotor and the stator of the electric motor.

The screw axially overlaps with a permanent magnet array of the rotor.

A rotor shaft connected to and disposed coaxially within a rotor body of the rotor. The rotor shaft rotates with the rotor body and connects the rotor body to the drive mechanism. The rotor shaft is hollow and receives the screw.

The screw extends within the electric motor such that a radial line extending from the central axis passes through, in order, the screw, the rotor shaft, the rotor, and the stator.

An axial overlap between the rotor shaft and the screw is larger with the screw disposed at a first position associated with an end of a stroke in a first axial direction than with the screw disposed at a second position associated with an end of a stroke in a second axial direction.

A spacer mounted on the screw and supporting the screw relative the rotor shaft.

An axial overlap between the screw and the rotor shaft is configured to vary during reciprocation of the piston.

The displacement assembly includes a first check valve disposed on the central axis; and a second check valve disposed on the central axis. The second check valve is disposed in the piston to travel with the piston.

A bearing assembly connecting the rotor of the electric motor to the drive mechanism, wherein the bearing assembly is configured to react axial loads.

A fluid outlet manifold positioned axially between the piston and the bearing assembly; and a plurality of tie rods extending axially between the bearing assembly and the fluid outlet manifold and connecting the bearing assembly and the fluid outlet manifold.

A clocking assembly disposed axially between the fluid outlet manifold and the bearing assembly, the clocking assembly interfacing with the screw to prevent the screw from rotating about the pump axis.

The rotor is an inner rotor disposed radially within the stator.

A pump includes an electric motor comprising a stator and a rotor disposed within the stator, the rotor configured to rotate about a pump axis; a displacement assembly including a piston, wherein the piston is disposed coaxially with the rotor and is configured to reciprocate axially along the pump axis to pump fluid; a drive mechanism connected to the rotor and the piston, the drive mechanism configured to convert a rotational output from the rotor into a linear input to the piston, wherein the drive mechanism is coaxial with the piston and the rotor; a fluid outlet manifold positioned axially between the piston and the rotor, the fluid outlet manifold in fluid communication with the displacement assembly; a first check valve axially between a piston head of the piston and a fluid inlet of the feed pump; and a second check valve disposed in the piston to travel axially with the piston.

The pump of the preceding paragraph can optionally include, additionally and/or alternatively, any one or more of the following features, configurations and/or additional components:

The drive mechanism includes a drive nut connected to the rotor and configured to rotate with the rotor; a screw extending through the drive nut and coaxial with the drive nut, wherein the screw is connected to the piston and is coaxial with both the piston and the rotor; and a plurality of rolling elements disposed within a gap between the screw and the drive nut, wherein the plurality of rolling elements support the screw relative the drive nut to prevent contact between the screw and the drive nut, and wherein the plurality of rolling elements are configured to be driven by rotation of the rotor shaft and the drive nut to drive the screw axially.

The fluid outlet manifold is disposed axially between the drive nut and the piston head.

A bearing assembly connecting the rotor to the drive mechanism. The bearing assembly is disposed axially between the rotor and the drive nut.

A plurality of tie rods extending axially between the fluid outlet manifold and a housing of the bearing assembly and connecting the bearing assembly and the fluid outlet manifold.

A drive mechanism for a feed pump that converts a rotational output from an electric motor into a linear input, wherein the drive mechanism includes a screw and a drive nut. The screw having a first end; a second end axially opposite the first end relative the pump axis; and a spiral groove extending on an outer surface of the screw between the first end and the second end, wherein the second end of the screw extends within each of a rotor shaft, a stator, and a housing of the electric motor, and wherein the screw translates axially within the rotor shaft. The drive nut connected to the rotor and configured to rotate with the rotor.

The drive mechanism of the preceding paragraph can optionally include, additionally and/or alternatively, any one or more of the following features, configurations and/or additional components:

A plurality of rolling elements disposed within a gap between the screw and the drive nut, wherein the plurality of rolling elements support the screw relative the drive nut and are configured to be driven by rotation of the rotor shaft and the drive nut to drive the screw axially.

A spacer bearing connected to the second end of the screw and radially between the second end of the screw and the rotor shaft relative the pump axis.

The screw does not directly contact the rotor shaft.

An axial overlap between the screw and the rotor shaft is largest at an end of an upstroke of the feed pump and smallest at an end of a downstroke of the feed pump.

A plural component spray system comprising a first feed pump, wherein the first feed pump comprises the pump of any preceding paragraph; a second feed pump; a first proportioner pump fluidically connected to an outlet of the first feed pump; a second proportioner pump fluidically connected to an outlet of the second feed pump; and an applicator connected to an outlet of the first proportioner pump and to an outlet of the second proportioner pump to output a plural component material formed from materials pumped by the first feed pump, the second feed pump, the first proportioner pump, and the second proportioner pump.

The plural component spray system of the preceding paragraph can optionally include, additionally and/or alternatively, any one or more of the following features, configurations and/or additional components:

The second feed pump comprises the pump of any one of the preceding claims.

A pump apparatus for pumping fluid from a reservoir, the pump apparatus including a frame for mounting on the reservoir; an electric motor mounted on the frame, the electric motor comprising a stator and a rotor, the rotor rotating about an axis to output rotational motion; a drive mechanism supported by the frame, the drive mechanism comprising a screw and a nut, the drive mechanism configured to receive the rotational motion output by the motor and convert the rotational motion into linear reciprocating motion, each of the screw and the nut one of rotating about the axis or linearly translating along the axis; and a pump comprising a cylinder and a piston within the cylinder, the piston configured to be linearly reciprocated along the axis by the drive mechanism.

The pump apparatus of the preceding paragraph can optionally include, additionally and/or alternatively, any one or more of the following features, configurations and/or additional components:

A drive shaft connected to a piston and the drive mechanism, wherein the drive shaft is configured to reciprocate axially along the pump axis of; a bearing assembly rotationally connecting a rotor shaft to the drive mechanism, wherein the rotor shaft is disposed within a rotor body of the rotor and is coaxial with the screw and the rotor; a fluid outlet manifold positioned axially between the cylinder and the bearing assembly.

A plurality of tie rods extending axially between the fluid outlet manifold and a housing of the bearing assembly and connecting the bearing assembly and the fluid outlet manifold.

The rotor includes a rotor shaft extending axially along the axis and connected to the drive mechanism.

A first check valve disposed axially between the piston and a fluid inlet of the cylinder; and a second check valve disposed within the piston to travel axially with the piston.

A plurality of rolling elements disposed within a gap between the screw and the drive nut, wherein the plurality of rolling elements support the screw relative the drive nut and are configured to be driven by rotation of the rotor shaft and the drive nut to drive the screw axially.

The nut is connected to the rotor and configured to rotate with the rotor; the screw extends through the nut and is coaxial with the nut; and the screw is connected to the piston and is coaxial with both the piston and the rotor.

The bearing assembly further includes a first housing member comprising a first opening; a second housing member positioned axially between the first housing member and the electric motor and comprising a second opening, wherein the second housing member is connected to a housing of the electric motor and to the first housing member; a sleeve coupler position axially between the first housing member and the second housing member and coaxial with the first housing member and the second housing member; a first plurality of roller bearings disposed between the sleeve coupler and the first housing member; and a second plurality of roller bearings disposed between the sleeve coupler and the second housing member, wherein the nut extends through the first opening and is connected to the sleeve coupler, and wherein the rotor is connected to the sleeve coupler through the second opening.

The sleeve coupler, the drive nut, and the rotor shaft are rotationally fixed relative one another such that the sleeve coupler, the drive nut, and the rotor shaft rotate in unison when the electric motor rotates the rotor shaft.

The screw includes a first end; a second end axially opposite the first end relative the pump axis; a spiral groove extending on an outer surface of the screw between the first end and the second end, wherein the first end of the screw is connected to a drive shaft extending between the screw and the piston, and wherein the second end of the screw extends within each of the rotor shaft, the stator, and a housing of the electric motor.

A spacer bearing connected to the second end of the screw and disposed radially between the second end of the screw and the rotor shaft.

A clocking assembly disposed axially between the fluid outlet manifold and the bearing assembly and disposed around the screw, wherein the clocking assembly prevents the screw from rotating about the axis.

The clocking assembly includes a clocking housing extending axially from the first housing member of the bearing assembly to the fluid outlet manifold, wherein the clocking housing is fastened to at least one of the fluid outlet manifold and the first housing member of the bearing assembly; a chamber inside the clocking housing; a collar inside the chamber and around the first end of the screw, wherein the collar is configured to slide inside the chamber relative the clocking housing; an anti-rotation pin extending through the collar and the screw to couple the screw to the collar; and an anti-rotation interface between the collar and the clocking housing and configured to prevent rotation of the collar relative the clocking housing.

A feed pump apparatus for pumping fluid from a reservoir, the feed pump includes a frame for mounting on the reservoir; an electric motor mounted on the frame, the electric motor comprising a stator and a rotor, the rotor rotating about an axis to output rotational motion; a drive mechanism supported by the frame, the drive mechanism comprising a screw and a nut, the drive mechanism configured to receive the rotational motion output by the motor and convert the rotational motion into linear reciprocating motion, each of the screw and the nut one of rotating about the axis or linearly translating along the axis; and a pump comprising a cylinder and a piston within the cylinder, the piston configured to be linearly reciprocated along the axis by the drive mechanism; wherein the piston is configured to reciprocate within a working zone to build pressure within the cylinder, and wherein the piston can travel into a pressure relief zone to vent pressurized fluid from the cylinder to the reservoir.

The feed pump of the preceding paragraph can optionally include, additionally and/or alternatively, any one or more of the following features, configurations and/or additional components:

The piston includes a vent seal mounted on the piston shaft, the vent seal disposed axially between a piston head of the piston and the drive mechanism, wherein the vent seal is configured to control flow through a vent path in fluid communication with the reservoir.

The piston head seals against a side wall of the cylinder to divide the cylinder into an upstream chamber and a downstream chamber, wherein the vent seal provides a seal between the downstream chamber and the vent path.

A portion of the downstream chamber is formed between a seal housing and the cylinder, wherein the vent seal is disposed within the seal housing and at the vent path extends through the seal housing.

A seal housing disposed within the cylinder, wherein the vent seal is disposed within the seal housing.

The seal housing is disposed coaxially with the cylinder.

The seal housing extends from a first end of the cylinder towards a second end of the cylinder, wherein the piston extends into the cylinder through the first end.

A fluid outlet of the cylinder extends through the first end.

The seal housing includes at least one port through the seal housing.

The at least one port is disposed at a convergence of the working zone and the pressure relief zone.

The vent seal enters the pressure relief zone to fluidly connect an interior of the cylinder to the vent with a lower edge of the vent seal extending over the at least one port.

The vent seal enters the pressure relief zone to fluidly connect an interior of the cylinder to the vent path when the vent seal is moved axially between the at least one port and a bottom end of the seal housing.

The vent seal includes a seal support connected to the piston; and a seal member mounted on the seal support.

The seal support forms a portion of a piston shaft of the piston.

The seal support includes a radial flange, and wherein the seal member is disposed on a side of the radial flange facing the vent path.

The seal member is a cup seal.

A pressure-actuated relief valve disposed downstream from the cylinder.

The pressure-actuated relief valve is configured to output fluid to the reservoir.

A fluid outlet manifold disposed axially between the piston and the drive mechanism, wherein the fluid outlet manifold is in fluid communication with the pump;

The fluid outlet manifold is connected to the cylinder by at least one axially elongate tube, the tube providing a flowpath for fluid between the cylinder and the fluid outlet manifold.

The pressure-actuated relief valve is mounted to the fluid outlet manifold.

The reservoir is a drum, an outlet of the fluid outlet manifold is disposed outside of the drum, and the pressure-actuated relief valve provides fluid to an interior of the drum.

A pump including an electric motor comprising a stator and a rotor, the rotor configured to rotate about a pump axis; a drive mechanism connected to the rotor and configured to translate a rotating input from the rotor to a linear output, wherein the drive mechanism is coaxial with the rotor; and a displacement assembly including a piston and a cylinder, wherein the piston is connected to the drive mechanism to receive the linear output and is disposed coaxially with the drive mechanism and the rotor; wherein the piston is configured to reciprocate axially within a working zone to build pressure within the cylinder, and wherein the piston can travel into a pressure relief zone to vent pressurized fluid from the cylinder to the reservoir.

A feed pump includes an electric motor comprising a stator and a rotor, the rotor configured to rotate about an axis; a drive shaft connected to a piston, wherein the drive shaft is configured to reciprocate axially along the pump axis of the feed pump, and wherein the drive shaft is coaxial with the rotor; a drive mechanism connected to the rotor and to the drive shaft, the drive mechanism configured to convert a rotational output from the rotor into a linear input to the drive shaft; a pump including a piston connected to the drive shaft to be reciprocated by the drive shaft and a cylinder surrounding the piston; a fluid outlet manifold positioned axially between the piston and the drive mechanism and including a fluid outlet, the fluid outlet manifold in fluid communication with the pump; and an over-pressurization valve connected to the fluid outlet manifold and fluidically connected to the fluid outlet by an interior passage of the fluid outlet manifold.

The feed pump of the preceding paragraph can optionally include, additionally and/or alternatively, any one or more of the following features, configurations and/or additional components:

A rotor shaft connected to the rotor and coaxial with the rotor, wherein the rotor shaft rotates with the rotor, wherein the rotor shaft is coaxial with the drive shaft and connects the rotor to the drive mechanism.

The over-pressurization valve extends axially from the fluid outlet manifold away from the electric motor and is not coaxial with the pump axis of the feed pump.

The over-pressurization valve includes a ball; a seat; and a spring biasing the ball against the seat in a closed position.

A seal housing inside the cylinder, wherein the seal housing is connected to a first end of the seal housing and extends circumferentially around the drive shaft and is disposed axially between the piston and the first end of the cylinder; a seal inside the seal housing and connected to the drive shaft, wherein the seal extends radially from the drive shaft relative the pump axis and contacts the seal housing; and at least one port extending through the seal housing, wherein the at least one port fluidically connects an opening in the first end of the cylinder with an interior of the cylinder when the seal is moved into contact with the at least one port.

The seal housing includes a top end connected to the first end of the cylinder; a bottom end axially spaced from the top end and axially between the top end and the piston; and a tubular body extending from the top end to the bottom end, wherein the tubular body is spaced radially from the cylinder relative the pump axis to form an annular gap between the seal housing and the cylinder, wherein the at least one port extends radially through the tubular body proximate the bottom end of the seal housing.

A pressure relief assembly for a double ball piston pump, the pressure relief assembly includes a piston housing disposed around a piston, wherein the piston housing extends along an axis and comprises a first end opposite a second end, wherein a piston rod extends through an opening in the first end; a seal housing inside the piston housing, wherein the seal housing is connected to the first end of the piston housing and extends circumferentially around the piston rod and is disposed axially between a piston head and the first end of the piston housing; a seal disposed inside the seal housing and connected to the piston rod, wherein the seal extends radially from the piston rod relative the pump axis and contacts the seal housing; a vent path disposed within the seal housing and in fluid communication with the opening; and at least one port extending through the seal housing; wherein the at least one port fluidically connects the opening in the first end of the piston housing with an interior of the piston housing when the seal is in a pressure relief zone defined by the at least one port; and wherein the seal fluidly isolates the at least one port and the vent path when the seal is in a working zone defined between the first end and the at least one port.

A method of depressurizing a feed pump includes actuating a drive shaft connected to a piston to move the piston inside of a piston housing below a bottom of a downstroke of the piston; and moving a seal element disposed inside of the piston housing and connected to the drive shaft such that the seal element moves axially with the piston from a working zone into a pressure relief zone to fluidically connect a gap between the drive shaft and the piston housing with an interior of the piston housing such that fluid vents from the interior through the gap.

The method of the preceding paragraph can optionally include, additionally and/or alternatively, any one or more of the following features, configurations and/or additional components:

Opening an over-pressurization valve connected to the feed pump when an internal pressure of the feed pump exceeds a predetermined pressure value.

A feed pump apparatus for pumping fluid from a reservoir includes a frame for mounting on the reservoir; an electric motor mounted on the frame, the electric motor comprising a stator and a rotor, the rotor rotating about an axis to output rotational motion; a drive mechanism supported by the frame, the drive mechanism comprising a screw and a nut, the drive mechanism configured to receive the rotational motion output by the motor and convert the rotational motion into linear reciprocating motion, each of the screw and the nut one of rotating about the axis or linearly translating along the axis; a clocking assembly disposed axially between the electric motor and the piston wherein the clocking assembly is configured to interface with a linear displacing element of the drive mechanism to prevent rotation of the linear displacement element about the pump axis; and a pump comprising a cylinder and a piston within the cylinder, the piston configured to be linearly reciprocated along the axis by the drive mechanism.

The clocking assembly includes a clocking housing forming a chamber, wherein the clocking housing is stationary relative the pump axis.

The clocking assembly includes a collar disposed inside the chamber and around the screw, wherein the collar is configured to interface with the clocking housing to prevent rotation of the screw about the axis.

The collar is configured to move axially inside the chamber relative the clocking housing.

The collar is fixed to the screw.

The clocking assembly further includes an anti-rotation element extending through the collar and the screw and coupling the screw to the collar.

An end of the screw is connected to an end of a drive shaft extending between the screw and the piston, and wherein the collar is disposed around an interface between the end of the screw and the end of the drive shaft.

The collar comprises a clamshell configuration with a first half that is separable with a second half.

The clocking housing comprises a clamshell configuration with a first half that is separable with a second half.

The clocking assembly includes a clocking housing forming a chamber, wherein the clocking housing is stationary relative the pump axis; a collar disposed inside the chamber and fixed to the screw, wherein the collar is configured to interface with the clocking housing to prevent rotation of the screw about the axis; wherein the interface is formed by at least one projection extending into at least one slot.

The at least one projection extends from the collar and the at least one slot is formed on the clocking housing.

A fluid outlet manifold positioned axially between the piston and the rotor.

The fluid outlet manifold defines an outlet flowpath between the pump and an outlet formed in the fluid outlet manifold, wherein a manifold portion of the outlet flowpath is disposed between an outer housing and an inner housing.

The clocking assembly includes a collar configured to reciprocate along the axis, wherein the collar is disposed within the inner housing and interfaces with the inner housing to prevent rotation about the axis.

The collar axially overlaps with the manifold portion of the outlet flowpath with the piston at an end of a first stroke, the first stroke being away from the motor.

The feed pump further includes a plurality of tie rods extending axially and disposed circumferentially about the clocking housing.

The clocking housing encloses at least a portion of the nut.

A feed pump includes an electric motor comprising a stator and a rotor; a pump having a piston configured to reciprocate axially along the pump axis of the feed pump, and wherein the piston is coaxial with the rotor; a drive mechanism connected to the rotor and to the piston, the drive mechanism configured to convert a rotational output from the rotor into a linear input to the piston; and a clocking assembly. The drive mechanism comprises a drive nut connected to the rotor and configured to rotate with the rotor; and a screw extending through the drive nut and coaxial with the drive nut. The clocking assembly axially between the electric motor and the piston and around a portion of the screw, wherein the clocking assembly is configured to prevent rotation of the screw relative the pump axis.

The feed pump of the preceding paragraph can optionally include, additionally and/or alternatively, any one or more of the following features, configurations and/or additional components:

The clocking assembly includes a clocking housing forming a chamber, wherein the clocking housing is stationary relative the pump axis; a collar inside the chamber and around the screw, wherein the collar is configured to slide inside the chamber relative the clocking housing, and wherein the collar interlocks with the clocking housing such that the collar does not rotate relative the clocking housing; and an anti-rotation pin extending through the collar and the screw and coupling the screw to the collar.

The clocking housing includes a slot extending radially into an inner surface of the clocking housing relative the pump axis and extending axially on the inner surface of the clocking housing relative the pump axis.

The collar includes a tab extending radially from the collar relative the pump axis of the feed pump and into the slot to provide anti-rotation between the collar and the clocking housing.

The clocking mechanism further includes a first bumper connected to a first end of the collar; and a second bumper connected to a second end of the collar and opposite the first bumper.

The clocking housing includes a second slot extending radially into the inner surface of the clocking housing relative the pump axis and extending axially on the inner surface of the clocking housing relative the pump axis.

The collar includes a second tab extending radially from the collar relative the pump axis of the feed pump and into the second slot to provide anti-rotation between the collar and the clocking housing.

A plural component spray system includes a first feed pump, wherein the first feed pump comprises the feed pump of any one of the preceding examples; a second feed pump; a first proportioner pump fluidically connected to an outlet of the first feed pump; a second proportioner pump fluidically connected to an outlet of the second feed pump; and an applicator connected to an outlet of the first proportioner pump and to an outlet of the second proportioner pump to output a plural component material formed from materials pumped by the first feed pump, the second feed pump, the first proportioner pump, and the second proportioner pump.

The plural component spray system of the preceding paragraph can optionally include, additionally and/or alternatively, any one or more of the following features, configurations and/or additional components:

Wherein the second feed pump comprises the pump of any one of the preceding examples.

A feed pump includes an electric motor comprising a stator and a rotor, the rotor configured to rotate about an axis; a pump having a piston disposed coaxially with the rotor and configured to reciprocate axially along the axis; a drive mechanism connected to the rotor and to the piston, the drive mechanism configured to convert a rotational output from the rotor into a linear input to the piston, wherein the drive mechanism comprises a screw and a nut, wherein each of the screw and the nut one of rotates about the axis or linearly translates along the axis; a bearing assembly axially between the electric motor and the piston and rotationally connecting the rotor of the electric motor to the drive nut; wherein the piston receives a downward reaction force when moving through the upstroke and an upward reaction force when moving through the downstroke, and both of the upward reaction force and the downward reaction force transfer through the drive mechanism and to the bearing assembly, and wherein the bearing assembly permits the rotational motion to pass within the drive mechanism from the motor to the drive mechanism while the bearing assembly prevents some or all of both of the downward reaction force and the upward reaction force from transferring to the rotor.

The feed pump of the preceding paragraph can optionally include, additionally and/or alternatively, any one or more of the following features, configurations and/or additional components:

The bearing assembly is fixed to a frame supporting the electric motor.

The frame includes a support extending axially between and connecting the bearing assembly to a fluid outlet manifold.

The support includes a plurality of tie rods.

A rotor shaft connected to the rotor to rotate with the rotor and disposed coaxial with the rotor, wherein connects the rotor to the drive mechanism.

The rotor shaft is rotationally fixed to the bearing assembly and axially free relative the bearing assembly.

The bearing assembly includes a first roller bearing assembly disposed axially between the nut and the electric motor; a second roller bearing assembly disposed axially between the first roller bearing assembly and the electric motor; a sleeve coupler connected to the drive nut and positioned axially between the first roller bearing assembly and the second roller bearing assembly; wherein the rotor is connected to the sleeve coupler.

The first roller bearing assembly is disposed on a first side of a radial flange of the sleeve coupler and the second roller bearing assembly is disposed on a second side of the radial flange such that the radial flange is disposed axially between the first roller bearing assembly and the second roller bearing assembly.

The bearing assembly further includes a first housing member axially aligned with the electric motor and comprising a first opening; and a second housing member connected to the first housing member and positioned axially between the first housing member and the electric motor and comprising a second opening, and wherein the drive nut extends through the first opening and is connected to the sleeve coupler, and wherein a rotor shaft of the rotor extends through the second opening and is connected to the sleeve coupler.

A portion of the drive nut extends into a bore of the sleeve coupler and an end of the rotor shaft extends into the bore.

The nut does not directly contact the rotor shaft.

The sleeve coupler is connected to the drive nut and the rotor shaft such that an axial gap is disposed between the drive nut and the rotor shaft.

The sleeve coupler, the drive nut, and the rotor shaft are rotationally fixed relative one another such that the sleeve coupler, the drive nut, and the rotor shaft rotate in unison.

The nut is axially fixed to the sleeve coupler and the rotor shaft is axially free relative the sleeve coupler.

The bearing assembly further includes a damper spring disposed axially between the first housing member and the first plurality of roller bearings.

The damper spring is an annular wave spring that is axially between the first housing member and the first plurality of roller bearings, and is coaxially aligned with the pump axis and the first opening in the first housing member.

The sleeve coupler includes a body extending axially from a first end to a second end axially opposite the first end;

a flange extending radially outward from the body between the first end and the second end; and a bore. The flange includes a first surface supports the first roller bearing assembly; and a second surface axially opposite the first surface, wherein the second surface supports the second roller bearing assembly. The bore extending axially through the body from the first end to the second end of the body.

The body of the sleeve coupler further includes a first portion extending axially from the first end of the body to the first surface of the flange; and a second portion extending axially from the second end of the body to the second surface of the flange, wherein the first portion comprises an inner radius larger than an inner radius of the second portion.

The drive nut is connected to the first end of the body by at least one fastener, and the rotor shaft of the electric motor extends into the bore.

A feed pump includes an electric motor comprising a stator and a rotor, the rotor configured to rotate on an axis; a pump having a piston, wherein the piston is configured to reciprocate axially along the axis of the feed pump, and wherein the piston is coaxial with the rotor; a drive mechanism connected to the rotor and to the piston, the drive mechanism configured to convert a rotational output from the rotor into a linear input to the piston; and a bearing assembly rotationally connecting the rotor of the electric motor to the drive mechanism and configured to react axial loads in both a first axial direction along the axis and a second axial direction along the pump axis.

The feed pump of the preceding paragraph can optionally include, additionally and/or alternatively, any one or more of the following features, configurations and/or additional components:

A rotor shaft connected to the rotor and coaxial with the rotor, wherein the rotor shaft rotates with the rotor, wherein the rotor shaft is coaxial with the drive shaft and connects the rotor to the drive mechanism.

A fluid outlet manifold positioned axially between the piston and the bearing assembly; a plurality of tie rods extending axially between the fluid outlet manifold and a housing of the bearing assembly and connecting the bearing assembly and the fluid outlet manifold; a first check valve axially between the piston and a fluid inlet of the feed pump; and a second check valve axially between the piston and the first check valve.

The drive mechanism includes a drive nut connected to the rotor shaft and configured to rotate with the rotor shaft; a screw extending through the drive nut and coaxial with the drive nut, wherein the screw is connected to the drive shaft and is coaxial with both the drive shaft and the rotor shaft; and a plurality of rolling elements disposed within a gap between the screw and the drive nut, wherein the plurality of rolling elements support the screw relative the drive nut and are configured to be driven by rotation of the rotor shaft and the drive nut to drive the screw axially.

The bearing assembly rotationally connects the rotor shaft of the electric motor to the drive nut.

The bearing assembly includes a first roller bearing subassembly disposed axially between the drive nut and the electric motor; a second roller bearing subassembly disposed axially between the first plurality of roller bearings and the electric motor; a sleeve coupler position axially between the first roller bearing subassembly and the second roller bearing subassembly; wherein the drive nut is connected to the sleeve coupler, and wherein the rotor shaft of the electric motor is connected to the sleeve coupler.

The bearing assembly further includes a first housing member axially aligned with the electric motor and comprising a first opening; and a second housing member positioned axially between the first housing member and the electric motor and comprising a second opening, wherein the second housing member is connected to a housing of the electric motor and to the first housing member, wherein the sleeve coupler position axially between the first housing member and the second housing member and coaxial with the first housing member and the second housing member, wherein the first roller bearing subassembly is disposed between the sleeve coupler and the first housing member, wherein the second roller bearing subassembly is disposed between the sleeve coupler and the second housing member, wherein the drive nut extends through the first opening and is connected to the sleeve coupler, and wherein the rotor shaft of the electric motor extends through the second opening and is connected to the sleeve coupler.

The sleeve coupler, the drive nut, and the rotor shaft are rotationally fixed relative one another such that the sleeve coupler, the drive nut, and the rotor shaft rotate in unison when the electric motor rotates the rotor shaft.

The rotor shaft is not axially fixed to the sleeve coupler such that the sleeve coupler can axially move relative the rotor shaft.

The rotor shaft does not directly contact the drive nut.

The bearing assembly further includes a damper spring disposed axially between the first housing member and the first roller bearing subassembly.

The damper spring is an annular wave spring that is axially between the first housing member and the first roller bearing subassembly, and is coaxially aligned with the pump axis and the first opening in the first housing member.

The sleeve coupler includes a body extending axially from a first end to a second end axially opposite the first end; a flange extending radially outward from the body between the first end and the second end; and a bore. The flange includes a first surface contacting the first roller bearing subassembly; and a second surface axially opposite the first surface, wherein the second surface contacts the second roller bearing subassembly. The bore extending axially through the body from the first end to the second end of the body.

The body of the sleeve coupler further includes a first portion extending axially from the first end of the body to the first surface of the flange; a second portion extending axially from the second end of the body to the second surface of the flange, wherein the first portion comprises an inner radius larger than an inner radius of the second portion; and a shoulder in the bore axially between the inner radius of the first portion and the inner radius of the second portion, wherein an axial gap is formed between the shoulder and the drive nut.

The drive nut is connected to the first end of the body by at least one fastener, and the rotor shaft of the electric motor extends into the bore.

The first roller bearing subassembly includes a first race adjacent the first housing member; a second race adjacent the first surface of the flange; and a first plurality of bearing elements axially between the first race and the second race.

The second roller bearing subassembly includes a third race adjacent the second surface of the flange; a fourth race adjacent the second housing member; and a second plurality of bearing elements axially between the third race and the fourth race.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pumping assembly for pumping a fluid from an upstream fluid source to a downstream location, the pumping assembly comprising:

a motor including a stator and a rotor, the rotor configured to rotate relative to the stator on a pump axis;

a drive connected to the rotor, the drive configured to receive a rotational output from the rotor and convert the rotational output into a linear input along the pump axis to cause pumping of the fluid; and a pump comprising a piston, wherein the piston is connected to the drive to receive the linear input and is disposed coaxially with the drive and the rotor, wherein the piston is configured to reciprocate axially along the pump axis to pump fluid;

wherein the drive is configured to drive the piston in a first axial direction along the pump axis and a second axial direction along the pump axis, and wherein a screw of the drive extends into the motor with the screw disposed at a first position associated with an end of a stroke in a second axial direction.

2. The pumping assembly of claim 1, wherein the drive comprises:

a drive nut connected to the rotor to rotate with the rotor;

the screw elongated along the pump axis and disposed coaxially on the pump axis; and a plurality of rolling elements disposed radially between the drive nut and the screw and supporting the drive nut relative to the screw to maintain a radial gap between the drive nut and the screw.

3. The pumping assembly of claim 2, wherein the drive further comprises:

a drive nut bore extending axially through the drive nut and inner threading formed on a surface of the hole, wherein the inner threading rotates with the drive nut; and outer threading on the screw, wherein the outer threading moves axially with the screw;

and wherein each rolling element of the plurality of rolling elements interfaces with both the inner threading and the outer threading.

4. The pumping assembly of claim 2, wherein the plurality of rolling elements includes one of balls and elongate rollers.

5. The pumping assembly of claim 1, further comprising:

a pump frame supporting the motor by a first static connection and a first dynamic connection.

6. The pumping assembly of claim 5, wherein a main body of the pump frame extends in a first axial direction relative to a first axial end of the motor, and wherein the first static connection is formed between the pump frame and a second axial end of the motor disposed opposite the first axial end.

7. The pumping assembly of claim 5, wherein the first dynamic connection is formed by a bearing supporting the motor on the pump frame, the bearing configured to react to axial loads in each of a first axial direction and a second axial direction.

8. The pumping assembly of claim 5, wherein the pump is mounted to the pump frame by a second static connection, wherein the piston is connected to the drive by a second dynamic connection, and wherein the first dynamic connection is disposed axially between the first static connection and the second static connection.

9. The pumping assembly of claim 1, wherein the piston is at least partially disposed within a cylinder of the pump, and wherein the piston is configured to reciprocate within a first zone along the axis during a first pumping mode to pump the fluid, and wherein the piston is configured to move into a second zone along the axis during a second pumping mode, the second zone different from the first zone.

10. The pumping assembly of claim 1, wherein the rotor includes a rotor body supporting a plurality of permanent magnets and a rotor shaft extending in the first axial direction from the rotor body, and wherein the drive is connected to an end of the rotor shaft opposite the rotor body.

11. A pumping assembly for pumping a fluid from an upstream fluid source to a downstream location, the pumping assembly comprising:

a motor including a stator and a rotor, the rotor configured to rotate relative to the stator on a pump axis;

a drive connected to the rotor, the drive configured to receive a rotational output from the rotor and convert the rotational output into a linear input along the pump axis to cause pumping of the fluid;

a pump comprising a piston, wherein the piston is connected to the drive to receive the linear input and is disposed coaxially with the drive and the rotor, wherein the piston is configured to reciprocate axially along the pump axis to pump fluid; and a rotor shaft connected to the rotor and coaxial with the rotor, wherein the rotor shaft rotates with the rotor and connects the rotor to the drive;

wherein a screw of the drive extends into the rotor shaft during at least a portion of a pump cycle.

12. The pumping assembly of claim 11, wherein the rotor shaft is at least partially disposed within and surrounded by the rotor.

13. The pumping assembly of claim 11, further comprising:

a spacer is disposed on the screw of the drive and radially between the screw and the rotor shaft;

wherein the spacer prevents the screw from directly contacting the rotor shaft.

14. A pumping assembly for pumping a fluid from an upstream fluid source to a downstream location, the pumping assembly comprising, a motor including a stator and a rotor, the rotor configured to rotate relative to the stator on a pump axis;

a drive connected to the rotor, the drive configured to receive a rotational output from the rotor and convert the rotational output into a linear input along the pump axis to cause pumping of the fluid; and a pump comprising a piston, wherein the piston is connected to the drive to receive the linear input and is disposed coaxially with the drive and the rotor, wherein the piston is configured to reciprocate axially along the pump axis to pump fluid, wherein the pump includes:

a first check valve disposed on the pump axis; and a second check valve disposed on the pump axis;

wherein the second check valve is disposed in the piston to travel with the piston.

15. A pumping assembly for pumping a fluid from an upstream fluid source to a downstream location, the pumping assembly comprising:

a motor including a stator and a rotor, the rotor configured to rotate relative to the stator on a pump axis;

a drive connected to the rotor, the drive configured to receive a rotational output from the rotor and convert the rotational output into a linear input along the pump axis to cause pumping of the fluid;

a pump comprising a piston, wherein the piston is connected to the drive to receive the linear input and is disposed coaxially with the drive and the rotor, wherein the piston is configured to reciprocate axially along the pump axis to pump fluid; and a bearing assembly connecting the rotor of the electric motor to the drive, wherein the bearing assembly is configured to react to axial loads;

wherein the bearing assembly further comprises:

a first housing member comprising a first opening;

a second housing member positioned axially between the first housing member and the electric motor and comprising a second opening, wherein the second housing member is connected to a housing of the electric motor and to the first housing member;

a sleeve coupler positioned axially between the first housing member and the second housing member and coaxial with the first housing member and the second housing member;

a first plurality of roller bearings disposed between the sleeve coupler and the first housing member; and a second plurality of roller bearings disposed between the sleeve coupler and the second housing member, wherein a drive nut of the drive extends through the first opening and is connected to the sleeve coupler, and wherein the rotor is connected to the sleeve coupler through the second opening.

16. The pumping assembly of claim 15, wherein a rotor shaft extends axially from the rotor and is connected to the sleeve coupler to connect the rotor to the sleeve coupler, and wherein the sleeve coupler, the drive nut, and the rotor shaft are rotationally fixed relative to one another such that the sleeve coupler, the drive nut, and the rotor shaft rotate in unison when the electric motor rotates the rotor shaft.

17. A pumping assembly for pumping a fluid from an upstream fluid source to a downstream location, the pumping assembly comprising:

a motor including a stator and a rotor, the rotor configured to rotate relative to the stator on a pump axis;

a drive connected to the rotor, the drive configured to receive a rotational output from the rotor and convert the rotational output into a linear input along the pump axis to cause pumping of the fluid; and a pump comprising a piston, wherein the piston is connected to the drive to receive the linear input and is disposed coaxially with the drive and the rotor, wherein the piston is configured to reciprocate axially along the pump axis to pump fluid; and a clocking assembly interfacing with a linear drive element of the drive to prevent rotation of the linear drive element about the pump axis, wherein the linear drive element interfaces with the piston to displace the piston axially along the pump axis.

18. A pumping assembly for pumping a fluid, the pumping assembly comprising:

a motor including a stator and a rotor, the rotor configured to rotate relative to the stator on a pump axis;

a pump frame supporting the motor by a first static connection and a first dynamic connection;

a drive connected to the rotor, the drive configured to receive a rotational output from the rotor and convert the rotational output into a linear input along the pump axis to cause pumping of the fluid; and a displacement pump fixed to the pump frame by a second static connection and connected to the drive by a second dynamic connection, the displacement pump including a piston configured to be reciprocated along the pump axis by the drive to pump the fluid;

wherein the first dynamic connection is disposed axially between the first static connection and the second static connection.

19. A fluid sprayer comprising:

a frame elongate along an axis to have a first end and a second end;

a motor mounted on the first end of the frame, the motor electrically powered, the motor comprising a rotor and a stator, the rotor rotating about an axis, the motor configured to output rotational motion, the motor supported by the frame by a first static connection and a first dynamic connection;

a pump mounted on the second end of the frame, the pump comprising a piston and a cylinder, the piston configured to reciprocate along the axis within the cylinder;

a drive supported by the frame and located directly between the motor and the pump, the drive comprising a screw that is elongate along the axis, the screw only one of linearly translating along or rotating about the axis, the drive outputting linear reciprocating motion;

wherein the piston receives the linear reciprocating motion output by the drive to reciprocate the piston along the axis while the cylinder is braced by the frame such that the piston reciprocates within the cylinder; and wherein a main body of the frame extends in a first axial direction away from a first axial end of the motor, and wherein the first static connection is formed between the pump frame and a second axial end of the motor disposed opposite the first axial end, the first axial end of the motor oriented towards the pump.

* * * * *